United States Patent [19]
Noble et al.

[11] Patent Number: 5,313,636
[45] Date of Patent: May 17, 1994

[54] MOSAIC OBJECTS AND METHOD FOR OPTIMIZING OBJECT REPRESENTATION PERFORMANCE IN AN OBJECT-ORIENTED REPRESENTATION SYSTEM

[75] Inventors: Robert E. Noble, Sunnyvale; Gregory D. Clemenson, Palo Alto, both of Calif.

[73] Assignee: Intellicorp, Inc., Mountain View, Calif.

[21] Appl. No.: 103,723

[22] Filed: Aug. 5, 1993

Related U.S. Application Data

[63] Continuation of Ser. No. 589,114, Sep. 27, 1990, abandoned.

[51] Int. Cl.⁵ ............... G06F 12/00; G06F 15/00
[52] U.S. Cl. .................... 395/700; 364/DIG. 1; 364/283.4; 364/282.3; 364/274.3; 395/400; 395/600
[58] Field of Search .............. 395/700; 364/DIG. 1

[56] References Cited

U.S. PATENT DOCUMENTS

| | | | |
|---|---|---|---|
| 4,068,300 | 1/1978 | Bachman | 364/200 |
| 4,450,522 | 5/1984 | Pilat et al. | 395/400 |
| 4,864,497 | 9/1989 | Lowry et al. | 364/300 |
| 4,930,071 | 5/1990 | Tou et al. | 364/300 |
| 5,129,083 | 7/1992 | Cutler et al. | 395/600 |

*Primary Examiner*—Gareth D. Shaw
*Assistant Examiner*—Lucien Toplu
*Attorney, Agent, or Firm*—Townsend and Townsend Khourie and Crew

[57] ABSTRACT

Object-oriented software-based systems may be optimized by providing a data representation which is initially permitted to be completely dynamic such that at compile time representation need not be specified and thereafter the data structure and representation is progressively optimized. The invention is based on the recognition that the important data structures in object-oriented systems are not the objects but rather the slots, i.e., the attributes of objects.

2 Claims, 3 Drawing Sheets

MOSAIC OBJECTS AND METHOD FOR OPTIMIZING OBJECT REPRESENTATION PERFORMANCE IN AN OBJECT-ORIENTED REPRESENTATION SYSTEM

This is a continuation of application Ser. No. 07/589,114, filed Sept. 27, 1990, now abandoned.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates to the field generally known as artificial intelligence and more particularly to programming in frame-based systems or more generally to object-oriented systems. Specifically, this invention relates to techniques for software development of an object-oriented system.

In the past, optimization of software-based systems and specifically of object-oriented systems has been dependent on the developer. While no solution for general software-based systems is known, characteristics of object-oriented systems have features which, according to the invention disclosed hereinafter, permit developer-independent optimization.

Many known computer languages support static data representation. Fewer languages support dynamic data representation. In static data representation, the decision on the internal layout of the data structure and representation is made at compile time of the computer program. All static data representation systems require prior specification of individual language, of each individual field and of each data type, such as integer, floating point, aggregate or the like. This greatly reduces flexibility of programming and data handling and extends the development time, although it does provide the best possible performance, since data access characteristics ar all determined at compile time. An example of an object-oriented language with static data representation capability is the C++ language.

In a language capable of dynamic data representation, the decision on internal layout of data structure is deferred until run time of the program, which allows efficient applications development. The dynamic representation capability is an important distinction over static data representation. The proto-typical example of an object-oriented language capable of dynamic data representation is the SmallTalk language of Xerox Corporation. Because of frequent and extensive lookup at program run time, the typical system with a dynamic data structure yields significantly slower run-time performance than a comparable system having a static data structure. Although it allows for easy applications development, SmallTalk does not run many practical applications in a generally acceptable amount of time. As a consequence, programmers may use SmallTalk or other similar languages with dynamic data structures during system development but thereafter recode a production system in another language which supports static data representation.

It is therefore desireable to provide a programming environment which is easy and flexible for development of a software-based system and which does not require extensive reengineering in a different language for production of a software-based system.

The problem area herein addressed is not to be confused with the area of database management, where database management systems employ dynamic look-up capabilities as part of an indexing scheme on a revisable database. The problem addressed herein is how to minimize recoding of source code in a generalized object-oriented programming environment.

What is needed is a programming environment and methodology that allows delay until compile time of any specification about how static the structure is to be, and what is needed is a range of options between the formation of a dynamic data structure and the formation of a fully static data with commensurate improvements over a program with fully dynamic data representation.

Definitions

In order to more fully understand the invention, an understanding of certain terms is helpful. These definitions are not necessarily all-inclusive, and it should be understood that even within certain audiences of the relevant arts, common concepts employ different terminology and common terms have various meanings.

An "object" is a specific term of art, sometimes referred to as a "unit" in the literature, which is a data structure. It is analogous to a "row" in a relational database. Typically the term "object" refers to data structures which carry both attributes ("slots") and behaviors or methods.

An "attribute" is a specific term of art, sometimes referred to as a "slot" in the literature, which is a "property" of an "object," such as a method associated with an "object." A parallel concept is the "fields" of a data structure. The artificial intelligence community refers to the concept by both terms.

A "frame" is an "object" with some additional capabilities, such as secondary structure, or attributes of attributes, active capabilities called for example "monitors," "active values," or "triggers", and self-descriptive capabilities, such as an understanding what attributes it has, what its parents are or what its parents or children are.

A "frame-based system" is a system of frames, or in other words, a system which has a self-descriptive capability.

An "object system" is a "frame-based system" which in many cases does not have the ability to describe itself.

A "value" is a term of art defining what is "in" an attribute ("slot") at any particular moment.

A "selector" is a reference to an "attribute." It is a name given to an "attribute" and the way by which access to the "attribute" is specified.

Other definitions have been or will be introduced as is helpful for an understanding of the invention.

SUMMARY OF THE INVENTION

According to the invention, an object-oriented software-based system is optimized by providing a data representation which is initially permitted to be completely dynamic, that is, a decision on layout of internal data structure is deferred such that at compile time during development data need not be specified and thereafter the data structure and representation is progressively specified and optimized. The invention is based on the recognition that the important data structures in object-oriented systems as viewed from an internal perspective are not objects but rather slots, i.e., the attributes of objects. An object of the type according to the invention begins as a pointer to a memory location. Specifically, optimization is based on the understanding that it is attributes that carry the dynamic or static characteristics and that an object is only the aggregate or mosaic of the static and dynamic characteristics of the entity which it represents.

The invention allows flexibility in terms of algorithm selection. There is the recognition that specific declarations about specific attributes can be changed to affect flexibility and thereby change both the internal representation of the attributes as well as, through means of dispatch tables, the operations that apply to them. It may be necessary to have an applicable "get value" operation, but the actual code to be executed can be customized according to the declaration made of the subject attribute. In order to effect such a modification, at compile time the system chooses a specific form of the "get value" operation suited to the level of development or optimization desired. In a specific embodiment, a minimum version is an index from a reference point or pointer in computer memory; the system will know the relative location of the specified value and then access that value. In the more flexible cases, the system may actually search using a reference data structure itself to find the right access location of the value. The attribute is specified by a reference name, which provides abstraction; the programmer need not know specific access information, such as memory offsets and indices. The name is useful as an indirect index to the data structure.

The invention will be better understood by reference to the following detailed description in connection with the following drawings.

DETAILED DESCRIPTION OF SPECIFIC EMBODIMENTS

In order to understand the invention, it is helpful to first outline the structure of objects and then show how to access the attributes in a fully dynamic mode. Thereafter, it is helpful to show how to access the attributes in a progressively more efficient and more static mode. With that one can appreciate the corresponding significant performance enhancement of the invention, which herein is referred to as a "mosaic object"-based system. It will be seen that a mosaic object is implemented as a pointer to a memory location in a software system on a computer.

Figure 1:
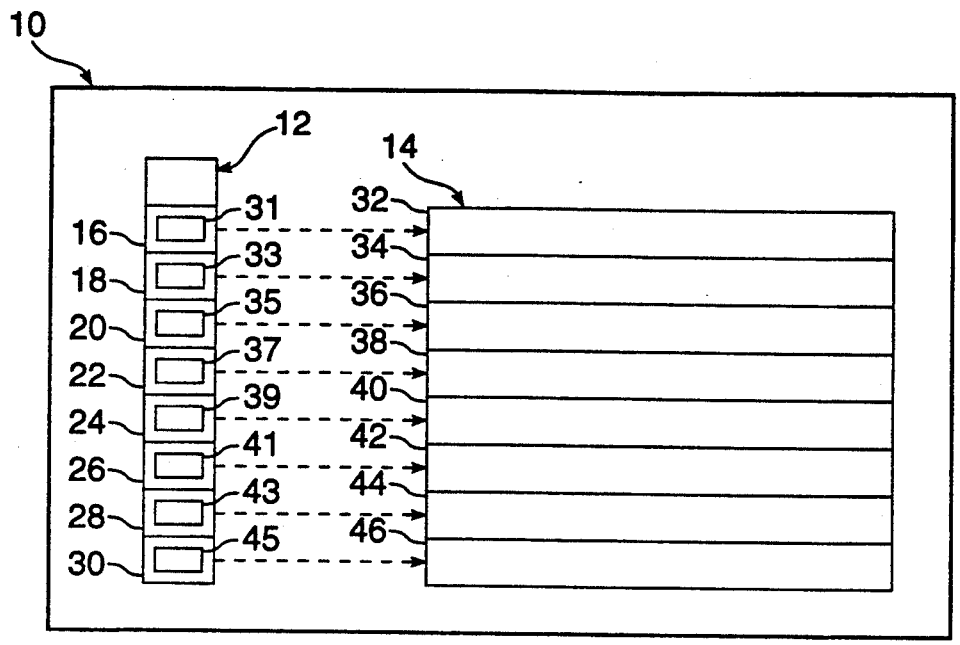
FIG. 1 is a graphical representation of an object-oriented system illustrating a single object according to the invention.

It is useful to separate the way in which attribute values are accessed from the values themselves. Referring to FIG. 1, there is shown a graphical representation of a portion of memory 10 in an object-oriented system according to the invention. An object is represented in related storage locations of a memory 10 by an attribute access table 12 and an attribute value array 14. The attribute access table 12 need not be a sequential order of memory locations. The attribute value array 14 is as a rule unique to the object and as a consequence an attribute value array 14 is a set of sequential storage locations containing structure provided for each object as represented by the elements 32, 34, 36, 38, 40, 42, 44, 46.

Figure 2:
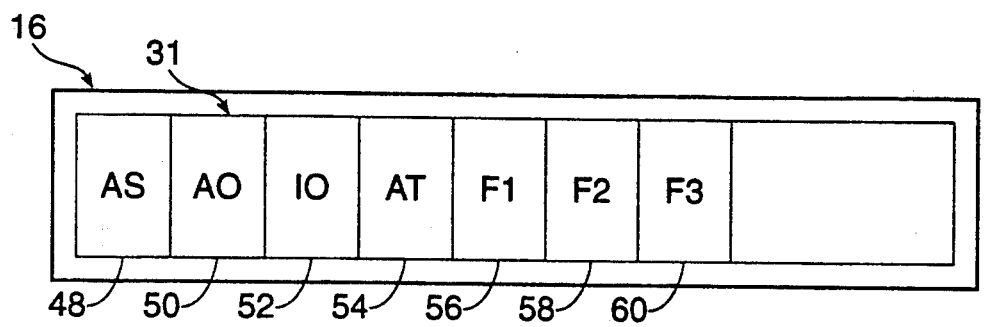
FIG. 2 is a graphical representation of an attribute access descriptor in a portion of computer memory according to the invention.

The attribute access table 12 is a hash table which contains structure or attribute access descriptors 31, 33, 35, 37, 39, 41, 43, 45 which are pointers to locations of the elements 32, 34, 36, 38, 40, 42, 44, 46 in order to interpret the attribute value array 14. Referring to FIG. 2, there is shown a table representing the attribute access descriptors structure 31 of one element 16 of an attribute access table 12. The first word or field in the structure 31 is the attribute selector (AS) 48. Another significant field is the attribute offset (AO) 50. Other fields are Inheritance Information (IO) 52, Attribute Type (AT) 54, and flags (F1) 56, (F2) 58, (F3) 60. The attribute offset 50, for example, is a value indicating an offset from a base address in an attribute value array 14 where the desired value is to be found.

Figure 3:
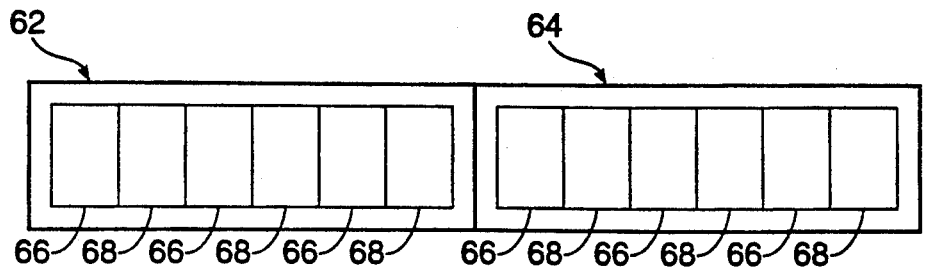
FIG. 3 is a graphical r presentation of an attribute value array in a further portion of computer memory according to the invention.

Referring to FIG. 3, there is shown a representation of two elements 32, 34 of the attribute value array 14. The attribute value array 14 is divided into types. Two significant types for this discussion are the locked type 62 and the unlocked type 64, as identified by Field 54 (FIG. 2). These types determine ancillary functionality for accessing the desired value or ways in which a representation of the structure which contains the value might be optimized or performance improvements can be obtained.

In a specific embodiment of the attribute value array, elements 62 and 64 have regions of memory of alternating attribute value 66 and associated secondary attributes 68 of the attribute. Thus attributes and secondary attributes may be associated closely.

It is now possible to describe a developmental system according to the invention and contrast it with a runtime system which has been fully optimized. It is significant that the access function or call is identical in all cases. Only the attribute declaration statement is changed. None of the functional source code is changed as among the different systems.

Figure 4:
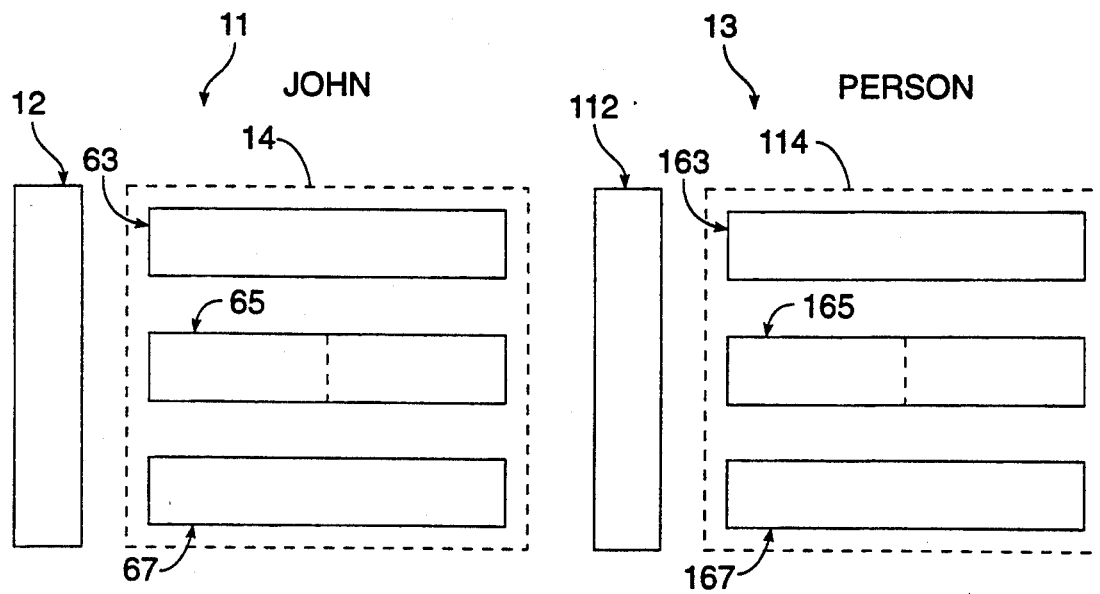
FIG. 4 is a graphical representation of an object-oriented system employing mosaic objects according to the invention.

Referring to FIG. 4, there is shown an object 11 according to the invention labeled "JOHN" with an attribute access table 12 and an attribute value array 14 having three attribute values 63, 65, 67, and there is an object 13 labeled "PERSON" with an attribute access table 112 and an attribute value array 114 having three corresponding attribute values 163, 165, 167. One of the attribute values, herein element 65 in the first array 14 and element 165 in the second array 114, is "EYE-COLOR". The generic call in the code used in a specific embodiment of the invention for objects 11 and 13 is:

getvalue ("John", "EYECOLOR").

The desired result is the value of John's eye color. In the fully dynamic developmental case, access to the value is by means of the attribute access table 12, which directs to an attribute access descriptor 31 (FIG. 2) with the access selector 48 of interest, which in this example is "EYECOLOR". Upon reference to the attribute access descriptor 31, the access offset 50 and the attribute type 54 are located. (The attribute type 54 is either locked or unlocked.) The start of the particular attribute types 62 or 64 of interest is found, and then it is added to the access offset (all of which are merely memory locations) which identifies the particular memory cell. In this case it is the element 65 in a portion of the attribute value array 14. All of these actions are considered necessary to perform a fully dynamic lookup of John's eye color, and it is considered a fairly significant computation.

By employing an attribute declaration statement according to the invention to redefine the getvalue statement, a more efficient static process is carried out without having to replace the source code. According to this action, the instruction fetches the mosaic object 11 labeled John, goes to the attribute value array 14, uses the compile time offset value (AO 50 in FIG. 2) and examines one word at element 65. This consumes significantly less computational overhead than the prior technique.

The organization of the system is such that a series of declarations may be provided to partition the possibilities between these two extremes. What has been recited are the most dynamic case and the most static case. There are also a number of incremental steps between those two extremes providing flexibility which are useful in the course of development and in certain application programs. When an application program is in development, the program is designed to follow the full path of access to the attribute value array to get at a memory cell. However, upon compilation of a fully developed program, the declarations may be set such that resultant translation specifies a minimal access path in order to go directly to the specific memory cell of the attribute value array.

The attribute declaration 52, 54, 56, 58, 60 are stored in the attribute access descriptor data structure 16 (FIG. 2, and they can be modified at any time, from the beginning of development to the point of desired optimization.

A system according to the invention typically works as described in connection with FIG. 5. A typical declaration in the language of interest (C or a dialect) is as follows:

```
Make_Object ("person", "application",
nil,'("eyecolor", Make_Raw_Attribute_Data (null,
locked), "weight", "height"), FALSE)
```

This source code statement creates a class in the repository "attributes" with no parents and three attributes, namely, "eyecolor", "weight", and "height", with an attribute declaration for "eyecolor" of "locked" attribute type, to which is added raw attribute data.

A further relationship is defined by the sentence.

pragma "John" is a "person"

Thus the compiler is advised "John" is an "instance" of the "class" "person". (#pragma is C construct.)

To fully understand the concept of declarations it is now necessary to define a further term, namely, "class". Referring to FIG. 4, a "class" is a specification for a type of object. In the case of a person, it specifies attributes which are appropriate to a person. Some of the secondary attributes of a person might also relate a person to other classes. A further term of art is an "instance". An "instance", rather than specifying a general concept such as person, specifies a specific concept, or a specific realization, for example, John. The "object" 11 "John" is a particular "instance" of the "class" "person", which in turn is represented by the "object" 13. There might be many instances of a person but there's only one John, for example.

Declarations are made at the class level. All such declarations are inherited in an object-representation system to the instance level. Referring to FIG. 3, in the unlocked type element 64 of the attribute value array, there is contained non-optimized attributes, and the locked type element 62 contains the optimized attributes. For example, by adding a declaration at the class level (object 13, FIG. 4), the instance would inherit whether or not a particular attribute (eye color) would be located in the unlocked or unoptimizable location or the locked or optimizable location. The attribute caller cannot tell the location of the particular attribute.

Significantly under "person", it is possible to add another level of indirection. It could have been stated that there is a subclass of person called "computer programmer" and then that "John" was a computer programmer and still advise the compiler that "John" is a "person" even though it is indirect. Because a particular attribute of interest is eye color, which is defined at the "person" level, not the "computer programmer" level, recoding is not required.

Figure 5:
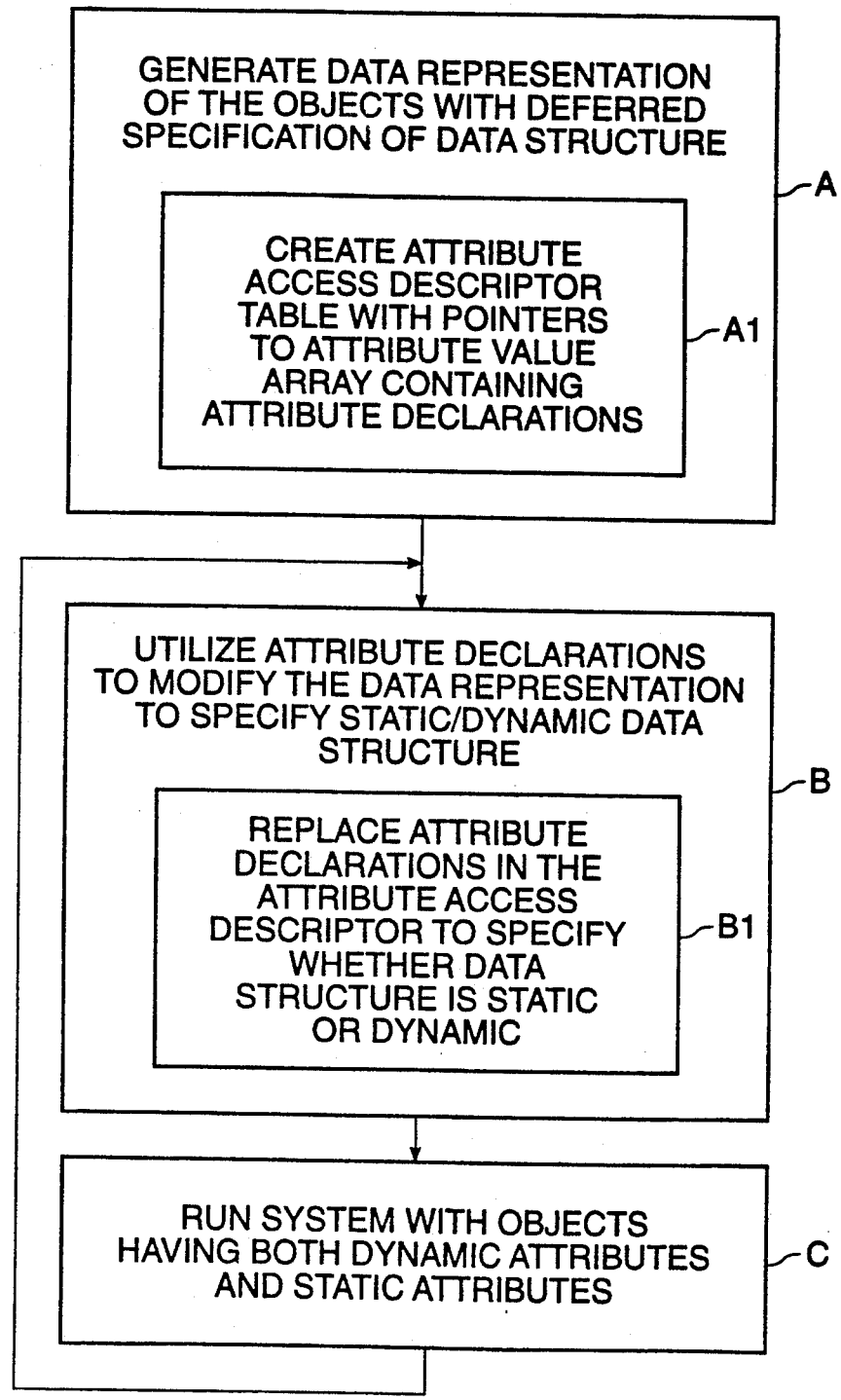
FIG. 5 is a flow chart of a general procedure for optimizing access to data representation in accordance with the invention.

In summary, and referring to FIG. 5, the method for implementing objects of the software system comprises generating a data representation of objects of the object-oriented system wherein decision on layout of internal data structure is deferred such that data structure need not be specified at the time source code of the object-oriented software system is compiled into an executable form (Step A), and thereafter utilizing attribute declarations of the attributes to modify data representation of the object-oriented software system to specify whether access to individual attributes of the objects is static or dynamic (Step B). Specifically, the generating step comprises creating an attribute access table for selected objects (Step A1), the attribute access table including pointers to an attribute value array. The attribute value array contains the attribute declarations. The utilizing step then comprises replacing the attribute declarations in the attribute value array with new (or second) attribute declarations (Step B1). The new attribute declarations specify the layout of the internal data structure and can be either static or dynamic. To this end the attribute declarations are prestored in the attribute access descriptor data structure such that the attribute declarations can be modified without affecting source code. Specifically, the software system is operated with mixed dynamic and static representations (Step C); thereafter the representations can be changed to alter the mixture (Step D) and the software systems is operated again (Step C), producing desired results with appropriately altered performance characteristics.

The invention herein enables the construction of an object-oriented system having substantial flexibility. Specifically, the invention enables construction of an object-oriented system from objects of a different character than heretofore known. The object-oriented software system on a computer has objects which are specified by attributes having attribute declarations, wherein the objects comprise data representations in the form of attributes, and attribute declarations defining the attributes and modifying said data representations. More specifically, there may be within a single object first attribute declarations which define static attributes and second attribute declarations define dynamic attributes. The combination of static attributes and dynamic attributes in a single object is a unique and powerful aspect of the present invention.

The following provides guidance to permit a programmer to adapt a conventional compiler of an object-oriented language to employ mosiac objects. Specifically, the following example illustrates programmatic manipulation of an object which contains both static and dynamic attributes. The access of the "Proceeds" attribute is transformed into a static fetch, whereas the access of "Expense" remains a dynamic fetch. OBJECT—VALUE—ARRAY(job) extracts the value array from the object job, and [0] accesses the specific location in the value array where the actual data is stored.

I. EXAMPLE

Give the following source code:

```
PrkFixnum Calculate_Profit (PrkObject job)
{
#pragma job is a "Job"
return GetValue(job, "Proceeds") - GetValue(job, "Expense");
}
```

In this example, JOB is a variable containing an object descended from the class "Job". "Job" is a class containing two attributes: "Proceeds" and "Expense". "Job" might be structured as follows:

| "Job": | | |
|---|---|---|
| Attribute | Attribute Offset | Attribute Type |
| "Proceeds" | 0 | Static |
| "Expense" | 2 | Dynamic |

This source code would be transformed using a simple preprocessor into:

```
PrkFixnum Calculate_Profit(PrkObject job)
{
return OBJECT_VALUE_ARRAY(job) [0] - GetValue(job, "Expense");
}
```

A parser/preprocessor mechanism in a compiler is in the generic case as follows:

1. parse source file
   1. Load class definitions from class repository
   2. parse source declaration/definition
      1. Parse declaration
         or
      2. Parse Definition
         1. Parse Data Definition
            (or)
         2. Parse Function Definition
            1. Parse function Prototype
            2. Parse block (compound) statement
               1. Parse block start
               2. Parse block element
                  1. Parse "is a" pragma
                     1. Recognize variable--save
                        scope of pragma
                     2. Recognize class--match against class definitions
                        (or)
                     2. Parse Object declaration--save scope
                        (or)
                     3. Parse inferior statements
                        1. Detect expressions
                        2. Match accessors
                        3. Match "is a" pragmas against object argument
                        4. Look up attribute declarations for constant attribute specifier
                        5. Replace sub-expression with new sub-expression from table based on declarations in 4.
                     4. repeat until block end
                  3. Parse block end
            3. Emit post-processed code with substitutions
      3. repeat 2 until End of File condition The following outlines a description of a Table containing Accessor vs. Attributes, where Table assumes the attribute "a" value is stored in value—array location "i":

| | GetValue(o, a) |
|---|---|
| dynamic | GetValue(o, a) |
| static with Monitor | GetStaticValueWithMonitor(o, i) |
| static without Monitor | OBJECT_VALUE_ARRAY(O) [i] |
| | SetValue(o, a, v) |
| No Inheritance | |
| dynamic | SetValue(o, a, v) |
| static with Monitor | SetStaticValueWithMonitor(o, i, v) |
| static without Monitor | OBJECT_VALUE_ARRAY(o) [i] = v8 |
| SingleOverride Inheritance | |
| dynamic | SetValue(o, a, v) |
| static with Monitor | SetStaticOverrideValueWithMonitor (o, a, i, v) |
| static without Monitor | ((v !=Null) ? (OBJECT_VALUE_ARRAY(o) [i] = v) : InheritValue(o, a, i)) |
| | AddValue(o, a, v) |
| No Inheritance | |
| dynamic | AddValue(o, a, v) |
| static with Monitor | AddStaticValueWithMonitor(o, i, v) |
| static without Monitor | AddValueToListPtr (&OBJECT_VALUE_ARRAY(o) [i], v) |

The foregoing enables a programmer of a compiler to employ mosiac objects. The compiler acts upon the source code to change from a dynamic data description to a static data description.

In summary, advantages of this invention include time savings of about one to two orders of magnitude between the development version and a corresponding run-time version with identical source code, as well as flexibility in the construction of object-oriented and related systems.

Appendix A is a source code listing incorporating one embodiment of the invention. The source code listing is an illustrative example of the invention hereinabove described in the C programming language. Other embodiments are contemplated, such as using the LISP programming language. Certain aspects of a complete system in the C programming language have been omitted as they may relate to a specific implementation of an object-oriented system. The omitted details are a matter of engineering choice within the skill of the ordinary programmer in this art.

The invention has now been explained with reference to specific embodiments. Other embodiments will be apparent to those of ordinary skill in the art. It is therefore not intended that this invention be limited, except as indicated by the appended claims.

APPENDIX A

SUMMARY OF THE PARSE PHASE USED TO TRANSFORM SOURCE CODE
TAKING ADVANTAGE OF OBJECT ATTRIBUTE DELCARATIONS

---

I. EXAMPLE

Given the following source code:

```
PrkFixnum Calculate_Profit(PrkObject job)
{
#pragma job is a "Job"
  return GetValue(job, "Proceeds") - GetValue(job, "Expense");
}
```

In this example job is a variable containing an object descended from the class "Job". "Job" is a class containing two attributes: "Proceeds" and "Expense". "Job" might be structured as follows:

"Job":

| Attribute  | Attribute Offset | Attribute Type |
|------------|------------------|----------------|
| "Proceeds" | 0                | Locked         |
| "Expense"  | 2                | UnLocked       |

This source code would be transformed using a simple preprocessor into:

```
PrkFixnum Calculate_Profit(PrkObject job)
{
  return VALUE_ARRAY(job)[0] - GetValue(job, "Expense");
}
```

This example illustrates programmatic manipulation of an object which contains both static and dynamic attributes. The access of the "Proceeds" attribute is transformed into a static fetch, whereas the access of "Expense" remains a dynamic fetch. OBJECT_VALUE_ARRAY(job) extracts the value array from the object job, and [0] accesses the specific location in the value array where the actual data is stored.

---

II. PARSER OUTLINE

Generic Description of parser/preprocessor mechanism:
1. parse source file
   1. Load class definitions from class repository
   2. parse source declaration/definition
      1. Parse declaration
      2. Parse Definition
         1. Parse Data Definition
            (or)
         2. Parse Function Definition
            1. Parse function Prototype
            2. Parse block (compound) statement
               1. Parse block start
               2. Parse block element
                  1. Parse "is a" pragma
                     1. Recognize variable--save scope
                        of pragma 2. Recognize class--match against class
                      definitions
             (or)
          2. Parse Object declaration--save scope
             (or)
          3. Parse inferior statements
             1. Detect expressions
             2. Match accessors
             3. Match "is a" pragmas against object
                argument
             4. Look up attribute declarations
                for constant attribute specifier
             5. Replace sub-expression with new
                sub-expression from table based
                on declarations in 4.
          4. repeat until block end
       3. Parse block end
    3. Emit post-processed code with substitutions
3. repeat 2 until End of File condition

---

III. TRANSFORMATIONS

Table containing Accessor vs. Attributes

Table assumes attribute "a" value stored in value_array location "i"

```
                        GetValue(o, a)

dynamic (unlocked)      GetValue(o, a)
locked with Monitor     GetStaticValueWithMonitor(o,i)
locked without Monitor  VALUE_ARRAY(o)[i]

SetValue(o, a, v)
No Inheritance
dynamic (unlocked)      SetValue(o, a, v)
locked with Monitor     SetStaticValueWithMonitor(o, i, v)
locked without Monitor  VALUE_ARRAY(o)[i] = v SingleOverride
Inheritance
dynamic (unlocked)      SetValue(o, a, v)
locked with Monitor     SetStaticOverrideValueWithMonitor(o, a, i, v)
locked without Monitor  ((v != Null) ? (VALUE_ARRAY(o)[i] = v)
                                     : InheritValue(o, a, i))

AddValue(o, a, v)
No Inheritance
dynamic (unlocked)      AddValue(o, a, v)
locked with Monitor     AddStaticValueWithMonitor(o, i, v)
locked without Monitor  AddValueToListPtr(&VALUE_ARRAY(o)[i], v)
```

```
/*
**
** IntelliCorp, Inc. owns all rights to this Software SOURCE
** CODE and intends to keep the Software SOURCE CODE strictly
** confidential and to preserve it as a trade secret.  The
** Software SOURCE CODE is also protected by copyright law, and
** any unauthorized reproduction is prohibited.  This
** Software SOURCE CODE contains proprietary information of
** IntelliCorp, Inc. and its receipt or possession does not
** convey any rights to reproduce, disclose its contents, or
** to manufacture, use, or sell anything it may describe.
** Reproduction, disclosure, or use without specific written
** authorization of IntelliCorp, Inc. is strictly prohibited.
** This source code is protected by one or more of the
** following U.S. patents: Inheritance, KEEConnection, KEEWorlds
** U.S. patent Numbers: 4,675,829, 4,930,071, 4,918,621.
**
** Use, duplication or disclosure by the U.S. Government is
** subject to restrictions as set forth in subdivision (c)
** (1) (ii) of the Rights in Technical Data and Computer
```

```
** Software clause at DFARS 252.227-7013 (October 1988) and
** FAR 52.227-19 (c) (June 1987).
**
** IntelliCorp, Inc.
** 1975 El Camino Real West
** Mountain View, CA 94040
**
** Copyright 1990 by IntelliCorp, Inc.  All rights reserved.
** ProKAPPA is a trademark of IntelliCorp, Inc.
**
*/

/*
  file: cmn_objm.ih
*/ ifndef PRKS_COMMON_OBJMAN define PRKS_COMMON_OBJMAN include <prokee/pub_ommc.ih> include <prokee/t_montr.ih> include <prokee/loop_o_s.ih> include <prokee/objmn_ex.ih>

/* ------- Include the Object Manager Exceptions ------ */
/* note: Users need to know the exceptions if they have to
         bind with their handlers */ define PrkSetValue(object, slot_name, value, monitor_filter) \
  prk_slot_modification_method(object, slot_name, value, monitor_filter, PRK_SMT_SE define prk_is_set_value(object, slot_name, value, monitor_filter) \
  prk_slot_mod_method_for_rules(object, slot_name, value, monitor_filter, PRK_SMT_S define PrkSetValues(object, slot_name, value, monitor_filter) \
  prk_slot_modification_method(object, slot_name, value, monitor_filter, PRK_SMT_SE define PrkAddValue(object, slot_name, value, monitor_filter, is_after) \
  prk_slot_modification_method(object, slot_name, value, monitor_filter, (is_after)

#define prk_is_add_value(object, slot_name, value, monitor_filter, is_after) \
  prk_slot_mod_method_for_rules(object, slot_name, value, monitor_filter, (is_after define PrkAddValues(object, slot_name, value, monitor_filter, is_after) \
  prk_slot_modification_method(object, slot_name, value, monitor_filter, (is_after)

#define PrkRemoveValue(object, slot_name, value, monitor_filter) \
  prk_slot_modification_method(object, slot_name, value, monitor_filter, PRK_SMT_RE define PrkRemoveValues(object, slot_name, value, monitor_filter) \
  prk_slot_modification_method(object, slot_name, value, monitor_filter, PRK_SMT_RE define PrkSetFacetValue(object, slot_name, facet_name, value) \
  prk_facet_modification_method(object, slot_name, facet_name, value, PRK_FMT_SET_F define prk_is_set_facet_value(object, slot_name, facet_name, value) \
  prk_facet_mod_method_for_rules(object, slot_name, facet_name, value, PRK_FMT_SET_ define PrkSetFacetValues(object, slot_name, facet_name, value) \
  prk_facet_modification_method(object, slot_name, facet_name, value, PRK_FMT_SET_F define PrkAddFacetValue(object, slot_name, facet_name, value, is_after) \
  prk_facet_modification_method(object, slot_name, facet_name, value, (is_after) ?

#define prk_is_add_facet_value(object, slot_name, facet_name, value, is_after) \
  prk_facet_mod_method_for_rules(object, slot_name, facet_name, value, (is_after) ?
```

```
#define PrkAddFacetValues(object, slot_name, facet_name, value, is_after) \
    prk_facet_modification_method(object, slot_name, facet_name, value, (is_after) ?

#define PrkRemoveFacetValue(object, slot_name, facet_name, value) \
    prk_facet_modification_method(object, slot_name, facet_name, value, PRK_FMT_REMOV define PrkRemoveFacetValues(object, slot_name, facet_name, value) \
    prk_facet_modification_method(object, slot_name, facet_name, value, PRK_FMT_REMOV endif /* PRKS_COMMON_OBJMAN */

/*
   file: cmn_sbst.ih
 */ ifndef PRKS_COMMON_SUBSTRATE define PRKS_COMMON_SUBSTRATE define USER_EXPORT define PrkIsCEnvironment prk_saber_p if defined(__STRICT_ANSI__) || defined(SABER)
define ANSIARGS(args) args
#else
#define ANSIARGS(args) ()
endif ifndef __STRICT_ANSI__
define volatile
#define const
endif if !defined(sun) && defined(__sun__)
define sun
endif if defined(sun) && (defined(mc68000) || defined(__mc68000__))
define sun3
endif if defined(sun) && (defined(sparc) || defined(__sparc__))
define sun4
endif ifdef sun4
/* The following is a hack for cc's alloca.h */
#ifndef sparc
#define sparc
#endif
#include <alloca.h>
endif include <sys/types.h>
include <stdio.h> ifndef PRK_SABER
include <prokee/machdep.ih>

/* *** this following line should be fixed */
#ifdef __STRICT_ANSI__
#define CONST const
#else
#define CONST
endif if defined(__hpux__) || defined(MSDOS)
define bzero(dest, n) (memset((dest), '\0', (n)))
#else
extern void *bzero ANSIARGS((void *,int));
#endif
```

```
typedef void (*PrkVoidFn)();
typedef int (*intfn)();
typedef enum {
  PRKS_FALSE = 0,
  PRKS_TRUE = 1
} PrkBool;

#include <prokee/pub_sbmc.ih>

/* These values are hardwired in prkcpp's prk/macr_cvr.h */
enum PRK_SLOT_METHOD_ENUM {
    PRK_SMT_LAYOUT_CHUNK = 0,
    PRK_SMT_FILL_CHUNK,
    PRK_SMT_FILL_CHUNK_1PARENT,
    PRK_SMT_GET_VALUE,
    PRK_SMT_GET_VALUES,
    PRK_SMT_SET_VALUE,
    PRK_SMT_SET_VALUES,
    PRK_SMT_ADD_VALUE_FRONT,
    PRK_SMT_ADD_VALUES_FRONT,
    PRK_SMT_ADD_VALUE_REAR,
    PRK_SMT_ADD_VALUES_REAR,
    PRK_SMT_REMOVE_VALUE,
    PRK_SMT_REMOVE_VALUES,
    PRK_SMT_LOCAL_VALUE,
    PRK_SMT_MARK_CHUNK,
    PRK_SMT_METHOD_COUNT          /* The number of methods in this table */
};

/* These values are hardwired in prkcpp's prk/macr_cvr.h */
enum PRK_FACET_METHOD_ENUM {
  PRK_FMT_SET_FACET_VALUE,
  PRK_FMT_SET_FACET_VALUES,
  PRK_FMT_ADD_FACET_VALUE_FRONT,
  PRK_FMT_ADD_FACET_VALUES_FRONT,
  PRK_FMT_ADD_FACET_VALUE_REAR,
  PRK_FMT_ADD_FACET_VALUES_REAR,
  PRK_FMT_REMOVE_FACET_VALUE,
  PRK_FMT_REMOVE_FACET_VALUES,
  PRK_FMT_METHOD_COUNT
};

typedef u_int PrkImmediateTag;
typedef u_int PrkSecondaryTag;
typedef u_int PrkSlotType;

typedef u_short PrkCollectionSize;
typedef u_short PrkSlotFlags;
typedef u_short PrkFacetFlags;
typedef u_long PrkMonitorFlags;
typedef u_int PrkInheritance;
typedef u_int PrkFacetInheritance;

/* ---------- generic stuff --------------- */
define PRK_TAG_HEADER unsigned char secondary_type_tag_ typedef struct {

PRK_TAG_HEADER;
} *PrkType, *PRK_SECONDARY_HEADER_PTR;

/* Internal Accessors: */

/*
  An object consists of an Object handle and an Object body.  The object handle
  contains 29 bits of pointer or immediate data and 3 bits of immediate tag
  data.  The tag is the least significant 3 bits.  Because of this scheme, the
  object bodies must be double word aligned--meaning their addresses must be
  multiples of 8 (word = 4 bytes).
*/
```

```
#define PRK_IMMEDIATE_TAG_ALIGN 8
#define PRK_IMMEDIATE_TAG_MASK ((unsigned long)(PRK_IMMEDIATE_TAG_ALIGN - 1))
#define PRK_OBJECT_IMMEDIATE_TAG(o) \
   ((unsigned)((unsigned long)(void *)(o) & PRK_IMMEDIATE_TAG_MASK))

#define PRK_ADJUST_TAG_TO_OBJECT_BASE(tag) (-(unsigned long)(tag))

#define PRK_OBJECT_BASE(object, tag, cast) \
   ((cast)((char *)(void *)(object) + PRK_ADJUST_TAG_TO_OBJECT_BASE(tag)))

#define PRK_OBJECT_SECONDARY_TAG(o) \
   ((unsigned)((PRK_OBJECT_BASE((o), PrkNonImmediateTag, PRK_SECONDARY_HEADER_PTR)-> define PRK_SET_OBJECT_SECONDARY_TAG(o, tag) \
   ((PRK_OBJECT_BASE((o), PrkNonImmediateTag, PRK_SECONDARY_HEADER_PTR)->secondary_t /* -------------- App/Module ------------- */ typedef struct PRK_APP_STRUCT *PrkApp;
typedef struct PRK_MOD_STRUCT *PrkModule;
typedef struct PRK_AV_STRUCT *PrkMonitor;

/* -------------- List Stuff -------------- */ define PrkIsEqual(o1, o2, p) \
   (p ? (PrkBool)((PrkType)(o1) == (PrkType)(o2)) : prk_is_equal(o1, o2))

#define PrkIsListEqual(l1, l2, p) \
   (p ? prk_list_ptr_equal(l1, l2) : prk_list_equal(l1, l2))

#define PrkFindListElmt(l, o, p) \
   (p ? prk_member_ptr_eq(l, o) : prk_member_eq(l, o))

#define PrkDeleteListElmt(o, l, p, all_p) \
   ((p ? (all_p ? prk_delete_all_ptr : prk_delete_ptr) : \
     (all_p ? prk_delete_all : prk_delete))(o, l))

#define PrkDeleteListPtrElmt(o, l, p, all_p) \
   ((p ? (all_p ? prk_delete_element_all_ptr : prk_delete_element_ptr) :\
     (all_p ? prk_delete_element_all : prk_delete_element))(o, l))

/* *** This is not yet implemented */
define PrkRemoveListElmt prk_remove_ptr_or_value include <prokee/t_list.ih>

/* -------------- String Stuff ------------- */

/* -------------- Array Stuff ------------- */ typedef struct PRK_ARRAY_STRUCT {
  PRK_TAG_HEADER;
  u_char dummy_[3]; /* dummy to make everything word aligned */
  PrkCollectionSize array_size_;
  PrkCollectionSize array_fill_count_;
  PrkType *body_;
} *PrkArray;

#define PrkIsArrayEqual(a1, a2, p) \
          (p ? prk_array_ptr_equal(a1, a2) : prk_array_value_equal(a1, a2))

/* internal stack array constructor--this must be a macro as it needs to
   allocate space in an enclosing scope. */ define prk_stack_alloc(size, tag) \
   ((PrkType)((((u_long)alloca(((size) + PRK_IMMEDIATE_TAG_ALIGN)) + PRK_IMMEDIATE_T /* *** The argument list is wrong, should be same as PrkMakeArray */
define PrkMakeStackArray(size) \
   (prk_init_stack_array((size),(PrkArray)prk_stack_alloc(sizeof(struct PRK_ARRAY_ST /* -------------- Collection Stuff ------------- */
```

```c
#include <prokee/t_collct.ih>

/* -------------- Float Stuff ------------- */

/* System Structure (Dummy--generic): */
typedef struct {
  u_long dummy;
} *PrkFloat;

typedef struct {
  u_long dummy;
} *PrkNumber;

/* -------------- RawSlotData Stuff ------------- */

/* -------------- RawFacetData Stuff ------------- */

/* -------------- SAT Stuff ------------- */

/* -------------- Object Stuff ------------- */

/* -------------- Sad Stuff ------------- */

/* -------------- DFacet Stuff ------------- */

/* -------------- Error Stuff ------------- */ include <prokee/t_error.ih>

/* -------------- CValue Stuff ------------- */ include <prokee/t_cvalue.ih>

/* -------------- MethodSpec Stuff ------------- */ typedef PrkType (*PrkMethodFn)();

/* -------------- SlotReference Stuff --------------- */

/* -------------- Symbol Stuff ------------- */ endif /* PRK_SABER */ include <prokee/t_string.ih>
include <prokee/t_symbol.ih> ifndef PRK_SABER define PRK_HASH_FACTOR 12345 endif /* PRK_SABER */

/* -------------- Fixnum Stuff ------------- */ include <prokee/t_fixnum.ih>

/* -------------- Char Stuff ------------- */ include <prokee/t_char.ih> ifndef PRK_SABER

/* ------- Include the Substrate Exceptions ------ */
/* note: Users need to know the exceptions if they have to
         bind with their handlers */ include <setjmp.h>
extern long PrkGetCurrentEnvStackIndex ANSIARGS((void));
extern void PrkResetUnwindProtect ANSIARGS((long id));
extern void PrkContinueUnwindProtect ANSIARGS((long id, int error));
```

```
extern void PrkPopContinueUnwindProtect ANSIARGS((int error));
extern jmp_buf *PrkEnvStack;

extern PrkBool prk_verify_string ANSIARGS((CONST char *));

/* related to exception for unwind protect */
#define PrkUnwindProtect(id, error) \

(!(error = setjmp(PrkEnvStack[id = PrkGetCurrentEnvStackIndex()])))

#include <prokee/exceptn.ih>
include <prokee/omfnids.ih> endif /* PRK_SABER */
endif /* PRKS_COMMON_SUBSTRATE */

/*
  file: facet_md.ih
*/
do {
  PrkSd sd;
  PrkType
    **value_array, *sub_chunk, *value_ptr, *local_value_ptr, *old_sub_chunk,
    *old_sf_chunk;
  PrkSat sat;
  static_facet_t *sf_array;
  PrkList dlist, old_dlist;
  PrkDFacet dfacet;
  PrkFacetInheritance role_specifier;
  PrkType local_value;
  PrkBool localized_p;
  unsigned hts;
  prk_get_union_fn_type get_fn;
  PrkBool do_monitor_p;
  PrkBool instance_p;
  PrkMonitor monitor;
  PrkList monitors,l;
  PrkBool blAttach;
  PrkBool created_p;

USER_ASSERT_FULL_OBJECT(object, generic_facet_mod_method);
  USER_ASSERT_TYPE(slot_name, PrkSymbolTag, generic_slot_facet_method);
  USER_ASSERT_TYPE(facet_name, PrkSymbolTag, generic_slot_facet_method);
  ASSERT((method_id >= PRK_FMT_SET_FACET_VALUE &&
          method_id <= PRK_FMT_REMOVE_FACET_VALUES),
         generic_facet_mod_method);

PRK_IS_VALUE_MODIFIED_OBJECT(object) = TRUE;
  INIT_FULL_SAD_ACCESS(object, sd, sat, slot_name,
                      PrkSignalExceptionLoop(PrkExcNonExistentSlot,
                                             object, slot_name),
                      value_array,
                      -1);
  do_monitor_p = FALSE;

created_p = FALSE;
  instance_p = PRK_IS_INSTANCE(object);
  hts = PRK_SAT_HASH_TABLE_SIZE(sat);
  old_sub_chunk = sub_chunk = PRK_MASK_CHUNK(value_array[1]);
  if (sf_array = prk_sfacet_lookup(sd, facet_name)) {
    old_sf_chunk = value_ptr =
      PRK_MASK_CHUNK(sub_chunk[PRK_SD_STATIC_FACET_START(sd)]);
  value_ptr += sf_array->offset;
  local_value_ptr = value_ptr + 1;
  localized_p =
    PRK_LOCAL_SF_CHUNK_P(sub_chunk[PRK_SD_STATIC_FACET_START(sd)]) &&
    PRK_LOCAL_CHUNK_P(value_array[1]);
  role_specifier = sf_array->role;
  goto select;
}
while (PRK_SD_DISALLOW_DFACETS_P(sd))
  PrkSignalException(PrkExcNoDFacetViolation, object, slot_name, facet_name);
```

```
   dlist = prk_dfacet_lookup(old_dlist =
                              PRK_MASK_DFACET(sub_chunk[PRK_SD_SIZE(sd) - 1]),
                              facet_name);
   if (!Null(dlist)) {
     value_ptr = &PRK_DFCONS_VALUE(dlist);
     local_value_ptr = &PRK_DFCONS_LVALUE(dlist);
     localized_p =
       PRK_LOCAL_DLIST_P(sub_chunk[PRK_SD_SIZE(sd) - 1]) &&
       PRK_LOCAL_CHUNK_P(value_array[1]);
     dfacet = PRK_DFCONS_DF(dlist);
     role_specifier = PRK_DFACET_ROLE(dfacet);
   }
   else {
     role_specifier = PRK_IS_MONITOR_FACET_NAME(facet_name) ? PrkMonitorInheritance
     old_value = local_value = PrkNull;
     localized_p = FALSE;
     created_p = TRUE;
     goto select_new;
   } select:
   old_value =
     (localized_p || !PRK_NO_INHERITANCE_ROLE_P(role_specifier)) ?
       *value_ptr : PrkNull;
   local_value = localized_p && role_specifier > PRK_FACET_MAX_ONE_WORD_ROLE
     ? *local_value_ptr : PrkNull;

select_new:
   ASSERT(PRK_FACET_ROLE_P(role_specifier), generic_facet_mod_fn);

if (value == PrkNull) /* PrkNull code treated specially */
     switch (method_id) {
     case PRK_FMT_SET_FACET_VALUE:
     case PRK_FMT_SET_FACET_VALUES:
       switch (role_specifier) {
       default:
         ASSERT_NEVER_REACHED(generic_facet_mod_method);
         break;
       case PrkSelfLastUnionInheritance:
         if (localized_p) {
           local_value = PrkNull;
           value = prk_get_inherited_union_fvalues(slot_name, facet_name, PrkNull,
                                         PRK_OBJECT_PARENTS(object, sat, hts),
                                         !sf_array, instance_p);
           goto inherit_value;

}
         else
           goto old_value_default;

case PrkSelfFirstUnionInheritance:
         if (localized_p) {
           local_value = PrkNull;
           value = prk_get_inhd_runion_fvalues(slot_name, facet_name, PrkNull,
                                         PRK_OBJECT_PARENTS(object, sat, hts)
                                         !sf_array, instance_p);
           goto inherit_value;
         }
         else
           goto old_value_default;

case PrkMonitorInheritance:
         monitors = PrkNil;
         if ((facet_name != PrkWhenNeededMonitorFacetName) &&
             (facet_name != PrkWhenChangedMonitorFacetName)) {
           PRK_EXC_MSG_WARNING("Warning - Ignoring attempt to create a non-monitor\r.
    "        facet with inheritance type PrkMonitorInheritance",
                          PrkMakeFacet);
           goto EndEnd;
         }
         if (localized_p) {
           local_value = PrkNull;
```

```c
      value = prk_get_inhd_monitor_fvalues(slot_name, facet_name, PrkNull,
                              PRK_OBJECT_PARENTS(object, sat, hts),
                              !sf_array, instance_p);
      PRK_INSTALL_AV(facet_name, sd, old_sub_chunk,
                     sf_array ? sf_array->offset : PRK_DYNAMIC_AV, value,
                     object);
      goto inherit_value;
    }
    else
      goto old_value_default;

case PrkMVNoInheritance:
  case PrkSVNoInheritance:
    goto inherit_value;

case PrkMVInitialInheritance:
  case PrkSVInitialInheritance:
  case PrkMVOverrideInheritance:
  case PrkSVOverrideInheritance:
  common_null_override:
    if (localized_p) {
      local_value = PrkNull;
      value = get_inherited_override_fvalues(slot_name, facet_name,
                              PRK_OBJECT_PARENTS(object, sat, ht
                              !sf_array, instance_p);
      goto inherit_value;
    }
    else
      goto old_value_default;
  } default:
    switch (role_specifier) {
    case PrkMVInitialInheritance:
    case PrkSVInitialInheritance:
      local_value = PRK_ONCE_ONLY_LOCAL_FVALUE;
      goto inherit_value;
    /* default falls through */
    }
  old_value_default:
    value = old_value;

if (!sf_array && Null(dlist))       /* do this to force the creation */
      goto inherit_value;

goto signal_event;
  } switch (role_specifier) {
default:
  ASSERT_NEVER_REACHED(generic_facet_mod_method);
  break;

case PrkMVOverrideInheritance:
do_multi_ov:
    switch (method_id) {
    default:
      ASSERT_NEVER_REACHED(generic_facet_mod_method);
      break;

case PRK_FMT_SET_FACET_VALUE:
      value = (PrkType)prk_ncons(value);
      /* fall through to PRK_FMT_PUT_VALUES case */ case PRK_FMT_SET_FACET_VALUES:
    common_multi_override:
      USER_ASSERT_TYPE(value, PrkListTag, generic_facet_mod_method);

common_single_override:
      local_value = value;
      goto inherit_value;

case PRK_FMT_ADD_FACET_VALUE_FRONT:
```

```c
    case PRK_FMT_ADD_FACET_VALUE_REAR:
      if (local_value != PrkNull)
        if (!Null(prk_member_eq((PrkList)local_value, value)))
          goto old_value_default;
        else if (method_id == PRK_FMT_ADD_FACET_VALUE_FRONT)
          value = (PrkType)PrkMakeCons(value, local_value);
        else
          value = (PrkType)prk_append_to_list((PrkList)local_value, value);
      else
        value = (PrkType)prk_ncons(value);
      goto common_multi_override;

case PRK_FMT_ADD_FACET_VALUES_FRONT:
    case PRK_FMT_ADD_FACET_VALUES_REAR:
      USER_ASSERT_TYPE(value, PrkListTag, generic_facet_mod_method);
      if (local_value != PrkNull)
        value = (PrkType)prk_union_values((PrkList)local_value, (PrkList)value,
                                 method_id == PRK_FMT_ADD_FACET_VALUES_REAR
      else
        value = (PrkType)prk_delete_duplicates((PrkList)value);
      goto common_multi_override;

case PRK_FMT_REMOVE_FACET_VALUE:
      if (local_value == PrkNull)
        goto old_value_default;
      value = (PrkType)prk_difference_value((PrkList)old_value, value);
      goto common_multi_override;

case PRK_FMT_REMOVE_FACET_VALUES:
      USER_ASSERT_TYPE(value, PrkListTag, generic_facet_mod_method);
      if (local_value == PrkNull)
        goto old_value_default;
      value = (PrkType)prk_difference_values((PrkList)old_value, (PrkList)value);
      goto common_multi_override;
    } case PrkSVOverrideInheritance:
    do_sngl_ov:
    switch (method_id) {
    default:
      ASSERT_NEVER_REACHED(generic_facet_mod_method);
      break;

case PRK_FMT_SET_FACET_VALUES:
      USER_ASSERT_TYPE(value, PrkListTag, generic_facet_mod_method);
      if (Null((PrkList)value))
        goto common_null_override;
      if (!Null(PRK_REST(value)))
        PrkSignalExceptionLoop(PrkExcFacetValueOverflow, object, slot_name, facet_r
      else
        value = PRK_FIRST(value);
      if (value == PrkNull)
        goto common_null_override;
      /* fall through to PRK_FMT_PUT_VALUE case */ case PRK_FMT_SET_FACET_VALUE:
      goto common_single_override;

case PRK_FMT_ADD_FACET_VALUES_FRONT:
    case PRK_FMT_ADD_FACET_VALUES_REAR:
      USER_ASSERT_TYPE(value, PrkListTag, generic_facet_mod_method);
      if (Null((PrkList)value))
        goto old_value_default;
      if (!Null(PRK_REST((PrkList)value)))
        PrkSignalExceptionLoop(PrkExcFacetValueOverflow, object, slot_name, facet_r
      value = PRK_FIRST(value);
      if (value == PrkNull)
        PrkSignalExceptionLoop(PrkExcNullAsFacetValue, object, slot_name, facet_nam
      /* fall through to PRK_FMT_ADD_FACET_VALUE_FRONT case */ case PRK_FMT_ADD_FACET_VALUE_FRONT:
    case PRK_FMT_ADD_FACET_VALUE_REAR:
      if (local_value != PrkNull) {
```

```
            if (!EQUAL_OBJS(local_value,value))
              PrkSignalExceptionLoop(PrkExcFacetValueOverflow, object, slot_name, facet
            else
              goto old_value_default;
          }
          goto common_single_override;

case PRK_FMT_REMOVE_FACET_VALUE:
          if (local_value == PrkNull || !EQUAL_OBJS(value,local_value))
            goto old_value_default;
          goto common_null_override;

case PRK_FMT_REMOVE_FACET_VALUES:
          USER_ASSERT_TYPE(value, PrkListTag, generic_facet_mod_method);
          if (local_value == PrkNull ||
              (Null(prk_member_eq((PrkList)value, local_value))))
            goto old_value_default;
          goto common_null_override;
        }
  case PrkMVInitialInheritance:
    switch (method_id) {
    default:
    case PRK_FMT_SET_FACET_VALUE:
    case PRK_FMT_SET_FACET_VALUES:
    case PRK_FMT_REMOVE_FACET_VALUE:
    case PRK_FMT_REMOVE_FACET_VALUES:
      goto do_multi_ov;

case PRK_FMT_ADD_FACET_VALUE_FRONT:
    case PRK_FMT_ADD_FACET_VALUE_REAR:
      if (local_value != PrkNull) {
        if (!Null(prk_member_eq((PrkList)local_value, value)))
          goto old_value_default;
        else if (method_id == PRK_FMT_ADD_FACET_VALUE_FRONT)
          value = (PrkType)PrkMakeCons(value, local_value);
        else
          value = (PrkType)prk_append_to_list((PrkList)local_value, value);
      }
      else if (old_value != PrkNull) {
        if (!Null(prk_member_eq((PrkList)old_value, value)))
          goto old_value_default;
        else if (method_id == PRK_FMT_ADD_FACET_VALUE_FRONT)
          value = (PrkType)PrkMakeCons(value, old_value);
        else
          value = (PrkType)prk_append_to_list((PrkList)old_value, value);
      }
      else
        value = (PrkType)prk_ncons(value);
      goto common_multi_override;

case PRK_FMT_ADD_FACET_VALUES_FRONT:
    case PRK_FMT_ADD_FACET_VALUES_REAR:
      USER_ASSERT_TYPE(value, PrkListTag, generic_facet_mod_method);
      if (local_value != PrkNull)
        value = (PrkType)prk_union_values((PrkList)local_value, (PrkList)value,
                                          method_id == PRK_FMT_ADD_FACET_VALUES_REAR
      else if (old_value != PrkNull)
        value = (PrkType)prk_union_values((PrkList)old_value, (PrkList)value,
                                          method_id == PRK_FMT_ADD_FACET_VALUES_REAR
      goto common_multi_override;
    } case PrkMVNoInheritance:
    switch (method_id) {
    default:
      ASSERT_NEVER_REACHED(generic_facet_mod_method);
      break;

case PRK_FMT_SET_FACET_VALUE:
      value = (PrkType)prk_ncons(value);
      /* fall through */ case PRK_FMT_SET_FACET_VALUES:
```

```
      goto common_multi_override;

case PRK_FMT_ADD_FACET_VALUE_FRONT:
case PRK_FMT_ADD_FACET_VALUE_REAR:
  if (old_value != PrkNull)
    if (!Null(prk_member_eq((PrkList)old_value, value)))
      goto old_value_default;
    else if (method_id == PRK_FMT_ADD_FACET_VALUE_FRONT)
      value = (PrkType)PrkMakeCons(value, old_value);
    else
      value = (PrkType)prk_append_to_list((PrkList)old_value, value);
  else
    value = (PrkType)prk_ncons(value);
  goto inherit_value;

case PRK_FMT_ADD_FACET_VALUES_FRONT:
case PRK_FMT_ADD_FACET_VALUES_REAR:
  USER_ASSERT_TYPE(value, PrkListTag, generic_facet_mod_method);
  if (old_value != PrkNull)
    value = (PrkType)prk_union_values((PrkList)old_value, (PrkList)value,
                                      method_id == PRK_FMT_ADD_FACET_VALUES_REAR
  else
    value = (PrkType)prk_delete_duplicates((PrkList)value);
  goto inherit_value;

case PRK_FMT_REMOVE_FACET_VALUE:
  if (old_value == PrkNull)
    value = PrkNull;
  else
    value = (PrkType)prk_difference_value((PrkList)old_value, value);
  goto inherit_value;

case PRK_FMT_REMOVE_FACET_VALUES:
  USER_ASSERT_TYPE(value, PrkListTag, generic_facet_mod_method);
  if (old_value == PrkNull)
    value = PrkNull;
  else
    value = (PrkType)prk_difference_values((PrkList)old_value, (PrkList)value);
  goto inherit_value;
} case PrkSVInitialInheritance:
  switch (method_id) {
  default:
  case PRK_FMT_SET_FACET_VALUES:
  case PRK_FMT_SET_FACET_VALUE:
  case PRK_FMT_REMOVE_FACET_VALUE:
  case PRK_FMT_REMOVE_FACET_VALUES:
    goto do_sngl_ov;

case PRK_FMT_ADD_FACET_VALUES_FRONT:
  case PRK_FMT_ADD_FACET_VALUES_REAR:
    USER_ASSERT_TYPE(value, PrkListTag, generic_facet_mod_method);
    if (Null((PrkList)value))
      goto old_value_default;
    if (!Null(PRK_REST((PrkList)value)))
      PrkSignalExceptionLoop(PrkExcFacetValueOverflow, object, slot_name, facet_n
    value = PRK_FIRST(value);
    if (value == PrkNull)
      PrkSignalExceptionLoop(PrkExcNullAsFacetValue, object, slot_name, facet_nam
    /* fall through to PRK_FMT_ADD_FACET_VALUE_FRONT case */ case PRK_FMT_ADD_FACET_VALUE_FRONT:
  case PRK_FMT_ADD_FACET_VALUE_REAR:
    if (old_value != PrkNull) {
      PrkSignalExceptionLoop(PrkExcFacetValueOverflow, object, slot_name,
                             facet_name);
      goto old_value_default;
    }
    goto common_single_override;
  }
```

```
case PrkSVNoInheritance:
  switch (method_id) {
  default:
    ASSERT_NEVER_REACHED(generic_facet_mod_method);
    break;

case PRK_FMT_SET_FACET_VALUES:
    USER_ASSERT_TYPE(value, PrkListTag, generic_facet_mod_method);
    if (Null((PrkList)value)) {
      value = PrkNull;
      goto inherit_value;
    }
    if (!Null(PRK_REST(value)))
      PrkSignalExceptionLoop(PrkExcFacetValueOverflow, object, slot_name, facet_n
    value = PRK_FIRST(value);
    if (value == PrkNull)
      PrkSignalExceptionLoop(PrkExcNullAsFacetValue, object, slot_name, facet_nam
    /* fall through */ case PRK_FMT_SET_FACET_VALUE:
    goto inherit_value;

case PRK_FMT_ADD_FACET_VALUES_FRONT:

case PRK_FMT_ADD_FACET_VALUES_REAR:
    USER_ASSERT_TYPE(value, PrkListTag, generic_facet_mod_method);
    if (Null((PrkList)value)) {
      value = old_value;
      goto inherit_value;
    }
    if (!Null(PRK_REST((PrkList)value)))
      PrkSignalExceptionLoop(PrkExcFacetValueOverflow, object, slot_name);
    value = PRK_FIRST(value);
    if (value == PrkNull)
      PrkSignalExceptionLoop(PrkExcNullAsFacetValue, object, slot_name, facet_nam
    /* fall through to PRK_FMT_ADD_FACET_VALUE_FRONT case */ case PRK_FMT_ADD_FACET_VALUE_FRONT:
  case PRK_FMT_ADD_FACET_VALUE_REAR:
    if (old_value != PrkNull && !EQUAL_OBJS(old_value,value))
      PrkSignalExceptionLoop(PrkExcFacetValueOverflow, object, slot_name, facet_n
    goto inherit_value;

case PRK_FMT_REMOVE_FACET_VALUE:
    if (!EQUAL_OBJS(value,old_value))
      value = old_value;
    else
      value = PrkNull;
    goto inherit_value;

case PRK_FMT_REMOVE_FACET_VALUES:
    USER_ASSERT_TYPE(value, PrkListTag, generic_facet_mod_method);
    if (old_value == PrkNull ||
        Null(prk_member_eq((PrkList)value, old_value)))
      value = old_value;
    else
      value = PrkNull;
    goto inherit_value;
  } case PrkSelfLastUnionInheritance:
  switch (method_id) {
  default:
    ASSERT_NEVER_REACHED(generic_facet_mod_method);
    break;

case PRK_FMT_SET_FACET_VALUE:
  union_put_value:
    value = (PrkType)prk_ncons(value);
    /* fall through to PRK_FMT_SET_FACET_VALUES case */ case PRK_FMT_SET_FACET_VALUES:
  union_put_facet_values:
    local_value = value;
```

```
      value = prk_get_inherited_union_fvalues(slot_name, facet_name, value,
                                    PRK_OBJECT_PARENTS(object, sat, hts),
                                    !sf_array, instance_p);
      goto inherit_value;

case PRK_FMT_ADD_FACET_VALUE_FRONT:
    case PRK_FMT_ADD_FACET_VALUE_REAR:
      if (local_value == PrkNull)
        goto union_put_value;
      if (!Null(prk_member_eq((PrkList)local_value, value)))
        goto old_value_default;
      else if (method_id == PRK_FMT_ADD_FACET_VALUE_FRONT)
        value = (PrkType)PrkMakeCons(value, local_value);
      else
        value = (PrkType)prk_append_to_list((PrkList)local_value, value);
      goto union_put_facet_values;

case PRK_FMT_ADD_FACET_VALUES_FRONT:
    case PRK_FMT_ADD_FACET_VALUES_REAR:
      USER_ASSERT_TYPE(value, PrkListTag, generic_facet_mod_method);
      if (local_value != PrkNull) {
        value = (PrkType)prk_union_values((PrkList)local_value, (PrkList)value,
                                    method_id == PRK_FMT_ADD_FACET_VALUES_REAR
        if (EQUAL_OBJS(value,local_value))
          goto old_value_default;
      }
      else
        value = (PrkType)prk_delete_duplicates((PrkList)value);
      goto union_put_facet_values;

case PRK_FMT_REMOVE_FACET_VALUE:
      if (local_value == PrkNull)
        goto old_value_default;
      value = (PrkType)prk_difference_value((PrkList)local_value, value);
      if (EQUAL_OBJS(value,local_value))
        goto old_value_default;
      goto union_put_facet_values;

case PRK_FMT_REMOVE_FACET_VALUES:
      USER_ASSERT_TYPE(value, PrkListTag, generic_facet_mod_method);

if (local_value == PrkNull)
        goto old_value_default;
      value = (PrkType)prk_difference_values((PrkList)local_value, (PrkList)value);
      if (EQUAL_OBJS(value,local_value))
        goto old_value_default;
      goto union_put_facet_values;
    } case PrkSelfFirstUnionInheritance:
    switch (method_id) {
    default:
      ASSERT_NEVER_REACHED(generic_facet_mod_method);
      break;

case PRK_FMT_SET_FACET_VALUE:
    runion_put_value:
      value = (PrkType)prk_ncons(value);
      /* fall through to PRK_FMT_SET_FACET_VALUES case */ case PRK_FMT_SET_FACET_VALUES:
    runion_put_facet_values:
      local_value = value;
      value = prk_get_inhd_runion_fvalues(slot_name, facet_name, value,
                                    PRK_OBJECT_PARENTS(object, sat, hts),
                                    !sf_array, instance_p);
      goto inherit_value;

case PRK_FMT_ADD_FACET_VALUE_FRONT:
    case PRK_FMT_ADD_FACET_VALUE_REAR:
      if (local_value == PrkNull)
        goto runion_put_value;
      if (!Null(prk_member_eq((PrkList)local_value, value)))
        goto old_value_default;
```

```c
      else if (method_id == PRK_FMT_ADD_FACET_VALUE_FRONT)
        value = (PrkType)PrkMakeCons(value, local_value);
      else
        value = (PrkType)prk_append_to_list((PrkList)local_value, value);
      goto runion_put_facet_values;

case PRK_FMT_ADD_FACET_VALUES_FRONT:
    case PRK_FMT_ADD_FACET_VALUES_REAR:
      USER_ASSERT_TYPE(value, PrkListTag, generic_facet_mod_method);
      if (local_value != PrkNull) {
        value = (PrkType)prk_union_values((PrkList)local_value, (PrkList)value,
                                    method_id == PRK_FMT_ADD_FACET_VALUES_REAF
        if (EQUAL_OBJS(value,local_value))
          goto old_value_default;
      }
      else
        value = (PrkType)prk_delete_duplicates((PrkList)value);
      goto runion_put_facet_values;

case PRK_FMT_REMOVE_FACET_VALUE:
      if (local_value == PrkNull)
        goto old_value_default;
      value = (PrkType)prk_difference_value((PrkList)local_value, value);
      if (EQUAL_OBJS(value,local_value))
        goto old_value_default;
      goto runion_put_facet_values;

case PRK_FMT_REMOVE_FACET_VALUES:
      USER_ASSERT_TYPE(value, PrkListTag, generic_facet_mod_method);

if (local_value == PrkNull)
        goto old_value_default;
      value = (PrkType)prk_difference_values((PrkList)local_value, (PrkList)value);
      if (EQUAL_OBJS(value,local_value))
        goto old_value_default;
      goto runion_put_facet_values;
    } case PrkMonitorInheritance:
    if ((facet_name != PrkWhenNeededMonitorFacetName) &&
        (facet_name != PrkWhenChangedMonitorFacetName)) {
      PRK_EXC_MSG_WARNING("Warning - Ignoring attempt to create a non-monitor\n"
                    "        facet with inheritance type PrkMonitorInheritance",
                    PrkMakeFacet);
      goto EndEnd;
    }
    blAttach = TRUE;
    do_monitor_p = TRUE;
    switch (method_id) {
    default:
      ASSERT_NEVER_REACHED(generic_facet_mod_method);
      break;

case PRK_FMT_SET_FACET_VALUE:
    do_monitor_put_value:
      value = (PrkType)prk_ncons(value);
      /* fall through to PRK_FMT_SET_FACET_VALUES case */ case PRK_FMT_SET_FACET_VALUES:
      ASSERT_TYPE(value, PrkListTag, generic_slot_facet_method);
      local_value = prk_monitor_order_value(value);
      monitors = (PrkList)local_value;

do_monitor_put_facet_values:
      if (!PrkIsList(value)) {
        if (PRK_MONITOR_FLAGS(value) & PrkWhenNeededMonitorFlag) {
          if ((facet_name) != PrkWhenNeededMonitorFacetName)
            PrkSignalExceptionLoop(PrkExcMonitorMismatch,(slot_name),
                  (facet_name));
        }
        else {
          if ((facet_name) != PrkWhenChangedMonitorFacetName)
            PrkSignalExceptionLoop(PrkExcMonitorMismatch,(slot_name),
                  (facet_name));
```

```
      }
    }
    else {
      PrkList l;
      for (l = (PrkList)(value); !Null(l); l = PRK_REST(l)) {
        if (PRK_MONITOR_FLAGS(PRK_FIRST(l)) & PrkWhenNeededMonitorFlag) {
          if ((facet_name) != PrkWhenNeededMonitorFacetName)
            PrkSignalExceptionLoop(PrkExcMonitorMismatch,(slot_name),
                (facet_name));
        }
        else {
          if ((facet_name) != PrkWhenChangedMonitorFacetName)
            PrkSignalExceptionLoop(PrkExcMonitorMismatch,(slot_name),
                (facet_name));
        }
      }
    }
    value = prk_get_inhd_monitor_fvalues(slot_name, facet_name, local_value,
                                        PRK_OBJECT_PARENTS(object, sat, hts),
                                        !sf_array, instance_p);
  /* if (blAttach) moved to later
     prk_call_monitors_attach_meth(object, sd, monitors); */
    goto inherit_value;

case PRK_FMT_ADD_FACET_VALUE_FRONT:
  case PRK_FMT_ADD_FACET_VALUE_REAR:
    if (local_value == PrkNull)
      goto do_monitor_put_value;
    if (!Null(prk_member_eq((PrkList)local_value, value)))
      goto old_value_default;
    monitors = prk_ncons(value);
    local_value = prk_add_an_monitor(value, (PrkList)local_value);
    goto do_monitor_put_facet_values;

case PRK_FMT_ADD_FACET_VALUES_FRONT:
  case PRK_FMT_ADD_FACET_VALUES_REAR:
    USER_ASSERT_TYPE(value, PrkListTag, generic_facet_mod_method);
    if (local_value == PrkNull || Null((PrkList)local_value)) {
      local_value = prk_monitor_order_value(value);
      monitors = (PrkList)local_value;
    }
    else {
      monitors = (PrkList)value;
      for (; !Null((PrkList)value); ) {
        local_value = prk_add_an_monitor(PRK_FIRST(value), (PrkList)local_value);
        value = (PrkType)PRK_REST((PrkList)value);
        ASSERT_TYPE(value, PrkListTag, generic_facet_mod_method);
      }
    }
    goto do_monitor_put_facet_values;

case PRK_FMT_REMOVE_FACET_VALUE:
    blAttach = FALSE;
    if (local_value == PrkNull)
      goto NoMon;
    monitors = prk_ncons(value);
    /* prk_call_monitors_detach_meth(object, sd, monitors); moved to later */
    value = (PrkType)prk_difference_value((PrkList)local_value, value);
    if (value == local_value)
      goto NoMon;
    local_value = value;
    goto do_monitor_put_facet_values;

case PRK_FMT_REMOVE_FACET_VALUES:
    blAttach = FALSE;
    USER_ASSERT_TYPE(value, PrkListTag, generic_facet_mod_method);
    if (local_value == PrkNull) {
NoMon:   PRK_EXC_MSG_WARNING(
           "Attempted to detach a monitor which was not attached",
                          PrkDetachMonitor);
      goto EndEnd;
    }
    monitors = (PrkList)value;
    /* prk_call_monitors_detach_meth(object, sd, monitors); moved to later */
```

```
      value = (PrkType)prk_difference_values((PrkList)local_value, (PrkList)value);
      if (value == local_value)
        goto NoMon;
      local_value = value;
      goto do_monitor_put_facet_values;
    }
  }

/* generic_facet_mod_method wrap-up */ inherit_value:
 if (!localized_p) {
   if (sf_array)
     local_value_ptr =
       (value_ptr =
         prk_localize_static_facets(sd, value_array + 1) + sf_array->offset)
         + 1;
   else {
     PrkList new_dlist = prk_localize_dynamic_facets(sd, value_array + 1);
     sub_chunk = PRK_MASK_CHUNK(value_array[1]);
     if (Null(dlist)) {
       dfacet = prk_make_dfacet(facet_name, role_specifier);
       dlist =
         role_specifier > PRK_FACET_MAX_ONE_WORD_ROLE ?
           PRK_MAKE_DFCONS(dfacet, value, local_value) :
             PRK_MAKE_SHORT_DFCONS(dfacet, value);
       PRK_MASK_CHUNK(value_array[1])[PRK_SD_SIZE(sd) - 1] =
         (PrkType)((u_long)PrkMakeCons((PrkType)dlist, (PrkType)new_dlist) | DFF_I
       goto check_for_children;
     }
     dlist = prk_dfacet_lookup(new_dlist, facet_name);

ASSERT(!Null(dlist), generic_facet_mod_method);
     value_ptr = &PRK_DFCONS_VALUE(dlist);
     local_value_ptr = &PRK_DFCONS_LVALUE(dlist);
   }
 }
 *value_ptr = value;
 if (role_specifier > PRK_FACET_MAX_ONE_WORD_ROLE)
   *local_value_ptr = local_value;

check_for_children:
 if (do_monitor_p) {
   PrkType *chunk = PRK_MASK_CHUNK(value_array[1]);
   PRK_INSTALL_AV(facet_name, sd, chunk,
       sf_array ? sf_array->offset : PRK_DYNAMIC_AV, value, object);
   if (blAttach) {
     prk_call_monitors_attach_meth(object, sd, monitors);
     prk_call_monitors_puts_meth(object, sd, value_array,
                     monitors, PrkMonitorFireOnAttachFlag);
   }
   else
     prk_call_monitors_detach_meth(object, sd, monitors);
 } if (PRK_IS_INSTANCE(object))
   goto signal_event;

switch (role_specifier) {
 default:
   ASSERT_NEVER_REACHED(generic_facet_mod_method);
   break;

case PrkMVNoInheritance:
case PrkSVNoInheritance:
  goto signal_event;

case PrkMVInitialInheritance:
case PrkSVInitialInheritance:
case PrkMVOverrideInheritance:
case PrkSVOverrideInheritance:
  switch (PRK_SD_SLOT_TYPE(sd)) {
  case PrkOwnSlotType:
```

```c
    case PrkSparseSlotType:
      goto signal_event;
    case PrkSubclassSlotType:
      prk_propagate_override_facet_values(value, sd, PRK_SAT_SUBCLASSES(sat, hts),
                              facet_name, FALSE, sf_array, old_sub_chunk,
                              old_sf_chunk, old_dlist, sub_chunk, dfacet);
      goto signal_event;
    }
    /* probably could optimize LOCKED case *** */
    prk_propagate_override_facet_values(value, sd, PRK_SAT_SUBCLASSES(sat, hts),
                              facet_name, FALSE, sf_array, old_sub_chunk,
                              old_sf_chunk, old_dlist, sub_chunk, dfacet);
    prk_propagate_override_facet_values(value, sd, PRK_SAT_INSTANCES(sat, hts),
                              facet_name, TRUE, sf_array, old_sub_chunk,
                              old_sf_chunk, old_dlist, sub_chunk, dfacet);
    goto signal_event;

case PrkSelfLastUnionInheritance:
    get_fn = prk_get_inherited_union_fvalues;
    goto propagate_union;

case PrkSelfFirstUnionInheritance:
    get_fn = prk_get_inhd_runion_fvalues;

propagate_union:
    switch (PRK_SD_SLOT_TYPE(sd)) {
    case PrkOwnSlotType:
    case PrkSparseSlotType:
      goto signal_event;
    case PrkSubclassSlotType:
      propagate_union_facet_values(value, sd, PRK_SAT_SUBCLASSES(sat, hts),
                              facet_name, FALSE, sf_array, old_sub_chunk,
                              old_sf_chunk, old_dlist, sub_chunk, dfacet,
                              get_fn);
      goto signal_event;
    }
    /* probably could optimize LOCKED case *** */
    propagate_union_facet_values(value, sd, PRK_SAT_SUBCLASSES(sat, hts),
                              facet_name, FALSE, sf_array, old_sub_chunk,
                              old_sf_chunk, old_dlist, sub_chunk, dfacet,
                              get_fn);
    propagate_union_facet_values(value, sd, PRK_SAT_INSTANCES(sat, hts),
                              facet_name, TRUE, sf_array, old_sub_chunk,
                              old_sf_chunk, old_dlist, sub_chunk, dfacet,
                              get_fn);
    goto signal_event;

case PrkMonitorInheritance:
    switch (PRK_SD_SLOT_TYPE(sd)) {
    case PrkOwnSlotType:
    case PrkSparseSlotType:
      goto signal_event;
    case PrkSubclassSlotType:
      propagate_monitor_facet_values(value, sd, PRK_SAT_SUBCLASSES(sat, hts),
                              facet_name, FALSE, sf_array, old_sub_chunk,
                              old_sf_chunk, old_dlist, sub_chunk, dfacet,
                              monitors, blAttach);
      goto signal_event;
    }
    /* probably could optimize LOCKED case *** */
    propagate_monitor_facet_values(value, sd, PRK_SAT_SUBCLASSES(sat, hts),
                              facet_name, FALSE, sf_array, old_sub_chunk,
                              old_sf_chunk, old_dlist, sub_chunk, dfacet,
                              monitors, blAttach);
    propagate_monitor_facet_values(value, sd, PRK_SAT_INSTANCES(sat, hts),
                              facet_name, TRUE, sf_array, old_sub_chunk,
                              old_sf_chunk, old_dlist, sub_chunk, dfacet,
                              monitors, blAttach);
    goto signal_event;
  }
```

```
  signal_event:
#ifdef OBJ_EVENTS
    if (PRK_IS_OBJECT_STRUCTURE_INTEREST(object)) {
      if (created_p) {
        prk_mark_object_decnds(object);
        prko_signal_facet_mod(object, slot_name, facet_name,
                        (PrkSymbol)PrkNull, PRK_SD_SLOT_TYPE(sd),
                        PrkoAddFacetEventID);
        break;
      }
    }
    if (PRK_IS_OBJECT_VALUE_INTEREST(object)) {
      if (!created_p) {
        PrkoFacetValueModEventStruct event_struct;
        event_struct.value = value;
        event_struct.object = object;
        event_struct.slot_name = slot_name;
        event_struct.facet_name = facet_name;
        PrkSignal(PrkoFacetValueModEventID, &event_struct);
      }
    }
#endif                              /* OBJ_EVENTS */

/* watch out for the break in the event stuff if you add code here */
  EndEnd:
    break;
  } while (FALSE);

/*
  file: fillcode.ih
*/

/* This file included by n_objmn.c and n_addslt.c assumes following declarations:

PrkObject object;
   PrkInheritance role_specifier;
   PrkSd sd, parent_sd;
   prk_rsd_t *rsd;
   unsigned parent_count;
   PrkBool single_sd_parent_p, instance_p;
   prk_sd_table_t *sd_table;
   PrkType **slot_chunk, **parent_slot_chunk;

*/ do {
  PrkType *common_parent_chunk;
  role_specifier = PRK_SD_ROLE_SPECIFIER(sd);
  if (PRK_IS_USER_DEFINED_INHERITANCE(role_specifier) ||
      rsd->dynamic_ftable ||
      rsd->static_ftable ||
      PRK_SD_SIZE(sd) &&
      (!parent_count ||
       !single_sd_parent_p &&
       (!sd_table->count ||
        !(common_parent_chunk = get_common_parent_chunk(sd_table))))
      ) {
    PrkType *sub_chunk = (PrkType *)PRK_SHORT_ALLOC(PRK_SD_SIZE(sd));
    slot_chunk[1] = (PrkType *)((u_long)sub_chunk | SVF_LOCAL_ARRAY_P);
    if (!PRK_SD_DISALLOW_AVS_P(PRK_SD_FLAGS(sd)))
      *(svf_t *)sub_chunk = default_svf;
    if (PRK_SD_STATIC_FACET_COUNT(sd))
      (PrkType *)sub_chunk[PRK_SD_STATIC_FACET_START(sd)] =
        rsd->static_ftable || !single_sd_parent_p /* *** 2nd case don't always mall
          ? (PrkType *)((u_long)PRK_SHORT_ALLOC(PRK_SD_STATIC_FACET_SIZE(sd))
                        | SFF_LOCAL_ARRAY_P)
          : (PrkType *)((u_long)PRK_MASK_CHUNK(parent_slot_chunk[1])[PRK_SD_STATI /* *** check for all of the errors: flags, mult facets, cross facets ... */
```

```
      switch (parent_count) {
      case 0:
      zero_case:
        prk_fill_facet_values_0(object, sub_chunk, sd, rsd);
        break;
      case 1:
        if (single_sd_parent_p) {
        one_case:
          prk_fill_facet_values_1(object, sub_chunk,
                        PRK_MASK_CHUNK(parent_slot_chunk[1]),
                        sd, parent_sd, rsd);
          prk_fill_chunk_1parent(slot_chunk, rsd->value, parent_slot_chunk,
                        sd, parent_sd, FALSE);
          continue;
        }
        else
          goto zero_case;

default:
        switch (sd_table->count) {
        case 0:
          goto zero_case;
        case 1:
          goto one_case;
        default:
          prk_fill_facet_values_n(object, sub_chunk, sd_table, sd, rsd);
          break;
        }
      }
    }
    else if (single_sd_parent_p)
      slot_chunk[1] = (PrkType *)((u_long)parent_slot_chunk[1] & ~SVF_LOCAL_ARRAY_P);
    else if (!PRK_SD_SIZE(sd)) {
      slot_chunk[1] = (PrkType *)0;
    }
    else {
      ASSERT(!PRK_IS_USER_DEFINED_INHERITANCE(role_specifier), generic_fill_code);
      ASSERT(!rsd->dynamic_ftable, generic_fill_code);
      ASSERT(!rsd->static_ftable, generic_fill_code);
      ASSERT(sd_table->count > 1 || !PRK_SD_SIZE(sd), generic_fill_code);
      ASSERT(!single_sd_parent_p, generic_fill_code);
      ASSERT(parent_count > 1, generic_fill_code);
      ASSERT(PRK_SD_SIZE(sd), generic_fill_code);
      ASSERT(common_parent_chunk, generic_fill_code);
      slot_chunk[1] = common_parent_chunk;
    }
    prk_fill_chunk(slot_chunk, rsd->value, sd, parents, FALSE, instance_p);
  } while (FALSE);

/*
  file: fr_mon.ih
*/

PrkType prk_get_inhd_monitor_fvalues(PrkSymbol slot_name, PrkSymbol facet_name,
                        PrkType local_value, PrkList parents,
                        PrkBool dynamic_p, PrkBool child_instance_p)
{
  PrkList result, temp;
  PrkBool needs_copying_p = TRUE;
  result = (local_value == PrkNull) ? PrkNil : (PrkList)local_value;

for (; !Null(parents); parents = PRK_REST(parents)) {
    ASSERT_TYPE(parents, PrkListTag, prk_get_inhd_monitor_fvalues);
    if (!Null((temp = (PrkList)prk_facet_values((PrkObject)PRK_FIRST(parents),
                        slot_name, facet_name,
                        dynamic_p, child_instance_p)))
        && (PrkType)temp != PrkNull) {
      ASSERT_TYPE(temp, PrkListTag, prk_get_inhd_monitor_fvalues);
      result = (PrkList)prk_combine_ordered_monitors(result, temp, &needs_copying_p
    }
  }
}
```

```c
  return (PrkType)result;
}

PrkType prk_fget_inhd_monitor_fvalues(PrkSymbol slot_name, PrkSymbol facet_name,
                                      PrkType local_value, prk_sd_table_t *sd_table,
                                      PrkBool dynamic_p, PrkBool child_instance_p)
{
  PrkList result, temp;
  PrkBool needs_copying_p = TRUE;
  unsigned parent_index;
  result = (local_value == PrkNull) ? PrkNil : (PrkList)local_value;

for (parent_index = 0; parent_index < sd_table->count; parent_index++) {
     /* *** This could be much faster using parent_sd in sd_table */
     if (!Null((temp = (PrkList)prk_facet_values(TABLE_ELT(sd_table, parent_index).p
         && (PrkType)temp != PrkNull) {
        ASSERT_TYPE(temp, PrkListTag, prk_fget_inhd_monitor_fvalues);
        result = (PrkList)prk_combine_ordered_monitors(result, temp, &needs_copying_p
     }
  } return (PrkType)result;
} void propagate_monitor_facet_values(PrkType value, PrkSd sd, PrkList children,
                                    PrkSymbol facet_name, PrkBool child_instance_p,
                                    static_facet_t *sf_ptr, PrkType *old_sub_chunk,
                                    PrkType *old_sf_chunk, PrkList old_dlist,
                                    PrkType *new_sub_chunk, PrkDFacet dfacet,
                                    PrkList new_monitors,PrkBool blAttach)
{
  PrkObject child;
  PrkSymbol slot_name = PRK_SD_NAME(sd);
  PrkSlotType storage_class = PRK_SD_SLOT_TYPE(sd);
  PrkSd child_sd;
  PrkSat child_sat;
  unsigned child_hts;
  static_facet_t *child_sf_ptr;
  PrkType **value_array, *sub_chunk, *sf_chunk, local_value;
  PrkType *local_old_sub_chunk, *local_old_sf_chunk;
  PrkList parents, local_old_dlist;

while (!Null(children)) {
     child = (PrkObject)PRK_FIRST(children);
     ASSERT_FULL_OBJECT(child, propagate_monitor_facet_values);

INIT_PARTIAL_SAD_ACCESS(child, child_sd, child_sat, slot_name,
                             goto next_child, value_array, storage_class,
                             child_instance_p);

sub_chunk = PRK_MASK_CHUNK(value_array[1]);
     local_value = value;

if (sub_chunk == new_sub_chunk) {
        SUB_CHUNKS_ARE_SAME();
     }
     else if (sub_chunk == old_sub_chunk) {
        SUB_CHUNK_SAME_AS_OLD();
     }
     if (child_sf_ptr = sf_ptr ? sf_ptr : prk_sfacet_lookup(child_sd, facet_name)) {
        sf_chunk = PRK_MASK_CHUNK(sub_chunk[PRK_SD_STATIC_FACET_START(child_sd)]);
        if (sf_ptr) {
           if (sf_chunk == PRK_MASK_CHUNK(new_sub_chunk[PRK_SD_STATIC_FACET_START(sd)]
              SF_CHUNKS_ARE_SAME();
           }
           else if (sf_chunk == old_sf_chunk) {
              SF_CHUNK_SAME_AS_OLD();
           }
        }
     }
     parents = child_instance_p
        ? PRK_SAT_PARENTS(child_sat)
        : PRK_SAT_CLASS_PARENTS(child_sat, PRK_SAT_HASH_TABLE_SIZE(child_sat));
     if (Null(PRK_REST(parents))) {
```

```
        sf_chunk[child_sf_ptr->offset] = local_value =
          (sf_chunk[child_sf_ptr->offset + 1] == PrkNull)
            ? value
            : prk_combine_ordered_monitors((PrkList)sf_chunk[child_sf_ptr->offset
                                (PrkList)value, (PrkBool *)0);
        local_old_sf_chunk = sf_chunk;
        local_old_sub_chunk = sub_chunk;
      }
      else {
        sf_chunk[child_sf_ptr->offset] = local_value =
          prk_get_inhd_monitor_fvalues(slot_name, facet_name,
                            sf_chunk[child_sf_ptr->offset + 1],
                            parents, FALSE, child_instance_p);
        local_old_sf_chunk = sf_chunk;
        local_old_sub_chunk = sub_chunk;
      }
      PRK_INSTALL_AV(facet_name, child_sd, sub_chunk, child_sf_ptr->offset,
        local_value, child);
    }
    else if (PRK_SD_DISALLOW_DFACETS_P(child_sd))
      PrkSignalExceptionLoop(PrkExcNoDFacetViolation, child, slot_name, facet_name)
    else {
      PrkList dlist;
      if ((dlist = PRK_MASK_DFACET(sub_chunk[PRK_SD_SIZE(child_sd) - 1]))
          == PRK_MASK_DFACET(new_sub_chunk[PRK_SD_SIZE(sd) - 1])) {
        goto sub_chunks_are_same;
      }
      else if (dlist == old_dlist) {
        sub_chunk[PRK_SD_SIZE(child_sd) - 1] =
          (PrkType)PRK_MASK_DFACET(new_sub_chunk[PRK_SD_SIZE(sd) - 1]);
        *sub_chunk = *new_sub_chunk;
        goto sub_chunks_are_same;
      }
      else {                              /* dfacet case */
        PrkList dlist2 = prk_dfacet_lookup(dlist, facet_name);
        if (Null(dlist2)) {    /* add new dfacet */
          local_old_dlist = dlist;
          sub_chunk[PRK_SD_SIZE(child_sd) - 1] =
            (PrkType)((u_long)PrkMakeCons((PrkType)PRK_MAKE_DFCONS(dfacet, value, F
                              (PrkType)PRK_MASK_DFACET(sub_chunk[PRK_SD_SIZE(ch
              | DFF_LOCAL_P);
          PRK_INSTALL_AV(facet_name, child_sd, sub_chunk, PRK_DYNAMIC_AV,
              value, child);
          local_old_sub_chunk = sub_chunk;
        }
        else {
          parents = child_instance_p
            ? PRK_SAT_PARENTS(child_sat)
            : PRK_SAT_CLASS_PARENTS(child_sat, PRK_SAT_HASH_TABLE_SIZE(child_sat)
          if (Null(PRK_REST(parents))) {
            PRK_DFCONS_VALUE(dlist2) = local_value =
              ((local_value = PRK_DFCONS_LVALUE(dlist2)) == PrkNull)
                ? value
                : prk_combine_ordered_monitors((PrkList)local_value, (PrkList)val
            local_old_sub_chunk = sub_chunk;
            local_old_dlist = dlist;
          }
          else {
            PRK_DFCONS_VALUE(dlist2) = local_value =
              prk_get_inhd_monitor_fvalues(slot_name, facet_name,
                              PRK_DFCONS_LVALUE(dlist2),
                              parents, TRUE, child_instance_p);
            local_old_sub_chunk = sub_chunk;
            local_old_dlist = dlist;
          }
          PRK_INSTALL_AV(facet_name, child_sd, sub_chunk, PRK_DYNAMIC_AV,
              local_value, child);
        }
      }
    }
  }
check_children:
  PRK_IS_VALUE_MODIFIED_OBJECT(child) = TRUE;
```

```
      if (!child_instance_p) {
        child_hts = PRK_SAT_HASH_TABLE_SIZE(child_sat);
        switch (storage_class) {
        default:
          ASSERT_NEVER_REACHED(propagate_monitor_facet_values);
          break;
        case PrkSubclassSlotType:
          propagate_monitor_facet_values(local_value, child_sd, PRK_SAT_SUBCLASSES(ch
                                         facet_name, FALSE, child_sf_ptr,
                                         local_old_sub_chunk, local_old_sf_chunk,
                                         local_old_dlist, sub_chunk, dfacet,new_monitors,
                                         blAttach);
          break;
        case PrkDefaultSlotType:
        case PrkLockedSlotType:
          propagate_monitor_facet_values(local_value, child_sd, PRK_SAT_SUBCLASSES(ch
                                         facet_name, FALSE, child_sf_ptr,
                                         local_old_sub_chunk, local_old_sf_chunk,
                                         local_old_dlist, sub_chunk, dfacet,new_monitors,
                                         blAttach);
          propagate_monitor_facet_values(local_value, child_sd, PRK_SAT_INSTANCES(chi
                                         facet_name, TRUE, child_sf_ptr,
                                         local_old_sub_chunk, local_old_sf_chunk,
                                         local_old_dlist, sub_chunk, dfacet,new_monitors,
                                         blAttach);
          break;
        }
      }
ifdef OBJ_EVENTS
      if (PRK_IS_OBJECT_VALUE_INTEREST(child)) {
        PrkoFacetValueModEventStruct event_struct;
        event_struct.object = child;
        event_struct.slot_name = slot_name;
        event_struct.facet_name = facet_name;
        event_struct.value = local_value;
        PrkSignal(PrkoFacetValueModEventID, &event_struct);
      }
endif                          /* OBJ_EVENTS */
    next_child:
      if (blAttach) {
        prk_call_monitors_attach_meth(child, child_sd, new_monitors);
        prk_call_monitors_puts_meth(child, child_sd, value_array,
                    new_monitors, PrkMonitorFireOnAttachFlag);
      }
      else
        prk_call_monitors_detach_meth(child, child_sd, new_monitors);
      children = PRK_REST(children);
      continue;
    sub_chunks_are_same:
      SUB_CHUNKS_ARE_SAME();
    }
}

/*
  file: fr_over.ih
 */ include <prokee/union.ih>

PrkType prk_facet_values(PrkObject object, PrkSymbol slot_name, PrkSymbol facet_nam
                         PrkBool dynamic_p, PrkBool child_instance_p)
{
  PrkSd sd;
  PrkType **value_array, *chunk;
  PrkSat sat;
  unsigned char sf_count;
  static_facet_t *sf;
  PrkList dlist;
  INIT_PARTIAL_SAD_ACCESS(object, sd, sat, slot_name, return(PrkNull), value_array,
                          -1, child_instance_p);
```

```
    chunk = PRK_MASK_CHUNK(value_array[1]);
    if (!dynamic_p && (sf_count = PRK_SD_STATIC_FACET_COUNT(sd))) {
      sf = PRK_SD_STATIC_FACETS(sd);
      for (; sf_count > 0; sf_count--, sf++)
        if (facet_name == sf->name)
          return PRK_MASK_CHUNK(chunk[PRK_SD_STATIC_FACET_START(sd)])[sf->offset];
    }
    if (PRK_SD_DISALLOW_DFACETS_P(sd) ||
        Null(dlist = prk_dfacet_lookup(PRK_MASK_DFACET(chunk[PRK_SD_SIZE(sd) - 1]),
                                      facet_name)))
      return PrkNull;
    return PRK_DFCONS_VALUE(dlist);
}

PrkType get_inherited_override_fvalues(PrkSymbol slot_name,
                                       PrkSymbol facet_name, PrkList parents,
                                       PrkBool dynamic_p, PrkBool child_instance_p)
{
  PrkType result;
  while (!Null(parents)) {
    if ((result = prk_facet_values((PrkObject)PRK_FIRST(parents), slot_name,
                                   facet_name, dynamic_p, child_instance_p))
        != PrkNull)
      return result;
    parents = PRK_REST(parents);
  }
  return PrkNull;
}

PrkType fget_inherited_override_fvalues(PrkSymbol slot_name,
                                        PrkSymbol facet_name,
                                        prk_sd_table_t *sd_table,
                                        PrkBool dynamic_p,
                                        PrkBool child_instance_p)
{
  PrkType result;
  unsigned parent_index;
  for (parent_index = 0; parent_index < sd_table->count; parent_index++)
    /* *** This could be much faster using parent_sd in sd_table */
    if ((result = prk_facet_values(TABLE_ELT(sd_table, parent_index).parent,
                                   slot_name, facet_name, dynamic_p,
                                   child_instance_p))
        != PrkNull)
      return result;

return PrkNull;
} define SUB_CHUNKS_ARE_SAME() \
  if (!child_instance_p) {                          \
    local_old_sub_chunk = sub_chunk;                \
    local_old_sf_chunk = old_sf_chunk;              \
    local_old_dlist = old_dlist;                    \
    child_sf_ptr = sf_ptr;                          \
    goto check_children;                            \
  }                                                 \
  else                                              \
    goto next_child define SUB_CHUNK_SAME_AS_OLD() \
    value_array[1] = (PrkType *)((u_long)new_sub_chunk | PRK_LOCAL_VALUE_P(value_arra if (!child_instance_p) {                                                       \
  local_old_sub_chunk = sub_chunk;                                             \
  local_old_sf_chunk = old_sf_chunk;                                           \
  local_old_dlist = old_dlist;                                                 \
  sub_chunk = new_sub_chunk;                                                   \
  child_sf_ptr = sf_ptr;                                                       \
  goto check_children;                                                         \
}                                                                              \
else                                                                           \
  goto next_child
```

```
define SF_CHUNKS_ARE_SAME() goto sub_chunks_are_same define SF_CHUNK_SAME_AS_OLD() \
   sub_chunk[PRK_SD_STATIC_FACET_START(child_sd)] =                           \
      (PrkType)PRK_MASK_CHUNK(new_sub_chunk[PRK_SD_STATIC_FACET_START(sd)]); \
   goto sub_chunks_are_same void prk_propagate_override_facet_values(PrkType value, PrkSd sd, PrkList children,
                                         PrkSymbol facet_name,
                                         PrkBool child_instance_p,
                                         static_facet_t *sf_ptr,
                                         PrkType *old_sub_chunk,
                                         PrkType *old_sf_chunk,
                                         PrkList old_dlist,
                                         PrkType *new_sub_chunk,
                                         PrkDFacet dfacet)
{
  PrkObject child;
  PrkSymbol slot_name = PRK_SD_NAME(sd);
  PrkSlotType storage_class = PRK_SD_SLOT_TYPE(sd);
  PrkSd child_sd;
  PrkSat child_sat;
  unsigned child_hts;
  static_facet_t *child_sf_ptr;
  PrkType **value_array, *sub_chunk, *sf_chunk, new_value;
  PrkType *local_old_sub_chunk, *local_old_sf_chunk;
  PrkList parents, local_old_dlist;
  while (!Null(children)) {
    child = (PrkObject)PRK_FIRST(children);
    INIT_PARTIAL_SAD_ACCESS(child, child_sd, child_sat, slot_name,
                            goto next_child, value_array, storage_class,
                            child_instance_p);
    sub_chunk = PRK_MASK_CHUNK(value_array[1]);
    new_value = value;
    if (sub_chunk == new_sub_chunk) {
      SUB_CHUNKS_ARE_SAME();
    }
    else if (sub_chunk == old_sub_chunk) {
      SUB_CHUNK_SAME_AS_OLD();
    }
    if (child_sf_ptr =
        sf_ptr ? sf_ptr : prk_sfacet_lookup(child_sd, facet_name)) {
      sf_chunk = PRK_MASK_CHUNK(sub_chunk[PRK_SD_STATIC_FACET_START(child_sd)]);
      if (sf_ptr) {
        if (sf_chunk == PRK_MASK_CHUNK(new_sub_chunk[PRK_SD_STATIC_FACET_START(sd)]
          SF_CHUNKS_ARE_SAME();
        }
        else if (sf_chunk == old_sf_chunk) {
          SF_CHUNK_SAME_AS_OLD();
        }
      }
      if (sf_chunk[child_sf_ptr->offset] == value ||
          sf_chunk[child_sf_ptr->offset + 1] != PrkNull &&
          PRK_LOCAL_SF_CHUNK_P(sub_chunk[PRK_SD_STATIC_FACET_START(child_sd)]) &&
          PRK_LOCAL_CHUNK_P(value_array[1]))
        goto next_child;
      parents = child_instance_p
        ? PRK_SAT_PARENTS(child_sat)
        : PRK_SAT_CLASS_PARENTS(child_sat, PRK_SAT_HASH_TABLE_SIZE(child_sat));
      local_old_sf_chunk = sf_chunk;
      local_old_sub_chunk = sub_chunk;
      if (Null(PRK_REST(parents)))
        sf_chunk[child_sf_ptr->offset] = value;
      else
        /* multiple parents */
        sf_chunk[child_sf_ptr->offset] = new_value =
          get_inherited_override_fvalues(slot_name, facet_name, parents, FALSE,
                                         child_instance_p);
    }
    else if (PRK_SD_DISALLOW_DFACETS_P(child_sd))
      PrkSignalExceptionLoop(PrkExcNoDFacetViolation, child, slot_name, facet_name)
    else {
```

```
    PrkList
      dlist = PRK_MASK_DFACET(sub_chunk[PRK_SD_SIZE(child_sd) - 1]),
      new_dlist = PRK_MASK_DFACET(new_sub_chunk[PRK_SD_SIZE(sd) - 1]);
    if (dlist == new_dlist)
      goto sub_chunks_are_same;
    if (dlist == old_dlist) {
      sub_chunk[PRK_SD_SIZE(child_sd) - 1] =
        (PrkType)PRK_MASK_DFACET(new_sub_chunk[PRK_SD_SIZE(sd) - 1]);
      goto sub_chunks_are_same;
    }
    else {                          /* dfacet case */
      PrkList dlist2 = prk_dfacet_lookup(dlist, facet_name);
      if (Null(dlist2)) {           /* add new dfacet */
        local_old_dlist = dlist;
        sub_chunk[PRK_SD_SIZE(child_sd) - 1] =
          (PrkType)((u_long)PrkMakeCons((PrkType)PRK_MAKE_DFCONS(dfacet, value, F
                           (PrkType)PRK_MASK_DFACET(sub_chunk[PRK_SD_SIZE(ch
                 | DFF_LOCAL_P);
        local_old_sub_chunk = sub_chunk;
      }
      else if (PRK_DFCONS_VALUE(dlist2) == value ||
               PRK_DFCONS_LVALUE(dlist2) != PrkNull &&
               PRK_LOCAL_DLIST_P(sub_chunk[PRK_SD_SIZE(child_sd) - 1]) &&
               PRK_LOCAL_CHUNK_P(value_array[1]))
        goto next_child;
      else {
        parents = child_instance_p
          ? PRK_SAT_PARENTS(child_sat)
          : PRK_SAT_CLASS_PARENTS(child_sat, PRK_SAT_HASH_TABLE_SIZE(child_sat)
        local_old_sub_chunk = sub_chunk;
        local_old_dlist = dlist;
        if (Null(PRK_REST(parents)))
          /* Must be localized dlist and local_value == PrkNull */
          PRK_DFCONS_VALUE(dlist2) = value;
        else
          PRK_DFCONS_VALUE(dlist2) = new_value =
            get_inherited_override_fvalues(slot_name, facet_name, parents, TRUE,
                                          child_instance_p);
      }
    }
  }
check_children:
  PRK_IS_VALUE_MODIFIED_OBJECT(child) = TRUE;
  if (!child_instance_p) {
    child_hts = PRK_SAT_HASH_TABLE_SIZE(child_sat);
    switch (storage_class) {
    default:
      ASSERT_NEVER_REACHED(prk_propagate_override_facet_values);
      break;
    case PrkSubclassSlotType:
      prk_propagate_override_facet_values(new_value, child_sd,
                                          PRK_SAT_SUBCLASSES(child_sat, child_hts),
                                          facet_name, FALSE, child_sf_ptr,
                                          local_old_sub_chunk, local_old_sf_chunk,
                                          local_old_dlist, sub_chunk, dfacet);
      break;
    case PrkDefaultSlotType:
    case PrkLockedSlotType:
      prk_propagate_override_facet_values(new_value, child_sd,
                                          PRK_SAT_SUBCLASSES(child_sat, child_hts),
                                          facet_name, FALSE, child_sf_ptr,
                                          local_old_sub_chunk, local_old_sf_chunk,
                                          local_old_dlist, sub_chunk, dfacet);
      prk_propagate_override_facet_values(new_value, child_sd,
                                          PRK_SAT_INSTANCES(child_sat, child_hts),
                                          facet_name, TRUE, child_sf_ptr,
                                          local_old_sub_chunk, local_old_sf_chunk,
                                          local_old_dlist, sub_chunk, dfacet);
      break;
    }
  }
ifdef OBJ_EVENTS
  if (PRK_IS_OBJECT_VALUE_INTEREST(child)) {
    PrkoFacetValueModEventStruct event_struct;
```

```
      event_struct.object = child;
      event_struct.slot_name = slot_name;
      event_struct.facet_name = facet_name;
      event_struct.value = new_value;
      PrkSignal(PrkoFacetValueModEventID, &event_struct);
    }
  #endif                              /* OBJ_EVENTS */
    next_child:
      children = PRK_REST(children);
      continue;
    sub_chunks_are_same:
      SUB_CHUNKS_ARE_SAME();
  }
} typedef PrkType (*prk_get_union_fn_type)(PrkSymbol slot_name, PrkSymbol facet_name,
                                PrkType local_value, PrkList parents,
                                PrkBool dynamic_p,
                                PrkBool child_instance_p);

PrkType prk_get_inherited_union_fvalues(PrkSymbol slot_name, PrkSymbol facet_name,
                                PrkType local_value, PrkList parents,
                                PrkBool dynamic_p, PrkBool child_instance_p)
{
   PRK_GET_INHERITED_UNION_VALUES(local_value, !Null(parents),
                          parents = PRK_REST(parents),
                          prk_facet_values((PrkObject)PRK_FIRST(parents), sl
                                      facet_name, dynamic_p,
                                      child_instance_p));
}

PrkType prk_fget_inhd_union_fvalues(PrkSymbol slot_name, PrkSymbol facet_name,
                                PrkType local_value,
                                prk_sd_table_t *sd_table, PrkBool dynamic_p,
                                PrkBool child_instance_p)
{
   unsigned parent_index = 0;
   /* *** This could be much faster using parent_sd in sd_table */
   PRK_GET_INHERITED_UNION_VALUES(local_value, parent_index < sd_table->count,
                          parent_index++,
                          prk_facet_values(TABLE_ELT(sd_table, parent_index)
                                      facet_name, dynamic_p,
                                      child_instance_p));
}

PrkType prk_get_inhd_runion_fvalues(PrkSymbol slot_name, PrkSymbol facet_name,
                                PrkType local_value, PrkList parents,
                                PrkBool dynamic_p, PrkBool child_instance_p)
{
   PRK_GET_INHERITED_RUNION_VALUES(local_value, !Null(parents),
                          parents = PRK_REST(parents),
                          prk_facet_values((PrkObject)PRK_FIRST(parents), s
                                      facet_name, dynamic_p,
                                      child_instance_p));
}

PrkType prk_fget_inherited_runion_fvls(PrkSymbol slot_name, PrkSymbol facet_name,
                                PrkType local_value,
                                prk_sd_table_t *sd_table, PrkBool dynamic_p
                                PrkBool child_instance_p)
{
   unsigned parent_index = 0;
   /* *** This could be much faster using parent_sd in sd_table */
   PRK_GET_INHERITED_RUNION_VALUES(local_value, parent_index < sd_table->count,
                          parent_index++,
                          prk_facet_values(TABLE_ELT(sd_table, parent_index
                                      facet_name, dynamic_p,
                                      child_instance_p));
} void propagate_union_facet_values(PrkType value, PrkSd sd, PrkList children,
                                PrkSymbol facet_name,
```

```
                              PrkBool child_instance_p,
                              static_facet_t *sf_ptr,
                              PrkType *old_sub_chunk,
                              PrkType *old_sf_chunk,
                              PrkList old_dlist,
                              PrkType *new_sub_chunk,
                              PrkDFacet dfacet,
                              prk_get_union_fn_type get_fn
                              )
{
  PrkObject child;
  PrkSymbol slot_name = PRK_SD_NAME(sd);
  PrkSlotType storage_class = PRK_SD_SLOT_TYPE(sd);
  PrkSd child_sd;
  PrkSat child_sat;
  unsigned child_hts;
  static_facet_t *child_sf_ptr;
  PrkType **value_array, *sub_chunk, *sf_chunk, local_value;
  PrkType *local_old_sub_chunk, *local_old_sf_chunk;
  PrkList parents, local_old_dlist;

while (!Null(children)) {
    child = (PrkObject)PRK_FIRST(children);
    ASSERT_FULL_OBJECT(child, propagate_union_facet_values);

INIT_PARTIAL_SAD_ACCESS(child, child_sd, child_sat, slot_name,
                            goto next_child, value_array, storage_class,
                            child_instance_p);

sub_chunk = PRK_MASK_CHUNK(value_array[1]);
    local_value = value;
    if (sub_chunk == new_sub_chunk) {
      SUB_CHUNKS_ARE_SAME();
    }
    else if (sub_chunk == old_sub_chunk) {
      SUB_CHUNK_SAME_AS_OLD();
    }
    if (child_sf_ptr = sf_ptr ? sf_ptr : prk_sfacet_lookup(child_sd, facet_name)) {
      sf_chunk = PRK_MASK_CHUNK(sub_chunk[PRK_SD_STATIC_FACET_START(child_sd)]);
      if (sf_ptr) {
        if (sf_chunk == PRK_MASK_CHUNK(new_sub_chunk[PRK_SD_STATIC_FACET_START(sd)]
          SF_CHUNKS_ARE_SAME();
        }
        else if (sf_chunk == old_sf_chunk) {
          SF_CHUNK_SAME_AS_OLD();
        }
      }
      parents = child_instance_p
        ? PRK_SAT_PARENTS(child_sat)
        : PRK_SAT_CLASS_PARENTS(child_sat, PRK_SAT_HASH_TABLE_SIZE(child_sat));
      sf_chunk[child_sf_ptr->offset] = local_value =
        get_fn(slot_name, facet_name, sf_chunk[child_sf_ptr->offset + 1],
               parents, FALSE, child_instance_p);
      local_old_sf_chunk = sf_chunk;
      local_old_sub_chunk = sub_chunk;
    }
    else if (PRK_SD_DISALLOW_DFACETS_P(child_sd))
      PrkSignalExceptionLoop(PrkExcNoDFacetViolation, child, slot_name, facet_name)
    else {
      PrkList dlist;
      if ((dlist = PRK_MASK_DFACET(sub_chunk[PRK_SD_SIZE(child_sd) - 1])
           == PRK_MASK_DFACET(new_sub_chunk[PRK_SD_SIZE(sd) - 1])) {
        goto sub_chunks_are_same;
      }
      else if (dlist == old_dlist) {
        sub_chunk[PRK_SD_SIZE(child_sd) - 1] =
          (PrkType)PRK_MASK_DFACET(new_sub_chunk[PRK_SD_SIZE(sd) - 1]);
        goto sub_chunks_are_same;
      }
      else {                        /* dfacet case */
        PrkList dlist2 = prk_dfacet_lookup(dlist, facet_name);
        if (Null(dlist2)) {         /* add new dfacet */
          local_old_dlist = dlist;
```

```
                    sub_chunk[PRK_SD_SIZE(child_sd) - 1] =
                        (PrkType)((u_long)PrkMakeCons((PrkType)PRK_MAKE_DFCONS(dfacet, value, F
                                        (PrkType)PRK_MASK_DFACET(sub_chunk[PRK_SD_SIZE(ch
                                | DFF_LOCAL_P);
                    local_old_sub_chunk = sub_chunk;
                }
                else {
                    parents = child_instance_p
                        ? PRK_SAT_PARENTS(child_sat)
                        : PRK_SAT_CLASS_PARENTS(child_sat, PRK_SAT_HASH_TABLE_SIZE(child_sat)
                    PRK_DFCONS_VALUE(dlist2) = local_value =
                        get_fn(slot_name, facet_name, PRK_DFCONS_LVALUE(dlist2),
                                parents, TRUE, child_instance_p);
                    local_old_sub_chunk = sub_chunk;
                    local_old_dlist = dlist;
                }
            }
        }
    check_children:
        PRK_IS_VALUE_MODIFIED_OBJECT(child) = TRUE;
        if (!child_instance_p) {
            child_hts = PRK_SAT_HASH_TABLE_SIZE(child_sat);
            switch (storage_class) {
            default:
                ASSERT_NEVER_REACHED(propagate_union_facet_values);
                break;
            case PrkSubclassSlotType:
                propagate_union_facet_values(local_value, child_sd, PRK_SAT_SUBCLASSES(chil
                                    facet_name, FALSE, child_sf_ptr,
                                    local_old_sub_chunk, local_old_sf_chunk,
                                    local_old_dlist, sub_chunk, dfacet,
                                    get_fn);
                break;
            case PrkDefaultSlotType:
            case PrkLockedSlotType:
                propagate_union_facet_values(local_value, child_sd, PRK_SAT_SUBCLASSES(chil
                                    facet_name, FALSE, child_sf_ptr,
                                    local_old_sub_chunk, local_old_sf_chunk,
                                    local_old_dlist, sub_chunk, dfacet,
                                    get_fn);
                propagate_union_facet_values(local_value, child_sd, PRK_SAT_INSTANCES(child
                                    facet_name, TRUE, child_sf_ptr,
                                    local_old_sub_chunk, local_old_sf_chunk,
                                    local_old_dlist, sub_chunk, dfacet,
                                    get_fn);
                break;
            }
        }
ifdef OBJ_EVENTS
        if (PRK_IS_OBJECT_VALUE_INTEREST(child)) {
            PrkoFacetValueModEventStruct event_struct;
            event_struct.object = child;
            event_struct.slot_name = slot_name;
            event_struct.facet_name = facet_name;
            event_struct.value = local_value;
            PrkSignal(PrkoFacetValueModEventID, &event_struct);
        }
#endif                              /* OBJ_EVENTS */
    next_child:
        children = PRK_REST(children);
        continue;
    sub_chunks_are_same:
        SUB_CHUNKS_ARE_SAME();
    }
}

/*
    file: getval1.ih
*/

/*
    Used by PrkGetValue, PrkGetValues, and PrkGetValueOrValues
``` assumes the following decls:

```
   PrkObject object;
   PrkSymbol slot_name;
   unsigned monitor_filter;
   PrkType result;
   PrkInheritance role_specifier;
*/

{
  PrkSat sat;

INIT_FULL_SAD_ACCESS(object, sd, sat, slot_name,
                       PrkSignalExceptionLoop(PrkExcNonExistentSlot,
                                              object,slot_name),
                       value_array, -1);

ASSERT_TYPE(sd, PrkSdTag, GetValue__generic);
  role_specifier = PRK_SD_ROLE_SPECIFIER(sd);

if (PRK_IS_USER_DEFINED_INHERITANCE(role_specifier))
    return (PRK_SMT_METHOD(role_specifier, PRK_SMT_GET_VALUE))
      (value_array, object, sd, monitor_filter);
  if (!monitor_filter || PRK_SD_FLAGS(sd) & PrkNoWhenNeededMonitorsFlag ||
      PRK_NO_AV_P(((svf_t *)PRK_MASK_CHUNK(value_array[1]))->avget_offset))
    result = (PrkType)*value_array;
  else
    result = prk_execute_wn_monitor(value_array, object, sd, monitor_filter);
}

/*
  file: int_objm.ih
*/ ifndef PRK_OBJMAN_H
define PRK_OBJMAN_H include <prokee/int_sbst.ih>
include <prokee/cmn_objm.ih>
include <prokee/objmain.ih> extern char *prk_gc_r_objmgr_data_start;
extern char *prk_gc_r_objmgr_data_end;

/* modmain.c */
extern void prk_init_module ANSIARGS((void));
extern PrkModule prk_make_empty_module ANSIARGS((PrkSymbol name, PrkApp app));
extern PrkSymbol prk_module_class_name;
extern PrkModule prk_module_class_object;
extern PrkList prk_module_parent_classes;
extern PrkBool prk_rename_module ANSIARGS((PrkModule module, PrkSymbol new_name));
extern void prk_delete_module ANSIARGS((PrkModule module));
#define PrkModAbort            0
#define PrkModIgnore           1
#define PrkModDeleteDepApps    2
extern PrkBool prk_save_module ANSIARGS((PrkModule module, PrkString pathname, PrkE
extern PrkModule prk_load_module ANSIARGS((PrkString pathname, PrkBool quietp));
extern PrkModule prk_make_module ANSIARGS((PrkSymbol new_name, PrkApp app));
extern PrkList prk_dependent_modules ANSIARGS((PrkModule mod));

/* appmn.c */
extern void prk_init_app ANSIARGS((void));
extern PrkApp prk_make_empty_app ANSIARGS((PrkSymbol name));
extern PrkList prk_app_parent_classes;
extern PrkBool prk_rename_app ANSIARGS((PrkApp app, PrkSymbol new_name));
extern void prk_delete_app ANSIARGS((PrkApp app));
extern PrkBool prk_save_app ANSIARGS((PrkApp app, PrkString pathname, PrkBool quiet
```

```c
extern PrkApp prk_load_app ANSIARGS((PrkString pathname, PrkBool quietp));
extern PrkApp prk_make_app ANSIARGS((PrkSymbol name));
extern PrkList prk_dependent_apps ANSIARGS((PrkApp app));

/* objmain.c */
extern PrkMethodFn PrkGetMsgFn ANSIARGS((PrkObject object, PrkSymbol slot_name));
extern PrkBool prk_fill_parent_table ANSIARGS((prk_parent_table_t *parent_table,
                                               PrkCollection parents, PrkModule mod
                                               char *fn));
extern PrkBool prk_role_conflict_p ANSIARGS((PrkInheritance old_role,
                                             PrkInheritance new_role));
extern void prk_fill_rsd_table ANSIARGS((prk_rsd_table_t *rsd_table,
                                         PrkCollection raw_slot_data));
extern PrkBool prk_parse_raw_slot_datum ANSIARGS((PrkSymbol object_name, PrkSat sat
                                                  PrkRawSlotData raw_data, PrkBool *must_create_p));
extern void prk_fill_inhrtd_facet_values_1
   ANSIARGS((PrkType *slot_chunk, PrkType *p_slot_chunk,
             unsigned filled_static_count, char *sfacet_vec,
             PrkSd sd, PrkSd parent_sd, PrkList dlist, PrkObject object));
extern void prk_fill_inhrtd_facet_values_n ANSIARGS((PrkType *slot_chunk,
                                                     prk_sd_table_t *sd_table,
                                                     unsigned filled_static_count,
                                                     char *sfacet_vec,
                                                     PrkSd sd, PrkList dlist,
                                                     PrkBool instance_p, PrkObject object));
extern PrkBool prk_include_slot_check ANSIARGS((PrkObject object, PrkSd sd,
                      PrkSat old_sat,
                      PrkType **chunk, PrkType **sub_chunk,
                      PrkBool instance_p, unsigned orphan_mode,
                      PrkSd *new_sdp));
extern PrkBool prk_fill_rsd_from_slot ANSIARGS((prk_rsd_t *rsd, PrkSd old_sd,
                      PrkSd new_sd, PrkSat sat, PrkType **chunk,
                      PrkType **sub_chunk, PrkBool instance_p,
                      PrkBool *must_create_p));
extern void prk_add_child_links ANSIARGS((PrkObject object,
                  prk_parent_table_t *parent_table));
extern void prk_merge_into_sat ANSIARGS((PrkSat sat,
                  prk_rsd_table_t *rsd_table, PrkObject object));
extern void prk_stuff_object ANSIARGS((PrkObject object, prk_parent_table_t *parent
                  prk_rsd_table_t *rsd_table));
extern void prk_create_static_facets ANSIARGS((PrkSd sd, prk_parsed_facet_table_t *
extern PrkSat prk_make_isat_oneshot ANSIARGS((PrkSat sat, unsigned sd_count));
extern PrkSat prk_make_csat ANSIARGS((PrkSat sat, unsigned sd_count, PrkObject obje
extern char *prk_image_file_name;
extern PrkBool PrkIsSlotOrigin ANSIARGS((PrkObject object,
                                          PrkSymbol slot_name));
extern void PrkReconfigureSlot ANSIARGS((PrkObject object, PrkSymbol slot_name,
                PrkInheritance new_inheritance,
                PrkSlotType new_slot_type,
                PrkSlotFlags new_flags));
extern void prk_mark_object_decnds ANSIARGS((PrkObject object));
extern void prk_unmark_object_decnds ANSIARGS((PrkObject object));
#if !PRK_BIG_MACROS_OK
extern PrkBool prk_init_full_sad_access ANSIARGS((PrkObject object,
                PrkSd *sdp, PrkSat *satp, PrkSymbol slot_name,
                PrkType ***value_arrayp, PrkSlotType storage_class));

extern PrkBool prk_init_partial_sad_access ANSIARGS((PrkObject object,
                PrkSd *sdp, PrkSat *satp, PrkSymbol slot_name,
                PrkType ***value_arrayp, PrkSlotType storage_class,
                PrkBool instance_p));
endif /* om_data.c */
extern long PrkSeqLOBuffSize;
extern long PrkSeqSOBuffSize;

/* inherit.c */
extern CONST struct prk_slot_method_table_struct smt_array[];
extern PrkType prk_execute_wn_monitor ANSIARGS((PrkType **chunk, PrkObject object,
extern void prk_fill_chunk ANSIARGS((PrkType **chunk, PrkType value, PrkSd sd, PrkI
                PrkBool load_module_p, PrkBool instance_p));
```

```c
extern void prk_fill_chunk_1parent
    ANSIARGS((PrkType **chunk, PrkType value, PrkType **parent_chunk,
        PrkSd sd, PrkSd parent_sd, PrkBool load_module_p));
extern void prk_fill_sd_table ANSIARGS((PrkSymbol slot_name, prk_sd_table_t *sd_tab
                    PrkBool instance_p));

extern PrkType PRK_FAST_INSTANCE_S_OVERRIDE_PV ANSIARGS((PrkObject object, PrkSymbo
                    short location, PrkType value));
extern PrkType prk_slot_mod_meth ANSIARGS((PrkObject object, PrkSymbol slot_name,
                    PrkType value,
                    unsigned monitor_filter,
                    u_short method_id,
                    PrkMonitorFlags monitor_flags,
                    PrkType *old_valp));
extern PrkType **prk_get_slot_ptr ANSIARGS((PrkObject object,
        PrkSymbol slot_name));
extern PrkType **prk_get_child_or_parent_slot ANSIARGS((PrkSymbol name,
                    PrkList parents, PrkObject child));
extern PrkBool PrkIsLocalValued ANSIARGS((PrkObject object,
        PrkSymbol slot_name));
extern PrkType PrkGetLocalValueOrValues ANSIARGS((PrkObject object,
        PrkSymbol slot_name, unsigned monitor_filter,
        PrkBool *single_valued_p));

/* av.c */
extern PrkList MonitorSort ANSIARGS((PrkList monitors, PrkList monitors2));

/* facets.c */
extern void prk_init_facets ANSIARGS(());
extern PrkList prk_dfacet_lookup ANSIARGS((PrkList dlist, PrkSymbol facet_name));
extern PrkList prk_copy_dlist ANSIARGS((PrkList dlist));
extern PrkType get_inherited_override_fvalues ANSIARGS((PrkSymbol slot_name,
                        PrkSymbol facet_name,
                        PrkList parents,
                        PrkBool dynamic_p,
                        PrkBool child_instance_p));
extern PrkType prk_get_inherited_union_fvalues ANSIARGS((PrkSymbol slot_name,
                        PrkSymbol facet_name,
                        PrkType local_value,
                        PrkList parents,
                        PrkBool dynamic_p,
                        PrkBool child_instance_p));
extern PrkType prk_get_inhd_runion_fvalues ANSIARGS((PrkSymbol slot_name,
                        PrkSymbol facet_name,
                        PrkType local_value,
                        PrkList parents,
                        PrkBool dynamic_p,
                        PrkBool child_instance_p));
extern PrkType prk_get_inhd_monitor_fvalues ANSIARGS((PrkSymbol slot_name,
                        PrkSymbol facet_name,
                        PrkType local_value,
                        PrkList parents,
                        PrkBool dynamic_p,
                        PrkBool child_instance_p));
extern PrkType fget_inherited_override_fvalues ANSIARGS((PrkSymbol slot_name,
                        PrkSymbol facet_name,
                        prk_sd_table_t *sd_table,
                        PrkBool dynamic_p,
                        PrkBool child_instance_p));
extern PrkType prk_fget_inhd_union_fvalues ANSIARGS((PrkSymbol slot_name,
                        PrkSymbol facet_name,
                        PrkType local_value,
                        prk_sd_table_t *sd_table,
                        PrkBool dynamic_p,
                        PrkBool child_instance_p));
extern PrkType prk_fget_inherited_runion_fvls ANSIARGS((PrkSymbol slot_name,
                        PrkSymbol facet_name,
                        PrkType local_value,
                        prk_sd_table_t *sd_table,
                        PrkBool dynamic_p,
                        PrkBool child_instance_p));
extern PrkType prk_fget_inhd_monitor_fvalues ANSIARGS((PrkSymbol slot_name,
                        PrkSymbol facet_name,
```

```
                                        PrkType local_value,
                                        prk_sd_table_t *sd_table,
                                        PrkBool dynamic_p,
                                        PrkBool child_instance_p));
extern static_facet_t *prk_sfacet_lookup ANSIARGS((PrkSd sd, PrkSymbol facet_name))
extern PrkType *prk_localize_slot_chunk ANSIARGS((PrkSd sd, PrkType **old_chunk_ptr
extern PrkBool PrkIsFacetOrigin ANSIARGS((PrkObject object,
                PrkSymbol slot_name, PrkSymbol facet_name));

/* facetmain.c */
extern void prk_fill_facet_values_0 ANSIARGS((PrkObject object, PrkType *slot_chunk
extern void prk_fill_facet_values_1
  ANSIARGS((PrkObject object, PrkType *slot_chunk, PrkType *parent_chunk,
           PrkSd sd, PrkSd parent_sd, prk_rsd_t *rsd));
extern void prk_fill_facet_values_n ANSIARGS((PrkObject object, PrkType *slot_chunk
                                  prk_sd_table_t *sd_table, PrkSd sd, prk_rsd_t *rsd)

/* parse.c */
extern void prk_calc_facet_lengths ANSIARGS((PrkRawSlotData raw_slot_data, prk_rsd_
extern PrkSat prk_get_hashed_parent_sat ANSIARGS((prk_parent_table_t *parent_table)
extern PrkSd prk_copy_sd ANSIARGS((PrkSd sd));
extern PrkObject prk_force_to_class ANSIARGS((PrkType o, PrkApp app, char *fn));
extern unsigned prk_sort_sd_array ANSIARGS((PrkSd *sd_array, unsigned size, unsigne
                                    PrkSat sat, unsigned new_mask));
extern void prk_install_multi_sat ANSIARGS((PrkSat new_sat, prk_parent_table_t *par /* n_objmn.c */
extern PrkObject prk_make_object ANSIARGS((PrkSymbol object_name, PrkModule module, extern void prk_fill_slot_chunks ANSIARGS((PrkObject object, prk_rsd_table_t *rsd_t
                                  unsigned parent_count));
extern PrkType *get_common_parent_chunk ANSIARGS((prk_sd_table_t *sd_table));
extern CONST svf_t default_svf;
extern void prk_set_prnts_fill_rsd_table ANSIARGS((prk_rsd_table_t *rsd_table,
                                  PrkObject object,
                                  PrkSat old_sat, prk_parent_table_t *parent_table,
                                  PrkSat sat, unsigned orphan_mode));
extern void prk_set_object_parents_stk ANSIARGS((PrkObject object,
                                  PrkList parents,
                                  unsigned orphan_mode));

/* delete.c */
extern void prk_scrub_value_array ANSIARGS((PrkSat sat,
                                  PrkType **value_array));
extern int prk_delete_module_internal ANSIARGS((PrkModule module));

/* n_parse.c */
extern PrkSat prk_create_new_multi_sat
  ANSIARGS((prk_parent_table_t *parent_table));
extern void prk_merge_static_facets
  ANSIARGS((PrkSd sd, prk_parsed_facet_table_t *sfacet_table));
extern void prk_sd_collision ANSIARGS((PrkSd *sd_ptr, PrkSd new_sd));
extern PrkSat prk_slow_get_hashed_parent_sat ANSIARGS((PrkList parents,
                                                       char *fn));

/* loop_o_s.c */
extern CONST char prk_single_value_p_array[PRK_FROLE_COUNT];

/* cmb_slot.c */
extern PrkList prk_union_values ANSIARGS((PrkList old, PrkList new, PrkBool after_p
extern PrkList prk_difference_values ANSIARGS((PrkList old, PrkList remove));
extern PrkList prk_difference_value ANSIARGS((PrkList old, PrkType remove));
extern PrkList prk_delete_duplicates ANSIARGS((PrkList l));

/* svobj.c */
extern PrkType prk_save_objects ANSIARGS((PrkModule module, PrkString pathname,
                                  PrkBool quietp));
extern PrkType prk_logical_pathname ANSIARGS((PrkString pathname, PrkBool quietp));

/* ldobj.c */
extern PrkType prk_load_objects ANSIARGS((PrkString pathname, PrkModule module,
                                  PrkBool quietp, int fire_monitor_flag))
extern void *prk_get_method_fn ANSIARGS((char *fn_name));
```

```c
/* rldobj.c */
extern void prk_init_save_load_modules ANSIARGS(());
extern PrkModule prk_open_object_file ANSIARGS((PrkString pathname, PrkBool quietp)
extern PrkModule prk_close_object_file ANSIARGS((PrkModule module, PrkBool unloadp,
                                                 PrkBool quietp));
extern PrkType prk_load_instances_of_class ANSIARGS((PrkObject class, int ninstance
                                                     PrkBool quietp,
                                                     PrkBool returnlistp));
extern PrkType prk_load_some_objects ANSIARGS((PrkList objects, PrkModule module,
                                               PrkBool quietp, PrkBool returnlist
extern PrkType prk_unload_some_objects ANSIARGS((PrkList objects, PrkBool quietp,
                                                 PrkBool returnlistp));
extern PrkType prk_unload_instances_of_class ANSIARGS((PrkObject class, int ninstan
                                                       PrkBool quietp,
                                                       PrkBool returnlistp));
extern void prk_unload_objects ANSIARGS((PrkModule module, PrkBool quietp));

/* rsvobj.c */
extern PrkString prk_rsave_objects ANSIARGS((PrkModule module, PrkBool quietp,
                                             PrkString pathname));
extern PrkType prk_rsave_some_objects ANSIARGS((PrkList objects, PrkModule module,
                                                PrkBool quietp, PrkBool returnlist
extern PrkType prk_rsave_instances_of_class ANSIARGS((PrkObject class, PrkBool quie
                                                      PrkBool returnlistp));

extern long PrkRanLOBuffSize;
extern long PrkSingleLOBuffSize;
extern long PrkRanSOBuffSize;

/* n_compkb.c */
extern PrkString prk_compress_robject_file ANSIARGS((PrkString oldmodulefile, PrkSt /* n_tplsld.c */
extern PrkBool prk_save_a_tuple ANSIARGS((u_long tuplesize, PrkType *tuple, void *s
extern PrkType *prk_load_a_tuple ANSIARGS((void *ltp));
extern PrkString prk_save_tuples_internal ANSIARGS((PrkString pathname,PrkBool quie
extern PrkString prk_load_tuples_internal ANSIARGS((PrkString pathname,PrkBool quie /* monitors.c */
extern void prk_init_monitors ANSIARGS(());
extern void prk_install_monitor ANSIARGS((PrkSymbol monitor_facet_name,
                  PrkSd sd, void *mem_ptr, unsigned offset,
                  PrkType value, PrkObject object));
extern PrkType prk_monitor_order_value ANSIARGS((PrkType value));
extern PrkType prk_add_an_monitor ANSIARGS((PrkType new_monitor, PrkList old_monito
extern PrkType prk_combine_ordered_monitors ANSIARGS((PrkList value, PrkList inheri
                          PrkBool *needs_copying_p));
extern PrkType prk_execute_wn_monitor ANSIARGS((PrkType **chunk, PrkObject object,
extern void prk_execute_bc_monitor ANSIARGS((PrkType **chunk, PrkObject object,
      PrkSd sd, unsigned monitor_filter,
      PrkType *added_values, PrkType *removed_values,
      PrkMonitorFlags monitor_flags));
extern void prk_execute_ac_monitor ANSIARGS((PrkType **chunk, PrkObject object,
      PrkSd sd, unsigned monitor_filter,
      PrkType new_values, PrkType old_values, PrkMonitorFlags monitor_flags));
extern void prk_call_monitors_attach_meth ANSIARGS((PrkObject object,PrkSd sd,
      PrkList monitors));
extern void prk_call_monitors_detach_meth ANSIARGS((PrkObject object,PrkSd sd,
      PrkList monitors));
extern void prk_call_slot_attach_meths ANSIARGS((PrkObject object,PrkSd sd,PrkType
extern void prk_call_slot_detach_meths ANSIARGS((PrkObject object,PrkSd sd,PrkType
extern void prk_call_object_attach_meths ANSIARGS((PrkObject object,PrkMonitorFlags
extern void prk_call_object_detach_meths ANSIARGS((PrkObject object));
extern void prk_call_module_attach_meths ANSIARGS((PrkModule module,
      PrkMonitorFlags flags, PrkBool fire_monitor_puts_p));
extern void prk_call_module_detach_meths ANSIARGS((PrkModule module));
extern void prk_call_monitors_puts_meth ANSIARGS((PrkObject object, PrkSd sd,
              PrkType **chunk,
              PrkList monitor_puts, PrkMonitorFlags monitor_flags));
extern void PrkFireSlotWhenChangedMonitors ANSIARGS((PrkObject object,
                                PrkSymbol slot_name));
```

```
extern void PrkFireWhenChangedMonitor ANSIARGS((PrkObject object,
                      PrkSymbol slot_name, PrkMonitor monitor));
extern void PrkFireSlotAfterChangedMonitors ANSIARGS((PrkObject object,
                                        PrkSymbol slot_name));
extern void prk_call_obj_fam_attaches ANSIARGS((PrkObject object,
                                        PrkMonitorFlags flags));
extern void prk_call_obj_fam_detaches ANSIARGS((PrkObject object));

/* ob_excpt.c */
extern void prk_init_ob_excpt ANSIARGS(());
extern PrkBool prk_objman_exit_exc ANSIARGS((PrkException id, va_list args));

/* n_addslt.c */
extern void prk_unmark_descendants ANSIARGS((PrkObject super, unsigned link));

#ifdef OBJ_EVENTS
#include <prokee/ob_event.ih>
extern void prko_signal_slot_mod ANSIARGS((PrkObject object,
                    PrkSymbol slot_name, int sc, PrkEventId id));
extern void prko_signal_facet_mod ANSIARGS((PrkObject object,
                       PrkSymbol slot_name, PrkSymbol facet_name,
                       PrkSymbol new_name, int sc, PrkEventId id));
#endif
#endif /* PRK_OBJMAN_H */

/*
   file: int_sbst.ih
*/ ifndef PRK_SBSTRATE_H
define PRK_SBSTRATE_H include <prokee/cmn_sbst.ih>
include <setjmp.h>
include <prokee/uwp.ih> ifndef NDEBUG
define MAX_DEBUG_INDEX 1000
#define PRK_DEBUG(n, x) \
   if (prk_is_on_debug && prk_debug_status[n]) { \
     x ; \
   }
/*
        Please document the indices used.

Usage:

index: 1  - 25 - used by GC
        index: 26 - 50 - used by Load/Save objects
        index: 51 - used by UWP

*/
#else /* NDEBUG */
#define PRK_DEBUG(n, x)
#endif /* NDEBUG */

/*
   This macro allows to switch between Our GC and standard
   C malloc and free
*/ ifndef PRK_GC_LOADED define PRK_GC_MALLOC malloc
define PRK_GC_MEMALIGN(alignby, size) \
   ((void *)(((long)malloc((size) + (alignby))) & ((alignby) - 1)))
#define PRK_GC_FREE free
#define prk_free_object(x, type)   free((char *) (x) - type)
#define prk_init_gc()
#define prk_init_gc_end()
#define PRK_GC_ALLOC_FIXED_SIZE_OBJECT(type) \
   ((u_char *)malloc((type - Byte4Tag + 1) * sizeof(PrkType)))
```

```c
#define PRK_GC_FREE_FIXED_SIZE_OBJECT(type, object) (free(object))
#define PrkFreeType(o) free((void *)((long)o & PRK_IMMEDIATE_TAG_MASK))

else include <prokee/gc.ih>
define PRK_GC_MALLOC PrkMalloc
#define PRK_GC_MEMALIGN(alignby, size) PrkMalloc(size)
#define PRK_GC_FREE PrkFree
#define prk_free_object(x, type) PrkFreeType(x);
#define PRK_GC_ALLOC_FIXED_SIZE_OBJECT prk_gc_alloc_fixed_size_object
#define PRK_GC_FREE_FIXED_SIZE_OBJECT prk_gc_free_fixed_size_object
endif /* PRK_GC_LOADED */ include <memory.h>

/*
#ifdef __hpux__
#define bcopy(source, dest, n) (memcpy((dest), (source), (n)))
!!! This can't be right
#define alloca malloc
#endif
*/ ifndef PRKS_DEBUG

/*
  PRKS_DEBUG affects the way in which files compile.  When PRKS_DEBUG is true,
  runtime typechecking code is generated for all coersions and class
  declarations.  If !PRKS_DEBUG, then all declarations are assumed correct and
  the code generated is optimized for runtime performance.
*/ define PRKS_DEBUG TRUE endif /* PRKS_DEBUG */

/* type includes: */
#include <prokee/t_generc.ih>

/* #include <prokee/t_list.h>      included in cmn_sbst.h */
/* #include <prokee/t_string.h>    included in cmn_sbst.h */
/* #include <prokee/t_symbol.h>    included in cmn_sbst.h */
#include <prokee/t_array.ih>
/* #include <prokee/t_char.h>      included in cmn_sbst.h */
/* #include <prokee/t_collct.h>    included in cmn_sbst.h */
/* #include <prokee/t_error.h>     included in cmn_sbst.h */
/* #include <prokee/t_fixnum.h>    included in cmn_sbst.h */
#include <prokee/t_sat.ih>
#include <prokee/t_object.ih>
#include <prokee/t_app.ih>
#include <prokee/t_sd.ih>
#include <prokee/t_rawsdt.ih>
#include <prokee/t_rawfdt.ih>
#include <prokee/t_dfacet.ih>
/* #include <prokee/t_cvalue.h>    included in cmn_sbst.h */
#include <prokee/t_method.ih>
#include <prokee/t_float.ih>
include <prokee/t_sltref.ih> define DEV_EXTERN extern
define DEL_STATIC ifndef PRK_GC_LOADED
                                /* *** Crap for Saber source misdefinition
                                       H_INCLUDE is a saber internal */
#ifndef H_INCLUDE
extern void *malloc ANSIARGS((size_t));
endif extern void free ANSIARGS((void *));
```

```
endif /* PRK_GC_LOADED */ ifdef MSDOS define PRK_LIMITED_STACK ifdef OS2
define huge
#define halloc malloc
#define halloca alloca
#define hfree free
#define hfreea(ptr)
#else
#define PRK_USE_HUGE_MODEL
#define halloca halloc
#define hfreea hfree
endif define memalign(alignby, size) \
  ((void *)((((long)malloc((size) + (alignby))) + ((alignby) - 1)) & !((alignby) - else
extern void *memalign ANSIARGS((unsigned, size_t));
#define huge
#define halloc malloc
#define halloca alloca
#define hfree free
#define hfreea(ptr)
endif ifdef sun3
extern void *alloca ANSIARGS((size_t));
endif ifdef sun4
extern void *__builtin_alloca ANSIARGS((size_t));
endif ifdef sun

/* stdio.h */
/* patches to sun's stdio stuff */ extern bcopy ANSIARGS((char *str1, char *str2, int cnt));
extern int printf ANSIARGS((CONST char *, ...));
extern int read ANSIARGS((int, unsigned char *, int));
extern int write ANSIARGS((int, unsigned char *, int));
extern long lseek ANSIARGS((int, long, int));
extern int open ANSIARGS((CONST char *, int, int));
extern int creat ANSIARGS((CONST char *, int));
extern int close ANSIARGS((int));
extern volatile void exit ANSIARGS((int));
extern int fflush ANSIARGS((FILE *));
extern int fprintf ANSIARGS((FILE *, CONST char *, ...));
#ifndef SABER
extern char *strchr ANSIARGS((CONST char *, int c));
#endif
extern int fputs ANSIARGS((CONST char *, FILE *));
extern int _flsbuf ANSIARGS((u_char, FILE *));
endif /* sun */ ifdef __hpux__ include <sys/types.h>
extern int printf ANSIARGS((char *, ...));
extern int read ANSIARGS((int, char *, unsigned));
extern int write ANSIARGS((int, unsigned char *, int));
extern long lseek ANSIARGS((int, off_t, int));
extern int open ANSIARGS((char *, int, mode_t));
extern int creat ANSIARGS((char *, int));
extern int close ANSIARGS((int));
extern volatile void exit ANSIARGS((int));
```

```
extern int fflush ANSIARGS((FILE *));
extern int fprintf ANSIARGS((FILE *, char *, ...));
extern int fputs ANSIARGS((char *, FILE *));
extern int _flsbuf ANSIARGS((u_char, FILE *));
endif /* __hpux__ */ ifndef PRK_GC_LOADED define prk_make_untagged_object(size, type) \
  prk_internal_make_untagged_obj(size, type)
#define prk_make_tagged_object(size, type) \
  prk_internal_make_tagged_obj(size, type)
#define prk_internal_allocate_sat(instance_p, hash_table_size) \
  (PrkSat)prk_internal_make_tagged_obj((sizeof(PrkType) << (hash_table_size)) \
                                + ((instance_p) ? sizeof(struct PRK_SLOT_ACCESS
                                (instance_p) ? PrkISatTag : PrkCSatTag)

else define prk_make_untagged_object(size, type) \
  ((PrkType)AllocFixObject(type))
#define prk_make_tagged_object(size, type) \
  ((PrkType)AllocFixObject(type))
#define prk_internal_allocate_sat(instance_p, hash_table_size) \
  ((PrkSat)AllocFixObject((hash_table_size) + PRKS_SYSTEM_TAG_COUNT + ((instance_p)

endif /* PRK_GC_LOADED */ ifdef MSDOS
/* *** to be determined */
#define END_OF_CODE 0
#define END_OF_STATIC_DATA ((void *)0xffffffff)
#define END_OF_HEAP_DATA ((void *)0xffffffff))
#define END_OF_INITIALIZED_DATA ((void *)0xffffffff))
#else
extern int etext;
#define END_OF_CODE (&etext)
extern int edata, end;
#define END_OF_INITIALIZED_DATA (&edata)
#define END_OF_STATIC_DATA (&end)
extern char *sbrk ANSIARGS((long size));
#define END_OF_HEAP_DATA (sbrk(0))
endif include <prokee/sbstr_ex.ih>

/* app.c */ extern PrkApp prk_require_app ANSIARGS((PrkSymbol name));
extern PrkType prk_find_scoped_object ANSIARGS((PrkSymbol name, PrkApp app, PrkType extern PrkSymbol prk_default_object_type;
extern PrkSymbol prk_app_class_name;
extern PrkApp prk_app_class_object;

extern PrkSymbol prk_objmgr_app_name;
extern PrkApp prk_objmgr_app_object;

extern PrkSymbol prk_default_object_type;

/* array.c */

/* char.c */

/* collection.c */

/* cvalue.c */

/* dfacet.c */
extern PrkDFacet prk_make_dfacet ANSIARGS((PrkSymbol name, PrkFacetInheritance role /* error.c */
extern void prk_object_prop_error ANSIARGS((PrkType o));
```

```c
/* exceptn.c */
extern void prk_init_exceptions();
extern FILE *PrkStdExcOut;
extern FILE *PrkStdExcIn;
extern PrkException PrkNextExc;
extern int prk_reset_in_progress_p;

/* fixnum.c */

/* float.c */

/* gc.c */ define WORDSHIFT 2
define WORDSIZE ((u_long) 4)
#define BYTESHIFT 3
#define BYTESIZE 8
#define PAGESHIFT 13
#define PAGESIZE (1 << PAGESHIFT) /* 8K,this is machine specific*/
#define SEGMENTSHIFT 16
define SEGMENTSIZE ( 1 << SEGMENTSHIFT)   /* 64K */ ifdef PRK_GC_LOADED
extern void prk_init_gc();
extern void prk_init_gc_end();
extern char *prk_gc_substrate_data_start;
extern char *prk_gc_substrate_data_end;
extern char *prk_gc_objmgr_data_start;
extern char *prk_gc_objmgr_data_end;
#endif /* PRK_GC_LOADED */

/* gc_asm.c */
extern void gc_save_registers ANSIARGS((PrkType *register_array));

/* list.c */
extern PrkList prk_append_to_list ANSIARGS((PrkList l, PrkType o));
extern PrkType prk_get_cons_prop ANSIARGS((PrkList l, PrkType prop));
extern PrkType prk_rem_cons_prop ANSIARGS((PrkList *l, PrkType prop));
extern PrkType prk_put_cons_prop ANSIARGS((PrkList *l, PrkType prop, PrkType value));
extern PrkType prk_get_whole_assoc_prop ANSIARGS((PrkList assoc_list, PrkType val));
extern void PrkListToArray ANSIARGS((PrkList l, PrkArray a));
extern PrkType *prk_get_addr_cons_prop ANSIARGS((PrkList l, PrkType prop));
extern PrkType prk_add_cons_prop ANSIARGS((PrkList *l, PrkType prop, PrkType value));
extern PrkType prk_get_assoc_prop ANSIARGS((PrkList assoc_list, PrkType val));
extern PrkType prk_rem_assoc_prop ANSIARGS((PrkList *assoc_list, PrkType val));
extern PrkList *prk_addr_member_ptr_eq ANSIARGS((PrkList *l, PrkType o));
extern PrkBool prko_is_valid_list ANSIARGS((PrkList lst));

/* gcpage.c */ extern u_char *prk_gc_get_sbrk_chunk ANSIARGS((long *size, PrkBool variable_p));
extern u_char *prk_gc_get_free_segment();
extern void prk_gc_add_free_segment ANSIARGS((u_char *segment));
extern u_char *prk_gc_get_free_page ANSIARGS((PrkBool requiredp));
extern void prk_gc_add_free_page ANSIARGS((u_char *page));

/* machine.c */
extern void prk_query_abort ANSIARGS((PrkException exc));

/* gcmisc.c */
extern void prk_print_gc_statistics ANSIARGS((long b_used, long b_free, long a_used /* gctool.c */
extern void prk_gc_tool_init ANSIARGS((void));

/* methspec.c */
extern void prk_init_method_spec();

/* mod.c */
extern PrkModule prk_require_module ANSIARGS((PrkSymbol name, PrkApp app));
```

```c
/* type.c */
extern PrkType prk_internal_make_tagged_obj ANSIARGS((size_t size, PrkSecondaryTag
extern PrkType prk_internal_make_untagged_obj ANSIARGS((size_t size, PrkImmediateTa
extern PrkBool prko_is_valid_type ANSIARGS((PrkType o));

/* rawfacetdata.c */
extern void prk_init_rawfacetdata ANSIARGS(());

/* rawslotdata.c */
extern void prk_init_rawslotdata();

/* sab_meth.c */
extern void prk_init_saber_method();
extern void prk_add_to_method_ht ANSIARGS((PrkMethod mspec));
extern void *prk_get_fn_addr ANSIARGS((PrkMethod mspec));
extern void *prk_patch_method_spec ANSIARGS((PrkMethod mspec));
extern void prk_remove_mspec_from_ht ANSIARGS((PrkMethod mspec));
extern PrkList *prk_method_ht;
extern void **prk_method_at;
extern u_long prk_method_addr_max;

/* sabr_dmy.c */
extern const PrkBool prk_saber_p;
extern void prk_longjmp ANSIARGS((jmp_buf buf, int code));
extern int prk_setjmp ANSIARGS((jmp_buf buf));

/* sd.c */
extern PrkList prk_bucket_lookup ANSIARGS((PrkSymbol name, PrkList l));
extern PrkSd *prk_get_sd_ptr ANSIARGS((PrkSymbol name, PrkSat sat, PrkObject object
extern PrkSd *prk_maybe_get_sd_ptr ANSIARGS((PrkSymbol name, PrkSat sat));

/* sat.c */
extern PrkSat empty_sat;
extern PrkSat prk_allocate_sat ANSIARGS((PrkBool instance_p, sat_hash_index_t hash_
extern unsigned prk_hash_table_size ANSIARGS((unsigned sd_count));
extern void prk_copy_sat ANSIARGS((PrkSat sat, PrkSat new_sat, PrkBool instance_p))
extern PrkSat prk_instance_sat_from_class_sat ANSIARGS((PrkSat sat));
extern void prk_copy_into_isat ANSIARGS((PrkSat source_sat, PrkSat isat));
extern void prk_init_sat();

/* sb_data.c */
extern PrkBool PrkPrintVerboseP;
extern char prk_substrate_initialized_p;
extern const char PrkoObjectManagerString[];
extern int prk_handling_xevents_p;
extern jmp_buf prk_xevent_handler_env;

/* sb_excpt.c */
extern void prk_init_sb_excpt();
extern PrkBool prk_generic_exception_cleanup ANSIARGS((PrkException id, char *error
extern void prk_exc_frmt_put_str ANSIARGS((char *frmt,...));
#define PrkExcFrmtPutStr prk_exc_frmt_put_str
#define PrkExcPutStr(str) prk_exc_frmt_put_str(str)

/* string.c */
extern void prk_init_string();

/* stackalloc.s */

/* symbol.c */
extern void prk_init_symbol();
extern u_long prk_symbol_hash_table_size;
extern u_long prk_symbol_count;
extern PrkSymbol *prk_symbol_hash_table;
extern PrkBool prk_symbol_ht_expand_p;
extern PrkBool prko_is_valid_symbol ANSIARGS((PrkSymbol s));
extern PrkSymbol prk_null_symbol;

/* object.c */
extern PrkBool PrkNameSpaceActiveP;
extern CONST char *prk_get_inheritance_cstring ANSIARGS((PrkInheritance role));
extern CONST char *prk_get_finheritance_cstring ANSIARGS((PrkInheritance frole));
```

```c
extern char *prk_get_sc_cstring ANSIARGS((PrkSlotFlags sc));
extern PrkObject prk_find_anon_object_internal ANSIARGS((PrkBool class_p,
                                        PrkFixnum anon_object_num,
                                        PrkObject object));
extern PrkObject prk_find_anonymous_object ANSIARGS((PrkBool class_p,
        PrkFixnum anon_object_num,PrkType parents_list_or_object));
extern PrkBool prko_is_valid_object ANSIARGS((PrkObject object));
extern void prk_init_object();
extern PrkObject prk_internal_make_object ANSIARGS((PrkSymbol object_name, PrkModul /* print.c */
extern void prk_debug_on ANSIARGS((int id));
extern void prk_debug_off ANSIARGS((int id));
extern char *prk_debug_status;
extern int prk_is_on_debug;

/* verify*.c */
extern PrkBool prk_verify_string ANSIARGS((CONST char *str));
extern PrkBool prk_verify_data_pntr ANSIARGS((CONST void *pntr));
extern PrkBool prk_verify_pntr ANSIARGS((CONST void *pntr));
extern PrkBool prk_is_valid_type ANSIARGS((PrkType obj));
extern PrkBool prk_verify_data_or_text_string ANSIARGS((CONST char *str));
extern PrkBool prko_is_valid_string ANSIARGS((PrkString s));
extern PrkBool prk_is_stack_prk_type ANSIARGS((PrkType t));
extern PrkBool prko_is_valid_symbol ANSIARGS((PrkSymbol s));
extern PrkBool prk_verify_data_string ANSIARGS((CONST char *str));

#define PrkExit(id) PrkSignalException(PrkExcSubstrateExit, (id))
#define PrkForceExit(id) PrkSignalException(PrkExcSubstrateForceExit, (id))

#define UNSUPPORTED(str) PrkSignalExceptionLoop(PrkExcNotYetDoneUsage, (str))

#undef PRK_USER_ASSERT_SYSTEM_NAME
#define PRK_USER_ASSERT_SYSTEM_NAME PrkoObjectManagerString
#undef PRK_ASSERT_SYSTEM_NAME
define PRK_ASSERT_SYSTEM_NAME PrkoObjectManagerString include <prokee/u_assert.ih> define PRK_EXC_MSG(msg, fn) \
   PrkSignalExceptionLoop(PrkExcPutOMMsg, msg, #fn, __LINE__, __FILE__, \
                   PrkoObjectManagerString, TRUE)

#define PRK_EXC_MSG_WARNING(msg, fn) \
   PrkSignalException(PrkExcPutOMMsg, msg, #fn, __LINE__, __FILE__, \
                   PrkoObjectManagerString, FALSE)

int strcmp ANSIARGS((CONST char *, CONST char *));
int strlen ANSIARGS((CONST char *));
char *strcpy ANSIARGS((CONST char *, CONST char *));

#define PRK_FIND_OBJECT_NULL_RESULT ((PrkObject)PrkNull)

/* The following macro can be used to remove the CONST qualifier
   from strings where you explicity do not want the warning one
   might get otherwise
*/
#define PRK_UNQUALIFY_STRING(s)  (&(char)*(s))

/*
#define EQUAL_OBJS(v1, v2)                                           \
                  (((PrkType)v1 == (PrkType)v2) ||                   \
                   (PrkIsString((PrkType)v2) &&                      \
                    PrkIsString((PrkType)v1) &&                      \
                    ((PRK_STRING_CSTRING((PrkString)v2) ==           \
                      PRK_STRING_CSTRING((PrkString)v1)) ||          \
                     (strcmp(PRK_STRING_CSTRING((PrkString)v2),      \
                       PRK_STRING_CSTRING((PrkString)v1)) == 0))) || \
                   (PrkIsList((PrkType)v2) &&                        \
                    PrkIsList((PrkType)v1) &&                        \
                    prk_list_equal((PrkList)v1,(PrkList)v2)))
```

```
*/
#define EQUAL_OBJS(v1, v2) prk_is_equal(v1, v2)

#endif /* PRK_SBSTRATE_H */

/*
  file: objmain.ih
*/ enum {
  NEVER_CREATE = 0,
  MAYBE_CREATE,
  ALWAYS_CREATE
};

typedef unsigned char prk_monitor_offset_type;

typedef struct {
  prk_monitor_offset_type avget_offset;
  prk_monitor_offset_type avput_offset;
} svf_t;

typedef unsigned char prk_create_state_type;

/*
  No Monitors if offset = PRK_NO_AV
  dynamic Monitors if offset = PRK_DYNAMIC_AV
  otherwise static facet
*/ define PRK_NO_AV 255
define PRK_DYNAMIC_AV 254 define PRK_NO_AV_P(x)  ((x) == PRK_NO_AV)

define PRK_DYNAMIC_AV_P(x)  ((x) == PRK_DYNAMIC_AV)

#define PRK_NO_AVPUT_P(sd, value_array) \
    ((PRK_SD_FLAGS(sd) & PrkNoWhenChangedMonitorsFlag) || PRK_NO_AV_P(((svf_t *)PRK_M define PRK_NO_AVGET_P(sd, value_array) \
    ((PRK_SD_FLAGS(sd) & PrkNoWhenNeededMonitorsFlag) || PRK_NO_AV_P(((svf_t *)PRK_MA define PRK_AVGET_P(sd, value_array) \
    (!PRK_NO_AVGET_P(sd,value_array))

#define PRK_AVPUT_P(sd, value_array) \
    (!PRK_NO_AVPUT_P(sd,value_array))

#define PRK_DYNAMIC_AVGET_P(value_array) \
    PRK_DYNAMIC_AV_P(((svf_t *)PRK_MASK_CHUNK(value_array[1]))->avget_offset)

#define PRK_DYNAMIC_AVPUT_P(value_array) \
    PRK_DYNAMIC_AV_P(((svf_t *)PRK_MASK_CHUNK(value_array[1]))->avput_offset)

/* slot value flags */
#define SVF_LOCAL_VALUE_P 1
#define SVF_LOCAL_ARRAY_P 2
#define SVF_ALIGNMENT 4
#define SVF_MASK (SVF_ALIGNMENT - 1)

#define PRK_MASK_CHUNK(chunk) ((PrkType *)((u_long)(chunk) & ~SVF_MASK))
#define PRK_MASK_DFACET(dlist) ((PrkList)((u_long)(dlist) & ~DFF_LOCAL_P))
#define PRK_LOCAL_CHUNK_P(chunk) ((u_long)(chunk) & SVF_LOCAL_ARRAY_P)
#define PRK_LOCAL_SF_CHUNK_P(chunk) ((u_long)(chunk) & SFF_LOCAL_ARRAY_P)
#define PRK_LOCAL_DLIST_P(chunk) ((u_long)(chunk) & DFF_LOCAL_P)
#define PRK_LOCAL_VALUE_P(address) ((u_long)(address)[1] & SVF_LOCAL_VALUE_P)
#define PRK_SET_LOCAL_VALUE_P(address) ((u_long)(address)[1] |= SVF_LOCAL_VALUE_P)
define PRK_UNSET_LOCAL_VALUE_P(address) ((u_long)(address)[1] &= ~SVF_LOCAL_VALUE_ define PRK_LOCAL_VALUE(chunk, sd) \
    ((chunk)[PRK_SD_STATIC_FACET_START(sd) - 1])
```

```c
#define PRK_ONCE_ONLY_LOCAL_FVALUE ((PrkType)PRK_MAKE_FIXNUM(0))

#define PRK_MV_TO_SV(chunk, fn) \
    if (*(PrkType *)(chunk) == PrkNull); \
    else if (*(PrkList *)(chunk) == PrkNil) \
        *(PrkType *)(chunk) = PrkNull; \
    else { \
      ASSERT(PrkIsList(*(PrkType *)(chunk)), fn); \
      *(PrkType *)(chunk) = PRK_FIRST(*(PrkList *)(chunk)); \
    } define PRK_SV_TO_MV(chunk, fn) \
    if (*(PrkType *)(chunk) != PrkNull) \
      *(PrkList *)(chunk) = prk_ncons(*(PrkType *)chunk)

#define PRK_NULL_COMB_VAL(chunk) (*(PrkType *)chunk = PrkNull)

/* *** The following could have hard-wired array index */ define PRK_METHOD_LOCAL_VALUE(chunk, sd) PRK_LOCAL_VALUE(chunk, sd)

define SFF_LOCAL_ARRAY_P 1
define DFF_LOCAL_P 2 define PRK_IS_SLOT_ROLE(role) (((role) >= PrkMVNoInheritance) && ((role) <= PrkDef typedef struct {
  unsigned count;
  PrkObject start;
} prk_parent_table_t;

typedef struct {
  static_facet_t sf_part;
  PrkType value;
} prk_parsed_raw_facet_t;

typedef struct {
  unsigned count;
  unsigned size;
  unsigned combined_count;
  prk_parsed_raw_facet_t start;
} prk_parsed_facet_table_t;

typedef struct {
  PrkSymbol name;
  PrkType value;
  PrkSlotFlags flags;
  PrkInheritance role;
  unsigned char must_create_p;
  prk_parsed_facet_table_t *dynamic_ftable, *static_ftable;     /* NULL -> no facet
} prk_rsd_t;

typedef struct {
  unsigned count;                /* Size of table */
  unsigned char must_create_p;
  unsigned short sd_count;       /* number of SADs when adding local+nonlocal */
  prk_rsd_t rsd_start;
} prk_rsd_table_t;

typedef struct {
  PrkSd parent_sd;
  PrkObject parent;
} prk_sd_object_t;

typedef struct {
  unsigned count;
  prk_sd_object_t start;
} prk_sd_table_t;

typedef struct {
  u_long key;
  PrkSd sd;
} prk_sd_item_t;
```

```c
typedef struct {
  unsigned count;
  prk_sd_item_t start;
} prk_sd_item_table_t;

#define PRK_STACK_TABLE(type, elem_type, length) \
  ((type *)alloca(sizeof(type) - sizeof(elem_type) + sizeof(elem_type) * (length)))

#define TABLE_ELT(table, i) \
  ((&(table)->start)[i])

#define PRK_IS_SV_INHERITANCE(role) \
  (prk_single_value_p_array[role])

#define PRK_SD_DISALLOW_DFACETS_P(sd) \
  (PRK_SD_FLAGS(sd) & PrkNoDynamicFacetsFlag)

/* no longer used in n_addslt.c or objmain.c */
#define PRK_LAYOUT_CHUNK(role_specifier, sd, sd_flags)                    \
  do                                                                      \
  if (!PRK_IS_USER_DEFINED_INHERITANCE(role_specifier))                   \
    switch ((PrkFacetInheritance)role_specifier) {                        \
      unsigned char _sd_size;                                             \
    default:                                                              \
      ASSERT_NEVER_REACHED(PRK_LAYOUT_CHUNK_MACRO);                       \
      break;                                                              \
    case PrkMethodInheritance:                                            \
      sd_flags |= PrkNoWhenChangedMonitorsFlag | PrkNoWhenNeededMonitorsFlag; \
      PRK_SD_FLAGS(sd) = sd_flags;                                        \
      _sd_size = 1;                                                       \
      goto common_layout;                                                 \
    case PrkSVOverrideInheritance:                                        \
    case PrkMVOverrideInheritance:                                        \
    case PrkMVNoInheritance:                                              \
    case PrkSVNoInheritance:                                              \
    case PrkMVInitialInheritance:                                         \
    case PrkSVInitialInheritance:                                         \
      _sd_size = !PRK_SD_DISALLOW_AVS_P(sd_flags);                        \
    common_layout:                                                        \
      PRK_SD_STATIC_FACET_START(sd) = _sd_size;                           \
      if (PRK_SD_STATIC_FACET_SIZE(sd))                                   \
        _sd_size++;                                                       \
      if (!PRK_SD_DISALLOW_DFACETS_P(sd))                                 \
        _sd_size++;                                                       \
      PRK_SD_SIZE(sd) = _sd_size;                                         \
      break;                                                              \
    case PrkSelfLastUnionInheritance:                                     \
    case PrkSelfFirstUnionInheritance:                                    \
      _sd_size = !PRK_SD_DISALLOW_AVS_P(sd_flags) + 1;                    \
      goto common_layout;                                                 \
    }                                                                     \
  else                                                                    \
    (PRK_SMT_METHOD(role_specifier, PRK_SMT_LAYOUT_CHUNK))(sd);            \
  while (FALSE)

#define MAX(x,y) ((x) > (y) ? (x) : (y))
#define MIN(x,y) ((x) > (y) ? (y) : (x))

#define CALCULATE_START_OFFSET(value_array, sat, storage_class, fn)       \
  switch (storage_class) {                                                \
  default:                                                                \
    ASSERT_NEVER_REACHED(fn);                                             \
    break;                                                                \
  case PrkDefaultSlotType:                                                \
    value_array += PRK_SAT_LOCKED_END(sat);                               \
    break;                                                                \
  case PrkLockedSlotType:                                                 \
    break;                                                                \
  case PrkSubclassSlotType:                                               \
    value_array += PRK_SAT_DEFAULT_END(sat);                              \
    break;                                                                \
```

```
    case PrkOwnSlotType:                                              \
      value_array += PRK_SAT_SUBCLASS_END(sat);                       \
      break;                                                          \
    case PrkSparseSlotType:                                           \
      break;                                                          \
    } define CALCULATE_END_OFFSET(value_array, sat, storage_class, fn)     \
  switch (storage_class) {                                            \
  default:                                                            \
    ASSERT_NEVER_REACHED(fn);                                         \
    break;                                                            \
  case PrkDefaultSlotType:                                            \
    value_array += PRK_SAT_DEFAULT_END(sat);                          \
    break;                                                            \
  case PrkLockedSlotType:                                             \
    value_array += PRK_SAT_LOCKED_END(sat);                           \
    break;                                                            \
  case PrkSubclassSlotType:                                           \
    value_array += PRK_SAT_SUBCLASS_END(sat);                         \
    break;                                                            \
  case PrkOwnSlotType:                                                \
    value_array += PRK_SAT_CHUNK_END(sat);                            \
    break;                                                            \
  case PrkSparseSlotType:                                             \
    break;                                                            \
  } define OFFSET_SLOT_TYPE_END(sat, storage_class, ofs)                 \
  switch (storage_class) {                                            \
  default:                                                            \
    ASSERT_NEVER_REACHED(OFFSET_SLOT_TYPE_END);                       \
    break;                                                            \
  case PrkLockedSlotType:                                             \
    PRK_SAT_LOCKED_END(sat) += ofs;                                   \
  case PrkDefaultSlotType:                                            \
    PRK_SAT_DEFAULT_END(sat) += ofs;                                  \
  case PrkSubclassSlotType:                                           \
    PRK_SAT_SUBCLASS_END(sat) += ofs;                                 \
  case PrkOwnSlotType:                                                \
    PRK_SAT_CHUNK_END(sat) += ofs;                                    \
    break;                                                            \
  case PrkSparseSlotType:                                             \
    break;                                                            \
  } define GET_SLOT_TYPE_LEN(sat, slot_type, len)                        \
  switch (slot_type) {                                                \
  default:                                                            \
    ASSERT_NEVER_REACHED(GET_SLOT_TYPE_LEN);                          \
    break;                                                            \
  case PrkDefaultSlotType:                                            \
    len = PRK_SAT_DEFAULT_END(sat) - PRK_SAT_LOCKED_END(sat);         \
    break;                                                            \
  case PrkLockedSlotType:                                             \
    len = PRK_SAT_LOCKED_END(sat);                                    \
    break;                                                            \
  case PrkSubclassSlotType:                                           \
    len = PRK_SAT_SUBCLASS_END(sat) - PRK_SAT_DEFAULT_END(sat);       \
    break;                                                            \
  case PrkOwnSlotType:                                                \
    len = PRK_SAT_CHUNK_END(sat) - PRK_SAT_SUBCLASS_END(sat);         \
    break;                                                            \
  case PrkSparseSlotType:                                             \
    break;                                                            \
  } define CALCULATE_FULL_OFFSET(value_array, sat, storage_class, sd, fn) \
  switch (storage_class) {                                            \
  default:                                                            \
    ASSERT_NEVER_REACHED(fn);                                         \
    break;                                                            \
```

```
  case PrkDefaultSlotType:                                                      \
    value_array += PRK_SAT_LOCKED_END(sat);                                     \
    break;                                                                      \
  case PrkLockedSlotType:                                                       \
    break;                                                                      \
  case PrkSubclassSlotType:                                                     \
    value_array += PRK_SAT_DEFAULT_END(sat);                                    \
    break;                                                                      \
  case PrkOwnSlotType:                                                          \
    value_array += PRK_SAT_SUBCLASS_END(sat);                                   \
    break;                                                                      \
  case PrkSparseSlotType:                                                       \
                            /* *** */                                           \
    break;                                                                      \
  }                                                                             \
  value_array += PRK_SD_OFFSET(sd)

#define CALCULATE_PARTIAL_OFFSET(value_array, sat, storage_class, sd, fn, not_found
  switch (storage_class) {                                                      \
  case PrkLockedSlotType:                                       \               \
    break;                                                                      \
  case PrkDefaultSlotType:                                      \               \
    value_array += PRK_SAT_LOCKED_END(sat);                                     \
      break;                                                                    \
  case PrkSubclassSlotType:                                     \               \
    if (instance_p)                                                             \
      goto init_partial_sd_failure;                                             \
    value_array += PRK_SAT_DEFAULT_END(sat);                                    \
    break;                                                                      \
  default:                                                                      \
  init_partial_sd_failure:                                                      \
    not_found_code;                                                             \
  }                                                                             \
  value_array += PRK_SD_OFFSET(sd)

/* can't have a continue in sd_not_cound_code as PRK_FIND_SAD has a loop inside */ if PRK_BIG_MACROS_OK
define INIT_FULL_SAD_ACCESS(object, sd, sat, slot_name, sd_not_found_code, value_a
  sat = PRK_OBJECT_SAT(object);                                                 \
  ASSERT(PRK_IS_SAT(sat), INIT_FULL_SAD_ACCESS);                                \
  PRK_FIND_SAD(sd, sat, slot_name, sd_not_found_code);                          \
  value_array = PRK_OBJECT_VALUE_ARRAY(object);                                 \
  CALCULATE_FULL_OFFSET(value_array, sat,                                       \
      (((int)storage_class == -1) ? PRK_SD_SLOT_TYPE(sd) : storage_class),      \
      sd, INIT_FULL_SAD_ACCESS)

#define INIT_PARTIAL_SAD_ACCESS(object, sd, sat, slot_name, sd_not_found_code, valu
  {                                                                             \
    sat = PRK_OBJECT_SAT(object);                                               \
    ASSERT(PRK_IS_SAT(sat), INIT_PARTIAL_SAD_ACCESS);                           \
    PRK_FIND_SAD(sd, sat, slot_name, goto init_partial_sd_failure);             \
    value_array = PRK_OBJECT_VALUE_ARRAY(object);                               \
    CALCULATE_PARTIAL_OFFSET(value_array, sat,                                  \
       (((int)storage_class == -1) ? PRK_SD_SLOT_TYPE(sd) : storage_class),     \
       sd, INIT_PARTIAL_SAD_ACCESS, sd_not_found_code, instance_p);             \
  }
else
#define INIT_FULL_SAD_ACCESS(object, sd, sat, slot_name, sd_not_found_code, value_a
  if (prk_init_full_sad_access(object, &sd, &sat, slot_name, &value_array,   \
                               storage_class)) \
    sd_not_found_code
#define INIT_PARTIAL_SAD_ACCESS(object, sd, sat, slot_name, sd_not_found_code, valu
  if (prk_init_partial_sad_access(object, &sd, &sat, slot_name, &value_array, \
                               storage_class, instance_p)) \
    sd_not_found_code
endif define PRK_INSTALL_AV(monitor_facet_name, sd, mem_ptr, offset, value, object)\
  prk_install_monitor(monitor_facet_name, sd, mem_ptr, offset, value, object)

#define PRK_DFCONS_DF(df_cons) ((PrkDFacet)PRK_FIRST(df_cons))
```

```
#define PRK_DFCONS_VALUE(df_cons) PRK_FIRST(PRK_REST(df_cons))
#define PRK_DFCONS_LVALUE(df_cons) ((PrkType)PRK_REST(PRK_REST(df_cons)))
#define PRK_MAKE_DFCONS(dfacet, value, lvalue) \
   PrkMakeCons((PrkType)(dfacet), (PrkType)PrkMakeCons((PrkType)(value), (PrkType)(l
#define PRK_MAKE_SHORT_DFCONS(dfacet, value) \
   PrkMakeCons((PrkType)(dfacet), (PrkType)prk_ncons(value))

#define PRK_IS_USER_DEFINED_INHERITANCE(role) ((u_long)(role) >= PRK_ROLE_COUNT)

#define PRK_IS_USER_DEFINED_FINHER(role) ((u_long)(role) >= PRK_FROLE_COUNT)

#define PRK_NO_INHERITANCE_ROLE_P(role) \
   ((u_long)(role) <= PrkSVNoInheritance)

define PRK_DEREFERENCE_METHOD_SPEC(o) ((o) == PrkNull ? (PrkType)0 : (PrkType)PRK_ define PRK_ENSURE_LOCAL_CHUNK(chunk, sd) \
   (PRK_LOCAL_CHUNK_P(chunk) ? PRK_MASK_CHUNK(chunk) : prk_localize_slot_chunk((sd), define PRK_OBJECT_PARENTS(object, sat, hts) \
   (PRK_IS_INSTANCE(object) ? PRK_SAT_PARENTS(sat) : PRK_SAT_CLASS_PARENTS((sat), ht ifndef PRK_GC_LOADED define PRK_SHORT_ALLOC(word_count) \
   PRK_GC_MEMALIGN(SVF_ALIGNMENT, (size_t)(sizeof(PrkType) * (word_count)))

#define PRK_SHORT_FREE(word_count, object) (PRK_GC_FREE(object))

else define PRK_SHORT_ALLOC(word_count) \
   ((word_count) <= 4 ? (void *)PRK_GC_ALLOC_FIXED_SIZE_OBJECT( \
      RETURN_ASSERT(word_count, PRK_SHORT_ALLOC) + Byte4Tag - 1) : \
   (void *)PRK_GC_MEMALIGN(SVF_ALIGNMENT, (size_t)(sizeof(PrkType) * (word_count))))

#define PRK_SHORT_FREE(word_count, obj) \
   ((word_count) <= 4 ? PRK_GC_FREE_FIXED_SIZE_OBJECT((word_count) + Byte4Tag - 1, \
                                         (PrkType)(obj)) : \
   PRK_GC_FREE(obj))

endif /* PRK_GC_LOADED */ define prk_mark_object(object) \
   (PRK_IS_MARKED_OBJECT(object) = TRUE)

#define prk_unmark_object(object) \
   (PRK_IS_MARKED_OBJECT(object) = FALSE)
#include <prk/sbstrate.h>
#ifndef PRK_SABER
#include <prk/cmn_objm.ih>
endif /*
   file: objman.ih
*/ ifndef PRK_OBJMAN_H
define PRK_OBJMAN_H include <prokee/sbstrate.ih>
include <prokee/cmn_objm.ih> endif /* PRK_OBJMAN_H */

/*
   file: pub_ommc.ih
*/

/* The roles are ordered as follows:
   1. facet and slot one word roles
   2. slot only one word roles
   3. multi word roles
```

```
*/ define PrkMVNoInheritance              0
define PrkSVNoInheritance              1
#define PrkMethodInheritance            2
#define PrkMVInitialInheritance         3
#define PrkSVInitialInheritance         4
#define PrkMVOverrideInheritance        5
#define PrkSVOverrideInheritance        6
#define PrkSelfLastUnionInheritance     7
#define PrkSelfFirstUnionInheritance    8
#define PrkDefaultCreationInheritance   9
define PrkMonitorInheritance           10 ifndef PRK_SABER
define PRK_FACET_MAX_ONE_WORD_ROLE PrkSVNoInheritance
#define PRK_SLOT_MAX_ONE_WORD_ROLE PrkSVOverrideInheritance
#define PRK_ROLE_COUNT (PrkDefaultCreationInheritance + 1)
#define PRK_FROLE_COUNT (PrkMonitorInheritance + 1)
#endif /* PRK_SABER */

/*
  case PrkMVNoInheritance:
  case PrkSVNoInheritance:
  case PrkMethodInheritance:
  case PrkMVInitialInheritance:
  case PrkSVInitialInheritance:
  case PrkMVOverrideInheritance:
  case PrkSVOverrideInheritance:
  case PrkSelfLastUnionInheritance:
  case PrkSelfFirstUnionInheritance:

case PrkDefaultSlotType:
  case PrkLockedSlotType:
  case PrkSubclassSlotType:
  case PrkOwnSlotType:
  case PrkSparseSlotType:
*/ define PrkDefaultSlotType      0
define PrkLockedSlotType       1
#define PrkSubclassSlotType     2
#define PrkOwnSlotType          3
#define PrkSparseSlotType       4

/* slot descriptor flags--all flags have a default value of 0 */
#define PrkNoWhenNeededMonitorsFlag         (1 << 3)
#define PrkNoWhenChangedMonitorsFlag        (1 << 4)
#define PrkNoDynamicFacetsFlag              (1 << 5)

#ifndef PRK_SABER
#define PRK_SD_WHEN_NEEDED_LOCAL_P          (1 << 6)
#define PRK_SD_WHEN_CHANGED_LOCAL_P         (1 << 7)
#define PRK_SD_DFACETS_LOCAL_P              (1 << 8)
#define PRK_SD_SPARSE_LOCAL_P               (1 << 9)
#define PRK_SD_ROLE_LOCAL_P                 (1 << 10)
#define PRK_SD_HAS_PARENT_P                 (1 << 11)
#define PRK_SD_PARENT_SAME_LOC_P            (1 << 12)
#define PRK_SD_SLOT_TYPE_MASK               7
#define PRK_SD_SLOT_TYPE_COUNT              (PrkSparseSlotType + 1)
#define PRK_SD_DEFAULT_FLAGS 0
#endif /* PRK_SABER */

/* orphan modes for PrkSetObjectParents */ define PrkDeleteOrphans                0
define PrkKeepOrphansWithLocalValues   1
define PrkKeepAllOrphans               2 define PrkMonitorMaxPriority 127
define PrkMonitorMinPriority 0 define PrkMonitorMaxLevel 255
define PrkMonitorMinLevel 1
```

```
/* flags remember a persistent flag which if false, won't save
   with a svobj */ ifndef PRK_SABER
define PRK_MON_PRIORITY_MASK 127
#define PRK_MON_LEVEL_MASK 255
endif /* PRK_SABER */ define PRK_MON_PRIORITY_SHIFT PRK_IMMEDIATE_FIXNUM_TAG_BITS
/* This flag is included with Priority to facilitate sorting.
   It also needs to be a sign bit for the algorithm to work. */
#define PrkBeforeChangedMonitorFlag   (1 << (PRK_MON_PRIORITY_SHIFT + 7))
#define PRK_MON_LEVEL_SHIFT (PRK_MON_PRIORITY_SHIFT + 8)
#define PRK_MON_FLAGS_SHIFT (PRK_MON_LEVEL_SHIFT + 8)

#define PrkMonitorFireOnLoadFlag       ((PrkMonitorFlags) (1 << PRK_MON_FLAGS_SHIFT)
#define PrkMonitorFireOnCreateFlag     ((PrkMonitorFlags) (2 << PRK_MON_FLAGS_SHIFT))
#define PrkMonitorFireOnAttachFlag     ((PrkMonitorFlags) (4 << PRK_MON_FLAGS_SHIFT))
#define PrkMonitorFireIfSameValueFlag          ((PrkMonitorFlags) (8 << PRK_MON_FLAG
#define PrkWhenNeededMonitorFlag           ((PrkMonitorFlags) (32 << PRK_MON_FLAGS_SF
#define PrkMonitorNotSavedFlag         ((PrkMonitorFlags) (64 << PRK_MON_FLAGS_SHIFT))
#define PrkMonitorEnableOnClassFlag ((PrkMonitorFlags) (128 << PRK_MON_FLAGS_SHIFT)

#ifndef PRK_SABER

/* these are internal flags */
#define PRK_MON_ATTACH_METHOD_FLAG            ((PrkMonitorFlags) (256 << PRK_MON
#define PRK_MON_DETACH_METHOD_FLAG            ((PrkMonitorFlags) (512 << PRK_MON
#endif /* PRK_SABER */

/* flags to control firing of AVs when loading a module/app */ define PrkDisableAllMonitorsOnLoad      0x01
define PrkDisableChangedMonitorsOnLoad 0x02 define PrkMakeMethod(method_fn) \
   (prk_make_method((PrkMethodFn)method_fn, #method_fn))

#define __PrkMakeProtalkMethod(name) \
   (prk_make_method(Prk_##name##_method_any, "Prk_" #name "_method_any"))

/*
  file: pub_sbmc.ih
*/ define TRUE 1
define FALSE 0

/* immediate tags */
/* If these tags change, make sure the change is reflected in the
   string table in object.c and in the print dispatcher table */ define PrkEvenFixnumTag       0
define PrkListTag             1
#define PrkObjectTag           2
                              /* The object has a secondary tag */
#define PrkNonImmediateTag     3
#define PrkOddFixnumTag        4
#define PrkSymbolTag           5
#define PrkCharTag             6
define PrkErrorTag            7 define PRK_MAX_IMMEDIATE_TAG  7 define PrkSingleFloatTag      8
define PrkDoubleFloatTag      9
#define PrkArrayTag            10
#define PrkStringTag           11
#define PrkRawSlotDataTag      12
#define PrkRawFacetDataTag     13
#define PrkCValueTag           14
```

```c
#define PrkMethodTag           15
#define PrkSlotReferenceTag    16
define PrkSdTag               17 ifndef PRK_SABER
define PrkDFacetTag           18
#define PrkISatTag             19
define PrkCSatTag             20 define PRKS_SYSTEM_TAG_COUNT (PrkCSatTag+1)
endif /* PRK_SABER */

/* Needed for Monitor Flags */
#define PRK_IMMEDIATE_FIXNUM_TAG_BITS 2
/* Needed for PrkIsFixnum */
#define PRK_IMMEDIATE_FIXNUM_TAG_MASK 3
/* Needed for _prk_make_error */
define PRK_IMMEDIATE_TAG_BITS 3 define PRKS_NON_IMMEDIATE_PRIMARY_TYPE(type) \
    ((type) == PrkNonImmediateTag)

#define PrkGetType(o) \
    ((unsigned int)(PrkIsNonImmediate(o) ? PRK_OBJECT_SECONDARY_TAG(o) : PRK_OBJECT_I /* User Predicate: */
define PrkIsType(t, type) \
    ((PrkBool)((type) <= PRK_MAX_IMMEDIATE_TAG ? \
               PRK_OBJECT_IMMEDIATE_TAG(t) == (type) : \
               PrkIsNonImmediate(t) && PRK_OBJECT_SECONDARY_TAG(t) == (type)))

#define PrkIsFixnum(o) \
    (!((unsigned long)(void *)(PrkType)(o) & PRK_IMMEDIATE_FIXNUM_TAG_MASK))

#define PrkIsList(o) \
    (PRK_OBJECT_IMMEDIATE_TAG(o) == PrkListTag)

#define PrkIsObject(t) \
    (PRK_OBJECT_IMMEDIATE_TAG(t) == PrkObjectTag)

#define PrkIsNonImmediate(o) \
    (PRKS_NON_IMMEDIATE_PRIMARY_TYPE(PRK_OBJECT_IMMEDIATE_TAG(o)))

#define PrkIsSymbol(t) \
    (PRK_OBJECT_IMMEDIATE_TAG(t) == PrkSymbolTag)

#define PrkIsChar(o) \
    (PRK_OBJECT_IMMEDIATE_TAG(o) == PrkCharTag)

#define PrkIsError(o) \
    (PRK_OBJECT_IMMEDIATE_TAG(o) == PrkErrorTag)

#define PrkIsSingleFloat(t) \
    (PrkIsType((t), PrkSingleFloatTag))

#define PrkIsDoubleFloat(t) \
    (PrkIsType((t), PrkDoubleFloatTag))

#define PrkIsFloat(t) \
    (PrkIsNonImmediate(t) && PRK_OBJECT_SECONDARY_TAG(t) <= PrkDoubleFloatTag)

#define PrkIsNumber(t) \
    (PrkIsFixnum(t) || PrkIsFloat(t))

#define PrkIsArray(t) \
    (PrkIsType((t), PrkArrayTag))

#define PrkIsCollection(o) (PrkIsList(o) || PrkIsArray(o))

#define PrkIsString(t) \
    (PrkIsType((t), PrkStringTag))
```

```
#define PrkIsRawSlotData(t) \
  (PrkIsType((t), PrkRawSlotDataTag))

#define PrkIsRawFacetData(t) \
  (PrkIsType((t), PrkRawFacetDataTag))

#define PrkIsCValue(t) \
  (PrkIsType((t), PrkCValueTag))

#define PrkIsMethod(t) \
  (PrkIsType((t), PrkMethodTag))

#define PrkIsSlotReference(t) \
  (PrkIsType((t), PrkSlotReferenceTag))

#define PrkIsSd(t) \
  (PrkIsType((t), PrkSdTag))

#define PrkNil ((PrkList)(void *)PrkListTag)
#define PrkNoError ((PrkError)0)

#define PrkIgnore(x) ((x) = (x))

#define _prk_make_error(error_number) \
    ((PrkError)(void *)(PrkErrorTag + (error_number << PRK_IMMEDIATE_TAG_BITS)))

#define PrkNull                        ((PrkType)_prk_make_error(0))
#define PrkRuleNullObject              ((PrkType)_prk_make_error(1))
#define PrkDeleteError                 (_prk_make_error(2))
#define PrkParseError                  (_prk_make_error(3))
#define PrkRenameError                 (_prk_make_error(4))
#define PrkEmptyArrayCell              ((PrkType)_prk_make_error(5))

#ifndef PRK_SABER
#define PRK_UNCHECKED_VALUE_CELL       ((PrkType)_prk_make_error(3))
#define PRK_OBJECT_BACKPTR_PROP        ((PrkType)_prk_make_error(8))
#endif /* PRK_SABER */
#ifndef PRK_SABER
#include <prk/sbstrate.ih>
else define ANSIARGS(args) args
define PrkMakeFixnum PRK_MAKE_FIXNUM
#define PRK_MAKE_FIXNUM(i) ((PrkFixnum)(long)(i))
#define PRK_UNBOX_FIXNUM(fixnum) ((long)(fixnum))
#define PrkIsCEnvironment prk_saber_p
#define PRK_STRING_CSTRING(s) ((char *)(PrkString)(s))
#define PRK_SYMBOL_CSTRING(s) ((char *)(PrkSymbol)(s))
#define PRK_BOX_CHAR(c) ((PrkChar)(char)(c))
#define PRK_FIX_CHAR(c) ((char)(PrkChar)(c))

#include <stdio.h>
#endif

/*
   file: sbstrate.ih
*/ ifndef PRK_SBSTRATE_H
define PRK_SBSTRATE_H include <prokee/cmn_sbst.ih> ifndef PRK_SABER
include <prokee/loop.ih> typedef struct PRK_SINGLE_FLOAT_STRUCT *PrkSingleFloat;
typedef struct PRK_DOUBLE_FLOAT_STRUCT *PrkDoubleFloat;
typedef struct PRK_RAW_SLOT_DATA_STRUCT *PrkRawSlotData;
typedef struct PRK_RAW_FACET_DATA_STRUCT *PrkRawFacetData;
typedef struct PRK_OBJECT_STRUCT *PrkObject;
```

```
typedef struct PRK_SD_STRUCT *PrkSd;
typedef struct PRK_METHOD_SPEC_STRUCT *PrkMethod;
typedef struct PRK_SLOT_REFERENCE_STRUCT *PrkSlotReference;

include <prokee/sbstr_ex.ih> endif /* PRK_SABER */ endif /* PRK_SBSTRATE_H */

/*
  file: slot_mod.ih
*/ do {
  PrkSd sd;
  PrkType **value_array, method_value, *old_chunk = (PrkType *)0, *sub_chunk;
  PrkSat sat;
  PrkType old_dmy;
  PrkInheritance role_specifier;
  unsigned hts;
  prk_get_inherited_u_values_type get_fn;
  PrkBool instance_p,multi_p,values_p;
  PrkType added_values,added_bkup,removed_values;
  PrkType removed_bkup,new_monitor_value,old_monitor_value;

USER_ASSERT_FULL_OBJECT(object, generic_slot_mod_method);
  USER_ASSERT_TYPE(slot_name, PrkSymbolTag, generic_slot_mod_method);
  ASSERT((method_id >= PRK_SMT_SET_VALUE && method_id <= PRK_SMT_REMOVE_VALUES),
         generic_slot_mod_method);

PRK_IS_VALUE_MODIFIED_OBJECT(object) = TRUE;

INIT_FULL_SAD_ACCESS(object, sd, sat, slot_name,
                      PrkSignalExceptionLoop(PrkExcNonExistentSlot,
                                             object, slot_name),
                      value_array, -1);
  instance_p = PRK_IS_INSTANCE(object);
  hts = PRK_SAT_HASH_TABLE_SIZE(sat);
  role_specifier = PRK_SD_ROLE_SPECIFIER(sd);
  old_value = (PrkType)*value_array;
  if (PRK_IS_USER_DEFINED_INHERITANCE(role_specifier)) {
    value = (PRK_SMT_METHOD(role_specifier, method_id))
       (value_array, object, sd, monitor_filter, value);
    goto signal_event;
  }

/* this is temporary ("make it work, then make it fast") */
  /* *** Note that Before AVs are always fired regardless of
     the state of the PrkMonitorFireIfSameValueFlag */ if (PRK_AVPUT_P(sd, value_array) && monitor_filter) {
    old_monitor_value = old_value;
    multi_p = !PRK_IS_SV_INHERITANCE(role_specifier);
    switch (method_id) {
    case PRK_SMT_SET_VALUE:
    case PRK_SMT_ADD_VALUE_FRONT:
    case PRK_SMT_ADD_VALUE_REAR:
    case PRK_SMT_REMOVE_VALUE:
      new_monitor_value = (multi_p && (value != PrkNull)) ?
        (PrkType)prk_ncons(value) : value;
      values_p = FALSE;
      break;
    case PRK_SMT_SET_VALUES:
    case PRK_SMT_ADD_VALUES_FRONT:
    case PRK_SMT_ADD_VALUES_REAR:
    case PRK_SMT_REMOVE_VALUES:
      new_monitor_value = value;
      values_p = TRUE;
    default:
      break;
    }
```

```
        switch (method_id) {
        case PRK_SMT_SET_VALUE:
        case PRK_SMT_SET_VALUES:
          added_values = new_monitor_value;
          switch (role_specifier) {
          case PrkSVNoInheritance:
          case PrkMVNoInheritance:
            removed_values = old_monitor_value;
            break;
          case PrkSVInitialInheritance:
          case PrkSVOverrideInheritance:
            if (PRK_LOCAL_VALUE_P(value_array))
              removed_values = old_monitor_value;
            else
              removed_values = PrkNull;
            break;
          case PrkMVInitialInheritance:
          case PrkMVOverrideInheritance:
            if (PRK_LOCAL_VALUE_P(value_array))
              removed_values = old_monitor_value;
            else
              removed_values = (PrkType)PrkNil;
            break;
          case PrkSelfLastUnionInheritance:
          case PrkSelfFirstUnionInheritance:
            if (PRK_LOCAL_CHUNK_P(value_array[1])) {
              sub_chunk = PRK_MASK_CHUNK(value_array[1]);
              removed_values = PRK_LOCAL_VALUE(sub_chunk,sd);
            }
            else
              removed_values = (PrkType)PrkNil;
            break;
          default:
            break;
          }
          removed_bkup = removed_values;
          prk_execute_bc_monitor(value_array,object,sd,monitor_filter,&added_values,
                          &removed_values,monitor_flags);
          if (removed_values != removed_bkup) {
            prk_slot_mod_meth(object,slot_name,removed_values,0,
                     multi_p ? PRK_SMT_REMOVE_VALUES : PRK_SMT_REMOVE_VALUE,
                     monitor_flags, &old_dmy);
            value = prk_slot_mod_meth(object,slot_name,added_values,0,
                     multi_p ? PRK_SMT_ADD_VALUES_REAR : PRK_SMT_ADD_VALUE_REAR,
                     monitor_flags, &old_dmy);
DoPostAV:
            prk_execute_ac_monitor(value_array, object, sd, monitor_filter, value,
                          old_monitor_value,monitor_flags);
            goto Exit;
          }
          if (!values_p && multi_p && PrkIsList((PrkList)added_values)) {
            if (added_values == (PrkType)PrkNil) {
              value = prk_slot_mod_meth(object,slot_name,removed_values,0,
                       PRK_SMT_REMOVE_VALUES,monitor_flags, &old_dmy);
              goto DoPostAV;
            }
            else if (PRK_REST((PrkList)added_values) == PrkNil)
              value = PRK_FIRST((PrkList)added_values);
            else {
              method_id = PRK_SMT_SET_VALUES;
              value = added_values;
            }
          }
          else if ((value != added_values) && (added_values == PrkNull)) {
            value = prk_slot_mod_meth(object,slot_name,removed_values,0,
                     multi_p ? PRK_SMT_REMOVE_VALUES : PRK_SMT_REMOVE_VALUE,
                     monitor_flags, &old_dmy);
            goto DoPostAV;
          }
          else
            value = added_values;
          break;
        case PRK_SMT_ADD_VALUE_FRONT:
```

```
case PRK_SMT_ADD_VALUES_FRONT:
case PRK_SMT_ADD_VALUE_REAR:
case PRK_SMT_ADD_VALUES_REAR:
  added_values = new_monitor_value;
  removed_values = removed_bkup =
    multi_p ? (PrkType)PrkNil : PrkNull;
  prk_execute_bc_monitor(value_array,object,sd,monitor_filter,&added_values,
                &removed_values,monitor_flags);
  if (removed_values != removed_bkup)
    old_value = prk_slot_mod_meth(object,slot_name,removed_values,0,
            multi_p ? PRK_SMT_REMOVE_VALUES : PRK_SMT_REMOVE_VALUE,
            monitor_flags, &old_dmy);
  if (!values_p && multi_p && PrkIsList((PrkList)added_values)) {
    if (added_values == (PrkType)PrkNil)
      value = PrkNull;
    else if (PRK_REST((PrkList)added_values) == PrkNil)
      value = PRK_FIRST((PrkList)added_values);
    else {
      method_id = (method_id == PRK_SMT_ADD_VALUE_FRONT) ?
        PRK_SMT_ADD_VALUES_FRONT : PRK_SMT_ADD_VALUES_REAR;
      value = added_values;
    }
  }
  else
    value = added_values;
  break;
case PRK_SMT_REMOVE_VALUE:
case PRK_SMT_REMOVE_VALUES:
  removed_values = new_monitor_value;
  added_values = added_bkup =
    multi_p ? (PrkType)PrkNil : PrkNull;
  prk_execute_bc_monitor(value_array,object,sd,monitor_filter,&added_values,
                &removed_values,monitor_flags);
  if (added_values != added_bkup) {
    old_value = prk_slot_mod_meth(object,slot_name,removed_values,0,
            multi_p ? PRK_SMT_REMOVE_VALUES : PRK_SMT_REMOVE_VALUE,
            monitor_flags, &old_dmy);
    value = prk_slot_mod_meth(object,slot_name,added_values,0,
            multi_p ? PRK_SMT_ADD_VALUES_REAR : PRK_SMT_ADD_VALUE_REAR,
            monitor_flags, &old_dmy);
    goto DoPostAV;
  }
  if (!values_p && multi_p && PrkIsList((PrkList)removed_values)) {
    if (removed_values == (PrkType)PrkNil)
      value = PrkNull;
    else if (PRK_REST((PrkList)removed_values) == PrkNil)
      value = PRK_FIRST((PrkList)removed_values);
    else {
      method_id = PRK_SMT_REMOVE_VALUES;
      value = removed_values;
    }
  }
  else
    value = removed_values;
  break;
default:
  break;
  }
}
  if (value == PrkNull) /* PrkNull code treated specially */
    switch (method_id) {
    case PRK_SMT_SET_VALUE:
    case PRK_SMT_SET_VALUES:
      switch ((PrkFacetInheritance)role_specifier) {
      default:
        ASSERT_NEVER_REACHED(generic_slot_mod_method);
        break;

case PrkSelfLastUnionInheritance:
        if (PRK_LOCAL_CHUNK_P(value_array[1])) {
          PRK_LOCAL_VALUE(PRK_MASK_CHUNK(value_array[1]), sd) = PrkNull;
```

```
        value = get_inherited_union_values(slot_name, PrkNull,
                                  PRK_OBJECT_PARENTS(object, sat, hts),
                                  instance_p);
      goto instance_check;
    }
    else
      goto old_value_default;

case PrkSelfFirstUnionInheritance:
  if (PRK_LOCAL_CHUNK_P(value_array[1])) {
    PRK_LOCAL_VALUE(PRK_MASK_CHUNK(value_array[1]), sd) = PrkNull;
    value = get_inherited_runion_values(slot_name, PrkNull,
                                  PRK_OBJECT_PARENTS(object, sat, hts),
                                  instance_p);
    goto instance_check;
  }
  else
    goto old_value_default;

case PrkMVNoInheritance:
case PrkSVNoInheritance:
  goto monitor_check;

case PrkMethodInheritance:
  sub_chunk = PRK_MASK_CHUNK(value_array[1]);
common_null_method_override:
  if (PRK_LOCAL_VALUE_P(value_array)) {
    PRK_UNSET_LOCAL_VALUE_P(value_array);
    value = prk_get_inherited_method_value(slot_name,
                                  PRK_OBJECT_PARENTS(object, sat, hts),
                                  instance_p);
    PRK_METHOD_LOCAL_VALUE(PRK_MASK_CHUNK(value_array[1]), sd) = value;
    value = PRK_DEREFERENCE_METHOD_SPEC(value);
    goto instance_check;
  }
  else
    goto old_value_default;

case PrkMVInitialInheritance:
case PrkSVInitialInheritance:
case PrkMVOverrideInheritance:
case PrkSVOverrideInheritance:

common_null_override:
    if (PRK_LOCAL_VALUE_P(value_array)) {
      PRK_UNSET_LOCAL_VALUE_P(value_array);
      if (instance_p) {
        value = prk_get_inherited_override_values(slot_name, PRK_SAT_PARENTS(sa
                                        TRUE);
        goto monitor_check;
      }
      else {
        value = prk_get_inherited_override_values(slot_name,
                                        PRK_SAT_CLASS_PARENTS(sat, hts),
                                        FALSE);
        goto class_monitor_check;
      }
    }
    goto old_value_default;
  }
default:
  switch ((PrkFacetInheritance)role_specifier) {
  case PrkMVInitialInheritance:
  case PrkSVInitialInheritance:
    PRK_SET_LOCAL_VALUE_P(value_array);
    /* fall through to old_value_default */
  } old_value_default:
    value = old_value;
    goto instance_check;
}
```

```c
switch ((PrkFacetInheritance)role_specifier) {
default:
  ASSERT_NEVER_REACHED(generic_slot_mod_method);
  break;
case PrkMVOverrideInheritance:
  switch (method_id) {
  default:
    ASSERT_NEVER_REACHED(generic_slot_mod_method);
    break;

case PRK_SMT_SET_VALUE:
    value = (PrkType)prk_ncons(value);
    /* fall through to PRK_SMT_SET_VALUES case */ case PRK_SMT_SET_VALUES:
    USER_ASSERT_TYPE(value, PrkListTag, generic_slot_mod_method);
    PRK_SET_LOCAL_VALUE_P(value_array);
    goto instance_check;

case PRK_SMT_ADD_VALUE_FRONT:
  case PRK_SMT_ADD_VALUE_REAR:
    if (PRK_LOCAL_VALUE_P(value_array)) {
      ASSERT((PrkType)old_value != PrkNull, generic_slot_mod_method);
      if (!Null(prk_member_eq((PrkList)old_value, value)))
        goto old_value_default;
      else if (method_id == PRK_SMT_ADD_VALUE_FRONT)
        value = (PrkType)PrkMakeCons(value, old_value);
      else
        value = (PrkType)prk_append_to_list((PrkList)old_value, value);
    }
    else {
      PRK_SET_LOCAL_VALUE_P(value_array);
      value = (PrkType)prk_ncons(value);
    }
    goto instance_check;

case PRK_SMT_ADD_VALUES_FRONT:
  case PRK_SMT_ADD_VALUES_REAR:
    USER_ASSERT_TYPE(value, PrkListTag, generic_slot_mod_method);
    if (PRK_LOCAL_VALUE_P(value_array)) {
      ASSERT(old_value != PrkNull, generic_slot_mod_method);
      value = (PrkType)prk_union_values((PrkList)old_value,
                                       (PrkList)value,
                                       method_id == PRK_SMT_ADD_VALUES_REAR);
    }
    else {
      PRK_SET_LOCAL_VALUE_P(value_array);
      value = (PrkType)prk_delete_duplicates((PrkList)value);
    }
    goto instance_check;

case PRK_SMT_REMOVE_VALUE:
    if (!PRK_LOCAL_VALUE_P(value_array))
      goto old_value_default;
    ASSERT(old_value != PrkNull, generic_slot_mod_method);
    value = (PrkType)prk_difference_value((PrkList)old_value, value);
    goto instance_check;

case PRK_SMT_REMOVE_VALUES:
    USER_ASSERT_TYPE(value, PrkListTag, generic_slot_mod_method);
    if (!PRK_LOCAL_VALUE_P(value_array))
      goto old_value_default;
    ASSERT(old_value != PrkNull, generic_slot_mod_method);
    value = (PrkType)prk_difference_values((PrkList)old_value, (PrkList)value);
    goto instance_check;
  } case PrkSVOverrideInheritance:
  switch (method_id) {
  default:
    ASSERT_NEVER_REACHED(generic_slot_mod_method);
    break;
```

```
case PRK_SMT_SET_VALUES:
  USER_ASSERT_TYPE(value, PrkListTag, generic_slot_mod_method);
  if (Null((PrkList)value))
    goto common_null_override;
  if (!Null(PRK_REST(value)))
    PrkSignalExceptionLoop(PrkExcValueOverflow, object, slot_name);
  else
    value = PRK_FIRST(value);
  if (value == PrkNull)
    goto common_null_override;
  /* fall through to PRK_SMT_SET_VALUE case */ case PRK_SMT_SET_VALUE:
  PRK_SET_LOCAL_VALUE_P(value_array);
  goto instance_check;

case PRK_SMT_ADD_VALUES_FRONT:
case PRK_SMT_ADD_VALUES_REAR:
  USER_ASSERT_TYPE(value, PrkListTag, generic_slot_mod_method);
  if (Null((PrkList)value))
    goto old_value_default;
  if (!Null(PRK_REST((PrkList)value)))
    PrkSignalExceptionLoop(PrkExcValueOverflow, object, slot_name);
  value = PRK_FIRST(value);
  if (value == PrkNull)
    PrkSignalExceptionLoop(PrkExcNullAsSlotValue, object, slot_name);
  /* fall through to PRK_SMT_ADD_VALUE_FRONT case */ case PRK_SMT_ADD_VALUE_FRONT:
case PRK_SMT_ADD_VALUE_REAR:
  if (PRK_LOCAL_VALUE_P(value_array)) {
    ASSERT(old_value != PrkNull, generic_slot_mod_method);
    if (!EQUAL_OBJS(value,old_value))
      PrkSignalExceptionLoop(PrkExcValueOverflow, object, slot_name);
  }
  else
    PRK_SET_LOCAL_VALUE_P(value_array);
  goto instance_check;

case PRK_SMT_REMOVE_VALUE:
  if (!PRK_LOCAL_VALUE_P(value_array) || !EQUAL_OBJS(value,old_value))
    goto old_value_default;
  ASSERT(old_value != PrkNull, generic_slot_mod_method);
  goto common_null_override;

case PRK_SMT_REMOVE_VALUES:
  USER_ASSERT_TYPE(value, PrkListTag, generic_slot_mod_method);
  if ((!(PRK_LOCAL_VALUE_P(value_array)) ||

(Null(prk_member_eq((PrkList)value, old_value)))))
    goto old_value_default;
  ASSERT(old_value != PrkNull, generic_slot_mod_method);
  goto common_null_override;
} case PrkMVInitialInheritance:
  switch (method_id) {
  default:
    ASSERT_NEVER_REACHED(generic_slot_mod_method);
    break;

case PRK_SMT_SET_VALUE:
    value = (PrkType)prk_ncons(value);
    goto SingleValueOnceOnlyCommonCode;

case PRK_SMT_SET_VALUES:
    USER_ASSERT_TYPE(value, PrkListTag, generic_slot_mod_method);
    goto SingleValueOnceOnlyCommonCode;

case PRK_SMT_ADD_VALUE_FRONT:
  case PRK_SMT_ADD_VALUE_REAR:
    if (old_value != PrkNull)
      if (!Null(prk_member_eq((PrkList)old_value, value)))
        goto SingleValueOnceOnlySameCode;
```

```
      else if (method_id == PRK_SMT_ADD_VALUE_FRONT)
        value = (PrkType)PrkMakeCons(value, old_value);
      else
        value = (PrkType)prk_append_to_list((PrkList)old_value, value);
    else
      value = (PrkType)prk_ncons(value);
    goto SingleValueOnceOnlyCommonCode;

case PRK_SMT_ADD_VALUES_FRONT:
  case PRK_SMT_ADD_VALUES_REAR:
    USER_ASSERT_TYPE(value, PrkListTag, generic_slot_mod_method);
    if (old_value != PrkNull)
      value = (PrkType)prk_union_values((PrkList)old_value, (PrkList)value,
                                 method_id == PRK_SMT_ADD_VALUES_REAR);
    else
      value = (PrkType)prk_delete_duplicates((PrkList)value);
    goto SingleValueOnceOnlyCommonCode;

case PRK_SMT_REMOVE_VALUE:
    if (old_value == PrkNull)
      goto SingleValueOnceOnlySameCode;
    value = (PrkType)prk_difference_value((PrkList)old_value, value);
    goto SingleValueOnceOnlyCommonCode;

case PRK_SMT_REMOVE_VALUES:
    USER_ASSERT_TYPE(value, PrkListTag, generic_slot_mod_method);
    if (old_value == PrkNull)
      goto SingleValueOnceOnlySameCode;
    value = (PrkType)prk_difference_values((PrkList)old_value, (PrkList)value);
    goto SingleValueOnceOnlyCommonCode;
  } case PrkMVNoInheritance:
  switch (method_id) {
  default:
    ASSERT_NEVER_REACHED(generic_slot_mod_method);
    break;

case PRK_SMT_SET_VALUE:
    value = (PrkType)prk_ncons(value);
    goto monitor_check;

case PRK_SMT_SET_VALUES:
    USER_ASSERT_TYPE(value, PrkListTag, generic_slot_mod_method);
    goto monitor_check;

case PRK_SMT_ADD_VALUE_FRONT:
  case PRK_SMT_ADD_VALUE_REAR:
    if (old_value != PrkNull)
      if (!Null(prk_member_eq((PrkList)old_value, value)))
        goto old_value_default;
      else if (method_id == PRK_SMT_ADD_VALUE_FRONT)
        value = (PrkType)PrkMakeCons(value, old_value);
      else
        value = (PrkType)prk_append_to_list((PrkList)old_value, value);
    else
      value = (PrkType)prk_ncons(value);
    goto monitor_check;

case PRK_SMT_ADD_VALUES_FRONT:
  case PRK_SMT_ADD_VALUES_REAR:
    USER_ASSERT_TYPE(value, PrkListTag, generic_slot_mod_method);
    if (old_value != PrkNull)
      value = (PrkType)prk_union_values((PrkList)old_value, (PrkList)value,
                                 method_id == PRK_SMT_ADD_VALUES_REAR);
    else
      value = (PrkType)prk_delete_duplicates((PrkList)value);
    goto monitor_check;

case PRK_SMT_REMOVE_VALUE:
    if (old_value == PrkNull)
      goto old_value_default;
    value = (PrkType)prk_difference_value((PrkList)old_value, value);
    goto monitor_check;
```

```
        case PRK_SMT_REMOVE_VALUES:
          USER_ASSERT_TYPE(value, PrkListTag, generic_slot_mod_method);
          if (old_value == PrkNull)
            goto old_value_default;
          value = (PrkType)prk_difference_values((PrkList)old_value, (PrkList)value);
          goto monitor_check;
      }
case PrkSVInitialInheritance:
  switch (method_id) {
  default:
    ASSERT_NEVER_REACHED(generic_slot_mod_method);
    break;

case PRK_SMT_SET_VALUES:
    USER_ASSERT_TYPE(value, PrkListTag, generic_slot_mod_method);
    if (Null((PrkList)value)) {
      value = PrkNull;
      goto SingleValueOnceOnlyCommonCode;
    }
    if (!Null(PRK_REST(value)))
      PrkSignalExceptionLoop(PrkExcValueOverflow, object, slot_name);
    value = PRK_FIRST(value);
    if (value == PrkNull)
      PrkSignalExceptionLoop(PrkExcNullAsSlotValue, object, slot_name);

case PRK_SMT_SET_VALUE:
  SingleValueOnceOnlyCommonCode:
    PRK_SET_LOCAL_VALUE_P(value_array);
    goto instance_check;

SingleValueOnceOnlySameCode:
    PRK_SET_LOCAL_VALUE_P(value_array);
    goto old_value_default;

case PRK_SMT_ADD_VALUES_FRONT:
  case PRK_SMT_ADD_VALUES_REAR:
    USER_ASSERT_TYPE(value, PrkListTag, generic_slot_mod_method);
    if (Null((PrkList)value))
      goto SingleValueOnceOnlySameCode;
    if (!Null(PRK_REST((PrkList)value)))
      PrkSignalExceptionLoop(PrkExcValueOverflow, object, slot_name);
    value = PRK_FIRST(value);
    if (value == PrkNull)
      PrkSignalExceptionLoop(PrkExcNullAsSlotValue, object, slot_name);
    /* fall through to PRK_SMT_ADD_VALUE_FRONT case */ case PRK_SMT_ADD_VALUE_FRONT:
  case PRK_SMT_ADD_VALUE_REAR:
    if (old_value != PrkNull && !EQUAL_OBJS(old_value,value))
      PrkSignalExceptionLoop(PrkExcValueOverflow, object, slot_name);
    goto SingleValueOnceOnlyCommonCode;

case PRK_SMT_REMOVE_VALUE:
    if (!EQUAL_OBJS(value,old_value))
      goto SingleValueOnceOnlySameCode;
    value = PrkNull;
    goto SingleValueOnceOnlyCommonCode;

case PRK_SMT_REMOVE_VALUES:
    USER_ASSERT_TYPE(value, PrkListTag, generic_slot_mod_method);
    if (old_value == PrkNull ||
        Null(prk_member_eq((PrkList)value, old_value)))
      goto SingleValueOnceOnlySameCode;
    value = PrkNull;
    goto SingleValueOnceOnlyCommonCode;
  }
case PrkSVNoInheritance:
  switch (method_id) {
  default:
    ASSERT_NEVER_REACHED(generic_slot_mod_method);
    break;
```

```
    case PRK_SMT_SET_VALUES:
      USER_ASSERT_TYPE(value, PrkListTag, generic_slot_mod_method);
      if (Null((PrkList)value)) {
        value = PrkNull;
        goto monitor_check;
      }
      if (!Null(PRK_REST(value)))
        PrkSignalExceptionLoop(PrkExcValueOverflow, object, slot_name);
      value = PRK_FIRST(value);
      if (value == PrkNull)
        PrkSignalExceptionLoop(PrkExcNullAsSlotValue, object, slot_name);

case PRK_SMT_SET_VALUE:
      goto monitor_check;

case PRK_SMT_ADD_VALUES_FRONT:
    case PRK_SMT_ADD_VALUES_REAR:
      USER_ASSERT_TYPE(value, PrkListTag, generic_slot_mod_method);
      if (Null((PrkList)value))
        goto old_value_default;
      if (!Null(PRK_REST((PrkList)value)))
        PrkSignalExceptionLoop(PrkExcValueOverflow, object, slot_name);
      value = PRK_FIRST(value);
      if (value == PrkNull)
        PrkSignalExceptionLoop(PrkExcNullAsSlotValue, object, slot_name);
      /* fall through to PRK_SMT_ADD_VALUE_FRONT case */ case PRK_SMT_ADD_VALUE_FRONT:
    case PRK_SMT_ADD_VALUE_REAR:
      if (old_value != PrkNull && !EQUAL_OBJS(old_value,value))
        PrkSignalExceptionLoop(PrkExcValueOverflow, object, slot_name);
      goto monitor_check;

case PRK_SMT_REMOVE_VALUE:
      if (!EQUAL_OBJS(value,old_value))
        goto old_value_default;
      value = PrkNull;
      goto monitor_check;

case PRK_SMT_REMOVE_VALUES:
      USER_ASSERT_TYPE(value, PrkListTag, generic_slot_mod_method);
      if (old_value == PrkNull ||
          Null(prk_member_eq((PrkList)value, old_value)))
        goto old_value_default;
      value = PrkNull;
      goto monitor_check;
    } case PrkSelfLastUnionInheritance:
  switch (method_id) {
  default:
    ASSERT_NEVER_REACHED(generic_slot_mod_method);
    break;

case PRK_SMT_SET_VALUE:
  union_put_value:
    value = (PrkType)prk_ncons(value);
    /* fall through to PRK_SMT_SET_VALUES case */ case PRK_SMT_SET_VALUES:
  union_put_values:
    {
      PrkType local_value;
      USER_ASSERT_TYPE(value, PrkListTag, generic_slot_mod_method);
      if (PRK_LOCAL_CHUNK_P(value_array[1])) {
        sub_chunk = PRK_MASK_CHUNK(value_array[1]);
        if ((local_value = PRK_LOCAL_VALUE(sub_chunk, sd)) != PrkNull &&
            prk_list_equal((PrkList)local_value, (PrkList)value))
          goto old_value_default;
      }
      else {
        old_chunk = PRK_MASK_CHUNK(value_array[1]);
        sub_chunk = prk_localize_slot_chunk(sd, &value_array[1]);
      }
```

```
   store_local_union:
     PRK_LOCAL_VALUE(sub_chunk, sd) = value;
     value = get_inherited_union_values(slot_name, value,
                                        PRK_OBJECT_PARENTS(object, sat, hts),
                                        instance_p);
     goto instance_check;
   } case PRK_SMT_ADD_VALUE_FRONT:
case PRK_SMT_ADD_VALUE_REAR:
  if (PRK_LOCAL_CHUNK_P(value_array[1])) {
    PrkType local_value;
    sub_chunk = PRK_MASK_CHUNK(value_array[1]);
    local_value = PRK_LOCAL_VALUE(sub_chunk, sd);
    if (local_value == PrkNull) {
      value = (PrkType)prk_ncons(value);
      goto store_local_union;
    }
    if (!Null(prk_member_eq((PrkList)local_value, value)))
      goto old_value_default;
    else if (method_id == PRK_SMT_ADD_VALUE_FRONT)
      value = (PrkType)PrkMakeCons(value, local_value);
    else
      value = (PrkType)prk_append_to_list((PrkList)local_value, value);
    goto store_local_union;
  }
  else
    goto union_put_value;

case PRK_SMT_ADD_VALUES_FRONT:
case PRK_SMT_ADD_VALUES_REAR:
  USER_ASSERT_TYPE(value, PrkListTag, generic_slot_mod_method);
  if (PRK_LOCAL_CHUNK_P(value_array[1])) {
    PrkType local_value;
    sub_chunk = PRK_MASK_CHUNK(value_array[1]);
    local_value = PRK_LOCAL_VALUE(sub_chunk, sd);
    if (local_value == PrkNull) {
      value = (PrkType)prk_delete_duplicates((PrkList)value);
      goto store_local_union;
    }
    value = (PrkType)prk_union_values((PrkList)local_value, (PrkList)value,
                                      method_id == PRK_SMT_ADD_VALUES_REAR);
    if (value == local_value)
      goto old_value_default;
    goto store_local_union;
  }
  else {
    value = (PrkType)prk_delete_duplicates((PrkList)value);
    goto union_put_values;
  } case PRK_SMT_REMOVE_VALUE:
  if (PRK_LOCAL_CHUNK_P(value_array[1])) {
    PrkType local_value;
    sub_chunk = PRK_MASK_CHUNK(value_array[1]);
    local_value = PRK_LOCAL_VALUE(sub_chunk, sd);
    if (local_value == PrkNull)
      goto old_value_default;
    value = (PrkType)prk_difference_value((PrkList)local_value, value);
    if (value == local_value)
      goto old_value_default;
    goto store_local_union;
  }
  else
    goto old_value_default;

case PRK_SMT_REMOVE_VALUES:
  USER_ASSERT_TYPE(value, PrkListTag, generic_slot_mod_method);
  if (PRK_LOCAL_CHUNK_P(value_array[1])) {
    PrkType local_value;
    sub_chunk = PRK_MASK_CHUNK(value_array[1]);
    local_value = PRK_LOCAL_VALUE(sub_chunk, sd);
    if (local_value == PrkNull)
```

```
              goto old_value_default;
           value = (PrkType)prk_difference_values((PrkList)local_value, (PrkList)value
           if (value == local_value)
              goto old_value_default;
           goto store_local_union;
         }
       else
         goto old_value_default;
     } case PrkSelfFirstUnionInheritance:
    switch (method_id) {
    default:
       ASSERT_NEVER_REACHED(generic_slot_mod_method);
       break;

case PRK_SMT_SET_VALUE:
    runion_put_value:
       value = (PrkType)prk_ncons(value);
       /* fall through to PRK_SMT_SET_VALUES case */ case PRK_SMT_SET_VALUES:
    runion_put_values:
       {
         PrkType local_value;
         USER_ASSERT_TYPE(value, PrkListTag, generic_slot_mod_method);
         if (PRK_LOCAL_CHUNK_P(value_array[1])) {
           sub_chunk = PRK_MASK_CHUNK(value_array[1]);
           if ((local_value = PRK_LOCAL_VALUE(sub_chunk, sd)) != PrkNull &&
               prk_list_equal((PrkList)local_value, (PrkList)value))
             goto old_value_default;
         }
         else {
           old_chunk = PRK_MASK_CHUNK(value_array[1]);
           sub_chunk = prk_localize_slot_chunk(sd, &value_array[1]);
         }
       store_local_runion:
         PRK_LOCAL_VALUE(sub_chunk, sd) = value;
         value = get_inherited_runion_values(slot_name, value,
                                             PRK_OBJECT_PARENTS(object, sat, hts),
                                             instance_p);
         goto instance_check;
       } case PRK_SMT_ADD_VALUE_FRONT:
    case PRK_SMT_ADD_VALUE_REAR:
       if (PRK_LOCAL_CHUNK_P(value_array[1])) {
         PrkType local_value;
         sub_chunk = PRK_MASK_CHUNK(value_array[1]);
         local_value = PRK_LOCAL_VALUE(sub_chunk, sd);
         if (local_value == PrkNull) {
           value = (PrkType)prk_ncons(value);
           goto store_local_runion;
         }
         if (!Null(prk_member_eq((PrkList)local_value, value)))
           goto old_value_default;
         else if (method_id == PRK_SMT_ADD_VALUE_FRONT)
           value = (PrkType)PrkMakeCons(value, local_value);
         else
           value = (PrkType)prk_append_to_list((PrkList)local_value, value);
         goto store_local_runion;
       }
       else
         goto runion_put_value;

case PRK_SMT_ADD_VALUES_FRONT:
    case PRK_SMT_ADD_VALUES_REAR:
       USER_ASSERT_TYPE(value, PrkListTag, generic_slot_mod_method);
       if (PRK_LOCAL_CHUNK_P(value_array[1])) {
         PrkType local_value;
         sub_chunk = PRK_MASK_CHUNK(value_array[1]);
         local_value = PRK_LOCAL_VALUE(sub_chunk, sd);
```

```
      if (local_value == PrkNull) {
        value = (PrkType)prk_delete_duplicates((PrkList)value);
        goto store_local_runion;
      }
      value = (PrkType)prk_union_values((PrkList)local_value, (PrkList)value,
                              method_id == PRK_SMT_ADD_VALUES_REAR);
      if (value == local_value)
        goto old_value_default;
      goto store_local_runion;
    }
    else {
      value = (PrkType)prk_delete_duplicates((PrkList)value);
      goto runion_put_values;
    } case PRK_SMT_REMOVE_VALUE:
    if (PRK_LOCAL_CHUNK_P(value_array[1])) {
      PrkType local_value;
      sub_chunk = PRK_MASK_CHUNK(value_array[1]);
      local_value = PRK_LOCAL_VALUE(sub_chunk, sd);
      if (local_value == PrkNull)
        goto old_value_default;
      value = (PrkType)prk_difference_value((PrkList)local_value, value);
      if (value == local_value)
        goto old_value_default;
      goto store_local_runion;
    }
    else
      goto old_value_default;

case PRK_SMT_REMOVE_VALUES:
    USER_ASSERT_TYPE(value, PrkListTag, generic_slot_mod_method);
    if (PRK_LOCAL_CHUNK_P(value_array[1])) {
      PrkType local_value;
      sub_chunk = PRK_MASK_CHUNK(value_array[1]);
      local_value = PRK_LOCAL_VALUE(sub_chunk, sd);
      if (local_value == PrkNull)
        goto old_value_default;
      value = (PrkType)prk_difference_values((PrkList)local_value, (PrkList)value
      if (value == local_value)
        goto old_value_default;
      goto store_local_runion;
    }
    else
      goto old_value_default;
  } case PrkMethodInheritance:
  sub_chunk = PRK_MASK_CHUNK(value_array[1]);
  switch (method_id) {
  default:
    ASSERT_NEVER_REACHED(generic_slot_mod_method);
    break;

case PRK_SMT_SET_VALUES:
    USER_ASSERT_TYPE(value, PrkListTag, generic_slot_mod_method);
    if (Null((PrkList)value))
      goto common_null_method_override;
    if (!Null(PRK_REST(value)))
      PrkSignalExceptionLoop(PrkExcValueOverflow, object, slot_name);
    else
      value = PRK_FIRST(value);
    if (value == PrkNull)
      goto common_null_method_override;
    /* fall through to PRK_SMT_SET_VALUE case */ case PRK_SMT_SET_VALUE:
  cmethod_put_value:
    {
      USER_ASSERT_TYPE(value, PrkMethodTag, generic_slot_mod_method);
      if (PRK_LOCAL_CHUNK_P(value_array[1]))
        sub_chunk = PRK_MASK_CHUNK(value_array[1]);
      else {
```

```
              old_chunk = PRK_MASK_CHUNK(value_array[1]);
              sub_chunk = prk_localize_slot_chunk(sd, &value_array[1]);
          }
          PRK_SET_LOCAL_VALUE_P(value_array);
          PRK_METHOD_LOCAL_VALUE(sub_chunk, sd) = value;
          value = (value == (PrkType)PrkNullMethod ? (PrkType)0 :
              (PrkType)PRK_METHOD_SPEC_FN((PrkMethod)value));
          goto instance_check;
      } case PRK_SMT_ADD_VALUES_FRONT:
    case PRK_SMT_ADD_VALUES_REAR:
      USER_ASSERT_TYPE(value, PrkListTag, generic_slot_mod_method);
      if (Null((PrkList)value))
        goto old_value_default;
      if (!Null(PRK_REST((PrkList)value)))
        PrkSignalExceptionLoop(PrkExcValueOverflow, object, slot_name);
      value = PRK_FIRST(value);
      if (value == PrkNull)
        PrkSignalExceptionLoop(PrkExcNullAsSlotValue, object, slot_name);
      /* fall through to PRK_SMT_ADD_VALUE_FRONT case */ case PRK_SMT_ADD_VALUE_FRONT:
    case PRK_SMT_ADD_VALUE_REAR:
      if (PRK_LOCAL_VALUE_P(value_array)) {
        if (PRK_METHOD_LOCAL_VALUE(PRK_MASK_CHUNK(value_array[1]), sd) != value)
          PrkSignalExceptionLoop(PrkExcValueOverflow, object, slot_name);
      }
      else
        goto cmethod_put_value;
      goto instance_check;

case PRK_SMT_REMOVE_VALUE:
      if (!PRK_LOCAL_VALUE_P(value_array) ||
          PRK_METHOD_LOCAL_VALUE(PRK_MASK_CHUNK(value_array[1]), sd) != value)
        goto old_value_default;
      goto common_null_method_override;

case PRK_SMT_REMOVE_VALUES:
      USER_ASSERT_TYPE(value, PrkListTag, generic_slot_mod_method);
      if (!PRK_LOCAL_VALUE_P(value_array) ||
          Null(prk_member_eq((PrkList)value,
                    PRK_METHOD_LOCAL_VALUE(PRK_MASK_CHUNK(value_array[1]), sd))
        goto old_value_default;
      goto common_null_method_override;
    }
  }

/* generic_slot_mod_method wrap-up */ instance_check:
  if (instance_p)
    goto monitor_check;

class_monitor_check:
  (PrkType)*value_array = value;

if (PRK_AVPUT_P(sd, value_array) && monitor_filter)
    prk_execute_ac_monitor(value_array, object, sd, monitor_filter, value, old_moni
        monitor_flags);
  if (value == old_value)
    goto signal_event;

/* process children */
  switch ((PrkFacetInheritance)role_specifier) {
  default:
    ASSERT_NEVER_REACHED(generic_slot_mod_method);
    break;

case PrkMVNoInheritance:
  case PrkSVNoInheritance:
    goto signal_event;
```

```
case PrkMVInitialInheritance:
case PrkSVInitialInheritance:
case PrkMVOverrideInheritance:
case PrkSVOverrideInheritance:
  switch (PRK_SD_SLOT_TYPE(sd)) {
  case PrkOwnSlotType:
  case PrkSparseSlotType:
    goto signal_event;
  case PrkSubclassSlotType:
    prk_propagate_override_values(value, sd, PRK_SAT_SUBCLASSES(sat, hts),
                      object, FALSE, monitor_filter, monitor_flags);
    goto signal_event;
  }
  /* probably could optimize LOCKED case *** */
  prk_propagate_override_values(value, sd, PRK_SAT_SUBCLASSES(sat, hts), object,
                      monitor_filter, monitor_flags);
  prk_propagate_override_values(value, sd, PRK_SAT_INSTANCES(sat, hts), object, T
                      monitor_filter, monitor_flags);
  goto signal_event;

case PrkSelfFirstUnionInheritance:
  get_fn = get_inherited_runion_values;
  goto propagate_union;

case PrkSelfLastUnionInheritance:
  get_fn = get_inherited_union_values;

propagate_union:
  switch (PRK_SD_SLOT_TYPE(sd)) { case PrkOwnSlotType:
  case PrkSparseSlotType:
    goto signal_event;
  case PrkSubclassSlotType:
    prk_propagate_union_values(value, sd, PRK_SAT_SUBCLASSES(sat, hts),
                      object, FALSE, monitor_filter, old_chunk, sub_chunk,
                      get_fn, monitor_flags);
    goto signal_event;
  }
  /* probably could optimize LOCKED case *** */
  prk_propagate_union_values(value, sd, PRK_SAT_SUBCLASSES(sat, hts), object, FAI
                      monitor_filter, old_chunk, sub_chunk, get_fn, monitor_fl
  prk_propagate_union_values(value, sd, PRK_SAT_INSTANCES(sat, hts), object, TRUE
                      monitor_filter, old_chunk, sub_chunk, get_fn, monitor_fl
  goto signal_event;

case PrkMethodInheritance:
  method_value = PRK_METHOD_LOCAL_VALUE(PRK_MASK_CHUNK(value_array[1]), sd);
  switch (PRK_SD_SLOT_TYPE(sd)) {
  case PrkOwnSlotType:
  case PrkSparseSlotType:
    goto signal_event;
  case PrkSubclassSlotType:
    prk_propagate_method_values(method_value, sd, PRK_SAT_SUBCLASSES(sat, hts),
                      object, FALSE, old_chunk, sub_chunk);
    goto signal_event;
  }
  /* probably could optimize LOCKED case *** */
  prk_propagate_method_values(method_value, sd, PRK_SAT_SUBCLASSES(sat, hts),
                      object, FALSE, old_chunk, sub_chunk);
  prk_propagate_method_values(method_value, sd, PRK_SAT_INSTANCES(sat, hts),
                      object, TRUE, old_chunk, sub_chunk);
  goto signal_event;
} monitor_check:
  (PrkType)*value_array = value;

if (PRK_AVPUT_P(sd, value_array) && monitor_filter)
    prk_execute_ac_monitor(value_array, object, sd, monitor_filter, value, old_moni
      monitor_flags);
```

```
signal_event:

/* this is temporary ("make it work, then make it fast") */
  if ((PrkFacetInheritance)role_specifier == PrkMethodInheritance)
    value = PRK_METHOD_LOCAL_VALUE(sub_chunk, sd);

#ifdef OBJ_EVENTS
  if (PRK_IS_OBJECT_VALUE_INTEREST(object)) {
    PrkoSlotValueModEventStruct event_struct;
    event_struct.object = object;
    event_struct.slot_name = slot_name;
    event_struct.value = value;
    PrkSignal(PrkoSlotValueModEventID, &event_struct);
  } endif                          /* OBJ_EVENTS */ break;

} while (FALSE);

Exit:

/*
  file: t_generc.ih
*/ typedef enum {
  ISatTag0 = PRKS_SYSTEM_TAG_COUNT + 1,   /* value is 21.*/
  ISatTag1,
  ISatTag2,
  ISatTag3,
  ISatTag4,
  ISatTag5,
  ISatTag6,
  ISatTag7,
  CSatTag0,
  CSatTag1,
  CSatTag2,
  CSatTag3,
  CSatTag4,
  CSatTag5,
  CSatTag6,
  CSatTag7,
  Byte4Tag,
  Byte8Tag,
  Byte12Tag,
  Byte16Tag,
  GCSystemTagCount
  } prk_gc_extended_types;

#define SET_PRK_OBJECT_SECONDARY_TAG(o, type) \
  ((PRK_OBJECT_BASE((o), PrkNonImmediateTag, PrkType)->secondary_type_tag_)\
    = ((type) << 1))

#define PRK_REAL_OBJECT_ADDR(o) \
  ((PrkType) ((u_long) (o) & ~PRK_IMMEDIATE_TAG_MASK))

typedef unsigned short prk_value_array_index_t;

/*
  file: t_list.h
*/

/* System Structure: */
typedef struct PRK_LIST_STRUCT {
  PrkType list_first;
  struct PRK_LIST_STRUCT *list_rest;
  } *PrkList;
```

```c
/* Internal Accessors: */
#define PRK_FIRST(l) \
   ((PrkType)(PRK_OBJECT_BASE((l), PrkListTag, PrkList)->list_first))

#define PRK_REST(l) \
   ((PrkList)(PRK_OBJECT_BASE((l), PrkListTag, PrkList)->list_rest))

#define PRK_MAKE_CONS() \
   (PrkList)prk_make_untagged_object((size_t)sizeof(struct PRK_LIST_STRUCT), PrkList define COERCE_TO_LIST_OR_NULLOBJECT(o) \
   (((o) != PrkNull && !PrkIsList(o)) ? (PrkType)prk_ncons(o) : (o))

#define COERCE_TO_LIST(o) \
   (PrkIsList(o) ? (o) : (PrkType)prk_ncons(o))

/* User Stuff: */ define Null(l) \
   ((l) == PrkNil)

/*
   file: t_object.ih
*/ define SAD_OFFSET_BITS 10

/* System Structure: */
typedef struct {
   unsigned instance_p_       : 1;      /* T if object is an instance, else class */
   unsigned deleted_p_        : 1;      /* T if object is a deleted ptr, else live */
   unsigned locked_p_         : 1;      /* T if all slots in object are auto locked */
   unsigned loaded_p_         : 1;       /* T if object has been fully loaded into memory *
   unsigned exported_p_       : 1;          /* T if object is exported from its namespa
   unsigned same_module_parents_p_ : 1; /* T if object's parents are in same module
   unsigned value_modified_p_ : 1;  /* T if slot or facet value has changed */
   unsigned gc_mark_p_        : 1;         /* T if GC marked the object - this must be in bi
   unsigned structure_modified_p_ : 1; /* T if slots have been added or removed or
                                          parents changed */
   unsigned monitor_p_        : 1;         /* T if object is an Monitor object */
   unsigned object_mark_p_    : 1;  /* T if object is an unprocessed object in a markin
                                          algorithm */
   unsigned monitor_present_p_ : 1;       /* object has monitors(s) */
   unsigned module_p_         : 1;      /* T if object is a Module object */
   unsigned app_p_            : 1;      /* T if object is an App object */

/* if you add flags, put them here */
   unsigned dummy : 5;              /* dummy flags, split when adding new flags */
   unsigned system_object_p_  : 1; /* T if object is declared to be System Object */
#ifdef OBJ_EVENTS
   unsigned value_interest_   : 1; /* T if event mgr is interested in value changes */
   unsigned structure_interest_ : 1;     /* T if event mgr is interested in
                                          structure changes */
endif /* OBJ_EVENTS */ unsigned sparse_array_length_ : SAD_OFFSET_BITS;
} prk_object_flags_t;

typedef union {
   prk_object_flags_t of_s_;             /* object flags (struct) */
   u_long of_l_;                         /* object flags (u_long) */
} prk_object_flags_union_t;

typedef struct PRK_OBJECT_STRUCT {
   prk_object_flags_union_t object_flags_;       /* object flags (see below) */
   PrkSymbol object_name_;                        /* object name symbol */
   PrkList object_attributes_;            /* object attributes (user-defined) */
   struct PRK_MOD_STRUCT *object_module_;/* Module to which object belongs */
   PrkSat object_sat_;                    /* object SAT pointer */
   PrkType **object_value_array_;            /* object value array */
   PrkType **object_sparse_value_array_; /* object sparse value array */
} *PrkObject;
```

/* Internal Accessors: */

```
#define PRK_OBJECT_NAME(o) \
  (PRK_OBJECT_BASE((o), PrkObjectTag, PrkObject)->object_name_)

#define PRK_OBJECT_ATTRIBUTES(o) \
  (PRK_OBJECT_BASE((o), PrkObjectTag, PrkObject)->object_attributes_)

#define PRK_OBJECT_MODULE(o) \
  (PRK_OBJECT_BASE((o), PrkObjectTag, PrkObject)->object_module_)

#define PRK_OBJECT_SAT(o) \
  (PRK_OBJECT_BASE((o), PrkObjectTag, PrkObject)->object_sat_)

#define PRK_OBJECT_VALUE_ARRAY(o) \
  (PRK_OBJECT_BASE((o), PrkObjectTag, PrkObject)->object_value_array_)

#define PRK_OBJECT_SPARSE_VALUE_ARRAY(o) \
  (PRK_OBJECT_BASE((o), PrkObjectTag, PrkObject)->object_sparse_value_array_)

#define PRK_OBJECT_FLAGS(o) \
  (PRK_OBJECT_BASE((o), PrkObjectTag, PrkObject)->object_flags_.of_s_)

#define PRK_OBJECT_FLAGS_NUM(o) \
  (PRK_OBJECT_BASE((o), PrkObjectTag, PrkObject)->object_flags_.of_l_)

#define PRK_IS_DELETED_OBJECT(o) \
  (PRK_OBJECT_FLAGS(o).deleted_p_)

#define PRK_IS_LOADED_OBJECT(o) \
  (PRK_OBJECT_FLAGS(o).loaded_p_)

#define PRK_IS_INSTANCE(o) \
  (PRK_OBJECT_FLAGS(o).instance_p_)

#define PRK_IS_OBJECT_MONITOR(o) \
  (PRK_OBJECT_FLAGS(o).monitor_p_)

#define PRK_IS_EXPORTED_OBJECT(o) \
  (PRK_OBJECT_FLAGS(o).exported_p_)

#define PRK_IS_MARKED_OBJECT(o) \
  (PRK_OBJECT_FLAGS(o).object_mark_p_)

#define PRK_IS_OBJECT_APP(o) \
  (PRK_OBJECT_FLAGS(o).app_p_)

#define PRK_IS_OBJECT_MODULE(o) \
  (PRK_OBJECT_FLAGS(o).module_p_)

#define PRK_IS_VALUE_MODIFIED_OBJECT(o) \
  (PRK_OBJECT_FLAGS(o).value_modified_p_)

#define PRK_IS_MONITOR_PRESENT(o) \
  (PRK_OBJECT_FLAGS(o).monitor_present_p_)

#define PRK_IS_OBJECT_SAME_KB_PARENTS_P(o) \
  (PRK_OBJECT_FLAGS(o).same_module_parents_p_)

#define PRK_IS_SYSTEM_OBJECT(o) \
  (PRK_OBJECT_FLAGS(o).system_object_p_)

#define PRK_OBJECT_SPARSE_ARRAY_LENGTH(o) \
  (PRK_OBJECT_FLAGS(o).sparse_array_length_)

#ifdef OBJ_EVENTS
#define PRK_IS_OBJECT_VALUE_INTEREST(o) \
  (PRK_OBJECT_FLAGS(o).value_interest_)

#define PRK_IS_OBJECT_STRUCTURE_INTEREST(o) \
  (PRK_OBJECT_FLAGS(o).structure_interest_)
#endif /* OBJ_EVENTS */
``` define PRK_IS_CORRUPTED_OBJECT(o) (!PRK_IS_LOADED_OBJECT(o) && PRK_IS_DELETED_OBJE

```
/*
  file: t_rawsdt.ih
*/

/* System Structure */
typedef struct PRK_RAW_SLOT_DATA_STRUCT {
  PRK_TAG_HEADER;
  prk_slot_inheritance_storage inheritance_;
  PrkSlotFlags flags_;
  PrkType value_;
  PrkCollection facet_data_;
} *PrkRawSlotData;

/* Internal Accessors: */
#define PRK_RAW_SLOT_DATA_VALUE(rsd) \
   (PRK_OBJECT_BASE((rsd), PrkNonImmediateTag, PrkRawSlotData)->value_)

#define PRK_RAW_SLOT_DATA_FLAGS(rsd) \
   (PRK_OBJECT_BASE((rsd), PrkNonImmediateTag, PrkRawSlotData)->flags_)

#define PRK_RAW_SLOT_DATA_ROLE(rsd) \
   (PRK_OBJECT_BASE((rsd), PrkNonImmediateTag, PrkRawSlotData)->inheritance_)

#define PRK_RAW_SLOT_FACET_DATA(rsd) \
   (PRK_OBJECT_BASE((rsd), PrkNonImmediateTag, PrkRawSlotData)->facet_data_)

/*
  file: t_sat.ih
*/

/* System Structure: */
typedef unsigned short sat_hash_index_t;

typedef struct PRK_SLOT_ACCESS_TABLE_STRUCT {
  PRK_TAG_HEADER;
  PrkList sat_parents;            /* self list in classes */
  prk_value_array_index_t
     sat_chunk_end,
     sat_chunk_array_size,
     sat_locked_end,
     sat_default_end,
     sat_subclass_end;            /* this can double as an instancep flag */
  sat_hash_index_t sat_hash_table_size;
  PrkList sat_hash_table_start;
  /* followed by inline struct PRK_CLASS_SAT_TAIL_STRUCT */
} *PrkSat;

/*
  sat_instance_sat: this field needs to be filled in when the class has
  SADs of storageclass SubClass or Own, because the instance SAT can't
  see these.
*/ struct PRK_CLASS_SAT_TAIL_STRUCT {
  PrkList sat_class_parents;
  PrkList sat_subclasses;
  PrkList sat_instances;
  PrkSat sat_instance_sat;
  PrkList sat_multi_sats;                /* (count . multi_sats) */
};

typedef struct PRK_CLASS_SAT_TAIL_STRUCT *PRK_CSAT_TAIL_P;

/* Internal Accessors: */
#define PRK_SAT_PARENTS(sat) \
   (PRK_OBJECT_BASE((sat), PrkNonImmediateTag, PrkSat)->sat_parents)

#define PRK_SAT_CHUNK_END(sat) \
   (PRK_OBJECT_BASE((sat), PrkNonImmediateTag, PrkSat)->sat_chunk_end)
```

```
#define PRK_SAT_CHUNK_ARRAY_SIZE(sat) \
  (PRK_OBJECT_BASE((sat), PrkNonImmediateTag, PrkSat)->sat_chunk_array_size)

#define PRK_SAT_LOCKED_END(sat) \
  (PRK_OBJECT_BASE((sat), PrkNonImmediateTag, PrkSat)->sat_locked_end)

#define PRK_SAT_DEFAULT_END(sat) \
  (PRK_OBJECT_BASE((sat), PrkNonImmediateTag, PrkSat)->sat_default_end)

#define PRK_SAT_HASH_TABLE_SIZE(sat) \
  (PRK_OBJECT_BASE((sat), PrkNonImmediateTag, PrkSat)->sat_hash_table_size)

#define PRK_SAT_SUBCLASS_END(sat) \
  (PRK_OBJECT_BASE((sat), PrkNonImmediateTag, PrkSat)->sat_subclass_end)

#define PRK_SAT_HASH_BUCKET(sat, index) \
  ((&PRK_OBJECT_BASE((sat), PrkNonImmediateTag, PrkSat)->sat_hash_table_start)[inde define PRK_SAT_CLASS_PARENTS(sat, hash_table_size) \
  (((PRK_CSAT_TAIL_P)&PRK_SAT_HASH_BUCKET(sat, hash_table_size))->sat_class_parents define PRK_SAT_SUBCLASSES(sat, hash_table_size) \
  (((PRK_CSAT_TAIL_P)&PRK_SAT_HASH_BUCKET(sat, hash_table_size))->sat_subclasses)

#define PRK_SAT_INSTANCES(sat, hash_table_size) \
  (((PRK_CSAT_TAIL_P)&PRK_SAT_HASH_BUCKET(sat, hash_table_size))->sat_instances)

#define PRK_SAT_INSTANCE_SAT(sat, hash_table_size) \
  (((PRK_CSAT_TAIL_P)&PRK_SAT_HASH_BUCKET(sat, hash_table_size))->sat_instance_sat)

#define PRK_SAT_MULTI_SATS(sat, hash_table_size) \
  (((PRK_CSAT_TAIL_P)&PRK_SAT_HASH_BUCKET(sat, hash_table_size))->sat_multi_sats)

#define NullSat ((PrkSat)0)

#define PRK_DEFAULT_SAT_HASH_SIZE 1

/* the following should be an even number: */
#define PRK_DEFAULT_VA_FUDGE_FACTOR 4

/* the following 5 is pure magic.  I haven't been able to justify the value
    --REN */
#define PRK_SYMBOL_HASH_SHIFT 5
#define PRK_SD_NAME_HASH_INDEX(name, mask) \
  ((((u_int)(u_long)(name)) >> PRK_SYMBOL_HASH_SHIFT) & (mask))
#define PRK_FETCH_SAD_BUCKET(sat, name) \
  (PRK_SAT_HASH_BUCKET(sat, PRK_SD_NAME_HASH_INDEX(name, PRK_SAT_HASH_TABLE_SIZE(sa define PRK_FIND_SAD(sd, sat, slot_name, fail_code) { \
  register PrkList bucket = PRK_FETCH_SAD_BUCKET(sat, slot_name); \
  __find_sd_loop: \
  if (Null(bucket)) { fail_code; } \
  else if (PRK_SD_NAME(sd = (PrkSd)PRK_FIRST(bucket)) != slot_name) { \
    bucket = PRK_REST(bucket); goto __find_sd_loop; }}

/* use different label to avoid conflict with PRK_FIND_SAD */ define PRK_FIND_SAD2(sd, sat, slot_name, fail_code) { \
  register PrkList bucket = PRK_FETCH_SAD_BUCKET(sat, slot_name); \
  __find_sd_loop2: \
  if (Null(bucket)) { fail_code; } \
  else if (PRK_SD_NAME(sd = (PrkSd)PRK_FIRST(bucket)) != slot_name) { \
    bucket = PRK_REST(bucket); goto __find_sd_loop2; }} define PRK_FIND_SAD_N(sd, sat, slot_name, fail_code, lbl) { \
  register PrkList bucket = PRK_FETCH_SAD_BUCKET(sat, slot_name); \
  lbl: \
  if (Null(bucket)) { fail_code; } \
  else if (PRK_SD_NAME(sd = (PrkSd)PRK_FIRST(bucket)) != slot_name) { \
    bucket = PRK_REST(bucket); goto lbl; }}
```

```
#define PRK_FIND_HSAD_N(sd, sat, hash_name, slot_name, fail_code, lbl) { \
  register PrkList bucket = PRK_FETCH_SAD_BUCKET(sat, hash_name); \
  lbl: \
  if (Null(bucket)) { fail_code; } \
  else if (PRK_SD_NAME(sd = (PrkSd)PRK_FIRST(bucket)) != slot_name) { \
      bucket = PRK_REST(bucket); goto lbl; }} define PRK_IS_SAT(o) \
   (PrkIsNonImmediate(o) && (PRK_OBJECT_SECONDARY_TAG(o) == PrkCSatTag || \
                       PRK_OBJECT_SECONDARY_TAG(o) == PrkISatTag))

#define PRK_IS_CSAT(t) \
  (PrkIsType((t), PrkCSatTag))

/*
  file: t_sd.ih
*/ typedef PrkType (*prk_slot_handler)();

typedef u_char prk_facet_inheritance_storage, prk_slot_inheritance_storage;

typedef CONST struct prk_slot_method_table_struct {
  prk_slot_inheritance_storage role;
  prk_slot_handler smt_handlers[PRK_SMT_METHOD_COUNT];
} *smt;

typedef struct {
  prk_facet_inheritance_storage role;
  unsigned char offset;
  PrkSymbol name;
} static_facet_t;

typedef unsigned short prk_sdf_t;

/* INHERITED_SFacet_count means save module does not need to save inherited
   static facet ids. */ typedef struct {

PrkSymbol sd_name;
  PrkObject sd_object;  /* note:  not necessarily founding object */
  static_facet_t *sd_static_facets;
  u_char sd_static_facet_count;
  u_char sd_static_facet_size;
  u_char sd_size;
  u_char sd_inherited_sfacet_count;
  prk_slot_inheritance_storage sd_role_specifier;
  prk_sdf_t sd_flags;          /* 16 */
  unsigned sd_offset : SAD_OFFSET_BITS;
  unsigned sd_static_facet_start : 2;
} PRK_SD_BODY;

/* System Structure: */
typedef struct PRK_SD_STRUCT {
  PRK_TAG_HEADER;
  PRK_SD_BODY sd_body;
} *PrkSd;

/* Internal Accessors: */
#define PRK_SD_NAME(sd) \
   (PRK_OBJECT_BASE((sd), PrkNonImmediateTag, PrkSd)->sd_body.sd_name)

#define PRK_SD_OBJECT(sd) \
   (PRK_OBJECT_BASE((sd), PrkNonImmediateTag, PrkSd)->sd_body.sd_object)

#define PRK_SD_ROLE_SPECIFIER(sd) \
   (PRK_OBJECT_BASE((sd), PrkNonImmediateTag, PrkSd)->sd_body.sd_role_specifier)

#define PRK_SD_STATIC_FACETS(sd) \
   (PRK_OBJECT_BASE((sd), PrkNonImmediateTag, PrkSd)->sd_body.sd_static_facets)
```

```c
#define PRK_SD_STATIC_FACET_COUNT(sd) \
  (PRK_OBJECT_BASE((sd), PrkNonImmediateTag, PrkSd)->sd_body.sd_static_facet_count)

#define PRK_SD_STATIC_FACET_SIZE(sd) \
  (PRK_OBJECT_BASE((sd), PrkNonImmediateTag, PrkSd)->sd_body.sd_static_facet_size)

#define PRK_SD_INHERITED_SFACET_COUNT(sd) \
  (PRK_OBJECT_BASE((sd), PrkNonImmediateTag, PrkSd)->sd_body.sd_inherited_sfacet_cc define PRK_SD_OFFSET(sd) \
  (PRK_OBJECT_BASE((sd), PrkNonImmediateTag, PrkSd)->sd_body.sd_offset)

#define PRK_SD_FLAGS(sd) \
  (PRK_OBJECT_BASE((sd), PrkNonImmediateTag, PrkSd)->sd_body.sd_flags)

#define PRK_SD_FLAGS_ONLY(sd) \
  ((PrkSlotType)(PRK_SD_FLAGS(sd) & ~PRK_SD_SLOT_TYPE_MASK))

#define PRK_SD_SIZE(sd) \
  (PRK_OBJECT_BASE((sd), PrkNonImmediateTag, PrkSd)->sd_body.sd_size)

#define PRK_SD_STATIC_FACET_START(sd) \
  (PRK_OBJECT_BASE((sd), PrkNonImmediateTag, PrkSd)->sd_body.sd_static_facet_start)

#define PRK_SD_SLOT_TYPE(sd) \
  ((PrkSlotType)(PRK_SD_FLAGS(sd) & PRK_SD_SLOT_TYPE_MASK))

#define PRK_SD_SET_SLOT_TYPE(sd, new_type) (PRK_SD_FLAGS(sd) = \
                (PRK_SD_FLAGS(sd) & ~PRK_SD_SLOT_TYPE_MASK) | new_type)

#define PRK_SMT_METHOD(slot_method_table, method_id) \
  (((smt)(slot_method_table))->smt_handlers[(method_id)])

#define PRK_SD_DISALLOW_AVS_P(sd_flags) \
  ((sd_flags & (PrkNoWhenNeededMonitorsFlag | PrkNoWhenChangedMonitorsFlag)) == (Pr define PRK_FACET_ROLE_P(role) \
  ((role) < PRK_FROLE_COUNT && role != PrkMethodInheritance)

#define PRK_MAKE_SAD(sd, object, slot_name) \
  do { \
    sd = (PrkSd)prk_make_tagged_object((size_t)sizeof(struct PRK_SD_STRUCT), \
                                       PrkSdTag); \
    ASSERT_TYPE(sd, PrkSdTag, PRK_MAKE_SAD); \
    PRK_SD_NAME(sd) = (slot_name); \
    PRK_SD_OBJECT(sd) = (object); \
  } while (FALSE)

/*
   file: t_symbol.h
*/ ifndef PRK_SABER
/* System Structure: */
typedef struct PRK_SYMBOL_STRUCT {
  char *symbol_cstring;
  PrkList symbol_attributes;
  struct PRK_SYMBOL_STRUCT *symbol_next;
  unsigned char symbol_char_count;
} *PrkSymbol;

/* Internal Accessors: */
#define PRK_SYMBOL_CSTRING(s) \
  (PRK_OBJECT_BASE((s), PrkSymbolTag, PrkSymbol)->symbol_cstring)

#define PRK_SYMBOL_ATTRIBUTES(s) \
  (PRK_OBJECT_BASE((s), PrkSymbolTag, PrkSymbol)->symbol_attributes)

#define PRK_SYMBOL_NEXT(s) \
  (PRK_OBJECT_BASE((s), PrkSymbolTag, PrkSymbol)->symbol_next)

#define PRK_SYMBOL_CHAR_COUNT(s) \
  (PRK_OBJECT_BASE((s), PrkSymbolTag, PrkSymbol)->symbol_char_count)
```

```
else define PRK_SYMBOL_CSTRING(s) \
  ((char *)(PrkSymbol)(s))
#endif /* PRK_SABER */

/*
  file: list.c
*/
static const char rcsid[] = "$Header: /tmp_mnt/net/op/prokee/src/generic/om/substra ifdef MSDOS    /* *** this is a temporary hack for OS2 port */
define PrkMakeStackList msldmy /* to disable prototype */
endif include <int_sbst.ih>

/*
  includes:
    PrkMakeList
    PrkIsEmptyList
    PrkListFirst
    PrkListRest
    PrkMakeCons
    prk_delete
    prk_delete_all
    prk_ncons
    PrkAddListPtrElmt
    prk_delete_element
    prk_get_cons_prop
    prk_rem_cons_prop
    prk_put_cons_prop
    prk_member_eq
    PrkCopyList
    PrkSetListFirst
    PrkSetListRest
    PrkListToArray
    PrkListLength
    PrkListLastCons
    PrkListNth
    PrkAppendLists
    prk_append_to_list
    PrkDestructiveAppendLists
    prk_list_equal
*/

/************************* PrkMakeList ****************************

PrkMakeList takes a variable number of arguments terminated by
  PrkNull. It then constructs a linked list of cons cells
  containing those arguments. The PrkNull is ignored.

****************************************************************/

USER_EXPORT PrkList PrkMakeList(PrkType obj1, ...)
{
  va_list args;

va_start(args, obj1);
  if (obj1 == PrkNull) {
    va_end(args);
    return PrkNil;
  }
  else {
    PrkList l = PRK_MAKE_CONS();
    PrkList current = l;
    ASSERT_TYPE(1, PrkListTag, PrkMakeList);
    PRK_FIRST(current) = obj1;
    while (PRK_REST(current) = PrkNil,
           (obj1 = va_arg(args, PrkType)) != PrkNull) {
      current = PRK_REST(current) = PRK_MAKE_CONS();
```

```c
      ASSERT_TYPE(current, PrkListTag, PrkMakeList);
      PRK_FIRST(current) = obj1;
    }
    va_end(args);
    return 1;
  }
}

/*********************** PrkIsEmptyList ***************************

PrkIsEmptyList is a predicate returning TRUE if its argument is PrkNil.

***************************************************************/

USER_EXPORT PrkBool PrkIsEmptyList(PrkList l)
{
  USER_ASSERT_TYPE(l, PrkListTag, PrkIsEmptyList);
  return Null(l);
}

/*********************** PrkListFirst ***************************

PrkListFirst returns the CAR of a CONS cell.

***************************************************************/

USER_EXPORT PrkType PrkListFirst(PrkList l)
{
  USER_ASSERT_TYPE(l, PrkListTag, PrkListFirst);
  USER_ASSERT(!Null(l), PrkListFirst);
  return PRK_FIRST(l);
}

/*********************** PrkListRest ***************************

PrkListRest returns the CDR of a CONS cell.

***************************************************************/

USER_EXPORT PrkList PrkListRest(PrkList l)
{
  USER_ASSERT_TYPE(l, PrkListTag, PrkListRest);

USER_ASSERT(!Null(l), PrkListRest);
  return PRK_REST(l);
}

/*************************** PrkMakeCons ********************************

PrkMakeCons constructs a single cons cell (dotted pair) of two objects.

***************************************************************/

USER_EXPORT PrkList PrkMakeCons(PrkType o, PrkType o2)
{
  PrkList cons = PRK_MAKE_CONS();
  ASSERT_TYPE(cons, PrkListTag, PrkMakeCons);
  PRK_FIRST(cons) = o;
  PRK_REST(cons) = (PrkList)o2;
  return cons;
}

/*********************** prk_delete **************************** prk_delete destructively deletes the first occurance of PrkType o in
  PrkList l.  If the first element of l is deleted, references to l will
  not see the change.  Object comparisons are by contents.

***************************************************************/
```

```
PrkList prk_delete(PrkType o, PrkList l)
{
  USER_ASSERT_TYPE(l, PrkListTag, PrkDeleteListElmt);
  if (Null(l))
    return l;
  else if (PRK_FIRST(l) == o)
    return PRK_REST(l);
  else {
    PrkList *l2 = &PRK_REST(l);
    for (; !Null(*l2); l2 = &PRK_REST(*l2)) {
      USER_ASSERT_TYPE(*l2, PrkListTag, PrkDeleteListElmt);
      if (prk_is_equal(PRK_FIRST(*l2), o)) {
        *l2 = PRK_REST(*l2);
        USER_ASSERT_TYPE(*l2, PrkListTag, PrkDeleteListElmt);
        break;
      }
    }
    return l;
  }
}
```

/************************ prk_delete_ptr ***************************** prk_delete_tr destructively deletes the first occurance of PrkType o in
  PrkList l.  If the first element of l is deleted, references to l will
  not see the change.  Object comparisons are made by pointer value.

*************************************************************************/

```
PrkList prk_delete_ptr(PrkType o, PrkList l)
{
  USER_ASSERT_TYPE(l, PrkListTag, PrkDeleteListElmt);
  if (Null(l))
    return l;
  else if (PRK_FIRST(l) == o)
    return PRK_REST(l);
  else {
    PrkList *l2 = &PRK_REST(l);
    for (; !Null(*l2); l2 = &PRK_REST(*l2)) {
      USER_ASSERT_TYPE(*l2, PrkListTag, PrkDeleteListElmt);
      if (PRK_FIRST(*l2) == o) {
        *l2 = PRK_REST(*l2);
        USER_ASSERT_TYPE(*l2, PrkListTag, PrkDeleteListElmt);
        break;
      }
    }
    return l;
  }
}
```

/************************ prk_delete_all ***************************** prk_delete_all is like PrkDeleteListElmt except all occurances of PrkType o in Pr
  l are deleted.  As in PrkDeleteListElmt, if the first element of l is deleted,
  references to l will not see that change.  Comparisons are by contents.

*************************************************************************/

```
PrkList prk_delete_all(PrkType o, PrkList l)
{
  PrkList *l2;

USER_ASSERT_TYPE(l, PrkListTag, PrkDeleteAll);
  if (Null(l))
    return l;

while (prk_is_equal(PRK_FIRST(l), o)) {
    if (Null(l = PRK_REST(l)))
      return l;
    USER_ASSERT_TYPE(l, PrkListTag, PrkDeleteAll);
  }
```

```
  12 = &PRK_REST(l);

for (; !Null(*l2); ) {
    USER_ASSERT_TYPE(*l2, PrkListTag, PrkDeleteAll);
    if (prk_is_equal(PRK_FIRST(*l2), o))
      *l2 = PRK_REST(*l2);
    else
      l2 = &PRK_REST(*l2);
  }
  return l;
}
```

/*********************** prk_delete_all_ptr ************************ prk_delete_all_ptr is like PrkDeleteListElmt except all occurances of PrkType
  o in PrkList
  l are deleted.  As in PrkDeleteListElmt, if the first element of l is deleted,
  references to l will not see that change.  Comparisons are by pointer.

********************************************************************/

```
PrkList prk_delete_all_ptr(PrkType o, PrkList l)
{
  PrkList *l2;

USER_ASSERT_TYPE(l, PrkListTag, PrkDeleteAll);
  if (Null(l))
    return l;

while (PRK_FIRST(l) == o) {
    if (Null(l = PRK_REST(l)))
      return l;
    USER_ASSERT_TYPE(l, PrkListTag, PrkDeleteAll);
  } l2 = &PRK_REST(l);

for (; !Null(*l2); ) {
    USER_ASSERT_TYPE(*l2, PrkListTag, PrkDeleteAll);
    if (PRK_FIRST(*l2) == o)
      *l2 = PRK_REST(*l2);
    else
      l2 = &PRK_REST(*l2);
  } return l;
}
```

/*********************** prk_ncons ************************ prk_ncons is equivalent to PrkMakeCons(o, PrkNil).

********************************************************************/

```
PrkList prk_ncons(PrkType o)
{
  PrkList cons = PRK_MAKE_CONS();
  ASSERT_TYPE(cons, PrkListTag, prk_ncons);
  PRK_FIRST(cons) = o;
  PRK_REST(cons) = PrkNil;
  return cons;
}
```

/*********************** PrkAddListPtrElmt ************************

PrkAddListPtrElmt inserts an element at the head of the list, creating
  a new entry.  It sets *l to and returns the new list.

********************************************************************/

```
USER_EXPORT PrkList PrkAddListPtrElmt(PrkType o, PrkList *l)
{
  PrkList cons = PRK_MAKE_CONS();
  ASSERT_TYPE(cons, PrkListTag, PrkAddElement);
  USER_ASSERT_DATA_PNTR(l, PrkAddListPtrElmt);
  USER_ASSERT_TYPE(*l, PrkListTag, PrkAddElement);
  PRK_REST(cons) = *l;
  PRK_FIRST(cons) = o;
  return *l = cons;
}

/********************* prk_delete_element ************************* prk_delete_element destructively deletes the specified object from
  the list.  It set *l to and returns the new list.  Comparisons are
  by contents.

******************************************************************/

PrkList prk_delete_element(PrkType o, PrkList *l)
{
  USER_ASSERT_DATA_PNTR(l, PrkDeleteListPtrElmt);
  USER_ASSERT_TYPE(*l, PrkListTag, PrkDeleteListPtrElmt);
  if (Null(*l))
    return *l;
  else {
    PrkList *l2 = l;
    if (prk_is_equal(PRK_FIRST(*l2), o)) {
      USER_ASSERT_TYPE(PRK_REST(*l2), PrkListTag, PrkDeleteListPtrElmt);
      return *l2 = PRK_REST(*l2);
    }
    else
      for (l2 = &PRK_REST(*l2); !Null(*l2); l2 = &PRK_REST(*l2)) {
        USER_ASSERT_TYPE(*l2, PrkListTag, PrkDeleteListPtrElmt);
        if (prk_is_equal(PRK_FIRST(*l2), o)) {
          *l2 = PRK_REST(*l2);
          break;
        }
      }
    return *l;
  }
}

/********************* prk_delete_element_ptr ********************* prk_delete_element_ptr destructively deletes the specified object from
  the list.  It set *l to and returns the new list.  Comparisons are
  by pointer.

******************************************************************/

PrkList prk_delete_element_ptr(PrkType o, PrkList *l)
{
  USER_ASSERT_TYPE(*l, PrkListTag, PrkDeleteListPtrElmt);
  USER_ASSERT_DATA_PNTR(l, PrkDeleteListPtrElmt);
  if (Null(*l))
    return *l;
  else {
    PrkList *l2 = l;
    if (PRK_FIRST(*l2) == o) {
      USER_ASSERT_TYPE(PRK_REST(*l2), PrkListTag, PrkDeleteListPtrElmt);
      return *l2 = PRK_REST(*l2);
    }
    else
      for (l2 = &PRK_REST(*l2); !Null(*l2); l2 = &PRK_REST(*l2)) {
        USER_ASSERT_TYPE(*l2, PrkListTag, PrkDeleteListPtrElmt);
        if (PRK_FIRST(*l2) == o) {
          *l2 = PRK_REST(*l2);
          break;
        }
      }
```

```
    return *l;
  }
}

PrkList prk_delete_element_all(PrkType o, PrkList *l)
{
  PrkList *l2;

USER_ASSERT_DATA_PNTR(l, PrkDeleteAll);
  USER_ASSERT_TYPE(*l, PrkListTag, prk_delete_element_all);
  if (Null(*l))
    return *l;

while (prk_is_equal(PRK_FIRST(*l), o)) {
    if (Null(*l = PRK_REST(*l)))
      return *l;
    USER_ASSERT_TYPE(*l, PrkListTag, prk_delete_element_all);
  } l2 = &PRK_REST(*l);

for (; !Null(*l2); ) {
    USER_ASSERT_TYPE(*l2, PrkListTag, prk_delete_element_all);
    if (prk_is_equal(PRK_FIRST(*l2), o))
      *l2 = PRK_REST(*l2);
    else
      l2 = &PRK_REST(*l2);
  } return *l;

}

PrkList prk_delete_element_all_ptr(PrkType o, PrkList *l)
{
  PrkList *l2;

USER_ASSERT_DATA_PNTR(l, PrkDeleteAll);
  USER_ASSERT_TYPE(*l, PrkListTag, PrkDeleteAll);
  if (Null(*l))
    return *l;

while (PRK_FIRST(*l) == o) {
    if (Null(*l = PRK_REST(*l)))
      return *l;
    USER_ASSERT_TYPE(*l, PrkListTag, PrkDeleteAll);
  } l2 = &PRK_REST(*l);

for (; !Null(*l2); ) {
    USER_ASSERT_TYPE(*l2, PrkListTag, PrkDeleteAll);
    if (PRK_FIRST(*l2) == o)
      *l2 = PRK_REST(*l2);
    else
      l2 = &PRK_REST(*l2);
  } return *l;
}

/********************* prk_get_cons_prop *********************** prk_get_cons_prop searches for a property pair in the given list
  using the given object as a key, which must be the same as the
  first object in the desired pair.  It returns the second object
  in the pair, or PrkNull if not found.

*****************************************************************/

PrkType prk_get_cons_prop(PrkList l, PrkType prop)
{
```

```
retry:
  USER_ASSERT_TYPE(l, PrkListTag, prk_get_cons_prop);
  if (Null(l))
    return PrkNull;
  USER_ASSERT_TYPE(PRK_REST(l), PrkListTag, prk_get_cons_prop);
  USER_ASSERT(!Null(PRK_REST(l)), prk_get_cons_prop);
  if (prk_is_equal(PRK_FIRST(l), prop))
    return PRK_FIRST(PRK_REST(l));
  l = PRK_REST(PRK_REST(l));
  goto retry;
}

/*********************** prk_get_addr_cons_prop *********************** prk_get_addr_cons_prop searches for a property pair in the given list
  using the given object as a key, which must be the same as the
  first object in the desired pair.  It returns the address of the
  second object in the pair, or PrkNull if not found.

Note: This is same as prk_get_cons_prop, except that it returns
  the address of the list.

*************************************************************************/

PrkType *prk_get_addr_cons_prop(PrkList l, PrkType prop)
{
retry:
  USER_ASSERT_TYPE(l, PrkListTag, prk_get_cons_prop);
  if (Null(l))
    return (PrkType *) PrkNull;
  USER_ASSERT_TYPE(PRK_REST(l), PrkListTag, prk_get_addr_cons_prop);
  USER_ASSERT(!Null(PRK_REST(l)), prk_get_addr_cons_prop);
  if (prk_is_equal(PRK_FIRST(l), prop))
    return &(PRK_FIRST(PRK_REST(l)));
  l = PRK_REST(PRK_REST(l));
  goto retry;
}

/*********************** prk_rem_cons_prop *********************** prk_rem_cons_prop searches for a property pair in the given list
  using the given object as a key, which must be the same as the
  first object in the desired pair.  If found, it deletes the pair
  from the list and returns the second object in the pair.  If not
  found, it returns PrkNull.

*************************************************************************/

PrkType prk_rem_cons_prop(PrkList *l, PrkType prop)
{
retry:
  USER_ASSERT_DATA_PNTR(l, prk_rem_cons_prop);
  USER_ASSERT_TYPE(*l, PrkListTag, prk_rem_cons_prop);
  if (Null(*l))
    return PrkNull;
  USER_ASSERT_TYPE(PRK_REST(*l), PrkListTag, prk_rem_cons_prop);
  USER_ASSERT(!Null(PRK_REST(*l)), prk_rem_cons_prop);
  if (prk_is_equal(PRK_FIRST(*l), prop)) {
    PrkList result = PRK_REST(*l);
    *l = PRK_REST(result);
    USER_ASSERT_TYPE(*l, PrkListTag, prk_rem_cons_prop);
    return PRK_FIRST(result);
  }
  l = &PRK_REST(PRK_REST(*l));
  goto retry;
}

/*********************** prk_put_cons_prop *********************** prk_put_cons_prop searches for a property pair in the given list
  using the given object as a key, which must be the same as the
  first object in the desired pair. If found, it destructively
``` replaces the second object of the pair with the given value.
If not found, it appends a new pair to the list.  In all cases
it will return the value argument.

*****************************************************************/

```
PrkType prk_put_cons_prop(PrkList *l, PrkType prop, PrkType value)
{
 retry:
  USER_ASSERT_DATA_PNTR(l, prk_put_cons_prop);
  USER_ASSERT_TYPE(*l, PrkListTag, prk_put_cons_prop);
  if (Null(*l)) {
    *l = PrkMakeCons(prop, (PrkType)prk_ncons(value));
    return value;
  }
  USER_ASSERT_TYPE(PRK_REST(*l), PrkListTag, prk_put_cons_prop);
  USER_ASSERT(!Null(PRK_REST(*l)), prk_put_cons_prop);
  if (prk_is_equal(PRK_FIRST(*l), prop))
    return PRK_FIRST(PRK_REST(*l)) = value;
  else {
    l = &PRK_REST(PRK_REST(*l));
    goto retry;
  }
}
```

/*********************** prk_add_cons_prop *********************** prk_add_cons_prop searches for a property pair in the given list
  using the given object as a key which must be the same as the
  first object in the desired pair. If found, it destructively
  replaces the second object of the pair with a list of the given
  value and the old value.
  If not found, it appends a new pair to the list.  In all cases
  it will return the final value.

*****************************************************************/

```
PrkType prk_add_cons_prop(PrkList *l, PrkType prop, PrkType value)
{
  PrkType *addr_old_value;

retry:
  USER_ASSERT_DATA_PNTR(l, prk_add_cons_prop);
  USER_ASSERT_TYPE(*l, PrkListTag, prk_add_cons_prop);
  if (Null(*l)) {
    value = (PrkType) PrkMakeList(value, PrkNull);
    *l = PrkMakeList(prop, value, PrkNull);
    return value;
  }
  USER_ASSERT_TYPE(PRK_REST(*l), PrkListTag, prk_add_cons_prop);
  USER_ASSERT(!Null(PRK_REST(*l)), prk_add_cons_prop);
  if (prk_is_equal(PRK_FIRST(*l), prop)) {
    addr_old_value = &(PRK_FIRST(PRK_REST(*l)));
    return *addr_old_value = (PrkType) PrkMakeCons(value, *addr_old_value);
  }
  else {
    l = &PRK_REST(PRK_REST(*l));
    goto retry;
  }
}
```
/*********************** prk_get_whole_assoc_prop *************** prk_get_whole_assoc_prop searches for a list in the given assoc_list,
  whose first value is the given val. It returns the list found.
  If not found returns PrkNull.

*****************************************************************/

```
PrkType prk_get_whole_assoc_prop(PrkList assoc_list, PrkType val)
{
  PrkList apair;
```

```
retry:
  if (Null(assoc_list) || ((PrkType) assoc_list == PrkNull))
    return PrkNull;

USER_ASSERT_TYPE(assoc_list, PrkListTag, prk_get_whole_assoc_prop);
  apair = (PrkList) PRK_FIRST(assoc_list);
  USER_ASSERT_TYPE(apair, PrkListTag, prk_get_whole_assoc_prop);
  if (prk_is_equal(PRK_FIRST(apair), val))
    return (PrkType)apair;
  assoc_list = PRK_REST(assoc_list);
  goto retry;
}
/********************* prk_get_assoc_prop *************** prk_get_assoc_prop searches for a list in the given assoc_list,
  whose first value is the given val. It returns the REST of the
  list found (i.e., list excluding the first val). If not found
  returns PrkNull.

*****************************************************************/

PrkType prk_get_assoc_prop(PrkList assoc_list, PrkType val)
{
  PrkList apair;

retry:
  if (Null(assoc_list) || ((PrkType) assoc_list == PrkNull))
    return PrkNull;

USER_ASSERT_TYPE(assoc_list, PrkListTag, prk_get_assoc_prop);
  apair = (PrkList) PRK_FIRST(assoc_list);
  USER_ASSERT_TYPE(apair, PrkListTag, prk_get_assoc_prop);
  if (prk_is_equal(PRK_FIRST(apair), val))
    return (PrkType)PRK_REST(apair);
  assoc_list = PRK_REST(assoc_list);

goto retry;
}

/********************* prk_rem_assoc_prop *************** prk_rem_assoc_prop searches for a list in the given assoc_list,
  whose first value is the given val. If found, removes that list
  from the assoc_list. It returns the list removed. If not found
  returns PrkNull.

*****************************************************************/

PrkType prk_rem_assoc_prop(PrkList *assoc_list, PrkType val)
{
  PrkType ret_val;

retry:
  USER_ASSERT_DATA_PNTR(assoc_list, prk_rem_assoc_prop);
  if (Null(*assoc_list) || ((PrkType) *assoc_list == PrkNull))
    return PrkNull;

USER_ASSERT_TYPE(*assoc_list, PrkListTag, prk_rem_assoc_prop);
  USER_ASSERT_TYPE(PRK_FIRST(*assoc_list), PrkListTag, prk_rem_assoc_prop);
  if (prk_is_equal(PRK_FIRST(PRK_FIRST(*assoc_list)), val)) {
    ret_val = PRK_FIRST(*assoc_list);
    *assoc_list = PRK_REST(*assoc_list);
    return ret_val;
  }
  assoc_list = &PRK_REST(*assoc_list);
  goto retry;
}
```

/************************* prk_member_ptr_eq ***************************** prk_member_ptr_eq searches for an object in a list and returns the sublist
  which has that object as its first member, or returns PrkNil if the
  object was not found.

*****************************************************************************/

```
PrkList prk_member_ptr_eq(PrkList l, PrkType o)
{
  register PrkList nil = PrkNil;
  for(; l != nil; l = PRK_REST(l)) {
    USER_ASSERT_TYPE(l, PrkListTag, PrkFindListElmt);
    if (PRK_FIRST(l) == o)
      break;
  }
  return l;
}
```

/*********************** prk_addr_member_ptr_eq ******************* just like prk_member_ptr_eq except that it takes address of the list
  and return address of the value returned.

*****************************************************************************/

```
PrkList *prk_addr_member_ptr_eq(PrkList *l, PrkType o)
{
  register PrkList nil = PrkNil;

USER_ASSERT_DATA_PNTR(l, PrkFindListElmt);
  for(; *l != nil; l = &PRK_REST(*l)) {
    USER_ASSERT_TYPE(*l, PrkListTag, PrkFindListElmt);
    if (PRK_FIRST(*l) == o)
      break;
  }
  return l;
}
```

/************************* prk_member_eq ********************** prk_member_eq searches for an object in a list and returns the sublist
  which has that object as its first member, or returns PrkNil if the
  object was not found.  The difference between this and prk_member_ptr_eq
  is that the comparisons made will be by value (contents).

*****************************************************************************/

```
PrkList prk_member_eq(PrkList l, PrkType o)
{
  register PrkList nil = PrkNil;
  for(; l != nil; l = PRK_REST(l)) {
    USER_ASSERT_TYPE(l, PrkListTag, PrkFindListElmt);
    if ((PRK_FIRST(l) == o) || prk_is_equal(o, PRK_FIRST(l)))
      break;
  }
  return l;
}
```

/************************* PrkCopyList ****************************

PrkCopyList will create a copy of the given list.

*****************************************************************************/

```
USER_EXPORT PrkList PrkCopyList(PrkList l)
{
  USER_ASSERT_TYPE(l, PrkListTag, PrkCopyList);
  if (Null(l))
    return l;
  else if (!PrkIsList(PRK_REST(l))) {
    PrkList l2 = PRK_MAKE_CONS();
```

```
      PRK_FIRST(l2) = PRK_FIRST(l);
      PRK_REST(l2) = PRK_REST(l);
      return(l2);
    }
    else {
      PrkList l2 = PRK_MAKE_CONS();
      PrkList current = l2;
      ASSERT_TYPE(l2, PrkListTag, PrkCopyList);
      PRK_FIRST(current) = PRK_FIRST(l);
      while (PRK_REST(current) = PrkNil,
             !Null(l = PRK_REST(l))) {
        USER_ASSERT_TYPE(l, PrkListTag, PrkCopyList);
        current = PRK_REST(current) = PRK_MAKE_CONS();
        ASSERT_TYPE(current, PrkListTag, PrkCopyList);
        PRK_FIRST(current) = PRK_FIRST(l);
      }
      return l2;
    }
}

/*************************** PrkSetListFirst ****************************

PrkSetListFirst will destructively replace the first object in the list
  with the given new object.  It returns the new object argument.

***********************************************************************/

USER_EXPORT PrkType PrkSetListFirst(PrkList l, PrkType o)
{
  USER_ASSERT_TYPE(l, PrkListTag, PrkSetListFirst);
  PRK_FIRST(l) = o;
  return(o);
}

/*************************** PrkSetListRest *****************************

PrkSetListRest will destructively replace the rest part of the given list
  (l) with a new rest part list (cdr).  It returns the new rest part (cdr).

***********************************************************************/

USER_EXPORT PrkList PrkSetListRest(PrkList l, PrkList cdr)
{
  USER_ASSERT_TYPE(l, PrkListTag, PrkSetListRest);
  USER_ASSERT(l != PrkNil, PrkSetListRest);
  PRK_REST(l) = cdr;
  return(cdr);
}

/********************** PrkListToArray *********************************

PrkListToArray will load an array (a) with the elements of the
  list (l).

***********************************************************************/

USER_EXPORT void PrkListToArray(PrkList l, PrkArray a)
{
  USER_ASSERT_TYPE(l, PrkListTag, PrkListToArray);
  USER_ASSERT_TYPE(a, PrkArrayTag, PrkListToArray);
  USER_ASSERT(PrkListLength(l) <= PRK_ARRAY_SIZE(a), PrkListToArray);
  if (Null(l))
    PRK_ARRAY_FILL_COUNT(a) = 0;
  else {
    unsigned short i = 0, size = PRK_ARRAY_SIZE(a);
    for (; i < size && !Null(l); i++, l = PRK_REST(l))
      PRK_ELT(a, i) = PRK_FIRST(l);
    PRK_ARRAY_FILL_COUNT(a) = i;
  }
}
```

```c
USER_EXPORT PrkList PrkArrayToList(PrkArray a)
{
  PrkCollectionSize max;
  USER_ASSERT_TYPE(a, PrkArrayTag, PrkArrayToList);

if ((max = PRK_ARRAY_FILL_COUNT(a)) == 0)
    return PrkNil;
  else {
    PrkList l, l2;
    PrkCollectionSize i;
    l = l2 = prk_ncons(PRK_ELT(a, 0));
    for (i = 1; i < max; i++)
      l2 = PRK_REST(l2) = prk_ncons(PRK_ELT(a, i));
    return l;
  }
}

/*************************** PrkListLength ******************************

PrkListLength will return the number of items in the given list.

**********************************************************************/

USER_EXPORT PrkCollectionSize PrkListLength(PrkList l)
{
  PrkCollectionSize i = 0;
  for (; !Null(l); l = PRK_REST(l), i++)
    USER_ASSERT_TYPE(l, PrkListTag, PrkListLength);
  return i;
}

/*************************** PrkListLastCons ****************************

PrkListLastCons will return the sublist containing the last element
  of the given list.

**********************************************************************/

USER_EXPORT PrkList PrkListLastCons(PrkList l)
{
  register PrkList nil = PrkNil;
  PrkList result;
  USER_ASSERT_TYPE(l, PrkListTag, PrkListLastCons);
  if(l != nil)
    for(; (result = PRK_REST(l)) != nil; l = result)
      USER_ASSERT_TYPE(result, PrkListTag, PrkListLastCons);
  return(l);
}

/*************************** PrkListNth *********************************

PrkListNth with return the nth object in the given list, or will return
  PrkNull if n is out of range.

**********************************************************************/

USER_EXPORT PrkType PrkListNth(PrkList l, PrkCollectionSize n)
{
  register PrkList nil = PrkNil;

for (; l != nil; l = PRK_REST(l), n--) {
    USER_ASSERT_TYPE(l, PrkListTag, PrkListNth);
    if (!n)
      return PRK_FIRST(l);
  } return PrkNull;
}
```

```
USER_EXPORT PrkType PrkCdr(PrkList cons)
{
  USER_ASSERT_TYPE(cons, PrkListTag, PrkCdr);

return(cons == PrkNil ? (PrkType)PrkNil : (PrkType)PRK_REST(cons));
}

/*************************** PrkAppendLists **************************

PrkAppendLists will create a copy of the first list (l1) and will
  append the second (l2) to the end of the copy.  It will return the new
  list.

***************************************************************/

USER_EXPORT PrkList PrkAppendLists(PrkList l1, PrkList l2)
{
  USER_ASSERT_TYPE(l1, PrkListTag, PrkAppendLists);
  USER_ASSERT_TYPE(l2, PrkListTag, PrkAppendLists);
  if (Null(l1))
    return l2;
  else {
    PrkList l3 = prk_ncons(PRK_FIRST(l1));
    PrkList l4 = l3;
    for (; !Null(l1 = PRK_REST(l1));) {
      USER_ASSERT_TYPE(l1, PrkListTag, PrkAppendLists);
      l4 = PRK_REST(l4) = prk_ncons(PRK_FIRST(l1));
    }
    PRK_REST(l4) = l2;
    return l3;
  }
}

/************************* prk_append_to_list ************************ prk_append_to_list will create a copy of the list (l) and will create
  and append a new list containing only the given object (o) to the
  end of the copy.  It will return the new list (the head of the copy).

***************************************************************/

USER_EXPORT PrkList prk_append_to_list(PrkList l, PrkType o)
{
  USER_ASSERT_TYPE(l, PrkListTag, PrkListAppend1);
  if (Null(l))
    return prk_ncons(o);
  else {
    PrkList l2 = prk_ncons(PRK_FIRST(l));
    PrkList l3 = l2;
    for (; !Null(l = PRK_REST(l));) {
      USER_ASSERT_TYPE(l, PrkListTag, PrkListAppend1);
      l3 = PRK_REST(l3) = prk_ncons(PRK_FIRST(l));
    }
    PRK_REST(l3) = prk_ncons(o);
    return l2;
  }
}

/*************************** PrkDestructiveAppendLists **************

PrkDestructiveAppendLists will concatenate list l1 with list l2,
  simply appending l2 to the end of l1.  It will return the new list (l1).

***************************************************************/

USER_EXPORT PrkList PrkDestructiveAppendLists(PrkList l1, PrkList l2)
{
  USER_ASSERT_TYPE(l1, PrkListTag, PrkListNConc);
  USER_ASSERT_TYPE(l2, PrkListTag, PrkListNConc);
  if (Null(l1))
    return l2;
```

```
      else {
        PrkList l3 = l1;
        PrkList l4;
        while (!Null(l4 = PRK_REST(l3))) {
          USER_ASSERT_TYPE(l4, PrkListTag, PrkListNConc);
          l3 = l4;
        }
        PRK_REST(l3) = l2;
        return l1;
      }
    }

/************************* prk_list_ptr_equal ************************* prk_list_ptr_equal will return TRUE if the two list arguments contain the
  same elements, or FALSE if they differ or are not valid lists.

*******************************************************************/
/* Does not rely on type of arguments or if they are PrkNil terminated lists */

PrkBool prk_list_ptr_equal(PrkList l1, PrkList l2)
{
  while (!Null(l1)) {
    if (Null(l2) || !PrkIsList(l1) || !PrkIsList(l2) || PRK_FIRST(l1) != PRK_FIRST(
      return FALSE;
    l1 = PRK_REST(l1);
    l2 = PRK_REST(l2);
  }
  return Null(l2);
}

/************************* prk_list_equal ************************* prk_list_equal will return TRUE if the two list arguments contain the
  same elements, or FALSE if they differ or are not valid lists.  This
  function differs from prk_list_ptr_equal in that prk_list_equal
  considers objects of equal content but different pointers equal.

*******************************************************************/
/* Does not rely on type of arguments or if they are PrkNil terminated lists */

PrkBool prk_list_equal(PrkList l1, PrkList l2)
{
  while (!Null(l1)) {
    if (Null(l2) || !PrkIsList(l1) || !PrkIsList(l2) ||
        !prk_is_equal(PRK_FIRST(l1),PRK_FIRST(l2)))
      return FALSE;
    l1 = PRK_REST(l1);
    l2 = PRK_REST(l2);
  }
  return Null(l2);
}

/* check for valid list or PrkNil */
PrkBool prko_is_valid_list(PrkList lst)
{
  PrkList l = lst;
  PrkList l2 = lst;

while (1) {
    if (l == PrkNil)
      return(TRUE);
    else if (PrkIsList((PrkType)l)) {
      if (prk_is_valid_type((PrkType)l)) {
        l = PRK_REST(l);
        if (!Null(l2) && PrkIsList((PrkType)l2) &&
            prk_is_valid_type((PrkType)l2)) {
          l2 = PRK_REST(l2);
          if (!Null(l2) && PrkIsList((PrkType)l2) &&
              prk_is_valid_type((PrkType)l2))
            l2 = PRK_REST(l2);
```

```c
        }
        if (!Null(l) && (l == l2))
            return(TRUE);
    }
    else
        break;
    }
    else
        return(TRUE);         /* assume dotted pair */
    }
    return(FALSE);
} ifdef MSDOS
undef PrkMakeStackList

PrkList PrkMakeStackList(PrkType a1, PrkType a2, PrkType a3, PrkType a4,
                         PrkType a5, PrkType a6, PrkType a7, PrkType a8,
                         PrkType a9, PrkType a10, PrkType a11, PrkType a12)
{
    return(PrkMakeList(a1,a2,a3,a4,a5,a6,a7,a8,a9,a10,a11,a12));
} endif

/*
   file: object.c
*/
static const char rcsid[] = "$Header: /tmp_mnt/net/op/prokee/src/generic/om/substra include <int_objm.ih> static CONST char *prk_inheritance_strings[PRK_FROLE_COUNT] = {
    "PrkMVNoInheritance",
    "PrkSVNoInheritance",
    "PrkMethodInheritance",
    "PrkMVInitialInheritance",
    "PrkSVInitialInheritance",
    "PrkMVOverrideInheritance",
    "PrkSVOverrideInheritance",
    "PrkSelfLastUnionInheritance",
    "PrkSelfFirstUnionInheritance",
    "PrkDefaultCreationInheritance",
    "PrkMonitorInheritance"
};

CONST char *prk_get_inheritance_cstring(PrkInheritance role)
{
    return PRK_IS_USER_DEFINED_INHERITANCE(role) ? "user defined" :
            prk_inheritance_strings[(u_short)role];

}

CONST char *prk_get_finheritance_cstring(PrkInheritance frole)
{
    return PRK_IS_USER_DEFINED_FINHER(frole) ? "user defined" :
            prk_inheritance_strings[(u_short)frole];

} static CONST char *prk_sc_strings[PRK_FROLE_COUNT] = {
    "PrkDefaultSlotType",
    "PrkLockedSlotType",
    "PrkSubclassSlotType",
    "PrkOwnSlotType",
    "PrkSparseSlotType"
};

char *prk_get_sc_cstring(PrkSlotFlags sc)
{
    return (sc <= PrkSparseSlotType ? prk_sc_strings[(u_short)sc] :
            "(Invalid storage class)");
```

```c
}

USER_EXPORT PrkBool PrkIsAnonymousObject(PrkObject object)
{
  USER_ASSERT_TYPE(object, PrkObjectTag, PrkIsAnonymousObject);

return !PrkIsSymbol(PRK_OBJECT_NAME(object));
}

PrkObject prk_find_anon_object_internal(PrkBool class_p,
                                        PrkFixnum anon_object_num,
                                        PrkObject object)
{
  PrkList l;
  PrkSat sat;
  ASSERT_TYPE(object, PrkObjectTag, prk_find_anon_object_internal);
  ASSERT(!PRK_IS_INSTANCE(object), prk_find_anon_object_internal);
  sat = PRK_OBJECT_SAT(object);
  l = class_p ?
    PRK_SAT_SUBCLASSES(sat,PRK_SAT_HASH_TABLE_SIZE(sat)) :
      PRK_SAT_INSTANCES(sat,PRK_SAT_HASH_TABLE_SIZE(sat));
  for (; !Null(l); l = PRK_REST(l)) {
    object = (PrkObject) PRK_FIRST(l);
    if (PRK_OBJECT_NAME(object) == (PrkSymbol)anon_object_num)
      return(object);
  }
  return PRK_FIND_OBJECT_NULL_RESULT;
}

PrkObject prk_find_anonymous_object(PrkBool class_p,PrkFixnum anon_object_num,
                                    PrkType parents_list_or_object)
{
  PrkList l,prnts;

PrkObject object;
  PrkSat sat;
  if (PrkIsList(parents_list_or_object)) {
    prnts = (PrkList)parents_list_or_object;
    for (; !Null(prnts); prnts = PRK_REST(prnts)) {
      if ((object = prk_find_anon_object_internal(class_p,anon_object_num,
                      (PrkObject)PRK_FIRST(prnts))) != PRK_FIND_OBJECT_NULL_RES
        return(object);
    }
  }
  else
    return(prk_find_anon_object_internal(class_p,anon_object_num,
                                         (PrkObject)PRK_FIRST(prnts)));
  return PRK_FIND_OBJECT_NULL_RESULT;
}

PrkObject prk_require_object(PrkSymbol object_name, PrkApp app)
{
  PrkObject o = PrkFindObject(object_name, app);
  if (o == PRK_FIND_OBJECT_NULL_RESULT)
    PrkSignalException(PrkExcNonExistentObject, object_name);
  return o;
}

CONST static prk_object_flags_t default_object_flags =
    { TRUE,                        /* instance_p_ */
      FALSE,                       /* deleted_p_ */
      FALSE,                       /* locked_p_ */
      FALSE,                       /* loaded_p_ */
      FALSE,                       /* exported_p_ */
      TRUE,                        /* same_module_parents_p_ */
      FALSE,                       /* value_modified_p_ */
      FALSE,                       /* gc_mark_p_ */
      FALSE,                       /* structure_modified_p_ */
      FALSE,                       /* monitor_p_ */
      FALSE,                       /* object_mark_p_ */
      FALSE,                       /* monitor_present_p_ */
      FALSE,                       /* module_p_ */
      FALSE,                       /* app_p_ */
```

```
        0,                              /* dummy - expansion */
        FALSE,                          /* system_object_p_ */
#ifdef OBJ_EVENTS
        FALSE,                          /* value_interest */
        FALSE,                          /* structure_interest */
#endif /* OBJ_EVENTS */
        0                               /* sparse_array_length */
    };

PrkObject prk_internal_make_object(PrkSymbol new_name, PrkModule module, PrkBool ir
{
    PrkObject object = (PrkObject)prk_make_untagged_object((size_t)sizeof(struct PRK_
                                    PrkObjectTag);

ASSERT_TYPE(object, PrkObjectTag, prk_internal_make_object);
    ASSERT(PrkIsSymbol(new_name) || PrkIsFixnum(new_name), prk_internal_make_object);
    PRK_OBJECT_NAME(object) = new_name;
    PRK_OBJECT_ATTRIBUTES(object) = PrkNil;
    PRK_OBJECT_MODULE(object) = module;
    PRK_OBJECT_FLAGS(object) = default_object_flags;
    PRK_IS_INSTANCE(object) = instance_p;
    PRK_OBJECT_SAT(object) = NullSat;
    PRK_OBJECT_SPARSE_VALUE_ARRAY(object) = PRK_OBJECT_VALUE_ARRAY(object) = (PrkType if (PrkIsSymbol(new_name) && (module != (PrkModule) PrkNull) && module)
        prk_add_cons_prop(&PRK_SYMBOL_ATTRIBUTES(new_name),
                        PRK_OBJECT_BACKPTR_PROP,
                        (PrkType)PrkMakeCons((PrkType) PRK_GET_APP(module),
                                    (PrkType) object));
    return object;
}

USER_EXPORT PrkSymbol PrkObjectName(PrkObject object)
{
    PrkSymbol s;

USER_ASSERT_TYPE(object, PrkObjectTag, PrkObjectName);
    s = PRK_OBJECT_NAME(object);
    return PrkIsFixnum(s) ? PrkAnonymousObjectName : s;
}

USER_EXPORT PrkBool PrkIsDeletedObject(PrkObject object)
{
    USER_ASSERT_TYPE(object, PrkObjectTag, PrkIsDeletedObject);
    return !!PRK_IS_DELETED_OBJECT(object);
}

USER_EXPORT PrkBool PrkIsLoadedObject(PrkObject object)
{
    USER_ASSERT_TYPE(object, PrkObjectTag, PrkIsLoadedObject);
    return !!PRK_IS_LOADED_OBJECT(object);
}

USER_EXPORT PrkBool PrkIsInstance(PrkObject object)
{
    USER_ASSERT_FULL_OBJECT(object, PrkIsInstance);
    return !!PRK_IS_INSTANCE(object);
}

USER_EXPORT PrkModule PrkObjectModule(PrkObject object)
{
    USER_ASSERT_TYPE(object, PrkObjectTag, PrkObjectMod);
    ASSERT_TYPE(PRK_OBJECT_MODULE(object), PrkObjectTag, PrkObjectMod);
    return PRK_OBJECT_MODULE(object);
}

USER_EXPORT PrkBool PrkIsSystemObject(PrkObject object)
{
    USER_ASSERT_TYPE(object, PrkObjectTag, PrkObjectMod);
    return !!PRK_IS_SYSTEM_OBJECT(object);
}
```

```c
USER_EXPORT void PrkSetSystemObject(PrkObject object)
{
  USER_ASSERT_TYPE(object, PrkObjectTag, PrkObjectMod);
  PRK_IS_SYSTEM_OBJECT(object) = TRUE;
}

USER_EXPORT void PrkResetSystemObject(PrkObject object)
{
  USER_ASSERT_TYPE(object, PrkObjectTag, PrkObjectMod);
  PRK_IS_SYSTEM_OBJECT(object) = FALSE;
}

PrkObject prk_find_object_wo_namespace(PrkSymbol name)
{
  PrkType result;
  PrkObject object;

ASSERT_TYPE(name, PrkSymbolTag, prk_find_object_wo_namespace);

result = prk_get_cons_prop(PRK_SYMBOL_ATTRIBUTES(name),
                             (PrkType)PRK_OBJECT_BACKPTR_PROP);
  if ((result == PrkNull) || Null((PrkList)result))
    return PRK_FIND_OBJECT_NULL_RESULT;

ASSERT_TYPE(result, PrkListTag, prk_find_object_wo_namespace);
  if (!Null(PRK_REST((PrkList) result))) {
    PrkSignalException(PrkExcNSMultipleObjError, name, result);
    return PRK_FIND_OBJECT_NULL_RESULT;
  }
  object = (PrkObject) PRK_REST((PrkList)PRK_FIRST((PrkList)result));
  if (PRK_IS_CORRUPTED_OBJECT(object)) {
    /* implies object is empty and its module is deleted (i.e., object is
       nogood) therefore remove the object from the plist */
    prk_rem_cons_prop((PrkList *) &PRK_SYMBOL_ATTRIBUTES(name),
                      PRK_OBJECT_BACKPTR_PROP);
    PRK_IS_DELETED_OBJECT(object) = TRUE;
    PRK_IS_LOADED_OBJECT(object) = TRUE;
    return PRK_FIND_OBJECT_NULL_RESULT;
  }
  return object;
}

USER_EXPORT PrkObject PrkFindObject(PrkSymbol object_name, PrkApp app)
{
  PrkObject object;

USER_ASSERT_TYPE(object_name, PrkSymbolTag, PrkFindObject);

if (!PrkNameSpaceActiveP) /* ignores app argument */
    object = prk_find_object_wo_namespace(object_name);
  else {
    if (PrkIsSymbol(app))
      app = PrkFindApp((PrkSymbol) app);
    if ((app == (PrkApp) PrkNull) || PRK_IS_DELETED_APP(app))
      return PRK_FIND_OBJECT_NULL_RESULT;
    USER_ASSERT(PRK_IS_APP(app), PrkFindObject);
    object = (PrkObject) prk_find_scoped_object(object_name, app,
                                                (PrkType)PRK_OBJECT_BACKPTR_PROP,
                                                FALSE, TRUE, TRUE);
  }
  if (object == PRK_FIND_OBJECT_NULL_RESULT)
    return object;

ASSERT(PrkIsObject(object) && !PRK_IS_DELETED_OBJECT(object), PrkFindObject);
  return object;
}

USER_EXPORT PrkApp PrkObjectApp(PrkObject object)
{
  USER_ASSERT_TYPE(object, PrkObjectTag, PrkObjectApp);
  return (PrkApp) (PRK_GET_APP(PRK_OBJECT_MODULE(object)));
```

```c
}

PrkBool prko_is_valid_object(PrkObject object)
{
  if (PrkIsObject((PrkType)object)) {
    if (prk_is_valid_type((PrkType)object)) {
      if (prko_is_valid_symbol(PRK_OBJECT_NAME(object)) ||
          PrkIsFixnum((PrkType)PRK_OBJECT_NAME(object)))
        return(TRUE);
    }
  }
  return(FALSE);
} void prk_init_object()
{
  PrkAnonymousObjectName = PrkMakeSymbol(" ...Anonymous Object... ");
}

/*
  file: rawsdata.c
*/
static const char rcsid[] = "$Header: /tmp_mnt/net/op/prokee/src/generic/om/substra include <int_objm.ih>

USER_EXPORT PrkRawSlotData PrkMakeRawSlotData(PrkType value, PrkSlotFlags flags, Pr
                                  PrkCollection facet_data)
{
  PrkRawSlotData rsd = (PrkRawSlotData)prk_make_tagged_object((size_t)sizeof(struct ASSERT_TYPE(rsd, PrkRawSlotDataTag, PrkMakeRawSlotData);

USER_ASSERT(PRK_IS_SLOT_ROLE(role), PrkMakeRawSlotData);

if (!PrkIsCollection(facet_data))
    USER_ASSERT_TYPE(facet_data, PrkListTag, PrkMakeRawSlotData);
  PRK_RAW_SLOT_DATA_VALUE(rsd) = value;
  PRK_RAW_SLOT_DATA_FLAGS(rsd) = flags;
  PRK_RAW_SLOT_DATA_ROLE(rsd)  = role;
  PRK_RAW_SLOT_FACET_DATA(rsd) = facet_data;

return rsd;
} void prk_init_rawslotdata()
{
  PrkDefaultRawSlotData = PrkMakeRawSlotData(PrkNull,
                                             PrkDefaultSlotDataFlags,
                                             PrkDefaultCreationInheritance,
                                             (PrkCollection)PrkNil);
  PrkDefaultInheritance      = PrkSVOverrideInheritance;
  PrkRawSlotDataDefaultFlags = PrkDefaultSlotType;
  PrkRawSlotDataDefaultInherit = PrkDefaultCreationInheritance;
  PrkRawSlotDataDefaultFacets = (PrkCollection) PrkNil;
}

/*
  file: sat.c
*/
static const char rcsid[] = "$Header: /tmp_mnt/net/op/prokee/src/generic/om/substra include <int_objm.ih>

PrkSat prk_allocate_sat(PrkBool instance_p, sat_hash_index_t hash_table_size)
{
  PrkSat sat = prk_internal_allocate_sat(instance_p, hash_table_size);
  int index;

ASSERT(PRK_IS_SAT(sat), prk_allocate_sat);
```

```
  index = PRK_SAT_HASH_TABLE_SIZE(sat) = (sat_hash_index_t)(1 << hash_table_size );

for (; index >= 0; index--)
    PRK_SAT_HASH_BUCKET(sat, index) = PrkNil;

PRK_SAT_PARENTS(sat) = PrkNil;

if (!instance_p) {
    index = PRK_SAT_HASH_TABLE_SIZE(sat);
    PRK_SAT_CLASS_PARENTS(sat, index) =
      PRK_SAT_SUBCLASSES(sat, index) =
        PRK_SAT_INSTANCES(sat, index) =
          PRK_SAT_MULTI_SATS(sat, index) = PrkNil;
    PRK_SAT_INSTANCE_SAT(sat, index) = NullSat;
  } return sat;
} define MAX_SAD_COUNT_LOOKUP 70 static const unsigned char sd_table[] = {
  0,
  0, 1, 2, 2, 3, 3, 3, 3,
  4, 4, 4, 4, 4, 4, 4, 4,
  5, 5, 5, 5, 5, 5, 5, 5,
  5, 5, 5, 5, 5, 5, 5, 5,
  6, 6, 6, 6, 6, 6, 6, 6,
  6, 6, 6, 6, 6, 6, 6, 6,
  6, 6, 6, 6, 6, 6, 6, 6,
  6, 6, 6, 6, 6, 6, 6, 6,
  6, 6, 6, 6, 6, 6
};

unsigned prk_hash_table_size(unsigned sd_count)
{
  return (sd_count <= MAX_SAD_COUNT_LOOKUP) ? sd_table[sd_count] : 7;
} void prk_copy_sat(PrkSat sat, PrkSat new_sat, PrkBool instance_p)
{
  unsigned hts;
  unsigned new_hts;
  int index;
  unsigned new_mask;
  PrkList bucket;
  PrkSd sd;

ASSERT(PRK_IS_SAT(sat), prk_copy_sat);
  ASSERT(PRK_IS_SAT(new_sat), prk_copy_sat);

hts = PRK_SAT_HASH_TABLE_SIZE(sat);
  new_hts = PRK_SAT_HASH_TABLE_SIZE(new_sat);
  new_mask = new_hts - 1;

for (index = new_mask; index >= 0; index--)
    PRK_SAT_HASH_BUCKET(new_sat, index) = PrkNil;

for (index = hts - 1; index >= 0; index--)
    for (bucket = PRK_SAT_HASH_BUCKET(sat, index);
         !Null(bucket);
         bucket = PRK_REST(bucket)) {
      ASSERT_TYPE(bucket, PrkListTag, prk_copy_sat);

sd = (PrkSd)PRK_FIRST(bucket);

ASSERT_TYPE(sd, PrkSdTag, prk_copy_sat);

switch (PRK_SD_SLOT_TYPE(sd)) {
      default:
        ASSERT_NEVER_REACHED(prk_copy_sat);
        break;
```

```
      case PrkOwnSlotType:
        break;
      case PrkSubclassSlotType:
        if (instance_p)
          break;

case PrkLockedSlotType:
      case PrkDefaultSlotType:
      case PrkSparseSlotType:
        PrkAddListPtrElmt((PrkType)sd,
                  &PRK_SAT_HASH_BUCKET(new_sat, PRK_SD_NAME_HASH_INDEX(PRK_SD
      }
    }
} void prk_copy_into_isat(PrkSat source_sat, PrkSat isat)
{
  ASSERT_TYPE(source_sat, PrkCSatTag, prk_copy_into_isat);
  ASSERT_TYPE(isat, PrkISatTag, prk_copy_into_isat);
  PRK_SAT_PARENTS(isat) = PRK_SAT_PARENTS(source_sat);
  PRK_SAT_CHUNK_END(isat) =
    PRK_SAT_SUBCLASS_END(isat) =
      PRK_SAT_DEFAULT_END(isat) = PRK_SAT_DEFAULT_END(source_sat);
  PRK_SAT_CHUNK_ARRAY_SIZE(isat) =
    PRK_SAT_CHUNK_END(isat) + PRK_DEFAULT_VA_FUDGE_FACTOR;
  PRK_SAT_LOCKED_END(isat) = PRK_SAT_LOCKED_END(source_sat);
  prk_copy_sat(source_sat,isat,TRUE);
}

PrkSat prk_instance_sat_from_class_sat(PrkSat sat)
{
  int hash_table_size;
  PrkSat isat;

ASSERT(PRK_IS_SAT(sat), prk_instance_sat_from_class_sat);

hash_table_size = PRK_SAT_HASH_TABLE_SIZE(sat);
  isat = PRK_SAT_INSTANCE_SAT(sat, hash_table_size);

if (isat == NullSat) {
    PRK_SAT_INSTANCE_SAT(sat, hash_table_size) =
      isat = prk_allocate_sat(TRUE, prk_hash_table_size((unsigned)hash_table_size))
    ASSERT_TYPE(isat, PrkISatTag, prk_instance_sat_from_class_sat);
    prk_copy_into_isat(sat, isat);
  }
  else
    ASSERT_TYPE(isat, PrkISatTag, prk_instance_sat_from_class_sat);
  return isat;
} void prk_init_sat()
{
  PrkSat sat = prk_allocate_sat(TRUE, (sat_hash_index_t)PRK_DEFAULT_SAT_HASH_SIZE);

ASSERT_TYPE(sat, PrkISatTag, init_sat);

PRK_SAT_CHUNK_END(sat) = PRK_SAT_LOCKED_END(sat) = PRK_SAT_DEFAULT_END(sat) = PRK
  PRK_SAT_CHUNK_ARRAY_SIZE(sat) = PRK_DEFAULT_VA_FUDGE_FACTOR;
  empty_sat = sat;
}

/*
  file: sb_data.c
*/
static const char rcsid[] = "$Header: /tmp_mnt/net/op/prokee/src/generic/om/substra include <int_objm.ih>

/******************************************************************/
/*    All global variables which are potentially garbage-collectable
      should be defined below the definition of
```

```
    the GLOBAL VARIABLE:  prk_gc_substrate_data_start
    and above the definition of
    the GLOBAL VARIABLE: prk_gc_substrate_data_end

MAKE SURE THAT ALL THE GLOBALS ARE INITIALIZED. */ char *prk_gc_substrate_data_start = NULL;

/* methspec.c */

PrkMethod PrkNullMethod = NULL;

/* rawfdata.c */

PrkRawFacetData PrkDefaultRawFacetData = NULL;

/* rawsdata.c */

PrkRawSlotData PrkDefaultRawSlotData = NULL;
PrkCollection PrkRawSlotDataDefaultFacets = NULL;

/* sab_meth.c */

PrkList *prk_method_ht; /* explicit GC protect is done */
void **prk_method_at;
u_long prk_method_addr_max;

/* sat.c */

PrkSat empty_sat = NULL;

/* string.c */

PrkString PrkNullString = NULL;

/* symbol.c */

PrkSymbol PrkNullSymbol = NULL;

/* modulepgmgmt.c */

PrkList PrkKbPageMgmtList = PrkNil;
PrkList PrkTTPageMgmtList = PrkNil;

/* misc. */

PrkList
  PrkSmallMonitorParent = PrkNil,
  PrkLargeMonitorParent = PrkNil;

PrkBool PrkDefaultPtrP = FALSE;
PrkBool PrkDefaultAllP = FALSE;

char *prk_gc_substrate_data_end = NULL;

/****************************************************************/

/* The value is apropriately set by object manager. */
char *prk_gc_objmgr_data_start = NULL;
char *prk_gc_objmgr_data_end = NULL;

/****************************************************************/

/* app.c */

PrkSymbol prk_default_object_type;
PrkSymbol prk_app_class_name;
PrkApp prk_app_class_object;

PrkSymbol prk_objmgr_app_name;
PrkApp prk_objmgr_app_object;
```

```c
/* exceptn.c */

PrkExcNode *PrkFreeExcNodeList = PRK_NULL_EXC_LIST;
PrkExcHandlerFn PrkDfltExcHandlerTbl[PRK_MAX_EXCEPTIONS];
PrkExcNode *PrkExcHandlerTbl[PRK_MAX_EXCEPTIONS];
PrkException PrkExcParentTbl[PRK_MAX_EXCEPTIONS];
PrkException PrkRootException, PrkSystemException;
FILE *PrkStdExcOut;
FILE *PrkStdExcIn;
PrkException PrkNextExc;
PrkException PrkExcDefaultParent;
PrkExcHandlerFn PrkExcDefaultHandler;
PrkExcHandlerFn PrkExcDefaultUnbindHandler;
jmp_buf *PrkEnvStack;
PrkUWPStruct *ESPrkEnvStack;
int prk_reset_in_progress_p = 0;

/* Unix Compatible System Exception Condition Ids */

PrkException PrkExcSIGHUP;       /* hangup */
PrkException PrkExcSIGINT;       /* interrupt */
PrkException PrkExcSIGQUIT;      /* quit */
PrkException PrkExcSIGILL;       /* illegal instruction (not reset when caught) */
PrkException PrkExcSIGTRAP;      /* trace trap (not reset when caught) */
PrkException PrkExcSIGIOT;       /* IOT instruction */
PrkException PrkExcSIGEMT;       /* EMT instruction */
PrkException PrkExcSIGFPE;       /* floating point exception */
PrkException PrkExcSIGKILL;      /* kill (cannot be caught or ignored) */
PrkException PrkExcSIGBUS;       /* bus error */
PrkException PrkExcSIGSEGV;      /* segmentation violation */
PrkException PrkExcSIGSYS;       /* bad argument to system call */
PrkException PrkExcSIGPIPE;      /* write on a pipe with no one to read it */
PrkException PrkExcSIGALRM;      /* alarm clock */
PrkException PrkExcSIGTERM;      /*software termination signal from kill */
PrkException PrkExcSIGURG;       /* urgent condition on IO channel */
PrkException PrkExcSIGSTOP;      /* sendable stop signal not from tty */
PrkException PrkExcSIGTSTP;      /* stop signal from tty */
PrkException PrkExcSIGCONT;      /* continue a stopped process */
PrkException PrkExcSIGCHLD;      /* to parent on child stop or exit */
PrkException PrkExcSIGCLD;       /* System V name for SIGCHLD */
PrkException PrkExcSIGTTIN;      /* to readers pgrp upon background tty read */
PrkException PrkExcSIGTTOU;      /* like TTIN for output if (tp->t_local<OSTOP) */
PrkException PrkExcSIGIO;               /* input/output possible signal */
PrkException PrkExcSIGPOLL;      /* System V name for SIGIO */
PrkException PrkExcSIGXCPU;      /* exceeded CPU time limit */
PrkException PrkExcSIGXFSZ;      /* exceeded file size limit */
PrkException PrkExcSIGVTALRM;    /* virtual time alarm */
PrkException PrkExcSIGPROF;      /* profiling time alarm */
PrkException PrkExcSIGWINCH;     /* window changed */
PrkException PrkExcSIGLOST;      /* resource lost (eg, record-lock lost) */
PrkException PrkExcSIGUSR1;      /* user defined signal 1 */
PrkException PrkExcSIGUSR2;      /* user defined signal 2 */

/* substrate exception IDs */

PrkException
  PrkExcSubstrateRoot,
  PrkExcIllegalArg,
  PrkExcUnexpectedType,
  PrkExcUnexpectedUserType,
  PrkExcNumberExpected,
  PrkExcZeroDivide,
  PrkExcCollectionExpected,
  PrkExcStringableExpected,
  PrkExcAssertionFailure,
  PrkExcFullObjectFailure,
  PrkExcFullMonitorFailure,
  PrkExcFullAppFailure,
  PrkExcFullModFailure,
  PrkExcFullAppOrModFailure,
  PrkExcUserAssertionFailure,
  PrkExcUserFullObjectFailure,
  PrkExcUserFullMonitorFailure,
```

```c
    PrkExcUserFullAppFailure,
    PrkExcUserFullModFailure,
    PrkExcUserFullAppOrModFailure,
    PrkExcArrayRoot,
    PrkExcArrayAccess,
    PrkExcLineReached,
    PrkExcSubstrateExit,
    PrkExcSubstrateForceExit,
    PrkExcNotYetDoneUsage,
    PrkExcNonExistentObject,
    PrkExcNonExistentMonitor,
    PrkExcNonExistentModule,
    PrkExcNonExistentApp,
    PrkExcQueryType,
    PrkExcGCRoot,
    PrkExcGCSbrkError,
    PrkExcGCExpandMsg,
    PrkExcGCExpandLimitError,
    PrkExcGCFreeAlreadyFreeError,
    PrkExcGCFreeNonAllocError,
    PrkExcGCTooBigChunkError,
    PrkExcGCStartMsg,
    PrkExcGCEndMsg,
    PrkExcGCNotEnoughMemError,
    PrkExcGCMallocSizeError,
    PrkExcNSMultipleObjError,
    PrkExcUnimplemented,
    PrkExcPutOMMsg;

/* This is used by event manager and the
   substrate exception:
*/
int prk_handling_xevents_p = 0;
jmp_buf prk_xevent_handler_env;

/* list.c */

/*********************** PrkPrintLength ************************

PrkPrintLength is a user-setable global variable which contains the
  number of leading list/array elements to show before "..." when
  printing a list/array.  A PrkPrintLength = 0 indicates no restriction
  on number of elements to print.

***************************************************************/ unsigned PrkPrintLength = 10;

/********************* PrkPrintDepth **********************

PrkPrintDepth is a user-setable global variable which contains the
  allowable depth in printing nested lists/arrays.  If the depth is
  exceeded, a "&" will be printed instead of the nested object.  A
  PrkPrintDepth = 0 indicates no restriction on depth of elements to
  print.

***************************************************************/ unsigned PrkPrintDepth = 10;
    /* mod.c */

/* rawfdata.c */

PrkFacetInheritance PrkDefaultFacetInheritance = PrkSVOverrideInheritance;
PrkBool PrkRawFacetDataDefaultStaticP;
PrkFacetInheritance PrkRawFacetDataDefaultInherit;

/* rawsdata.c */

PrkSlotFlags PrkDefaultSlotDataFlags = PRK_SD_DEFAULT_FLAGS;
```

```c
PrkInheritance PrkDefaultInheritance = PrkSVOverrideInheritance;
PrkSlotFlags PrkRawSlotDataDefaultFlags;
PrkInheritance PrkRawSlotDataDefaultInherit;

/* symbol.c */
u_long prk_symbol_hash_table_size;
u_long prk_symbol_count;
PrkSymbol *prk_symbol_hash_table;
PrkBool prk_symbol_ht_expand_p = TRUE;
PrkSymbol prk_null_symbol;

/* object.c */

PrkSymbol PrkAnonymousObjectName;
#ifndef NDEBUG
PrkBool PrkPrintVerboseP = FALSE;
#endif /* NDEBUG */
PrkBool PrkNameSpaceActiveP = FALSE;
char prk_substrate_initialized_p = FALSE;

/* gc.c */

/* User Globals */
PrkBool PrkIsOnMM;              /* T implies, do GC */
PrkBool PrkIsQuietMM;           /* T implies, do GC quietly */
PrkBool PrkIsVerboseMM;         /* T implies, do GC Verbosely */
PrkBool PrkIsMMRealtime;        /* T implies, GC in realtime mode */
float PrkMemoryExpandFactor;
float PrkMMThresholdFactor;
long PrkMemoryGrowthLimit;

/* uwp.c */

PrkLevelType *current_prk_breaklevel = NULL;
PrkBool PrkIsNewEHActive = TRUE;

/*
   file: sd.c
*/
static const char rcsid[] = "$Header: /tmp_mnt/net/op/prokee/src/generic/om/substra include <int_objm.ih>

PrkSd *prk_maybe_get_sd_ptr(PrkSymbol name, PrkSat sat)
{
  PrkList bucket;
  PrkSd sd;

ASSERT_TYPE(name, PrkSymbolTag, prk_get_sd_ptr);
  ASSERT(PRK_IS_SAT(sat), prk_get_sd_ptr);

bucket = PRK_FETCH_SAD_BUCKET(sat, name);

for (; !Null(bucket); bucket = PRK_REST(bucket)) {

ASSERT_TYPE(bucket, PrkListTag, prk_maybe_get_sd_ptr);
    ASSERT_TYPE(PRK_FIRST(bucket), PrkSdTag, prk_maybe_get_sd_ptr);

if (PRK_SD_NAME((PrkSd)PRK_FIRST(bucket)) == name)
      return &(PrkSd)PRK_FIRST(bucket);
  } return (PrkSd *)0;
}

PrkSd *prk_get_sd_ptr(PrkSymbol name, PrkSat sat, PrkObject object)
{
  register PrkList *bucket;
```

```c
  PrkList match;
  PrkSd sd;

ASSERT_TYPE(name, PrkSymbolTag, prk_get_sd_ptr);
  ASSERT(PRK_IS_SAT(sat), prk_get_sd_ptr);
  ASSERT_TYPE(object, PrkObjectTag, prk_get_sd_ptr);

bucket = &PRK_FETCH_SAD_BUCKET(sat, name);

for (match = *bucket; !Null(match); match = PRK_REST(match)) {

ASSERT_TYPE(match, PrkListTag, prk_get_sd_ptr);
    ASSERT_TYPE(PRK_FIRST(match), PrkSdTag, prk_get_sd_ptr);

if (PRK_SD_NAME((PrkSd)PRK_FIRST(match)) == name)
      return &(PrkSd)PRK_FIRST(match);
  }

PRK_MAKE_SAD(sd, object, name);

return &(PrkSd)PRK_FIRST(PrkAddListPtrElmt((PrkType)sd, bucket));
}

USER_EXPORT PrkSymbol PrkSdName(PrkSd sd)
{

USER_ASSERT_TYPE(sd, PrkSdTag, PrkSdName);

return PRK_SD_NAME(sd);
}

/*
  file: symbol.c
*/
static const char rcsid[] = "$Header: /tmp_mnt/net/op/prokee/src/generic/om/substra include <prokee/int_sbst.ih>
include <prokee/cmn_objm.ih> define PRK_INITIAL_SYMBOL_HT_SIZE (2048) /* Should always be 2**x */ ifdef MSDOS
pragma intrinsic (memcmp,memcpy)
endif define HASH_SYMBOL_FOR_BUCKET(symbol_name, bucket) \
  { \
    register u_long index = 0; \
    register u_short c; \
    register char *str = (char *) symbol_name; \
  \
    while (c = *str++) { \
      index = index * PRK_HASH_FACTOR + c + 1;\
      char_count++; \
    } \
  \
    bucket = prk_symbol_hash_table + (index % prk_symbol_hash_table_size); \
  } void prk_free_symbol_ht(PrkSymbol *old_sht, u_long old_size)
{
#ifdef PRK_GC_LOADED
  u_long len;

if ((len = old_size*sizeof(PrkSymbol)) <= PAGESIZE)
    prk_gc_add_free_page((u_char *) old_sht);
  else if (len <= SEGMENTSIZE)
    prk_gc_add_free_segment((u_char *) old_sht);
  /* should be able to reuse the chunk ??? */
```

```c
#else
    free(old_sht);
#endif
}

PrkSymbol *prk_make_symbol_ht(u_long size, PrkBool initp)
{
#ifdef PRK_GC_LOADED
    u_long len, i;
    PrkSymbol *sht;
    if ((len = size*sizeof(PrkSymbol)) <= PAGESIZE)
        sht = (PrkSymbol *) prk_gc_get_free_page(TRUE);
    else if (len <= SEGMENTSIZE)
        sht = (PrkSymbol *) prk_gc_get_free_segment();
    else {
        u_long req_size = size * sizeof(PrkSymbol);

sht = (PrkSymbol *) prk_gc_get_sbrk_chunk((long *)&req_size, FALSE);
        if (size * sizeof(PrkSymbol) != req_size)
            return NULL;
    }
else
    PrkSymbol *sht;
    u_long i;
    sht = (PrkSymbol *)malloc(size * sizeof(PrkSymbol));
endif if (initp)
        for (i=0; i < size;)
            sht[i++] = NULL;
    return sht;
} void prk_resize_symbol_ht(u_long size)
{
    PrkSymbol *old_sht = prk_symbol_hash_table;
    u_long i, old_size = prk_symbol_hash_table_size;
    PrkSymbol symbols;

prk_symbol_hash_table = prk_make_symbol_ht(size, TRUE);
    if (!prk_symbol_hash_table) { /* No Memory to increase the HT */
        prk_symbol_ht_expand_p = FALSE;
        return;
    }
    prk_symbol_hash_table_size = size;
    prk_symbol_count = 0;
    for (i=0; i < old_size;) {
        symbols = old_sht[i++];
        while (symbols) {        /* add to the symbol table */
            PrkSymbol *bucket, sym;
            u_int char_count = 1;

ASSERT_TYPE(symbols, PrkSymbolTag, prk_resize_symbol_ht);
            sym = symbols;
            symbols = PRK_SYMBOL_NEXT(symbols);
            HASH_SYMBOL_FOR_BUCKET(PRK_SYMBOL_CSTRING(sym), bucket);
            PRK_SYMBOL_NEXT(sym) = *bucket;
            *bucket = sym;
        }
    }
    prk_free_symbol_ht(old_sht, old_size);
}

USER_EXPORT PrkSymbol PrkMakeSymbol(char *symbol_name)
{

PrkSymbol s, *symbol_ptr;
    u_int char_count = 1;

USER_ASSERT(symbol_name != NULL, PrkMakeSymbol);
    USER_ASSERT_STRING(symbol_name, PrkMakeSymbol);
```

```c
include <prokee/findsym.ih> s = (PrkSymbol)prk_make_untagged_object((size_t)sizeof(struct PRK_SYMBOL_STRUCT),
                                          PrkSymbolTag);
  ASSERT_TYPE(s, PrkSymbolTag, PrkMakeSymbol);
  PRK_SYMBOL_ATTRIBUTES(s) = PrkNil;
  PRK_SYMBOL_NEXT(s) = (PrkSymbol)0; /* in case of GC in next line, we won't
                                        initialize char count or char *because
                                        GC ignores those fields. */
#ifndef PRK_GC_LOADED
  PRK_SYMBOL_CSTRING(s) =
    (char *)memcpy((char *)PRK_GC_MALLOC((PRK_SYMBOL_CHAR_COUNT(s) = char_count)),
                   symbol_name,
                   char_count);
#else
  PRK_SYMBOL_CSTRING(s) =
    (char *)memcpy((char *)PrkPermanentMalloc((PRK_SYMBOL_CHAR_COUNT(s) = char_coun
                   symbol_name,
                   char_count);
#endif /* PRK_GC_LOADED */
  *symbol_ptr = s;
  if ((++prk_symbol_count > prk_symbol_hash_table_size) && prk_symbol_ht_expand_p)
    prk_resize_symbol_ht(prk_symbol_hash_table_size*2);
  return s;
}

/*
  PrkFindSymbol would be useful in the case where an end-user wants to
  see if a symbol exists, and only if it does, do a PrkGetValue or a
  PrkFindObject.  It would save unnecessary interning of spurious
  symbols.
*/

USER_EXPORT PrkSymbol PrkFindSymbol(char *symbol_name)
{
  PrkSymbol s, *symbol_ptr;
  u_int char_count = 1;

USER_ASSERT(symbol_name != NULL, PrkFindSymbol);

include <prokee/findsym.ih> return (PrkSymbol)PrkNull;
} void prk_init_symbol()
{
  prk_symbol_hash_table = prk_make_symbol_ht(PRK_INITIAL_SYMBOL_HT_SIZE, TRUE);
  prk_symbol_hash_table_size = PRK_INITIAL_SYMBOL_HT_SIZE;
  prk_symbol_count = 0;
  prk_null_symbol = PrkMakeSymbol("(Null symbol)");
  PrkNullSymbol = prk_null_symbol;
}

/*
  file: type.c
*/
static const char rcsid[] = "$Header: /tmp_mnt/net/op/prokee/src/generic/om/substra include <prokee/int_sbst.ih> static CONST char *type_name_string [] =
{
  "fixnum",
  "list",
  "object",
  "",
  "fixnum",
  "symbol",
  "char",
```

```c
    "error",
    "single-float",
    "double-float",
    "array",
    "string",
    "raw-slot-datum",
    "raw-facet-datum",
    "C-value",
    "method",
    "slot-reference",
    "sd",
    "dynamic-facet",
    "instance-sat",
    "class-sat"
    };

CONST char PrkoObjectManagerString[] = "object manager";

USER_EXPORT CONST char *PrkTypeName(int type_num)
{
    return (type_num >= PRKS_SYSTEM_TAG_COUNT) ?
            "user-defined" : type_name_string[type_num];
} ifndef PRK_GC_LOADED

PrkType prk_internal_make_untagged_obj(size_t size, PrkImmediateTag type)
{
    return (PrkType)((u_long)memalign(8, size) + type);
}

PrkType prk_internal_make_tagged_obj(size_t size, PrkSecondaryTag type)
{
    PrkType o = (PrkType)((u_long)memalign(8, size) + PrkNonImmediateTag);
    SET_PRK_OBJECT_SECONDARY_TAG(o, type);
    return o;
} endif /* PRK_GC_LOADED */

USER_EXPORT PrkType PrkGetProperty(PrkType o, PrkType prop)
{
    PrkList attributes;
    switch (PRK_OBJECT_IMMEDIATE_TAG(o)) {
    case PrkSymbolTag:
        attributes = PRK_SYMBOL_ATTRIBUTES((PrkSymbol)o);
        break;

case PrkObjectTag:
        attributes = PRK_OBJECT_ATTRIBUTES((PrkObject)o);
        break;

case PrkNonImmediateTag:
        switch (PRK_OBJECT_SECONDARY_TAG(o)) {
        }
                                    /* fall through */
    default:
        prk_object_prop_error(o);
    } common_code:
    ASSERT_TYPE(attributes, PrkListTag, PrkGetProperty);
    return prk_get_cons_prop(attributes, prop);
}

USER_EXPORT PrkType PrkSetProperty(PrkType o, PrkType prop, PrkType value)
{
    PrkList *attributes;

switch (PRK_OBJECT_IMMEDIATE_TAG(o)) {
    case PrkSymbolTag:
```

```
    attributes = &PRK_SYMBOL_ATTRIBUTES((PrkSymbol)o);
    break;

case PrkObjectTag:
    attributes = &PRK_OBJECT_ATTRIBUTES((PrkObject)o);
    break;

case PrkNonImmediateTag:
    switch (PRK_OBJECT_SECONDARY_TAG(o)) {
    }
                              /* fall through */
  default:
    prk_object_prop_error(o);
  } common_code:
  ASSERT_TYPE(*attributes, PrkListTag, PrkSetProperty);
  return prk_put_cons_prop(attributes, prop, value);
}

USER_EXPORT PrkType PrkRemoveProperty(PrkType o, PrkType prop)
{
  PrkList *attributes;

switch (PRK_OBJECT_IMMEDIATE_TAG(o)) {
  case PrkSymbolTag:
    attributes = &PRK_SYMBOL_ATTRIBUTES((PrkSymbol)o);
    break;

case PrkObjectTag:
    attributes = &PRK_OBJECT_ATTRIBUTES((PrkObject)o);
    break;

case PrkNonImmediateTag:
    switch (PRK_OBJECT_SECONDARY_TAG(o)) {
    }
                              /* fall through */
  default:
    prk_object_prop_error(o);
  } common_code:
  ASSERT_TYPE(*attributes, PrkListTag, PrkObjectRemProp);
  return prk_rem_cons_prop(attributes, prop);
}

/* compare two objects by contents */

USER_EXPORT PrkBool prk_is_equal(PrkType o1, PrkType o2)
{
  if (o1 == o2)
    return(TRUE);
  else
  {
    int t = PrkGetType(o1);

if (t == PrkGetType(o2))
    {
      switch (t)
      {
        case PrkEvenFixnumTag:
        case PrkObjectTag:
        case PrkOddFixnumTag:
        case PrkSymbolTag:
        case PrkCharTag:
        case PrkErrorTag:
          return(FALSE);
        case PrkListTag:
          return(prk_list_equal((PrkList)o1,(PrkList)o2));
        case PrkSingleFloatTag:
          return(PRK_SINGLE_FLOAT((PrkSingleFloat)o1) ==
```

```
                    PRK_SINGLE_FLOAT((PrkSingleFloat)o2));
        case PrkDoubleFloatTag:
          return(PRK_DOUBLE_FLOAT((PrkDoubleFloat)o1) ==
                    PRK_DOUBLE_FLOAT((PrkDoubleFloat)o2));
        case PrkArrayTag:
          return(prk_array_value_equal((PrkArray)o1, (PrkArray)o2));
        case PrkStringTag:
          return((PRK_STRING_CSTRING((PrkString)o1) ==
                    PRK_STRING_CSTRING((PrkString)o2)) ||
                 (strcmp(PRK_STRING_CSTRING((PrkString)o1),
                    PRK_STRING_CSTRING((PrkString)o2)) == 0));
        case PrkCValueTag:
          return(PRK_CVALUE_VALUE((PrkCValue)o1) ==
                    PRK_CVALUE_VALUE((PrkCValue)o2));
        case PrkMethodTag:
          return(PRK_METHOD_SPEC_FN((PrkMethod)o1) ==
                    PRK_METHOD_SPEC_FN((PrkMethod)o2));
        case PrkSlotReferenceTag:
          return((PRK_SLOT_REF_OBJECT((PrkSlotReference)o1) ==
                    PRK_SLOT_REF_OBJECT((PrkSlotReference)o2)) &&
                 (PRK_SLOT_REF_SLOT_NAME((PrkSlotReference)o1) ==
                    PRK_SLOT_REF_SLOT_NAME((PrkSlotReference)o2)));
          break;
        case PrkISatTag:
        case PrkCSatTag:
        case PrkSdTag:
        case PrkRawSlotDataTag:
        case PrkRawFacetDataTag:
        case PrkDFacetTag:
        default:
          return(FALSE);
      }
    }
  } return(FALSE);
} ifndef NDEBUG
void init_debug()
{
  bzero((char *)prk_debug_status, MAX_DEBUG_INDEX);
}
#endif /* NDEBUG */

USER_EXPORT void PrkInitSubstrate(int argc, char *argv[])
{
  if (!prk_substrate_initialized_p) {
#ifndef NDEBUG
    init_debug();
#endif /* NDEBUG */
    prk_init_gc();
    prk_init_exceptions();
    prk_init_symbol();
    prk_init_sb_excpt();
    prk_init_string();
    prk_init_sat();
    prk_init_object();
    prk_init_rawfacetdata();
    prk_init_rawslotdata();
    prk_init_saber_method();
    prk_init_method_spec();
    prk_substrate_initialized_p = TRUE;
  }
}

/*
  file: cmb_slot.c
*/
static const char rcsid[] = "$Header: /tmp_mnt/net/op/prokee/src/generic/om/framema include <int_objm.ih>
```

```c
PrkList prk_delete_duplicates(PrkList l)
{
  ASSERT_TYPE(l, PrkListTag, prk_delete_duplicates);
  if (Null(l))
    return l;
  else {
    PrkList l2 = l, l3, l4;
    PrkType elem;
    for (elem = PRK_FIRST(l2); !Null(l2); ) {
      for (l3 = l2 = PRK_REST(l2); !Null(l3); l3 = PRK_REST(l3)) {
        ASSERT_TYPE(l2, PrkListTag, prk_delete_duplicates);
        if (EQUAL_OBJS(elem, PRK_FIRST(l3)))
            goto duplicates;
      }
    }
    return l;

duplicates:
    l2 = prk_ncons(PRK_FIRST(l));
    for (; !Null(l = PRK_REST(l)); ) {
      ASSERT_TYPE(l, PrkListTag, prk_delete_duplicates);
      elem = PRK_FIRST(l);
      l3 = l2;
    test:
      if (EQUAL_OBJS(elem, PRK_FIRST(l3)))
        continue;
      if (Null(l4 = PRK_REST(l3))) {
        ASSERT_TYPE(l4, PrkListTag, prk_delete_duplicates);
        PRK_REST(l3) = prk_ncons(elem);
        continue;
      }
      l3 = l4;
      goto test;
    }
    return l2;
  }
}

PrkList prk_union_values(PrkList old, PrkList new, PrkBool after_p)
{
  PrkList temp, result, *lastp;
  PrkType elem;

ASSERT_TYPE(old, PrkListTag, prk_union_values);
  if (Null(old))
    return prk_delete_duplicates(new);

for (; !Null(new); new = PRK_REST(new)) {
    ASSERT_TYPE(new, PrkListTag, prk_union_values);
    elem = PRK_FIRST(new);
    for (temp = old; !Null(temp); temp = PRK_REST(temp)) {
      ASSERT_TYPE(temp, PrkListTag, prk_union_values);
      if (EQUAL_OBJS(elem, PRK_FIRST(temp)))
        goto next_old;
    }
    goto found_new_element;
  next_old:
    continue;
  }
  return old;                    /* no new elements to add to old */ found_new_element:
  if (after_p) {
    result = temp = prk_ncons(PRK_FIRST(old));
    for (; !Null(old = PRK_REST(old));) {
      ASSERT_TYPE(old, PrkListTag, prk_union_values);
      temp = PRK_REST(temp) = prk_ncons(PRK_FIRST(old));
    }
    temp = PRK_REST(temp) = prk_ncons(elem);
  }
  else {
    result = PrkMakeCons(elem, (PrkType)old);
    lastp = &PRK_REST(result);
  }
```

```
    for (; !Null(new = PRK_REST(new));) {
      ASSERT_TYPE(new, PrkListTag, prk_union_values);
      elem = PRK_FIRST(new);
      for (temp = result; !Null(temp);) {
        ASSERT_TYPE(temp, PrkListTag, prk_union_values);
        if (EQUAL_OBJS(elem, PRK_FIRST(temp)))
          goto next_old2;
        if (Null(PRK_REST(temp))) {
          if (after_p)
            PRK_REST(temp) = prk_ncons(elem);
          else {
            *lastp = PrkMakeCons(elem, (PrkType)*lastp);
            lastp = &PRK_REST(*lastp);
          }
          goto next_old2;
        }
        temp = PRK_REST(temp);
      }
    }
  next_old2:
    continue;
  } return result;
}

PrkList prk_difference_values(PrkList old, PrkList remove)
{
  PrkList temp, temp2, result;
  PrkType elem;

ASSERT_TYPE(remove, PrkListTag, prk_difference_values);
  if (Null(remove))
    return old;

for (; !Null(remove); remove = PRK_REST(remove)) {
    ASSERT_TYPE(remove, PrkListTag, prk_difference_values);
    elem = PRK_FIRST(remove);
    for (temp = old; !Null(temp); temp = PRK_REST(temp)) {
      ASSERT_TYPE(temp, PrkListTag, prk_difference_values);
      if (EQUAL_OBJS(elem, PRK_FIRST(temp)))
        goto found_remove_element;
    }
  }
  return old;                    /* no elements to remove from old */ found_remove_element:
  for (; !Null(old); old = PRK_REST(old)) {
    ASSERT_TYPE(old, PrkListTag, prk_difference_values);
    elem = PRK_FIRST(old);
    for (temp = remove; !Null(temp); temp = PRK_REST(temp)) {
      ASSERT_TYPE(temp, PrkListTag, prk_difference_values);
      if (EQUAL_OBJS(elem, PRK_FIRST(temp)))
        goto next_old;
    }
    goto found_first;
  next_old:
    continue;
  } return old;                    /* no values left; old is PrkNil */ found_first:
  temp2 = result = prk_ncons(elem);
  for (; !Null(old = PRK_REST(old));) {
    ASSERT_TYPE(old, PrkListTag, prk_difference_values);
    elem = PRK_FIRST(old);
    for (temp = remove; !Null(temp); temp = PRK_REST(temp)) {
      ASSERT_TYPE(temp, PrkListTag, prk_difference_values);
      if (EQUAL_OBJS(elem, PRK_FIRST(temp)))
        goto next_old2;
    }
    temp2 = PRK_REST(temp2) = prk_ncons(elem);
  next_old2:
```

```
      continue;
    } return result;
}

PrkList prk_difference_value(PrkList old, PrkType remove)
{
  PrkList temp, temp2, result;

for (temp = old; !Null(temp); temp = PRK_REST(temp)) {
    ASSERT_TYPE(temp, PrkListTag, prk_difference_value);
    if (EQUAL_OBJS(PRK_FIRST(temp), remove))
      goto copy_to_here;
  } return old;                    /* nothing removed */ copy_to_here:
  if (temp == old) {
    for (; !Null(old = PRK_REST(old));) {
      ASSERT_TYPE(old, PrkListTag, prk_difference_value);
      if (PRK_FIRST(old) != remove)
        goto first_found;
    } return old;                  /* nothing left; old is PrkNil */ first_found:
    temp2 = result = prk_ncons(PRK_FIRST(old));
  }
  else {
    temp2 = result = prk_ncons(PRK_FIRST(old));
    for (; (old = PRK_REST(old)) != temp;) {
      ASSERT_TYPE(old, PrkListTag, prk_difference_value);
      temp2 = PRK_REST(temp2) = prk_ncons(PRK_FIRST(old));
    }
  }
  for (; !Null(old = PRK_REST(old));) {
    ASSERT_TYPE(old, PrkListTag, prk_difference_value);
    if (!EQUAL_OBJS(PRK_FIRST(old), remove))
      temp2 = PRK_REST(temp2) = prk_ncons(PRK_FIRST(old));
  } return result;
}

/*
  file: inherit.c
*/
static const char rcsid[] = "$Header: /tmp_mnt/net/op/prokee/src/generic/om/framema include <prokee/int_objm.ih>
include <prokee/union.ih>

PrkType prk_slot_values(PrkObject object, PrkSymbol slot_name, PrkBool child_instar
{
  PrkSat sat;
  PrkSd sd;
  PrkType **value_array;
  INIT_PARTIAL_SAD_ACCESS(object, sd, sat, slot_name, return(PrkNull),
                          value_array, -1,
                          child_instance_p);
  return (PrkType)*value_array;
}

PrkType prk_get_inherited_override_values(PrkSymbol name, PrkList parents,
                                          PrkBool child_instance_p)
{
  PrkType result;
  while (!Null(parents)) {
    if ((result = prk_slot_values((PrkObject)PRK_FIRST(parents), name,
                                  child_instance_p))
```

```
        != PrkNull)
      return result;
    parents = PRK_REST(parents);
  }
  return PrkNull;
}

PrkType **prk_get_slot_ptr(PrkObject object, PrkSymbol slot_name)
{
  PrkSat sat;
  PrkSd sd;
  PrkType **value_array;
  INIT_PARTIAL_SAD_ACCESS(object, sd, sat, slot_name, return(0),
                          value_array, -1,
                          PRK_IS_INSTANCE(object));
  return value_array;
}

PrkType **prk_get_child_or_parent_slot(PrkSymbol name, PrkList parents,
                                        PrkObject child)
{
  PrkObject object;
  PrkSat sat;
  PrkSd sd;
  PrkType **value_array;
  for (; !Null(parents); parents = PRK_REST(parents)) {
    object = (PrkObject)PRK_FIRST(parents);
    INIT_PARTIAL_SAD_ACCESS(object, sd, sat, name, continue,
                            value_array, -1,
                            FALSE);
    return value_array;
  }
  return(prk_get_slot_ptr(child, name));
} typedef PrkType (*prk_get_inherited_u_values_type)(PrkSymbol slot_name, PrkType loc
PrkType get_inherited_union_values(PrkSymbol slot_name, PrkType local_value,
                                    PrkList parents, PrkBool child_instance_p)
{
  PRK_GET_INHERITED_UNION_VALUES(local_value, !Null(parents),
                                  parents = PRK_REST(parents),
                                  prk_slot_values((PrkObject)PRK_FIRST(parents),
                                                   slot_name, child_instance_p));
}

PrkType get_inherited_runion_values(PrkSymbol slot_name, PrkType local_value,
                                     PrkList parents, PrkBool child_instance_p)
{
  PRK_GET_INHERITED_RUNION_VALUES(local_value, !Null(parents),
                                   parents = PRK_REST(parents),
                                   prk_slot_values((PrkObject)PRK_FIRST(parents),
                                                    slot_name, child_instance_p));
}

PrkType prk_get_inherited_method_value(PrkSymbol slot_name, PrkList parents,
                                        PrkBool child_instance_p)
{
  PrkType result;
    PrkSat sat;
    PrkSd sd;
    PrkType **value_array;
  PrkObject object;
  while (!Null(parents)) {
    object = (PrkObject)PRK_FIRST(parents);
    INIT_PARTIAL_SAD_ACCESS(object, sd, sat, slot_name, goto next_parent, value_arr
                            -1, child_instance_p);

result = (PrkType)PRK_LOCAL_VALUE(PRK_MASK_CHUNK(value_array[1]), sd);
    if (result != PrkNull)
      return result;
  next_parent:
    parents = PRK_REST(parents);
```

```
  }
  return PrkNull;
} void prk_propagate_override_values(PrkType value, PrkSd sd, PrkList children,
                                   PrkObject parent, PrkBool child_instance_p,
                                   unsigned monitor_filter, PrkMonitorFlags monitor_fla
{
  PrkObject child;
  PrkSymbol slot_name = PRK_SD_NAME(sd);
  PrkSlotType storage_class = PRK_SD_SLOT_TYPE(sd);
  PrkSd child_sd;
  PrkSat child_sat;
  unsigned child_hts;
  PrkType **value_array, combined_value,old_value;
  PrkList parents;
  PrkBool monitor_p;
  while (!Null(children)) {
    child = (PrkObject)PRK_FIRST(children);
    ASSERT_FULL_OBJECT(child, prk_propagate_override_values);
    INIT_PARTIAL_SAD_ACCESS(child, child_sd, child_sat, slot_name,
                            goto next_child, value_array, storage_class,
                            child_instance_p);

monitor_p = !PRK_NO_AVPUT_P(child_sd, value_array);
    if (!(PRK_LOCAL_VALUE_P(value_array)) &&
        ((PrkType)*value_array != value || monitor_p)) {
      parents = child_instance_p
        ? PRK_SAT_PARENTS(child_sat)
        : PRK_SAT_CLASS_PARENTS(child_sat, PRK_SAT_HASH_TABLE_SIZE(child_sat));
      ASSERT_FULL_OBJECT(PRK_FIRST(parents), prk_propagate_override_values);
      if (parent == (PrkObject)PRK_FIRST(parents) && value != PrkNull)
        combined_value = value;
      else
        combined_value = prk_get_inherited_override_values(slot_name, parents,
                                                           child_instance_p);

if (monitor_p) {
        if ((PrkType)*value_array != combined_value) {
          old_value = (PrkType)*value_array;
          (PrkType)*value_array = combined_value;
          prk_execute_ac_monitor(value_array,child,child_sd,monitor_filter,
                           combined_value,old_value,monitor_flags);
        }
        else {
          prk_execute_ac_monitor(value_array,child,child_sd,monitor_filter,
                           combined_value,combined_value,monitor_flags);
          goto next_child;
        }
      }
      else {
        if ((PrkType)*value_array != combined_value)
          (PrkType)*value_array = combined_value;
        else
          goto next_child;
      }

PRK_IS_VALUE_MODIFIED_OBJECT(child) = TRUE;
      if (!child_instance_p) {
        child_hts = PRK_SAT_HASH_TABLE_SIZE(child_sat);
        switch (storage_class) {
        case PrkSubclassSlotType:
          prk_propagate_override_values(combined_value, child_sd,
                                PRK_SAT_SUBCLASSES(child_sat, child_hts),
                                parent, FALSE, monitor_filter, monitor_flags);
          break;
        case PrkDefaultSlotType:
        case PrkLockedSlotType:
          prk_propagate_override_values(combined_value, child_sd,
                                PRK_SAT_SUBCLASSES(child_sat, child_hts),
                                parent, FALSE, monitor_filter, monitor_flags);
          prk_propagate_override_values(combined_value, child_sd,
                                PRK_SAT_INSTANCES(child_sat, child_hts),
                                parent, TRUE, monitor_filter, monitor_flags);
```

```c
          break;
        }
      }
ifdef OBJ_EVENTS
      if (PRK_IS_OBJECT_VALUE_INTEREST(child)) {
        PrkoSlotValueModEventStruct event_struct;
        event_struct.object = child;
        event_struct.slot_name = slot_name;
        event_struct.value = combined_value;
        PrkSignal(PrkoSlotValueModEventID, &event_struct);
      }
#endif                              /* OBJ_EVENTS */
    }
  next_child:
    children = PRK_REST(children);
  }
} void prk_propagate_method_values(PrkType value, PrkSd sd, PrkList children, PrkObje
                                 PrkBool child_instance_p, PrkType *old_chunk,
                                 PrkType *new_chunk)
{
  PrkObject child;
  PrkSymbol slot_name = PRK_SD_NAME(sd);
  PrkSlotType storage_class = PRK_SD_SLOT_TYPE(sd);
  PrkSd child_sd;
  PrkSat child_sat;
  unsigned child_hts;
  PrkType **value_array;
  PrkList parents;
  PrkType method_fn, combined_value, combined_fn_value;

ASSERT(PrkGetType(value) == PrkMethodTag || value == PrkNull,
         prk_propagate_method_values);
  method_fn = PRK_DEREFERENCE_METHOD_SPEC(value);

while (!Null(children)) {
    child = (PrkObject)PRK_FIRST(children);
    ASSERT_FULL_OBJECT(child, prk_propagate_method_values);
    INIT_PARTIAL_SAD_ACCESS(child, child_sd, child_sat, slot_name,
                            goto next_child, value_array, storage_class,
                            child_instance_p);
    if (!(PRK_LOCAL_VALUE_P(value_array)) &&
        (PrkType)*value_array != method_fn) {
      parents = child_instance_p
        ? PRK_SAT_PARENTS(child_sat)
        : PRK_SAT_CLASS_PARENTS(child_sat, PRK_SAT_HASH_TABLE_SIZE(child_sat));
      ASSERT_FULL_OBJECT(PRK_FIRST(parents), prk_propagate_method_values);
      if (PRK_MASK_CHUNK(value_array[1]) == old_chunk)
        value_array[1] = new_chunk;
      if (parent == (PrkObject)PRK_FIRST(parents)) {
        (PrkType)*value_array = method_fn;
        combined_value = value;
        if (PRK_LOCAL_CHUNK_P(value_array[1]))
          PRK_LOCAL_VALUE(PRK_MASK_CHUNK(value_array[1]), child_sd) = value;
      } else {
        combined_value = prk_get_inherited_method_value(slot_name, parents,
                                                        child_instance_p);
        combined_fn_value = PRK_DEREFERENCE_METHOD_SPEC(combined_value);
        if (combined_fn_value != (PrkType)*value_array) {
          (PrkType)*value_array = combined_fn_value;
          if (PRK_LOCAL_CHUNK_P(value_array[1]))
            PRK_LOCAL_VALUE(PRK_MASK_CHUNK(value_array[1]), child_sd) =
              combined_value;
        }
        else
          goto next_child;
      }
      PRK_IS_VALUE_MODIFIED_OBJECT(child) = TRUE;
      if (!child_instance_p) {
```

```c
          child_hts = PRK_SAT_HASH_TABLE_SIZE(child_sat);
          switch (storage_class) {
          case PrkSubclassSlotType:
            prk_propagate_method_values(combined_value, child_sd,
                              PRK_SAT_SUBCLASSES(child_sat, child_hts),
                              parent, FALSE, old_chunk, new_chunk);
            break;
          case PrkDefaultSlotType:
          case PrkLockedSlotType:
            prk_propagate_method_values(combined_value, child_sd,
                              PRK_SAT_SUBCLASSES(child_sat, child_hts),
                              parent, FALSE, old_chunk, new_chunk);
            prk_propagate_method_values(combined_value, child_sd,
                              PRK_SAT_INSTANCES(child_sat, child_hts),
                              parent, TRUE, old_chunk, new_chunk);
            break;
          }
        }
ifdef OBJ_EVENTS
        if (PRK_IS_OBJECT_VALUE_INTEREST(child)) {
          PrkoSlotValueModEventStruct event_struct;
          event_struct.object = child;
          event_struct.slot_name = slot_name;
          event_struct.value = combined_value;
          PrkSignal(PrkoSlotValueModEventID, &event_struct);
        }
#endif                           /* OBJ_EVENTS */
      }
  next_child:
      children = PRK_REST(children);
    }
} void prk_propagate_union_values(PrkType value, PrkSd sd,
                            PrkList children, PrkObject parent,
                            PrkBool child_instance_p, unsigned monitor_filter,
                            PrkType *old_chunk, PrkType *new_chunk,
                            prk_get_inherited_u_values_type get_fn,
                            PrkMonitorFlags monitor_flags)
{
  PrkObject child;
  PrkSymbol slot_name = PRK_SD_NAME(sd);
  PrkSlotType storage_class = PRK_SD_SLOT_TYPE(sd);
  PrkSd child_sd;
  PrkSat child_sat;
  unsigned child_hts;
  PrkType **value_array, combined_value, local_value, old_value;
  PrkList parents;
  PrkBool monitor_p;
  while (!Null(children)) {
    child = (PrkObject)PRK_FIRST(children);
    ASSERT_FULL_OBJECT(child, prk_propagate_union_values);

INIT_PARTIAL_SAD_ACCESS(child, child_sd, child_sat, slot_name,
                        goto next_child, value_array, storage_class,
                        child_instance_p);

monitor_p = !PRK_NO_AVPUT_P(child_sd, value_array);
    if ((PrkType)*value_array != value || monitor_p) {
      parents = child_instance_p
        ? PRK_SAT_PARENTS(child_sat)
        : PRK_SAT_CLASS_PARENTS(child_sat, PRK_SAT_HASH_TABLE_SIZE(child_sat));
      ASSERT_FULL_OBJECT(PRK_FIRST(parents), prk_propagate_union_values);
      if (PRK_MASK_CHUNK(value_array[1]) == old_chunk)
        value_array[1] = new_chunk;
      combined_value = get_fn(slot_name,
                        PRK_LOCAL_CHUNK_P(value_array[1]) ? PRK_LOCAL_VALUE(P
                        parents, child_instance_p);

if (monitor_p) {
        if ((PrkType)*value_array != combined_value) {
```

```c
          old_value = (PrkType)*value_array;
          (PrkType)*value_array = combined_value;
          prk_execute_ac_monitor(value_array,child,child_sd,monitor_filter,
                          combined_value,old_value,monitor_flags);
        }
        else {
          prk_execute_ac_monitor(value_array,child,child_sd,monitor_filter,
                          combined_value,combined_value,monitor_flags);
          goto next_child;
        }
      }
      else {
        if ((PrkType)*value_array != combined_value)
          (PrkType)*value_array = combined_value;
        else
          goto next_child;
      }

PRK_IS_VALUE_MODIFIED_OBJECT(child) = TRUE;
      if (!child_instance_p) {
        child_hts = PRK_SAT_HASH_TABLE_SIZE(child_sat);
        switch (storage_class) {
        case PrkSubclassSlotType:
          prk_propagate_union_values(combined_value, child_sd,
                          PRK_SAT_SUBCLASSES(child_sat, child_hts),
                          parent, FALSE, monitor_filter, old_chunk,
                          new_chunk, get_fn, monitor_flags);
          break;
        case PrkDefaultSlotType:
        case PrkLockedSlotType:
          prk_propagate_union_values(combined_value, child_sd,
                          PRK_SAT_SUBCLASSES(child_sat, child_hts),
                          parent, FALSE, monitor_filter, old_chunk,
                          new_chunk, get_fn, monitor_flags);
          prk_propagate_union_values(combined_value, child_sd,
                          PRK_SAT_INSTANCES(child_sat, child_hts),
                          parent, TRUE, monitor_filter, old_chunk,
                          new_chunk, get_fn, monitor_flags);
          break;
        }
      } ifdef OBJ_EVENTS
      if (PRK_IS_OBJECT_VALUE_INTEREST(child)) {
        PrkoSlotValueModEventStruct event_struct;
        event_struct.object = child;
        event_struct.slot_name = slot_name;
        event_struct.value = combined_value;
        PrkSignal(PrkoSlotValueModEventID, &event_struct);
      }
#endif                             /* OBJ_EVENTS */
    }
  next_child:
    children = PRK_REST(children);
  }
}

CONST struct prk_slot_method_table_struct smt_array[PRK_ROLE_COUNT] = {
  {PrkMVOverrideInheritance,
/*     (prk_slot_handler)override_layout_chunk,
       (prk_slot_handler)override_multi_fill_chunk,
       (prk_slot_handler)override_multi_get_value,
       (prk_slot_handler)override_multi_get_values,
       (prk_slot_handler)override_multi_put_value,
       (prk_slot_handler)override_multi_put_values,
       (prk_slot_handler)override_multi_add_value,
       (prk_slot_handler)override_multi_add_values,
       (prk_slot_handler)override_multi_remove_value,
       (prk_slot_handler)override_multi_remove_values,
       (prk_slot_handler)override_local_value */
    },
};
```

```
USER_EXPORT PrkType PrkGetValue(PrkObject object, PrkSymbol slot_name, unsigned mor
{
  PrkInheritance role_specifier;
  PrkType result, **value_array;
  PrkSd sd;

USER_ASSERT_FULL_OBJECT(object, PrkGetValue);
  USER_ASSERT_TYPE(slot_name, PrkSymbolTag, PrkGetValue);

include <prokee/getvall.ih> switch ((PrkFacetInheritance)role_specifier) {
  default:
    ASSERT_NEVER_REACHED(PrkGetValue);

case PrkMVOverrideInheritance:
  case PrkMVNoInheritance:
  case PrkMVInitialInheritance:
  case PrkSelfLastUnionInheritance:
  case PrkSelfFirstUnionInheritance:
    if (Null((PrkList)result) || result == PrkNull)
      return PrkNull;
    else if (Null(PRK_REST(result)))
      return PRK_FIRST((PrkList)result);
    else
      PrkSignalExceptionLoop(PrkExcGetValueMultiError, object, slot_name);

case PrkSVOverrideInheritance:
  case PrkSVNoInheritance:
  case PrkSVInitialInheritance:
    return result;
  case PrkMethodInheritance:
    return PRK_LOCAL_VALUE(PRK_MASK_CHUNK(value_array[1]), sd);
  }
}

USER_EXPORT PrkType PrkGetValues(PrkObject object, PrkSymbol slot_name, unsigned mc
{
  PrkInheritance role_specifier;
  PrkType result, **value_array;
  PrkSd sd;

USER_ASSERT_FULL_OBJECT(object, PrkGetValues);
  USER_ASSERT_TYPE(slot_name, PrkSymbolTag, PrkGetValues);

include <prokee/getvall.ih> switch ((PrkFacetInheritance)role_specifier) {
  default:
    ASSERT_NEVER_REACHED(PrkGetValues);

case PrkMVOverrideInheritance:
  case PrkMVNoInheritance:
  case PrkMVInitialInheritance:
  case PrkSelfLastUnionInheritance:
  case PrkSelfFirstUnionInheritance:
    return result;
  case PrkSVOverrideInheritance:
  case PrkSVNoInheritance:
  case PrkSVInitialInheritance:
    return (result == PrkNull) ? result : (PrkType)prk_ncons(result);
  case PrkMethodInheritance:
    return (PrkType)prk_ncons(PRK_METHOD_LOCAL_VALUE(PRK_MASK_CHUNK(value_array[1])
                                                    sd));
  }
}

USER_EXPORT PrkList PrkGetValuesList(PrkObject object, PrkSymbol slot_name, unsigne
{
    /* do this because getvalue1 does a return */
  PrkType value = PrkGetValues(object, slot_name, monitor_filter);
  return(PrkIsList(value) ? (PrkList)value : PrkNil);
}
```

```c
USER_EXPORT PrkType PrkGetValueOrValues(PrkObject object, PrkSymbol slot_name, unsi-
                        PrkBool *single_valued_p)
{
  PrkInheritance role_specifier;
  PrkType result, **value_array;
  PrkSd sd;

USER_ASSERT_FULL_OBJECT(object, PrkGetValueOrValues);
  USER_ASSERT_TYPE(slot_name, PrkSymbolTag, PrkGetValueOrValues);
  USER_ASSERT_DATA_PNTR(single_valued_p, PrkGetValueOrValues);
  *single_valued_p = TRUE;

include <prokee/getval1.ih> switch ((PrkFacetInheritance)role_specifier) {
  default:
    ASSERT_NEVER_REACHED(PrkGetValueOrValues);

case PrkSVNoInheritance:
  case PrkSVInitialInheritance:
  case PrkSVOverrideInheritance:
    break;
  case PrkMVOverrideInheritance:
  case PrkMVNoInheritance:
  case PrkMVInitialInheritance:
  case PrkSelfLastUnionInheritance:
  case PrkSelfFirstUnionInheritance:
    *single_valued_p = FALSE;
    break;
  case PrkMethodInheritance:
    return PRK_LOCAL_VALUE(PRK_MASK_CHUNK(value_array[1]), sd);
  }
  return result;
}

PrkType PrkGetLocalValueOrValues(PrkObject object, PrkSymbol slot_name,
          unsigned monitor_filter, PrkBool *single_valued_p)
{
  PrkInheritance role_specifier;
  PrkType result, **value_array;
  PrkSd sd;

USER_ASSERT_FULL_OBJECT(object, PrkGetValueOrValues);
  USER_ASSERT_TYPE(slot_name, PrkSymbolTag, PrkGetValueOrValues);
  USER_ASSERT_DATA_PNTR(single_valued_p, PrkGetLocalValueOrValues);
  *single_valued_p = TRUE;

include <prokee/getval1.ih> switch ((PrkFacetInheritance)role_specifier) {
  default:
    ASSERT_NEVER_REACHED(PrkGetValueOrValues);

case PrkSVNoInheritance:
  case PrkSVInitialInheritance:
  case PrkSVOverrideInheritance:
  case PrkMethodInheritance:
    break;
  case PrkMVOverrideInheritance:
  case PrkMVNoInheritance:
  case PrkMVInitialInheritance:
  case PrkSelfLastUnionInheritance:
  case PrkSelfFirstUnionInheritance:
    *single_valued_p = FALSE;
    break;
  } switch ((PrkFacetInheritance)role_specifier) {
  default:
    ASSERT_NEVER_REACHED(PrkGetValueOrValues);

case PrkSVNoInheritance:
  case PrkMVNoInheritance:
    return(result);
```

```
    case PrkSVInitialInheritance:
    case PrkSVOverrideInheritance:
    case PrkMVOverrideInheritance:
    case PrkMVInitialInheritance:
      return(PRK_LOCAL_VALUE_P(value_array) ? result : PrkNull);
    case PrkSelfLastUnionInheritance:
    case PrkSelfFirstUnionInheritance:
      if (PRK_LOCAL_CHUNK_P(value_array[1]))
        return(PRK_LOCAL_VALUE(PRK_MASK_CHUNK(value_array[1]), sd));
      else
        return(PrkNull);
    case PrkMethodInheritance:
      if (PRK_LOCAL_VALUE_P(value_array) && PRK_LOCAL_CHUNK_P(value_array[1]))
        return PRK_LOCAL_VALUE(PRK_MASK_CHUNK(value_array[1]), sd);
      return PrkNull;
  }
  return result;
}

PrkType prk_slot_mod_meth(PrkObject object, PrkSymbol slot_name, PrkType value,
                          unsigned monitor_filter,
                          u_short method_id,
                          PrkMonitorFlags monitor_flags,
                          PrkType *old_valp)
{
  PrkType old_value;

#include <prokee/slot_mod.ih>

*old_valp = old_value;

return value;
}

/* *** All rulesystem functions should be separated out so that the linker can
   toss them */

PrkBool prk_slot_mod_method_for_rules(PrkObject object, PrkSymbol slot_name, PrkTyp
                                      unsigned monitor_filter,
                                      u_short method_id)
{
  PrkType old_value;
  PrkMonitorFlags monitor_flags = 0;

include <prokee/slot_mod.ih> return old_value != value;
}

PrkType prk_slot_modification_method(PrkObject object, PrkSymbol slot_name, PrkType
                                     unsigned monitor_filter,
                                     u_short method_id)
{
  PrkType old_value;
  PrkMonitorFlags monitor_flags = 0;

include <prokee/slot_mod.ih> return value;
} void prk_fill_chunk(PrkType **chunk, PrkType value, PrkSd sd, PrkList parents,
                    PrkBool load_module_p, PrkBool instance_p)
{
  PrkInheritance role_specifier = PRK_SD_ROLE_SPECIFIER(sd);
  if (!PRK_IS_USER_DEFINED_INHERITANCE(role_specifier))
    switch ((PrkFacetInheritance)role_specifier) {
    default:
      ASSERT_NEVER_REACHED(prk_fill_chunk);
      break;
```

```
case PrkMVInitialInheritance:
case PrkMVOverrideInheritance:
  if (value != PrkNull) {
    (PrkType)*chunk = COERCE_TO_LIST(value);
    PRK_SET_LOCAL_VALUE_P(chunk);
  }
  else {
    PRK_UNSET_LOCAL_VALUE_P(chunk);
    (PrkType)*chunk = prk_get_inherited_override_values(PRK_SD_NAME(sd), parent
  }
  break;

case PrkSVInitialInheritance:
case PrkSVOverrideInheritance:
  if (value != PrkNull) {
    (PrkType)*chunk = value;
    PRK_SET_LOCAL_VALUE_P(chunk);
  }
  else {
    PRK_UNSET_LOCAL_VALUE_P(chunk);
    (PrkType)*chunk = prk_get_inherited_override_values(PRK_SD_NAME(sd), parent
  }
  break;

case PrkMVNoInheritance:
  (PrkType)*chunk = COERCE_TO_LIST_OR_NULLOBJECT(value);
  break;

case PrkSVNoInheritance:
  (PrkType)*chunk = value;
  break;

case PrkSelfLastUnionInheritance:
  if (value != PrkNull) {
    PrkType *sub_chunk = PRK_ENSURE_LOCAL_CHUNK(chunk[1], sd);
    value = COERCE_TO_LIST(value);
    PRK_LOCAL_VALUE(sub_chunk, sd) = value;
  }
  else if (PRK_LOCAL_CHUNK_P(chunk[1]))
    PRK_LOCAL_VALUE(PRK_MASK_CHUNK(chunk[1]), sd) = value;
  (PrkType)*chunk =
    get_inherited_union_values(PRK_SD_NAME(sd), value, parents, instance_p);
  break;

case PrkSelfFirstUnionInheritance:
  if (value != PrkNull) {
    PrkType *sub_chunk = PRK_ENSURE_LOCAL_CHUNK(chunk[1], sd);
    value = COERCE_TO_LIST(value);
    PRK_LOCAL_VALUE(sub_chunk, sd) = value;
  }
  else if (PRK_LOCAL_CHUNK_P(chunk[1]))
    PRK_LOCAL_VALUE(PRK_MASK_CHUNK(chunk[1]), sd) = value;
  (PrkType)*chunk =
    get_inherited_runion_values(PRK_SD_NAME(sd), value, parents, instance_p);
  break;

case PrkMethodInheritance:
  if (value != PrkNull) {
    PrkType *sub_chunk = PRK_ENSURE_LOCAL_CHUNK(chunk[1], sd);
    USER_ASSERT_TYPE(value, PrkMethodTag, prk_fill_chunk);
    PRK_SET_LOCAL_VALUE_P(chunk);
    (PrkType)*chunk = (PrkType)PRK_METHOD_SPEC_FN((PrkMethod)value);
    PRK_METHOD_LOCAL_VALUE(sub_chunk, sd) = value;
  }
  else {
    PRK_UNSET_LOCAL_VALUE_P(chunk);
    value = prk_get_inherited_method_value(PRK_SD_NAME(sd), parents, instance_p
    (PrkType)*chunk = PRK_DEREFERENCE_METHOD_SPEC(value);
    if (PRK_LOCAL_CHUNK_P(chunk[1]))
      PRK_METHOD_LOCAL_VALUE(PRK_MASK_CHUNK(chunk[1]), sd) = value;
  }
  break;
```

```
      }
    else
      (PRK_SMT_METHOD(role_specifier, PRK_SMT_FILL_CHUNK))
        (*chunk, value, sd, parents, load_module_p);
} void prk_fill_chunk_lparent(PrkType **chunk, PrkType value,
                            PrkType **parent_chunk,
                            PrkSd sd, PrkSd parent_sd, PrkBool load_module_p)
{
  PrkInheritance role_specifier = PRK_SD_ROLE_SPECIFIER(sd);
  if (!PRK_IS_USER_DEFINED_INHERITANCE(role_specifier))
    switch ((PrkFacetInheritance)role_specifier) {
    default:
      ASSERT_NEVER_REACHED(prk_fill_chunk_lparent);
      break;

case PrkMVOverrideInheritance:
    case PrkMVInitialInheritance:
      if (value != PrkNull) {
        (PrkType)*chunk = COERCE_TO_LIST(value);
        PRK_SET_LOCAL_VALUE_P(chunk);
      }
      else {
        PRK_UNSET_LOCAL_VALUE_P(chunk);
        (PrkType)*chunk = (PrkType)*parent_chunk;
      } break;

case PrkSVInitialInheritance:
    case PrkSVOverrideInheritance:
      if (value != PrkNull) {
        (PrkType)*chunk = value;
        PRK_SET_LOCAL_VALUE_P(chunk);
      }
      else {
        PRK_UNSET_LOCAL_VALUE_P(chunk);
        (PrkType)*chunk = (PrkType)*parent_chunk;
      }
      break;

case PrkMVNoInheritance:
      (PrkType)*chunk = COERCE_TO_LIST_OR_NULLOBJECT(value);
      break;

case PrkSVNoInheritance:
      (PrkType)*chunk = value;
      break;

case PrkSelfLastUnionInheritance:
      if (value != PrkNull) {
        PrkType *sub_chunk = PRK_ENSURE_LOCAL_CHUNK(chunk[1], sd);
        value = COERCE_TO_LIST(value);
        PRK_LOCAL_VALUE(sub_chunk, sd) = value;
      }
      else if (PRK_LOCAL_CHUNK_P(chunk[1]))
        PRK_LOCAL_VALUE(PRK_MASK_CHUNK(chunk[1]), sd) = value;
      (PrkType)*chunk = (value == PrkNull) ?
        (PrkType)*parent_chunk :
          ((PrkType)*parent_chunk == PrkNull ?
           (PrkType)prk_delete_duplicates((PrkList)value) :
           (PrkType)prk_union_values((PrkList)*parent_chunk,
                                     (PrkList)value,
                                     TRUE));
      break;

case PrkSelfFirstUnionInheritance:
      if (value != PrkNull) {
        PrkType *sub_chunk = PRK_ENSURE_LOCAL_CHUNK(chunk[1], sd);
        value = COERCE_TO_LIST(value);
        PRK_LOCAL_VALUE(sub_chunk, sd) = value;
      }
```

```
        else if (PRK_LOCAL_CHUNK_P(chunk[1]))
           PRK_LOCAL_VALUE(PRK_MASK_CHUNK(chunk[1]), sd) = value;
        (PrkType)*chunk = (value == PrkNull) ?
           (PrkType)*parent_chunk :
              ((PrkType)*parent_chunk == PrkNull ?
               (PrkType)prk_delete_duplicates((PrkList)value) :
               (PrkType)prk_union_values((PrkList)value,
                                         (PrkList)*parent_chunk,
                                         TRUE));
        break;
      case PrkMethodInheritance:
        if (value != PrkNull) {
           PrkType *sub_chunk = PRK_ENSURE_LOCAL_CHUNK(chunk[1], sd);
           USER_ASSERT_TYPE(value, PrkMethodTag, prk_fill_chunk_1parent);
           PRK_SET_LOCAL_VALUE_P(chunk);
           (PrkType)*chunk = (PrkType)PRK_METHOD_SPEC_FN((PrkMethod)value);
           PRK_LOCAL_VALUE(sub_chunk, sd) = value;
        }
        else {
           PRK_UNSET_LOCAL_VALUE_P(chunk);
           value = (PrkType)PRK_METHOD_LOCAL_VALUE(PRK_MASK_CHUNK(parent_chunk[1]),
                                                  parent_sd);
           (PrkType)*chunk = PRK_DEREFERENCE_METHOD_SPEC(value);
           if (PRK_LOCAL_CHUNK_P(chunk[1]))
              PRK_METHOD_LOCAL_VALUE(PRK_MASK_CHUNK(chunk[1]), sd) = value;
        }
        break;

}
  else
     (PRK_SMT_METHOD(role_specifier, PRK_SMT_FILL_CHUNK_1PARENT))
        (*chunk, value, parent_chunk, sd, parent_sd, load_module_p);
}

PrkType PRK_FAST_INSTANCE_S_OVERRIDE_PV(PrkObject object, PrkSymbol slot_name,
                                       short location, PrkType value)
{
  PrkType *address = (PrkType *)(PRK_OBJECT_VALUE_ARRAY(object) + location);
  PRK_IS_VALUE_MODIFIED_OBJECT(object) = TRUE;
  if (value != PrkNull) {
     PRK_SET_LOCAL_VALUE_P(address);
     return *address = value;
  }
  else if (!PRK_LOCAL_VALUE_P(address))
     return *address;
  else {
     PRK_UNSET_LOCAL_VALUE_P(address);
     return address[0] = prk_get_inherited_override_values(slot_name, PRK_SAT_PARENT
  }
}

/*
   file: modmain.c
*/
static const char rcsid[] = "$Header: /tmp_mnt/net/op/prokee/src/generic/om/framema include <int_objm.ih>

/*
   checks if there is any module, if so return,
   else creates an empty object/module
*/
PrkModule prk_make_empty_module(PrkSymbol new_name, PrkApp app)
{
  PrkModule module;
  ASSERT_TYPE(new_name, PrkSymbolTag, prk_make_empty_module);
  ASSERT(PRK_IS_APP(app), prk_make_empty_module);

module = PrkFindModule(new_name, app);
  if (module == (PrkModule) PrkNull) {
     module = (PrkModule) prk_internal_make_object(new_name, (PrkModule)app, TRUE);
     PRK_IS_OBJECT_MODULE(module) = TRUE;
```

```c
}
   return module;
}

PrkModule prk_make_module_internal(PrkSymbol new_name, PrkApp app)
{
  PrkModule module;
  PrkType plist;

ASSERT_TYPE(new_name, PrkSymbolTag, prk_make_module_internal);
  ASSERT(PRK_IS_APP(app), prk_make_module_internal);

ASSERT(new_name != PrkAnonymousObjectName, prk_make_module_internal);
  module = (PrkModule) prk_make_object(new_name, (PrkModule) PrkNull,
                                       (PrkCollection) prk_module_parent_classes,
                                       (PrkCollection) PrkNil,TRUE, app);

ASSERT_TYPE(module, PrkObjectTag, prk_make_module_internal);

PRK_OBJECT_MODULE(module) = (PrkModule) app;
  PRK_IS_OBJECT_MODULE(module) = TRUE;
  PRK_MOD_NAME(module) = new_name;
  PRK_MOD_APP(module) = app;
  PRK_APP_MODS(app) = PrkMakeCons((PrkType) module, (PrkType) PRK_APP_MODS(app));

plist = prk_get_cons_prop(PRK_SYMBOL_ATTRIBUTES(new_name), (PrkType)PRK_OBJECT_BA
  if ((app != (PrkApp) PrkNull) &&
      ((plist == PrkNull) ||
       (prk_get_assoc_prop((PrkList) plist, (PrkType) app) == PrkNull)))
    prk_add_cons_prop(&PRK_SYMBOL_ATTRIBUTES(new_name),
                      PRK_OBJECT_BACKPTR_PROP,
                      (PrkType)PrkMakeCons((PrkType) app, (PrkType) module));
  return module;
}

/*
  This function depends on prk_init_app being called before
  calling this function.
*/
void prk_init_module()
{
  PrkType mrsd = (PrkType)PrkMakeRawSlotData((PrkType)PrkNil,
                                             PrkLockedSlotType |
                                                 PrkNoWhenNeededMonitorsFlag |
                                                 PrkNoWhenChangedMonitorsFlag |
                                                 PrkNoDynamicFacetsFlag,
                                             PrkMVOverrideInheritance,
                                             (PrkCollection)PrkNil);
  PrkType srsd = (PrkType)PrkMakeRawSlotData((PrkType)PrkNull,
                                             PrkLockedSlotType |
                                                 PrkNoWhenNeededMonitorsFlag |
                                                 PrkNoWhenChangedMonitorsFlag |
                                                 PrkNoDynamicFacetsFlag,
                                             PrkSVNoInheritance,
                                             (PrkCollection)PrkNil);

prk_module_class_name = PrkMakeSymbol("ModuleClass");
  prk_module_class_object =
    (PrkModule)PrkMakeObject(prk_module_class_name,
                (PrkModule) prk_objmgr_app_object,
                (PrkCollection) PrkNil,
                (PrkCollection)PrkMakeList( /* make this a stack list ?? */
                          (PrkType) PrkMakeSymbol("Name"), srsd,
                          (PrkType) PrkMakeSymbol("ObjectFile"), srsd,
                          (PrkType) PrkMakeSymbol("Requires"), mrsd,
                          (PrkType) PrkMakeSymbol("ClassList"), mrsd,
                          (PrkType) PrkMakeSymbol("InstanceList"), mrsd,
                          (PrkType) PrkMakeSymbol("ClassListTail"), mrsd,
                          (PrkType) PrkMakeSymbol("AnonymousObjectCount"),
                          (PrkType)PrkMakeRawSlotData((PrkType)PRK_MAKE_FIXNUM(0),
```

```
                        PrkLockedSlotType |
                            PrkNoWhenNeededMonitorsFlag |
                            PrkNoWhenChangedMonitorsFlag |
                            PrkNoDynamicFacetsFlag,
                        PrkSVOverrideInheritance,
                        (PrkCollection)PrkNil),
                  (PrkType) PrkMakeSymbol("App"), srsd,
                  PrkNull),
              FALSE);
  prk_module_parent_classes = PrkMakeCons((PrkType)prk_module_class_object,(PrkType
} void prk_delete_module(PrkModule module)
{
  USER_ASSERT_FULL_APP_OR_MOD(module, PrkDeleteModule);

if (PRK_IS_SYSTEM_OBJECT(module)) {
    PrkSignalException(PrkExcSysObjOperationMsg, module, "delete");
    return;
  }
  if (PRK_IS_APP(module))
    PrkDeleteApp((PrkApp)module);
  else {
    prk_call_module_detach_meths(module);
    prk_delete_module_internal(module);
  }
}

PrkBool prk_rename_module(PrkModule module, PrkSymbol new_name)
{
  PrkSymbol old_name;
  PrkApp app;
  PrkType old_val;

USER_ASSERT_TYPE(new_name, PrkSymbolTag, PrkRenameModule);
  USER_ASSERT_FULL_APP_OR_MOD(module, PrkRenameModule);

if (PRK_IS_SYSTEM_OBJECT(module)) {
    PrkSignalException(PrkExcSysObjOperationMsg, module, "rename");
    return FALSE;
  }
  if (PRK_IS_APP(module))
    return (PrkRenameApp((PrkApp)module, new_name));

app = PRK_MOD_APP(module);

if (PrkFindObject(new_name, app) != PRK_FIND_OBJECT_NULL_RESULT)
    return FALSE;
  old_val = prk_rem_assoc_prop((PrkList *) prk_get_addr_cons_prop(PRK_SYMBOL_ATTRIE
                               (PrkType) app);
  PRK_MOD_NAME(module) = new_name;
  PRK_OBJECT_NAME(module) = new_name;
  prk_add_cons_prop(&PRK_SYMBOL_ATTRIBUTES(new_name),
                    PRK_OBJECT_BACKPTR_PROP,
                    old_val);

#ifdef OBJ_EVENTS
  {
    PrkoRenameModuleEventStruct event_struct;
    event_struct.module = module;
    event_struct.old_module_name = old_name;
    PrkSignal(PrkoRenameModuleEventID, &event_struct);
  }
endif                          /* OBJ_EVENTS */ return TRUE;
}

/*
   Creates a KB.  If the KB exists and is empty (module_empty),
   PrkMakeKb clears empty flag and returns the KB.  If the KB exists
```

```
    and is not empty, it simply returns the KB.  If the KB does
    not exist, it creates it.  A create KB signal is generated except
    for the case where the KB exists and is not empty.
*/

PrkModule prk_make_module(PrkSymbol new_name, PrkApp app)
{
  PrkModule module;
  USER_ASSERT_FULL_APP(app, PrkMakeModule);

module = PrkFindModule(new_name, app);
  if ((module != (PrkModule) PrkNull) && PRK_IS_LOADED_MODULE(module)) {
    PrkSignalException(PrkExcModuleAlreadyExists, new_name);
    return (PrkModule) PrkNull;
  } module = prk_make_module_internal(new_name, app);
  PRK_IS_LOADED_MODULE(module) = TRUE;
#ifdef OBJ_EVENTS
  {
    PrkoCreateModuleEventStruct mod_event_struct;
    mod_event_struct.module = module;
    PrkSignal(PrkoCreateModuleEventID, &mod_event_struct);
  }
endif /* OBJ_EVENTS */ return module;
}

/*
   returns a list of modules on which the given module depends
   to load itself back. i.e., the list of modules needs to be loaded
   first before loading the given module. Further detail - what this
   implies is that atleast a parent of an object in the given module
   is in one of the module in the return list.
*/
PrkList prk_dependent_modules_internal(PrkModule module)
{
  PrkList mods = PrkNil, parents, objects;
  PrkObject object, parent;
  PrkBool classp = TRUE;

ASSERT(PRK_MOD_P(module) || PRK_IS_APP(module), prk_dependent_modules_internal);
  objects = PRK_MOD_CLASS_LIST(module);
  while (!Null(objects) ||
         (classp ? ((classp = FALSE) ? FALSE :
                    (!Null(objects = PRK_MOD_INSTANCE_LIST(module)))) : FALSE)) {
    object = (PrkObject)PRK_FIRST(objects);
    objects = PRK_REST(objects);
    ASSERT_TYPE(object, PrkObjectTag, prk_dependent_modules_internal);
    ASSERT_TYPE(objects, PrkListTag, prk_dependent_modules_internal);
    parents = PrkObjectParents(object);
    ASSERT_TYPE(parents, PrkListTag, prk_write_object_in_file);
    while (!Null(parents)) {
      parent = (PrkObject) PRK_FIRST(parents);
      ASSERT_TYPE(parent, PrkObjectTag, prk_write_object_in_file);
      if (PRK_OBJECT_MODULE(parent) != module) {
        /* make entry into the dependent module list */
        if (Null(prk_member_eq(mods, (PrkType) PRK_OBJECT_MODULE(parent))))
          mods = PrkMakeCons((PrkType) PRK_OBJECT_MODULE(parent), (PrkType) mods);
      }
      parents = PRK_REST(parents);
      ASSERT_TYPE(parents, PrkListTag, prk_write_object_in_file);
    }
  }
  return mods;
}

PrkModule prk_load_module(PrkString pathname, PrkBool quietp)
{
```

```c
  USER_ASSERT_TYPE(pathname, PrkStringTag, PrkLoadModule);
  return (PrkModule) prk_load_objects(pathname, NULL, quietp, PrkLoadDefaultMonitor
}

PrkBool prk_save_module(PrkModule module, PrkString pathname, PrkBool quietp)
{
  USER_ASSERT_TYPE(pathname, PrkStringTag, PrkSaveModule);
  USER_ASSERT_FULL_MOD(module, PrkSaveModule);

if (prk_save_objects((PrkModule) module, pathname, quietp) != (PrkType) PrkNil)
    return TRUE;
  return FALSE;
}

/*
  prk_dependent_modules - Returns list of modules which depend on the
  given one.
*/

PrkList prk_dependent_modules(PrkModule mod)
{
  PrkList mods = PrkNil, classes, children;
  PrkObject class, child;
  PrkSat sat;
  unsigned hts;
  PrkModule child_mod;

ASSERT(PRK_MOD_P(mod), prk_dependent_modules);

for (classes = PRK_MOD_CLASS_LIST(mod); !Null(classes);
       classes = PRK_REST(classes)) {
    ASSERT_TYPE(classes, PrkListTag, prk_dependent_modules);
    class = (PrkObject)PRK_FIRST(classes);
    ASSERT_TYPE(class, PrkObjectTag, prk_dependent_modules);
    if (PRK_IS_LOADED_OBJECT(class)) {
      sat = PRK_OBJECT_SAT(class);
      if (sat != NullSat) {
        ASSERT(PRK_IS_SAT(sat), prk_dependent_modules);
        hts = PRK_SAT_HASH_TABLE_SIZE(sat);
        children = PRK_SAT_SUBCLASSES(sat, hts);
        for (; !Null(children); children = PRK_REST(children)) {
          ASSERT_TYPE(children, PrkListTag, prk_dependent_modules);
          child = (PrkObject)PRK_FIRST(children);
          ASSERT_TYPE(child, PrkObjectTag, prk_dependent_modules);
          if (PRK_IS_LOADED_OBJECT(child)) {
            if ((child_mod = PRK_OBJECT_MODULE(child)) != mod) {
              if (prk_member_ptr_eq(mods, (PrkType)child_mod) == PrkNil)
                mods = PrkMakeCons((PrkType)child_mod, (PrkType)mods);
            }
          }
        }
        children = PRK_SAT_INSTANCES(sat, hts);
        for (; !Null(children); children = PRK_REST(children)) {
          ASSERT_TYPE(children, PrkListTag, prk_dependent_modules);
          child = (PrkObject)PRK_FIRST(children);
          ASSERT_TYPE(child, PrkObjectTag, prk_dependent_modules);
          if (PRK_IS_LOADED_OBJECT(child)) {
            if ((child_mod = PRK_OBJECT_MODULE(child)) != mod) {
              if (prk_member_ptr_eq(mods, (PrkType)child_mod) == PrkNil)
                mods = PrkMakeCons((PrkType)child_mod, (PrkType)mods);
            }
          }
        }
      }
    }
  } return(mods);
}
```

```c
/*
  file: n_addslt.c
*/
static const char rcsid[] = "$Header: /tmp_mnt/net/op/prokee/src/generic/om/framema include <prokee/int_objm.ih>
include <prokee/mergefct.ih>
#include <prokee/rs_help.ih>

/* *** problems with PrkMakeSlot:
    multi parent instances
    instance SATs because parent has subclass/own slots
    fixing up multiparent SAT
    mixing in old slot same name
*/

/*
  PrkDeleteSlot algorithm:
    1.  Slot Exist?--No Exception exit
    2.  Instance?--handle specially (Not allowed)
    3.  own slot with no instances or last non-inherited slot to instances
            delete, shift other own slots, adjust SAT, shift VA
    4.  Mark all the way down, collecting max storage class count
    5.  If SC == Locked, make second pass for mixin error test
  Generic entry:
    6.  If any parent marked, exit
    7.  get raw revised SAT
    8.  fill raw revised SAT with local info
    9.  rearrange valuearray for SC
    10. if slot still there, inherit values
    11. shift following SCs
    12. store new SAT
    13. if class, process children
*/

/*
  PrkMakeSlot algorithm:
    1.  Parse rsd
    2.  Mark self and all children, checking for conflicts like
            storage_class, role, facet, and locked slot overflow or
            locked slot collision in child
            stop where slot exists or storage class stops
  Generic entry:
    3.  If any parent is marked, exit
    4.  If slot exists:
            if shared sat, goto 10a
            else clear mark; inherit here and down to marks, exit
    5.  Get Parent slots
    6.  If locked, go to 7b; else grow storage class and trailing storage classes
    7a. If location matches, goto 9a (if location after existing slots)
    8a. Create new sd
    9a. Add to SAT
    10a. if overflow array, create larger array, refill
            else shift higher storage classes by 2 words
    11a. create slot chunk and fill local values
    12a. clear mark
    13a. handle multi-parent sub-sats
    14a. process children 7b. shift higher locked SADs by 2 words
    8b. goto 9a
*/ define PRK_LOOP_OVER_SC_SADS(sd, sat, storage_class, count, bucket) \
    for (count = PRK_SAT_HASH_TABLE_SIZE(sat) - 1; \
         count >= 0; \
         count--) \
        for (bucket = PRK_SAT_HASH_BUCKET(sat, count); \
             !Null(bucket); \
             bucket = PRK_REST(bucket)) \
            if (PRK_SD_SLOT_TYPE(sd = (PrkSd)PRK_FIRST(bucket)) == (storage_class))
```

```c
void prk_move_down_value_array(PrkObject object, prk_value_array_index_t destinatic
                         prk_value_array_index_t source_offset, unsigned word_cou
{
  PrkType **dest_ptr, **source_ptr;

ASSERT_FULL_OBJECT(object, prk_move_down_value_array);
  ASSERT(source_offset > destination_offset, prk_move_down_value_array);

dest_ptr = source_ptr = PRK_OBJECT_VALUE_ARRAY(object);
  dest_ptr += destination_offset;
  source_ptr += source_offset;
  for (; word_count--;)
    *dest_ptr++ = *source_ptr++;
} void prk_mark_for_adding(PrkObject object, prk_rsd_t *rsd)
{
  ASSERT_FULL_OBJECT(object, prk_mark_for_adding);

if (!PRK_IS_MARKED_OBJECT(object)) {
    PrkSymbol slot_name = rsd->name;
    PrkSlotFlags sd_flags = rsd->flags;
    PrkSlotType
       storage_class = sd_flags & PRK_SD_SLOT_TYPE_MASK;
    PrkList children;
    PrkBool mark_children = TRUE;
    PrkSd sd;
    PrkSat sat = PRK_OBJECT_SAT(object);
    PrkInheritance role = rsd->role;

ASSERT(PRK_IS_SAT(sat), prk_mark_for_adding);

PRK_FIND_SAD(sd, sat, slot_name, goto not_found);
    ASSERT_TYPE(sd, PrkSdTag, prk_mark_for_adding);
    mark_children = FALSE;
    if (storage_class != PRK_SD_SLOT_TYPE(sd))
      PrkSignalExceptionLoop(PrkExcMarkSlotTypeConflict, object, slot_name);
    if (storage_class == PrkLockedSlotType) {
                              /* *** error state--different offsets */
    } if (prk_role_conflict_p(role, PRK_SD_ROLE_SPECIFIER(sd)))
      PrkSignalExceptionLoop(PrkExcSlotInheritanceConflict, PrkObjectName(object),
                slot_name, PRK_SD_ROLE_SPECIFIER(sd), role);

/* *** check flags? */ not_found:
    if (storage_class == PrkLockedSlotType) {
                              /* *** check to see if new locked
                                 slots are inheriting from above */
    } prk_mark_object(object);

if (mark_children & !PRK_IS_INSTANCE(object)) {
      unsigned hts = PRK_SAT_HASH_TABLE_SIZE(sat);
      switch (storage_class) {
      default:
        /* if storage class is right, mark instances */
        for (children = PRK_SAT_INSTANCES(sat, hts);
             !Null(children);
             children = PRK_REST(children))
          prk_mark_for_adding((PrkObject)PRK_FIRST(children), rsd);
                              /* fall through */ case PrkSubclassSlotType:
        /* mark subclasses */
        for (children = PRK_SAT_SUBCLASSES(sat, hts);
             !Null(children);
             children = PRK_REST(children))
          prk_mark_for_adding((PrkObject)PRK_FIRST(children), rsd);
        break;
```

```c
      case PrkOwnSlotType:
        break;

#ifdef NDEBUG
      case PrkLockedSlotType:
        break; /* *** Error case */
#endif /* NDEBUG */
      }
    }
  }
} void prk_mark_for_deleting(PrkObject object, PrkSymbol slot_name,
                           PrkSlotType storage_class,
                           prk_value_array_index_t *max_sc_size)
{
  prk_value_array_index_t size;
  PrkSat sat;

ASSERT_FULL_OBJECT(object, prk_mark_for_deleting);

sat = PRK_OBJECT_SAT(object);
  ASSERT(PRK_IS_SAT(sat), prk_mark_for_deleting);

if (!PRK_IS_MARKED_OBJECT(object)) { prk_mark_object(object);

switch (storage_class) {
    default:
      ASSERT_NEVER_REACHED(prk_mark_for_deleting);
      break;

case PrkDefaultSlotType:
      size = PRK_SAT_DEFAULT_END(sat) - PRK_SAT_LOCKED_END(sat);
      break;

case PrkLockedSlotType:
      size = PRK_SAT_LOCKED_END(sat);
      break;

case PrkSubclassSlotType:
      size = PRK_SAT_SUBCLASS_END(sat) - PRK_SAT_DEFAULT_END(sat);
      break;

case PrkSparseSlotType:
      UNSUPPORTED("Sparse Slots"); /* *** */
      break;

} if (size > *max_sc_size)
      *max_sc_size = size;

if (!PRK_IS_INSTANCE(object)) {
      sat_hash_index_t hts;
      PrkList children;

hts = PRK_SAT_HASH_TABLE_SIZE(sat);

switch (storage_class) {
      default:
        /* mark subclasses */
        for (children = PRK_SAT_SUBCLASSES(sat, hts);
             !Null(children);
             children = PRK_REST(children))
          prk_mark_for_deleting((PrkObject)PRK_FIRST(children), slot_name,
                                storage_class, max_sc_size);
        goto common_instance;

case PrkOwnSlotType:
        ASSERT(PRK_SAT_CHUNK_END(sat) - PRK_SAT_DEFAULT_END(sat) == 2,
               prk_mark_for_deleting);
```

```
    common_instance:
      /* if storage class is right, mark instances
         we mark instances even for PrkSubclassSlotType because
         as a result of deleting the last Subclass slot, the instance
         may be able to share the parent SAT directly rather than go
         through a shared instance SAT */
      for (children = PRK_SAT_INSTANCES(sat, hts);
           !Null(children);
           children = PRK_REST(children))
        prk_mark_for_deleting((PrkObject)PRK_FIRST(children), slot_name,
                              storage_class, max_sc_size);

break;

#ifdef NDEBUG
      case PrkLockedSlotType:
        break; /* *** Error case */
#endif /* NDEBUG */
    }
   }
  }
}

PrkBool prk_parent_is_marked_p(PrkList parents)
{
  for (; !Null(parents); parents = PRK_REST(parents)) {
    ASSERT_FULL_OBJECT(PRK_FIRST(parents), prk_parent_is_marked_p);
    if (PRK_IS_MARKED_OBJECT((PrkObject)PRK_FIRST(parents)))
      return TRUE;
  }
  return FALSE;
} void prk_use_old_sd_in_new_sat(PrkSat sat, PrkSd old_sd)
{
  PrkList *bucket, match;
  PrkSymbol name = PRK_SD_NAME(old_sd);

bucket = &PRK_FETCH_SAD_BUCKET(sat, name);

for (match = *bucket; !Null(match); match = PRK_REST(match)) {

ASSERT_TYPE(match, PrkListTag, prk_use_old_sd_in_new_sat);
    ASSERT_TYPE(PRK_FIRST(match), PrkSdTag, prk_use_old_sd_in_new_sat);
    if (PRK_SD_NAME((PrkSd)PRK_FIRST(match)) == name) {
      PRK_FIRST(match) = (PrkType)old_sd;
      return;
    }
  }
  *bucket = PrkMakeCons((PrkType)old_sd, (PrkType)*bucket);
}

PrkSat prk_delete_merge_sats(PrkSat new_sat, PrkSat old_sat, PrkSymbol slot_name,
                             PrkObject object, PrkSlotType storage_class)
{
  PrkBool instance_p = PRK_IS_INSTANCE(object);
  prk_value_array_index_t
    sd_count = PRK_SAT_CHUNK_END(old_sat) >> 1,
    sc_size;
  sat_hash_index_t old_hts;
  int count;
  PrkList bucket;
  PrkSd old_sd, new_sd, *new_sd_ptr;
  PrkSymbol new_slot_name;

new_sat =
    instance_p
      ? prk_make_isat_oneshot(new_sat, sd_count)
      : prk_make_csat(new_sat, sd_count, object);
```

```
switch (storage_class) {
default:
  ASSERT_NEVER_REACHED(prk_delete_merge_sats);
  break;

case PrkDefaultSlotType:
  sc_size = PRK_SAT_DEFAULT_END(new_sat) - PRK_SAT_LOCKED_END(new_sat);
  break;

case PrkLockedSlotType:
  sc_size = PRK_SAT_LOCKED_END(new_sat);
  break;

case PrkSubclassSlotType:
  sc_size = PRK_SAT_SUBCLASS_END(new_sat) - PRK_SAT_DEFAULT_END(new_sat);
  break;

case PrkOwnSlotType:
  sc_size = 0;
  break;

case PrkSparseSlotType:
  UNSUPPORTED("Sparse storage class"); /* *** */
  break;
} old_hts = PRK_SAT_HASH_TABLE_SIZE(old_sat);
for (count = old_hts - 1; count >= 0; count--)
  for (bucket = PRK_SAT_HASH_BUCKET(old_sat, count);
       !Null(bucket);
       bucket = PRK_REST(bucket)) {
    old_sd = (PrkSd)PRK_FIRST(bucket);
    ASSERT_TYPE(old_sd, PrkSdTag, prk_delete_merge_sats);
    if ((new_slot_name = PRK_SD_NAME(old_sd)) != slot_name) {
      if (PRK_SD_SLOT_TYPE(old_sd) != storage_class) {
        prk_use_old_sd_in_new_sat(new_sat, old_sd);
      }
      else {
        new_sd_ptr = prk_get_sd_ptr(new_slot_name, new_sat, object);
        new_sd = *new_sd_ptr;
        if (new_sd != old_sd) {
          prk_value_array_index_t offset;
          if (PRK_SD_OBJECT(new_sd) == object) {
            offset = sc_size;
            sc_size += 2;
          }
          else if (PRK_SD_OBJECT(old_sd) == object) {
            offset = PRK_SD_OFFSET(new_sd);
            PRK_MAKE_SAD(new_sd, object, new_slot_name);
            *new_sd_ptr = new_sd;

}
          else
            continue;
          *PRK_OBJECT_BASE((new_sd), PrkNonImmediateTag, PrkSd) =
            *PRK_OBJECT_BASE((old_sd), PrkNonImmediateTag, PrkSd);
          PRK_SD_OFFSET(new_sd) = offset;
        }
      }
    }
  }

PRK_SAT_LOCKED_END(new_sat) =
  (storage_class == PrkLockedSlotType)
    ? sc_size
    : PRK_SAT_LOCKED_END(old_sat);

PRK_SAT_DEFAULT_END(new_sat) = PRK_SAT_LOCKED_END(new_sat) +
  ((storage_class == PrkDefaultSlotType)
    ? sc_size
    : PRK_SAT_DEFAULT_END(old_sat) - PRK_SAT_LOCKED_END(old_sat));
```

```c
  PRK_SAT_SUBCLASS_END(new_sat) = PRK_SAT_DEFAULT_END(new_sat) +
    ((storage_class == PrkSubclassSlotType)
       ? sc_size
       : PRK_SAT_SUBCLASS_END(old_sat) - PRK_SAT_DEFAULT_END(old_sat));

PRK_SAT_CHUNK_END(new_sat) = PRK_SAT_SUBCLASS_END(new_sat) +
    ((storage_class == PrkOwnSlotType)
       ? sc_size
       : PRK_SAT_CHUNK_END(old_sat) - PRK_SAT_SUBCLASS_END(old_sat));

if (storage_class == PrkSparseSlotType)
    UNSUPPORTED("Sparse Storage Class");

if (!instance_p) {
    sat_hash_index_t new_hts = PRK_SAT_HASH_TABLE_SIZE(new_sat);
    PRK_SAT_INSTANCES(new_sat, new_hts) = PRK_SAT_INSTANCES(old_sat, old_hts);
    PRK_SAT_SUBCLASSES(new_sat, new_hts) = PRK_SAT_SUBCLASSES(old_sat, old_hts);
  }
  PRK_SAT_CHUNK_ARRAY_SIZE(new_sat) = PRK_SAT_CHUNK_ARRAY_SIZE(old_sat);
  return new_sat;
} void prk_generic_delete_slot(PrkObject object, PrkSymbol slot_name,
                             PrkType **temp_array, PrkSlotType storage_class)
{
  PrkSat sat, new_sat;
  PrkList parents, bucket;
  PrkSd new_sd, old_sd;
  PrkBool instance_p;
  PrkCollectionSize parent_count;
  prk_value_array_index_t sc_offset, trailing_sc_offset, sc_size;
  int count;
  PrkType **value_array;

ASSERT_FULL_OBJECT(object, prk_generic_delete_slot);
  ASSERT(PRK_IS_MARKED_OBJECT(object), prk_generic_delete_slot);

sat = PRK_OBJECT_SAT(object);
  ASSERT(PRK_IS_SAT(sat), prk_generic_delete_slot);

parents = PRK_OBJECT_PARENTS(object, sat, PRK_SAT_HASH_TABLE_SIZE(sat));
  ASSERT_TYPE(parents, PrkListTag, prk_generic_delete_slot);

value_array = PRK_OBJECT_VALUE_ARRAY(object);

/* Step 6: if any parents marked, exit */
  if (prk_parent_is_marked_p(parents))
    return;

/* Step 7: get raw revised SAT */
  parent_count = PrkListLength(parents);
  switch (parent_count) {
  case 0:
    new_sat = empty_sat;
    break;

case 1:
    new_sat = PRK_OBJECT_SAT((PrkObject)PRK_FIRST(parents));
    break;

default:
    new_sat = prk_slow_get_hashed_parent_sat(parents, "PrkDeleteSlot");
    break;
  } instance_p = PRK_IS_INSTANCE(object);
  ASSERT(PRK_IS_SAT(new_sat), prk_generic_delete_slot);
  if (instance_p && PRK_SAT_DEFAULT_END(new_sat) != PRK_SAT_CHUNK_END(new_sat))
    new_sat = prk_instance_sat_from_class_sat(new_sat);

/* Step 8: fill raw revised SAT with local info */
  if (!instance_p)
    new_sat = prk_delete_merge_sats(new_sat, sat, slot_name, object, storage_class)
```

```c
                        /* Step 9: rearrange valuearray for SC */
switch (storage_class) {
default:
  ASSERT_NEVER_REACHED(prk_generic_delete_slot);
  break;

case PrkDefaultSlotType:
  sc_offset = PRK_SAT_LOCKED_END(new_sat);
  trailing_sc_offset = PRK_SAT_DEFAULT_END(new_sat);
  sc_size = PRK_SAT_DEFAULT_END(sat) - PRK_SAT_LOCKED_END(sat);
  break;

case PrkLockedSlotType:
  sc_offset = 0;
  trailing_sc_offset = PRK_SAT_LOCKED_END(new_sat);
  sc_size = PRK_SAT_LOCKED_END(sat);
  break;

case PrkSubclassSlotType:
  sc_offset = PRK_SAT_DEFAULT_END(new_sat);
  trailing_sc_offset = PRK_SAT_SUBCLASS_END(new_sat);
  sc_size = PRK_SAT_SUBCLASS_END(sat) - PRK_SAT_DEFAULT_END(sat);
  break;

case PrkOwnSlotType:
  sc_offset = PRK_SAT_SUBCLASS_END(new_sat);
  trailing_sc_offset = PRK_SAT_CHUNK_END(new_sat);
  sc_size = PRK_SAT_CHUNK_END(sat) - PRK_SAT_SUBCLASS_END(sat);
  break;

case PrkSparseSlotType:
    UNSUPPORTED("Sparse Slots"); /* *** */
    break;
} memcpy(temp_array, value_array + sc_offset,
       (size_t)(sc_size * sizeof(PrkType *)));

PRK_LOOP_OVER_SC_SADS(new_sd, new_sat, storage_class, count, bucket) {
  prk_value_array_index_t old_offset, new_offset;
  PrkSymbol new_slot_name = PRK_SD_NAME(new_sd);
  PRK_FIND_SAD(old_sd, sat, new_slot_name,
               ASSERT_NEVER_REACHED(prk_generic_delete_slot));
  new_offset = PRK_SD_OFFSET(new_sd);
  old_offset = PRK_SD_OFFSET(old_sd);
  value_array[sc_offset + new_offset] = temp_array[old_offset];
  value_array[sc_offset + new_offset + 1] = temp_array[old_offset + 1];
}

/* *** Step 10: if slot still there, inherit values
                        /* *** check to make sure new SAD same size as old
                           SAD */

/* Step 11: shift following SCs */
if (PRK_SAT_CHUNK_END(new_sat) != PRK_SAT_CHUNK_END(sat))
  prk_move_down_value_array(object, trailing_sc_offset, trailing_sc_offset + 2,
                PRK_SAT_CHUNK_END(new_sat) - trailing_sc_offset);

/* Step 12: store new SAT */
PRK_OBJECT_SAT(object) = new_sat;

/* Step 13: unmark object */
prk_unmark_object(object);

/* Step 14: if class, process children */
if (!instance_p) {
  PrkList children;
  PrkObject child;
  sat_hash_index_t hts = PRK_SAT_HASH_TABLE_SIZE(new_sat);

for (children = PRK_SAT_SUBCLASSES(new_sat, hts);
       !Null(children);
```

```
                 children = PRK_REST(children)) {
      child = (PrkObject)PRK_FIRST(children);
      ASSERT_FULL_OBJECT(child, prk_generic_delete_slot);
      if (PRK_IS_MARKED_OBJECT(child))
        prk_generic_delete_slot(child, slot_name, temp_array, storage_class);
    }
    for (children = PRK_SAT_INSTANCES(new_sat, hts);
         !Null(children);
         children = PRK_REST(children)) {
      child = (PrkObject)PRK_FIRST(children);
      ASSERT_FULL_OBJECT(child, prk_generic_delete_slot);
      if (PRK_IS_MARKED_OBJECT(child))
        prk_generic_delete_slot(child, slot_name, temp_array, storage_class);
    }
  }
  return;
}

USER_EXPORT void PrkDeleteSlot(PrkObject object, PrkSymbol slot_name)
{
  PrkSd sd;
  PrkSat sat;
  PrkSlotType storage_class;
  prk_value_array_index_t max_sc_size;
  sat_hash_index_t hts;
  PrkType **temp_array;
  PrkType **chunk;

USER_ASSERT_FULL_OBJECT(object, PrkDeleteSlot);
  USER_ASSERT_TYPE(slot_name, PrkSymbolTag, PrkDeleteSlot);

if (PRK_IS_SYSTEM_OBJECT(object)) {
    PrkSignalException(PrkExcSysObjOperationMsg, object, "delete slot");
    return;
  }
  if (PRK_IS_INSTANCE(object))
    PrkSignalExceptionLoop(PrkExcIllegalInstSlotOp,PRK_OBJECT_NAME(object),slot_nam
                   "PrkDeleteSlot");
  /*USER_ASSERT(PrkIsSlotOrigin(object, slot_name), PrkDeleteSlot);*/ sat = PRK_OBJECT_SAT(object);
  ASSERT(PRK_IS_SAT(sat), PrkDeleteSlot);
  hts = PRK_SAT_HASH_TABLE_SIZE(sat);

/* Step 1: Slot Exist?--No exception exit */
  PRK_FIND_SAD(sd, sat, slot_name,
              PrkSignalExceptionLoop(PrkExcNonExistentSlot,
                                     object, slot_name));
  chunk = PRK_OBJECT_VALUE_ARRAY(object);
  storage_class = PRK_SD_SLOT_TYPE(sd);
  CALCULATE_FULL_OFFSET(chunk, sat, storage_class, sd, PrkDeleteSlot);

#if 0
                                  /* Step 2: Instance?--special case */
  if (PRK_IS_INSTANCE(object)) {
    /* *** handle specially */
    return;
  }
endif ifdef OBJ_EVENTS
  if (PRK_IS_OBJECT_STRUCTURE_INTEREST(object))
    prko_signal_slot_mod(object, slot_name, storage_class,
                         PrkoPendingDeleteSlotEventID);
endif prk_call_slot_detach_meths(object, sd, chunk);

if (storage_class == PrkOwnSlotType &&
      (PRK_SAT_INSTANCE_SAT(sat, hts) == NullSat ||
       PRK_SAT_CHUNK_END(sat) - PRK_SAT_DEFAULT_END(sat) != 2)) {
                              /* Step 3: own slot under special circumstances?
                                 delete, shift other own slots, adjust SAT,
                                 shift VA, exit */
```

```c
    prk_value_array_index_t
       offset = PRK_SD_OFFSET(sd),
       absolute_offset = offset + PRK_SAT_SUBCLASS_END(sat);
    PrkSd sd2;
    int count;
    PrkList bucket, *bucket_ptr;

if (absolute_offset + 2 != PRK_SAT_CHUNK_END(sat)) {
                                /* need to shift other sds */
       PRK_LOOP_OVER_SC_SADS(sd2, sat, PrkOwnSlotType, count, bucket) {
          if (PRK_SD_OFFSET(sd2) > offset)
             PRK_SD_OFFSET(sd2) -= 2;
       }
    }
    bucket_ptr = &PRK_FETCH_SAD_BUCKET(sat, slot_name);
    prk_delete_element_ptr((PrkType)sd, bucket_ptr);
    PRK_SAT_CHUNK_END(sat) -= 2;
    prk_move_down_value_array(object, absolute_offset, absolute_offset + 2,
                     PRK_SAT_CHUNK_END(sat) - absolute_offset);

#ifdef OBJ_EVENTS
    if (PRK_IS_OBJECT_STRUCTURE_INTEREST(object))
       prko_signal_slot_mod(object, slot_name, storage_class,
                            PrkoSlotDeletedEventID);
endif return;
  }

/* Step 4: Mark all the way down */
  max_sc_size = 0;
  prk_mark_for_deleting(object, slot_name, storage_class, &max_sc_size);

if (storage_class == PrkLockedSlotType) {
                                /* Step 5: if SC == Locked: make second pass */
                                /* *** Make second pass */
  } temp_array = (PrkType **)alloca(max_sc_size * sizeof(PrkType *));

prk_generic_delete_slot(object, slot_name, temp_array, storage_class);

#ifdef OBJ_EVENTS
  if (PRK_IS_OBJECT_STRUCTURE_INTEREST(object))
     prko_signal_slot_mod(object, slot_name, storage_class,
                          PrkoSlotDeletedEventID);
endif
} void prk_add_slot_inherit_down(PrkObject object, PrkSd sd, prk_rsd_t *rsd)
{                               /* *** */
  /* This needs to check if rsd info expands sd */
  return;
}

PrkSd prk_make_sd_in_add_slot(PrkObject object, PrkSymbol slot_name, prk_sd_table_t
                     prk_rsd_t *rsd)
{
  PrkSd sd, old_sd;
  PrkSat sat;
  unsigned count;
  PrkSlotFlags sd_flags = rsd->flags;
  PrkInheritance role = rsd->role;

PRK_MAKE_SAD(sd, object, slot_name);
  PRK_SD_ROLE_SPECIFIER(sd) = role;
  PRK_SD_FLAGS(sd) = sd_flags;

switch (sd_table->count) {
  case 0:
    NO_MERGE_STATIC_FACET_CODE(sd, rsd);
```

```
      break;

case 1:
      old_sd = TABLE_ELT(sd_table, 0).parent_sd;
      goto parent_case;

default:
      sat = prk_slow_get_hashed_parent_sat(PrkObjectParents(object),
                                           "PrkMakeSlot");
      PRK_FIND_SAD(old_sd, sat, slot_name,
                   PrkSignalExceptionLoop(PrkExcNonExistentSlot, object, slot_name));
                                      /* Fall through */
    parent_case:
      MERGE_STATIC_FACET_CODE(sd, old_sd, count, rsd);
      break;
  }

/* formerly: PRK_LAYOUT_CHUNK(role, sd, sd_flags); */
      /* see also objmain.c */
  if (!PRK_IS_USER_DEFINED_INHERITANCE(role))
    switch ((PrkFacetInheritance)role) {
      unsigned char _sd_size;
    default:
      ASSERT_NEVER_REACHED(PRK_LAYOUT_CHUNK_MACRO);
      break;
    case PrkMethodInheritance:
      sd_flags |= PrkNoWhenChangedMonitorsFlag | PrkNoWhenNeededMonitorsFlag;
      PRK_SD_FLAGS(sd) = sd_flags;
      _sd_size = 1;
      goto common_layout;
    case PrkSVOverrideInheritance:
    case PrkMVOverrideInheritance:
    case PrkMVNoInheritance:
    case PrkSVNoInheritance:
    case PrkMVInitialInheritance:
    case PrkSVInitialInheritance:
      _sd_size = !PRK_SD_DISALLOW_AVS_P(sd_flags);
     common_layout:
      PRK_SD_STATIC_FACET_START(sd) = _sd_size;
      if (PRK_SD_STATIC_FACET_SIZE(sd))
        _sd_size++;
      if (!PRK_SD_DISALLOW_DFACETS_P(sd))
        _sd_size++;
      PRK_SD_SIZE(sd) = _sd_size;
      break;
    case PrkSelfLastUnionInheritance:
    case PrkSelfFirstUnionInheritance:
      _sd_size = !PRK_SD_DISALLOW_AVS_P(sd_flags) + 1;
      goto common_layout;
    }
  else
    (PRK_SMT_METHOD(role, PRK_SMT_LAYOUT_CHUNK))(sd);

return sd;
} void prk_add_slot_modify_multi_sat(PrkSat sat, prk_rsd_t *rsd)
{
  prk_sd_table_t *sd_table;
  PrkList parents = PRK_SAT_PARENTS(sat);
  PrkSymbol slot_name = rsd->name;
  PrkSd sd, *sd_ptr;
  PrkSlotType storage_class;
  PrkList *bucket;

sd_table = PRK_STACK_TABLE(prk_sd_table_t, prk_sd_object_t, PrkListLength(parents
  prk_fill_sd_table(slot_name, sd_table, parents, FALSE);

if (!sd_table->count)
    return;

sd_ptr = prk_maybe_get_sd_ptr(slot_name, sat);
  if (sd_ptr) {
```

```
    unsigned count;
    sd = *sd_ptr;
    ASSERT_TYPE(sd, PrkSdTag, prk_add_slot_modify_multi_sat);

for (count = 0; count < sd_table->count; count++)
      prk_sd_collision(sd_ptr, TABLE_ELT(sd_table, count).parent_sd);
    return;
  }

/* check to see if rsd info expands sd */ sd = TABLE_ELT(sd_table, 0).parent_sd;
  storage_class = PRK_SD_SLOT_TYPE(sd);
  switch (storage_class) {
  default:
    ASSERT_NEVER_REACHED(prk_add_slot_modify_multi_sat);
    break;

case PrkLockedSlotType:
    ASSERT(PRK_SD_OFFSET(sd) == PRK_SAT_LOCKED_END(sat),
           prk_add_slot_modify_multi_sat);
    PRK_SAT_LOCKED_END(sat) += 2;
    goto common_default;

case PrkDefaultSlotType:
    if (PRK_SD_OFFSET(sd) != (PRK_SAT_DEFAULT_END(sat) -
                              PRK_SAT_LOCKED_END(sat))) {
      sd = prk_copy_sd(sd);
      PRK_SD_OFFSET(sd) = PRK_SAT_DEFAULT_END(sat) - PRK_SAT_LOCKED_END(sat);
      PRK_SD_OBJECT(sd) = (PrkObject)PrkNull;
    }
  common_default:
    PRK_SAT_DEFAULT_END(sat) += 2;
    goto common_subclass;

case PrkSubclassSlotType:
    if (PRK_SD_OFFSET(sd) != (PRK_SAT_SUBCLASS_END(sat) -
                              PRK_SAT_DEFAULT_END(sat))) {
      sd = prk_copy_sd(sd);

PRK_SD_OFFSET(sd) = PRK_SAT_SUBCLASS_END(sat) - PRK_SAT_DEFAULT_END(sat);
      PRK_SD_OBJECT(sd) = (PrkObject)PrkNull;
    }
   common_subclass:
    ASSERT(PRK_SAT_SUBCLASS_END(sat) == PRK_SAT_CHUNK_END(sat),
           prk_add_slot_modify_multi_sat);
    PRK_SAT_CHUNK_END(sat) = PRK_SAT_SUBCLASS_END(sat) += 2;
    break;

case PrkSparseSlotType:
      UNSUPPORTED("Sparse Slots");  /* *** */
      break;

case PrkOwnSlotType:
    return;                         /* don't add */
  } bucket = &PRK_FETCH_SAD_BUCKET(sat, slot_name);
  *bucket = PrkMakeCons((PrkType)sd, (PrkType)*bucket);

if (PRK_SAT_CHUNK_END(sat) > PRK_SAT_CHUNK_ARRAY_SIZE(sat)) {
    prk_value_array_index_t old_array_size = PRK_SAT_CHUNK_ARRAY_SIZE(sat);
    PrkSat isat;
    PRK_SAT_CHUNK_ARRAY_SIZE(sat) =
      PRK_SAT_CHUNK_END(sat) + PRK_DEFAULT_VA_FUDGE_FACTOR;

/* *** Grow shared instance SATs as necessary */
    /* *** Grow instances as necessary */
  }
} void prk_generic_add_slot(PrkObject object, prk_rsd_t *rsd,
                          int old_parent_value_array_size)
```

```
{
  PrkSat sat, parent_sat;
  PrkSymbol slot_name;
  PrkSd sd, parent_sd;
  PrkList parents;
  prk_sd_table_t *sd_table;
  PrkSlotFlags sd_flags = rsd->flags;
  PrkSlotType storage_class = sd_flags & PRK_SD_SLOT_TYPE_MASK;
  prk_value_array_index_t offset;
  unsigned i, absolute_offset, chunk_end, parent_count;
  PrkType **value_array, **parent_slot_chunk, **slot_chunk;
  PrkBool single_sd_parent_p, instance_p;
  PrkObject first_parent;
  PrkInheritance role_specifier;

ASSERT_FULL_OBJECT(object, prk_generic_add_slot);
  ASSERT(PRK_IS_MARKED_OBJECT(object), prk_generic_add_slot);

sat = PRK_OBJECT_SAT(object);
  ASSERT(PRK_IS_SAT(sat), prk_generic_add_slot);

/* Step 3: if any parents marked, exit */
  parents = PRK_OBJECT_PARENTS(object, sat, PRK_SAT_HASH_TABLE_SIZE(sat));
  ASSERT_TYPE(parents, PrkListTag, prk_generic_add_slot);
  if (prk_parent_is_marked_p(parents))
    return;

slot_name = rsd->name;
  instance_p = PRK_IS_INSTANCE(object);

PRK_FIND_SAD(sd, sat, slot_name, goto not_found);

/* Step 4: if slot exists:
                                   if shared sat, goto 10a;
                                   else clear mark; inherit here and
                                       down to marks; exit */
  if (instance_p)
    goto not_found;

prk_unmark_object(object);

prk_add_slot_inherit_down(object, sd, rsd);
  return;

not_found:
                              /* Step 5: get parent slots */
  sd_table = PRK_STACK_TABLE(prk_sd_table_t, prk_sd_object_t, PrkListLength(parents
  prk_fill_sd_table(slot_name, sd_table, parents, instance_p);
  parent_count = sd_table->count;
  if (single_sd_parent_p = parent_count == 1) {
    first_parent = TABLE_ELT(sd_table, 0).parent;
    parent_sd = TABLE_ELT(sd_table, 0).parent_sd;
    parent_slot_chunk =
      PRK_OBJECT_VALUE_ARRAY(first_parent) + PRK_SD_OFFSET(parent_sd);
    parent_sat = PRK_OBJECT_SAT(first_parent);
  } if (instance_p) {
    offset = PRK_SD_OFFSET(sd);
    switch (storage_class) {
    default:
      ASSERT_NEVER_REACHED(prk_generic_add_slot);
      break;

case PrkDefaultSlotType:
      absolute_offset = PRK_SAT_LOCKED_END(sat) + offset;
      if (single_sd_parent_p)
        parent_slot_chunk += PRK_SAT_LOCKED_END(parent_sat);
      goto step_10a;

case PrkLockedSlotType:
      absolute_offset = offset;
      goto step_10a;
```

```
    case PrkSubclassSlotType:
      absolute_offset = PRK_SAT_DEFAULT_END(sat) + offset;
      if (single_sd_parent_p)
        parent_slot_chunk += PRK_SAT_DEFAULT_END(parent_sat);
      goto step_10a;
    case PrkOwnSlotType:
      absolute_offset = PRK_SAT_SUBCLASS_END(sat) + offset;
      goto step_10a;

case PrkSparseSlotType:
      UNSUPPORTED("Sparse Slots"); /* *** */
      break;
    }
}

/* Step 6: if locked, goto 7b */
switch (storage_class) {
default:
  ASSERT_NEVER_REACHED(prk_generic_add_slot);
  break;

case PrkDefaultSlotType:
  offset =
    (absolute_offset - PRK_SAT_DEFAULT_END(sat)) - PRK_SAT_LOCKED_END(sat);
  if (single_sd_parent_p)
    parent_slot_chunk += PRK_SAT_LOCKED_END(parent_sat);

PRK_SAT_DEFAULT_END(sat) += 2;
  goto grow_subclass;

case PrkLockedSlotType:
  goto step_7b;

case PrkSubclassSlotType:
  offset =
    (absolute_offset - PRK_SAT_SUBCLASS_END(sat)) - PRK_SAT_DEFAULT_END(sat);
  if (single_sd_parent_p)
    parent_slot_chunk += PRK_SAT_DEFAULT_END(parent_sat);

grow_subclass:
  PRK_SAT_SUBCLASS_END(sat) += 2;
  goto grow_own;

case PrkOwnSlotType:
  offset =
    (absolute_offset - PRK_SAT_CHUNK_END(sat)) - PRK_SAT_SUBCLASS_END(sat);

grow_own:
  PRK_SAT_CHUNK_END(sat) += 2;
  break;

case PrkSparseSlotType:
  UNSUPPORTED("Sparse Slots"); /* *** */
  break;
}

/* Step 7a: if match on location, goto 9a */
for (i = 0; i < sd_table->count; i++)
  if (PRK_SD_OFFSET(sd = TABLE_ELT(sd_table, i).parent_sd) == offset)
    goto step_9a;

/* Step 8a: create new sd */
sd = prk_make_sd_in_add_slot(object, slot_name, sd_table, rsd);
PRK_SD_OFFSET(sd) = offset;

/* Step 9a: Add to SAT */
step_9a:
  PrkAddListPtrElmt((PrkType)sd, &PRK_FETCH_SAD_BUCKET(sat, slot_name));

/* Step 10a: if overflow array, create larger
                                   array, refill; else shift higher storage classes
                                   by 2 words */
```

```
step_10a:
 value_array = PRK_OBJECT_VALUE_ARRAY(object);
 chunk_end = PRK_SAT_CHUNK_END(sat);
 if (!instance_p)
   old_parent_value_array_size = PRK_SAT_CHUNK_ARRAY_SIZE(sat);

if (chunk_end > old_parent_value_array_size) {
   unsigned new_array_size = chunk_end + PRK_DEFAULT_VA_FUDGE_FACTOR;
   PrkType **new_value_array =
     (PrkType **)PRK_GC_MALLOC((size_t)(new_array_size * sizeof(PrkType *)));
   memcpy(new_value_array, value_array,
          (size_t)(absolute_offset * sizeof(PrkType *)));
   new_value_array[absolute_offset] =
     new_value_array[absolute_offset + 1] = (PrkType *)PRK_UNCHECKED_VALUE_CELL;
   memcpy(new_value_array + absolute_offset + 2,
          value_array + absolute_offset,
          (size_t)((chunk_end - absolute_offset - 2) * sizeof(PrkType *)));
   for (i = chunk_end; i < new_array_size; i++)
     new_value_array[i] = (PrkType *)PRK_UNCHECKED_VALUE_CELL;
   /* *** free old value_array */
   PRK_OBJECT_VALUE_ARRAY(object) = value_array = new_value_array;
   PRK_SAT_CHUNK_ARRAY_SIZE(sat) = new_array_size;        /* *** JAT - OK? */
 }
 else if (chunk_end - absolute_offset != 2) {
   PrkType **aliased_value_array;
   value_array += chunk_end - 1;
   aliased_value_array = value_array - 2;
   for (i = chunk_end - absolute_offset - 2; i-- > 0; )
     *value_array-- = *aliased_value_array--;
   value_array = PRK_OBJECT_VALUE_ARRAY(object);
 }

/* Step 11a: Create slot chunk and fill local
                                    values */
 slot_chunk = value_array + absolute_offset;
#include <prokee/fillcode.ih>

/* Step 12a: clear mark */
 prk_unmark_object(object);

rsd->value = PrkNull;
 rsd->static_ftable = rsd->dynamic_ftable = (prk_parsed_facet_table_t *)0;

if (!instance_p) {

PrkList children;
 PrkObject child;
 sat_hash_index_t hts = PRK_SAT_HASH_TABLE_SIZE(sat);

/* Step 13a: handle multi-parent sub-sats */
 children = PRK_SAT_MULTI_SATS(sat, hts);
 if (!Null(children) && (storage_class != PrkOwnSlotType))
    for (; !Null(children = PRK_REST(children)); ) {
      PrkSat multi_sat = (PrkSat)PRK_FIRST(children);
      parents = PRK_SAT_PARENTS(multi_sat);
      if (!prk_parent_is_marked_p(parents))
        prk_add_slot_modify_multi_sat(multi_sat, rsd);
    } if ((PRK_SAT_INSTANCE_SAT(sat, hts) != NullSat) &&
     (storage_class != PrkOwnSlotType))
    prk_add_slot_modify_multi_sat(PRK_SAT_INSTANCE_SAT(sat, hts), rsd);

/* Step 14a: process children */
 for (children = PRK_SAT_SUBCLASSES(sat, hts); !Null(children);
      children = PRK_REST(children)) {
   child = (PrkObject)PRK_FIRST(children);
   ASSERT_FULL_OBJECT(child, prk_generic_add_slot);
   if (PRK_IS_MARKED_OBJECT(child))
     prk_generic_add_slot(child, rsd, old_parent_value_array_size);
 }
 for (children = PRK_SAT_INSTANCES(sat, hts); !Null(children);
      children = PRK_REST(children)) {
```

```
    child = (PrkObject)PRK_FIRST(children);
    ASSERT_FULL_OBJECT(child, prk_generic_add_slot);
    if (PRK_IS_MARKED_OBJECT(child))
      prk_generic_add_slot(child, rsd, old_parent_value_array_size);
    else if ((storage_class == PrkOwnSlotType) &&
             PRK_IS_CSAT(PRK_OBJECT_SAT(child))) {
      PrkSat isat;
      if (!PRK_IS_SAT(isat = PRK_SAT_INSTANCE_SAT(sat, hts)))
        isat = PRK_SAT_INSTANCE_SAT(sat, hts) =
          prk_instance_sat_from_class_sat(sat);
      PRK_OBJECT_SAT(child) = isat;
    }
  }
} if (PRK_AVGET_P(sd,slot_chunk) || PRK_AVPUT_P(sd, slot_chunk))
  prk_call_slot_attach_meths(object, sd, slot_chunk,
                                         PrkMonitorFireOnAttachFlag);

return;

step_7b:
/* *** */ absolute_offset = PRK_SAT_LOCKED_END(sat);
PRK_SAT_LOCKED_END(sat)   += 2;
PRK_SAT_DEFAULT_END(sat)  += 2;
PRK_SAT_SUBCLASS_END(sat) += 2;

PRK_SAT_CHUNK_END(sat) += 2;
goto step_9a;
}

USER_EXPORT void PrkMakeSlot(PrkObject object, PrkSymbol slot_name, PrkRawSlotData
{
  PrkSat sat;
  prk_rsd_t rsd;
  PrkBool dummy_must_create_p;

USER_ASSERT_FULL_OBJECT(object, PrkMakeSlot);
  USER_ASSERT_TYPE(slot_name, PrkSymbolTag, PrkMakeSlot);
  USER_ASSERT_TYPE(raw_slot_data, PrkRawSlotDataTag, PrkMakeSlot);

if (PRK_IS_INSTANCE(object))
    PrkSignalExceptionLoop(PrkExcIllegalInstSlotOp,PRK_OBJECT_NAME(object),slot_nam
                    "PrkMakeSlot");

/* Step 1: parse raw_slot_data */
  prk_calc_facet_lengths(raw_slot_data, &rsd);
  {
    unsigned count;
    if (count = (unsigned char)rsd.dynamic_ftable) {
      rsd.dynamic_ftable =
        PRK_STACK_TABLE(prk_parsed_facet_table_t, prk_parsed_raw_facet_t, count);
      rsd.dynamic_ftable->count = count;
    }
    if (count = (unsigned char)rsd.static_ftable) {
      rsd.static_ftable =
        PRK_STACK_TABLE(prk_parsed_facet_table_t, prk_parsed_raw_facet_t, count);
      rsd.static_ftable->count = count;
    }
  } sat = PRK_OBJECT_SAT(object);
  ASSERT(PRK_IS_SAT(sat), PrkMakeSlot);

if (!prk_parse_raw_slot_datum(PrkObjectName(object), sat, &rsd, slot_name, raw_sl
    PrkSignalExceptionLoop(PrkExcSlotAlreadyExists, object, slot_name);

if (PRK_IS_INSTANCE(object) &&
      (rsd.flags & PRK_SD_SLOT_TYPE_MASK) > PrkLockedSlotType) {
                              /* *** error state */
```

```
                                    /* Step 2: Mark self and all children */
  prk_mark_for_adding(object, &rsd);

ASSERT(PRK_IS_MARKED_OBJECT(object), PrkMakeSlot);

prk_generic_add_slot(object, &rsd, -1);

#ifdef OBJ_EVENTS
  if (PRK_IS_OBJECT_STRUCTURE_INTEREST(object)) {
    PrkSd sd;
    PRK_FIND_SAD(sd, sat, slot_name,
                 PrkSignalExceptionLoop(PrkExcNonExistentSlot, object, slot_name));
    prk_mark_object_decnds(object);
    prko_signal_slot_mod(object, slot_name, PRK_SD_SLOT_TYPE(sd),
                         PrkoAddSlotEventID);
  }
endif return;
} void prk_unmark_module(PrkModule module)
{
  PrkList l;
  ASSERT_TYPE(module, PrkObjectTag, prk_unmark_module);

for (l = PRK_MOD_CLASS_LIST(module); !Null(l); l = PRK_REST(l)) {
    ASSERT_FULL_OBJECT(PRK_FIRST(l), prk_unmark_module);
    prk_unmark_object((PrkObject)PRK_FIRST(l));
  } for (l = PRK_MOD_INSTANCE_LIST(module); !Null(l); l = PRK_REST(l)) {
    ASSERT_FULL_OBJECT(PRK_FIRST(l), prk_unmark_module);
    prk_unmark_object((PrkObject)PRK_FIRST(l));
  }
}

USER_EXPORT void PrkUnmarkObjects(PrkList l)
{
  PrkType o;

USER_ASSERT_TYPE(l, PrkListTag, PrkUnmarkObjects);

if (Null(l)) {
    l = PrkApps();
  } for (; !Null(l); l = PRK_REST(l)) {
    o = PRK_FIRST(l);
    switch (PrkGetType(o)) {
    default:
      PrkSignalExceptionLoop(PrkExcUnmarkError, o);

case PrkObjectTag:
      USER_ASSERT_FULL_OBJECT(o, PrkUnmarkObjects);
      prk_unmark_object((PrkObject)o);
      break;
    }
  }
} void prk_unmark_descendants(PrkObject super, unsigned link)
{
  PrkList object_list;
  PrkObject object;
  ASSERT(PrkIsObject(super), prk_unmark_descendants);
  ASSERT(PRK_IS_MARKED_OBJECT(super), prk_unmark_descendants);
  ASSERT(link == SUBCLASS_LINK ||
         link == INSTANCE_LINK ||
         link == ALL_LINK, prk_unmark_descendants);
```

```
  prk_unmark_object(super);
  for (object_list = PrkObjectChildren(super, FALSE); /* process subclasses */
       !Null(object_list);
       object_list = PRK_REST(object_list)) {
    ASSERT_TYPE(object_list, PrkListTag, prk_unmark_descendants);
    object = (PrkObject)PRK_FIRST(object_list);
    ASSERT_TYPE(object, PrkObjectTag, prk_unmark_descendants);
    ASSERT(!PrkIsInstance(object), prk_unmark_descendants);
    if (PRK_IS_MARKED_OBJECT(object))
      prk_unmark_descendants(object, link);
  }
  if (link != SUBCLASS_LINK)
    for (object_list = PrkObjectChildren(super, TRUE); /* process instances */
         !Null(object_list);
         object_list = PRK_REST(object_list)) {
      ASSERT_TYPE(object_list, PrkListTag, prk_unmark_descendants);
      object = (PrkObject)PRK_FIRST(object_list);
      ASSERT_TYPE(object, PrkObjectTag, prk_unmark_descendants);
      ASSERT(PrkIsInstance(object), prk_unmark_descendants);
      prk_unmark_object(object);
    }
}

/*
  file: n_objmn.c
*/
static const char rcsid[] = "$Header: /tmp_mnt/net/op/prokee/src/generic/om/framema include <int_objm.ih>

CONST svf_t default_svf = {
  PRK_NO_AV,                    /* avget_offset */
  PRK_NO_AV                     /* avput_offset */
};

#define SLOT_NAME_CHECK() \
  if (!PrkIsSymbol((PrkType)slot_name)) { \
    if (PrkIsString((PrkType)slot_name)) \
      slot_name = (PrkType)PrkMakeSymbol(PRK_STRING_CSTRING((PrkString)slot_name)); \
    else \
      USER_ASSERT_TYPE(slot_name, PrkSymbolTag, "PrkMakeObject"); \
  } define COMMON_STUFF() \
  USER_ASSERT_TYPE(maybe_rsd, PrkRawSlotDataTag, PrkMakeObject); \
  rsd = &(&rsd_table->rsd_start)[rsd_index++]; \
  prk_calc_facet_lengths((PrkRawSlotData)maybe_rsd, rsd); \
  if (count = (unsigned char)rsd->dynamic_ftable) { \
    rsd->dynamic_ftable = PRK_STACK_TABLE(prk_parsed_facet_table_t, prk_parsed_raw_
    rsd->dynamic_ftable->count = count; \
  } \
  if (count = (unsigned char)rsd->static_ftable) { \
    rsd->static_ftable = PRK_STACK_TABLE(prk_parsed_facet_table_t, prk_parsed_raw_f
    rsd->static_ftable->count = count; \
  } \
  if (prk_parse_raw_slot_datum(object_name, sat, rsd, (PrkSymbol)slot_name, (PrkRaw
    new_slot_count++ define SET_UP_FIRST_PARENT() \
  parent_sat = PRK_OBJECT_SAT(first_parent); \
  parent_value_array = PRK_OBJECT_VALUE_ARRAY(first_parent); \
  p_locked_end = PRK_SAT_LOCKED_END(parent_sat); \
  p_default_end = PRK_SAT_DEFAULT_END(parent_sat);

/*
  This file contains stuff which contains stack adjustment functions.  This
  requires turning off the stack fixup optimization in gcc.
*/ void prk_fill_slot_chunks(PrkObject object, prk_rsd_table_t *rsd_table, unsigned pa
{
```

```c
  int index;
  PrkSat parent_sat, sat = PRK_OBJECT_SAT(object);
  unsigned locked_end = PRK_SAT_LOCKED_END(sat);
  unsigned default_end = PRK_SAT_DEFAULT_END(sat);
  unsigned subclass_end = PRK_SAT_SUBCLASS_END(sat);
  unsigned p_locked_end, p_default_end, offset;
  unsigned hash_table_size = PRK_SAT_HASH_TABLE_SIZE(sat);
  PrkSd sd, parent_sd;
  PrkInheritance role_specifier;
  PrkBool
    single_parent_p,         /* Object has precisely one parent */
    single_sd_parent_p,  /* sd is inherited from precisely one parent */
    instance_p;
  prk_sd_table_t *sd_table;
  PrkType **object_value_array = (PrkType **)PRK_GC_MALLOC((size_t)((index = PRK_SA
  PrkType **slot_chunk, **parent_value_array, **parent_slot_chunk;
  PrkList bucket;
  prk_rsd_t *rsd;
  PrkList parents = PRK_OBJECT_PARENTS(object, sat, hash_table_size);
  PrkObject first_parent;

instance_p = PRK_IS_INSTANCE(object);

for (; --index >= 0;)
    (PrkType)object_value_array[index] = PRK_UNCHECKED_VALUE_CELL;

PRK_OBJECT_VALUE_ARRAY(object) = object_value_array;

if (single_parent_p = (parent_count == 1)) {
    first_parent = (PrkObject)PRK_FIRST(parents);
    SET_UP_FIRST_PARENT();
  }
  sd_table = PRK_STACK_TABLE(prk_sd_table_t, prk_sd_object_t, parent_count);
  if (rsd_table) {
    rsd = &rsd_table->rsd_start;
    index = rsd_table->count - 1;
  }
  else
    index = -1;

for (; index >= 0; index--, rsd++) {
    PRK_FIND_SAD(sd, sat, rsd->name, sd = (PrkSd) PrkNull);
    if (sd == (PrkSd) PrkNull)
      if (PRK_IS_INSTANCE(object) && PrkIsSymbol(rsd->name)) {
        PrkSignalException(PrkExcWarnNonExistentSlot, object, rsd->name, parents);
        continue;
      }
      else
        PrkSignalExceptionLoop(PrkExcNonExistentSlot, object, rsd->name);
    offset = PRK_SD_OFFSET(sd);
    slot_chunk = object_value_array + offset;
    if (single_parent_p && (single_sd_parent_p = (PRK_SD_OBJECT(sd) != object))) {
      parent_slot_chunk = parent_value_array + offset;
      parent_sd = sd;
    }
    else {
      prk_fill_sd_table(rsd->name, sd_table, parents, instance_p);
      if (single_sd_parent_p = sd_table->count == 1) {
        /* *** check equal sd flags */
        if (!single_parent_p) {
          first_parent = TABLE_ELT(sd_table, 0).parent;
          SET_UP_FIRST_PARENT();
        }
        parent_sd = TABLE_ELT(sd_table, 0).parent_sd;
        parent_slot_chunk =
          parent_value_array + PRK_SD_OFFSET(parent_sd);
      }
    }
    switch(PRK_SD_SLOT_TYPE(sd)) {
    default:
      ASSERT_NEVER_REACHED(prk_fill_slot_chunks);
      break;
```

```
      case PrkLockedSlotType:
        break;
      case PrkDefaultSlotType:
        slot_chunk += locked_end;
        if (single_sd_parent_p)
          parent_slot_chunk += p_locked_end;
        break;
      case PrkSubclassSlotType:
        slot_chunk += default_end;
        if (single_sd_parent_p)
          parent_slot_chunk += p_default_end;
        break;
      case PrkOwnSlotType:
        slot_chunk += subclass_end;
        break;
      case PrkSparseSlotType:
        break;                      /* *** */
      } include <prokee/fillcode.ih>
  } if (parent_count)
    /* process inherited vals */
    for (index = hash_table_size - 1; index >= 0; index--)
      for (bucket = PRK_SAT_HASH_BUCKET(sat, index);
           !Null(bucket);
           bucket = PRK_REST(bucket)) {
        sd = (PrkSd)PRK_FIRST(bucket);

offset = PRK_SD_OFFSET(sd);
        slot_chunk = object_value_array + offset;
        if (single_parent_p)
          if (single_sd_parent_p = (PRK_SD_OBJECT(sd) != object)) {
            parent_slot_chunk = parent_value_array + offset;
            parent_sd = sd;
          }
          else
            goto again;
        else {
          prk_fill_sd_table(PRK_SD_NAME(sd), sd_table, parents, instance_p);
          if (single_sd_parent_p = sd_table->count == 1) {
            /* *** check equal sd flags */
            first_parent = TABLE_ELT(sd_table, 0).parent;
            SET_UP_FIRST_PARENT();
            parent_sd = TABLE_ELT(sd_table, 0).parent_sd;
            parent_slot_chunk =
              parent_value_array + PRK_SD_OFFSET(parent_sd);
          }
        } switch(PRK_SD_SLOT_TYPE(sd)) {
        default:
          ASSERT_NEVER_REACHED(prk_fill_slot_chunks);
          break;

case PrkLockedSlotType:
          break;
        case PrkDefaultSlotType:
          slot_chunk += locked_end;
          if (single_sd_parent_p)
            parent_slot_chunk += p_locked_end;
          break;
        case PrkSubclassSlotType:
          slot_chunk += default_end;
          if (single_sd_parent_p)
            parent_slot_chunk += p_default_end;
          break;
        case PrkOwnSlotType:
        case PrkSparseSlotType:
          goto again;
        }
```

```c
  /* inherit dynamic stuff */
  if ((PrkType)slot_chunk[1] == PRK_UNCHECKED_VALUE_CELL) {
    role_specifier = PRK_SD_ROLE_SPECIFIER(sd);
    if (PRK_IS_USER_DEFINED_INHERITANCE(role_specifier)) {
      PrkType *parent_sub_chunk;
      PrkType *sub_chunk = (PrkType *)PRK_SHORT_ALLOC(PRK_SD_SIZE(sd));
      slot_chunk[1] = (PrkType *)((u_long)sub_chunk | SVF_LOCAL_ARRAY_P);
      if (!PRK_SD_DISALLOW_AVS_P(PRK_SD_FLAGS(sd)))
        *(svf_t *)sub_chunk = default_svf;
      if (single_sd_parent_p) {
        parent_sub_chunk = PRK_MASK_CHUNK(parent_slot_chunk[1]);
        if (PRK_SD_STATIC_FACET_COUNT(sd))
          (PrkType *)sub_chunk[PRK_SD_STATIC_FACET_START(sd)] =
            (PrkType *)((u_long)parent_sub_chunk[PRK_SD_STATIC_FACET_START(sc
        if (!PRK_SD_DISALLOW_DFACETS_P(sd))
          sub_chunk[PRK_SD_SIZE(sd) - 1] =
            parent_sub_chunk[PRK_SD_SIZE(sd) - 1];
        goto optimize;
      }
      else {
        if (PRK_SD_STATIC_FACET_COUNT(sd))
          (PrkType *)sub_chunk[PRK_SD_STATIC_FACET_START(sd)] =
            (PrkType *)((u_long)PRK_SHORT_ALLOC(PRK_SD_STATIC_FACET_SIZE(sd))
                        | SFF_LOCAL_ARRAY_P);
        prk_fill_inhrtd_facet_values_n(sub_chunk, sd_table, 0, NULL, sd, PrkN
      }
    }
    else if (single_sd_parent_p) {
      slot_chunk[1] = (PrkType *)((u_long)parent_slot_chunk[1] &
                                  ~SVF_LOCAL_ARRAY_P);
      goto optimize;
    }
    else if (!PRK_SD_SIZE(sd)) {
      slot_chunk[1] = (PrkType *)0;
    }
    else {                    /* currently take pessimistic approach
                                 to mixin memory allocation *** */
      PrkType *sub_chunk = (PrkType *)PRK_SHORT_ALLOC(PRK_SD_SIZE(sd));
      slot_chunk[1] = (PrkType *)((u_long)sub_chunk | SVF_LOCAL_ARRAY_P);
      if (!PRK_SD_DISALLOW_AVS_P(PRK_SD_FLAGS(sd)))
        *(svf_t *)sub_chunk = default_svf;
      if (PRK_SD_STATIC_FACET_COUNT(sd))
        (PrkType *)sub_chunk[PRK_SD_STATIC_FACET_START(sd)] =
          (PrkType *)((u_long)PRK_SHORT_ALLOC(PRK_SD_STATIC_FACET_SIZE(sd))
                      | SFF_LOCAL_ARRAY_P);
      prk_fill_inhrtd_facet_values_n(sub_chunk, sd_table, 0, NULL, sd, PrkNil
    }
    prk_fill_chunk(slot_chunk, PrkNull, sd, parents, FALSE,
                   instance_p);
    continue;
  optimize:
    prk_fill_chunk_1parent(slot_chunk, PrkNull, parent_slot_chunk,
                           sd, parent_sd, FALSE);
  }
again:

continue;
    }
}

/*
  get_common_parent_chunk returns a slot_chunk if all of the
  non-slotvalue information is the same in all parents.
*/

PrkType *get_common_parent_chunk(prk_sd_table_t *sd_table)
{
  ASSERT(sd_table->count > 1, get_common_parent);
  /* *** */
  return (PrkType *)0;
}
```

```c
USER_EXPORT PrkObject PrkMakeObject(PrkSymbol object_name, PrkModule module,
                                    PrkCollection parents, PrkCollection raw_slot_c
                                    PrkBool instance_p)
{
  USER_ASSERT_TYPE(object_name, PrkSymbolTag, PrkMakeObject);
  USER_ASSERT(PrkIsCollection(parents), PrkMakeObject);
  USER_ASSERT(PrkIsCollection(raw_slot_data), PrkMakeObject);
  USER_ASSERT_FULL_APP_OR_MOD(module, PrkMakeObject);

return prk_make_object(object_name, module, parents, raw_slot_data,
                         instance_p, PRK_GET_APP(module));
}

PrkObject prk_make_object(PrkSymbol object_name, PrkModule module,
                          PrkCollection parents, PrkCollection raw_slot_data,
                          PrkBool instance_p, PrkApp app)
{
  PrkObject object = PRK_FIND_OBJECT_NULL_RESULT;
  prk_parent_table_t *parent_table;
  prk_rsd_table_t *rsd_table;
  int length, rsd_index = 0;
  PrkBool must_create_p = FALSE, same_module_parents_p;
  PrkType slot_name, maybe_rsd;
  prk_rsd_t *rsd;
  unsigned count, new_slot_count = 0;
  PrkSat sat;
  PrkBool prnt_has_monitor_p, prnt_is_monitor_p;

ASSERT(PrkIsSymbol((PrkType)object_name) || !PrkIsLoadedObject((PrkObject)object_
  ASSERT(PrkIsCollection(parents), prk_make_object);
  ASSERT(PrkIsCollection(raw_slot_data), prk_make_object);
  ASSERT((PRK_APP_OR_MOD_P(module) || module == (PrkModule)PrkNull), prk_make_objec if (app != (PrkApp) PrkNull) {
    ASSERT_FULL_APP(app, PrkMakeObject);

if (object_name == PrkAnonymousObjectName)
    object_name = PRK_MOD_ALLOC_ANON_OBJECT_NAME(module);
  else
    if (PrkIsSymbol(object_name)) {
      while ((object = PrkFindObject(object_name, app)) !=
             PRK_FIND_OBJECT_NULL_RESULT && PRK_IS_LOADED_OBJECT(object))
        PrkSignalException(PrkExcObjectAlreadyExists, object_name, app);
    }
    else {
      ASSERT(!PrkIsLoadedObject((PrkObject)object_name), prk_make_object);
      object = (PrkObject) object_name;
    }
}
parent_table = PRK_STACK_TABLE(prk_parent_table_t, PrkObject,
                               length = PrkCollectionLength(parents));

parent_table->count = length;
same_module_parents_p = prk_fill_parent_table(parent_table, parents, module,
                                              "PrkMakeObject");

/* get parent sat */
switch (length) {
case 0:
  sat = empty_sat;
  prnt_has_monitor_p = FALSE;
  prnt_is_monitor_p = FALSE;
  break;
case 1:
  prnt_has_monitor_p = PRK_IS_MONITOR_PRESENT(parent_table->start);
  prnt_is_monitor_p = PRK_IS_OBJECT_MONITOR(parent_table->start);
  sat = PRK_OBJECT_SAT(parent_table->start);
  break;
default:
  {
    int i;
```

```
      sat = prk_get_hashed_parent_sat(parent_table);
      prnt_has_monitor_p = FALSE;
      prnt_is_monitor_p = FALSE;
      for (i = 0; i < parent_table->count; i++) {
        prnt_has_monitor_p |=
          PRK_IS_MONITOR_PRESENT(TABLE_ELT(parent_table, i));
        prnt_is_monitor_p |= PRK_IS_OBJECT_MONITOR(TABLE_ELT(parent_table, i));
      }
    }
    break;
}

ASSERT(PRK_IS_SAT(sat), PrkMakeObject);
if (instance_p && PRK_SAT_DEFAULT_END(sat) != PRK_SAT_CHUNK_END(sat))
  /* This class SAT has either SUBCLASS or OWN SADs and we
     need to get the instance sat */
  sat = prk_instance_sat_from_class_sat(sat);

rsd_table = PRK_STACK_TABLE(prk_rsd_table_t, prk_rsd_t,
                            length = PrkCollectionLength(raw_slot_data));
rsd_table->count = length;

if (PrkIsList(raw_slot_data))
  while (!Null((PrkList)raw_slot_data)) {
    USER_ASSERT_TYPE(raw_slot_data, PrkListTag, PrkMakeObject);
    slot_name = PRK_FIRST((PrkList)raw_slot_data);
    SLOT_NAME_CHECK();
    raw_slot_data = (PrkCollection)PRK_REST((PrkList)raw_slot_data);
    if (Null((PrkList)raw_slot_data) ||
        PrkIsSymbol(PRK_FIRST((PrkList)raw_slot_data)) ||
        PrkIsString(PRK_FIRST((PrkList)raw_slot_data)))
      . maybe_rsd = (PrkType)PrkDefaultRawSlotData;
    else {
      maybe_rsd = PRK_FIRST((PrkList)raw_slot_data);
      raw_slot_data = (PrkCollection)PRK_REST((PrkList)raw_slot_data);
    }
    COMMON_STUFF();
  }
else {
  int index = 0;
  int used = PRK_ARRAY_FILL_COUNT((PrkArray)raw_slot_data);
  while (index != used) {
    slot_name = PRK_ELT((PrkArray)raw_slot_data, index);
    SLOT_NAME_CHECK();
    index++;
    if (index == used ||
        PrkIsSymbol(PRK_ELT((PrkArray)raw_slot_data, index)) ||
        PrkIsString(PRK_ELT((PrkArray)raw_slot_data, index)))
      maybe_rsd = (PrkType)PrkDefaultRawSlotData;
    else {
      maybe_rsd = PRK_ELT((PrkArray)raw_slot_data, index);
      index++;
    }
    COMMON_STUFF();
  }
}
rsd_table->must_create_p = must_create_p;
rsd_table->count = rsd_index;
rsd_table->sd_count = new_slot_count + ((instance_p
                                         ? PRK_SAT_DEFAULT_END(sat)
                                         : PRK_SAT_SUBCLASS_END(sat)) >> 1);
if (object == PRK_FIND_OBJECT_NULL_RESULT)
  object = prk_internal_make_object(object_name, module, instance_p);
else {
  PRK_IS_INSTANCE(object) = instance_p;
  /* *** fill in new info */
}
PRK_IS_LOADED_OBJECT(object) = TRUE;
PRK_OBJECT_SAT(object) = sat; /* raw sat */
PRK_IS_OBJECT_SAME_KB_PARENTS_P(object) = same_module_parents_p;
prk_stuff_object(object, parent_table, rsd_table);
PRK_IS_OBJECT_MONITOR(object) = prnt_is_monitor_p;
```

```
   if (PRK_IS_MONITOR_PRESENT(object) |= prnt_has_monitor_p)
      prk_call_object_attach_meths(object,
                  PrkMonitorFireOnCreateFlag | PrkMonitorFireOnAttachFlag);
#ifdef OBJ_EVENTS
   if (module != (PrkModule) PrkNull)
      {
         PrkoCreateObjectEventStruct event_struct;
         event_struct.object = object;
         PrkSignal(PrkoCreateObjectEventID, &event_struct);

if (parent_table->count) {
            PrkoChangeObjectLinkEventStruct ev;
            PrkEventId ID = PRK_IS_INSTANCE(object) ? PrkoChangeObjectInstanceEventID :
               PrkoChangeObjectSubclassEventID;
            int i;
            ev.child = object;
            ev.created_p = TRUE;
            for (i = 0; i < parent_table->count; i++) {
               ev.parent = (PrkObject)TABLE_ELT(parent_table, i);
               if (PRK_IS_OBJECT_STRUCTURE_INTEREST(ev.parent))
                  PrkSignal(ID, &ev);
            }
         }
      }
endif                          /* OBJ_EVENTS */ return object;
}

/*
 PrkSetObjectParents
*/

/* set object parents - no stack fixup or recursion section */ void prk_set_object_parents_stk(PrkObject object, PrkList parents,
                                 unsigned orphan_mode)
{
   prk_parent_table_t *parent_table;
   prk_rsd_table_t *rsd_table;
   int length, index, count, new_slot_count = 0;
   PrkBool must_create_p = FALSE, same_module_parents_p;
   PrkType **value_array, **chunk, **sub_chunk;
   prk_rsd_t *rsd;
   unsigned hts, old_hts;
   PrkSat sat, old_sat, parent_sat;
   PrkSd sd, new_sd;
   PrkBool prnt_has_monitor_p;
   PrkModule module;
   PrkBool instance_p;
   PrkList l, dlist;

ASSERT_FULL_OBJECT(object, prk_set_object_parents);
   module = PRK_OBJECT_MODULE(object);
   ASSERT(PRK_APP_OR_MOD_P(module), prk_set_object_parents);
   old_sat = PRK_OBJECT_SAT(object);
   ASSERT(PRK_IS_SAT(old_sat), prk_set_object_parents);
   old_hts = PRK_SAT_HASH_TABLE_SIZE(old_sat);

instance_p = PRK_IS_INSTANCE(object);
   value_array = PRK_OBJECT_VALUE_ARRAY(object);

/* create and load parent table */ parent_table = PRK_STACK_TABLE(prk_parent_table_t, PrkObject,
                                 length = PrkListLength(parents));
   parent_table->count = length;
   same_module_parents_p = prk_fill_parent_table(parent_table,
                     (PrkCollection)parents, module,
                     "PrkSetObjectParents");

/* get parent sat */
```

```
switch (length) {
case 0:
  sat = empty_sat;
  prnt_has_monitor_p = FALSE;
  PRK_IS_OBJECT_MONITOR(object) = FALSE;
  break;
case 1:
  prnt_has_monitor_p = PRK_IS_MONITOR_PRESENT(parent_table->start);
  PRK_IS_OBJECT_MONITOR(object) = PRK_IS_OBJECT_MONITOR(parent_table->start);
  sat = PRK_OBJECT_SAT(parent_table->start);
  break;
default:
  {
    int i;
    sat = prk_get_hashed_parent_sat(parent_table);
    prnt_has_monitor_p = FALSE;
    PRK_IS_OBJECT_MONITOR(object) = FALSE;
    for (i = 0; i < parent_table->count; i++) {
      prnt_has_monitor_p |=
        PRK_IS_MONITOR_PRESENT(TABLE_ELT(parent_table, i));
      PRK_IS_OBJECT_MONITOR(object) |=
        PRK_IS_OBJECT_MONITOR(TABLE_ELT(parent_table, i));
    }
  }
  break;
}

ASSERT(PRK_IS_SAT(sat), prk_set_object_parents);
if (instance_p && PRK_SAT_DEFAULT_END(sat) != PRK_SAT_CHUNK_END(sat)) {
  /* This class SAT has either SUBCLASS or OWN SADs and we
     need to get the instance sat */
  sat = prk_instance_sat_from_class_sat(sat);
}
hts = PRK_SAT_HASH_TABLE_SIZE(sat);

/* create and load slot table */ rsd_table = PRK_STACK_TABLE(prk_rsd_table_t, prk_rsd_t,
                            PRK_SAT_CHUNK_END(old_sat)/2);
rsd_table->count = 0;

for (index = old_hts - 1; index >= 0; index--) {
  for (l = PRK_SAT_HASH_BUCKET(old_sat, index); !Null(l); l = PRK_REST(l)) {
    sd = (PrkSd)PRK_FIRST(l);
    ASSERT_TYPE(sd, PrkSdTag, prk_set_prnts_fill_rsd_table);
    chunk = value_array;
    CALCULATE_FULL_OFFSET(chunk, old_sat, PRK_SD_SLOT_TYPE(sd), sd,
                          prk_set_prnts_fill_rsd_table);
    sub_chunk = (PrkType **)PRK_MASK_CHUNK(chunk[1]);
    if (prk_include_slot_check(object, sd, sat, chunk, sub_chunk, instance_p,
                               orphan_mode, &new_sd)) {
      rsd = &(&rsd_table->rsd_start)[rsd_table->count++];

if (PRK_LOCAL_CHUNK_P(chunk[1])) {
        if (PRK_SD_DISALLOW_DFACETS_P(sd) ||
            !PRK_LOCAL_DLIST_P(sub_chunk[PRK_SD_SIZE(sd) - 1])) {
          rsd->dynamic_ftable = 0;
        }
        else {
          dlist = PRK_MASK_DFACET(sub_chunk[PRK_SD_SIZE(sd) - 1]);
          count = PrkListLength(dlist);
          rsd->dynamic_ftable = PRK_STACK_TABLE(prk_parsed_facet_table_t,
                                                prk_parsed_raw_facet_t, count);
          rsd->dynamic_ftable->count = count;
        } if (((count = PRK_SD_STATIC_FACET_COUNT(sd)) != 0) &&
            PRK_LOCAL_SF_CHUNK_P(sub_chunk[PRK_SD_STATIC_FACET_START(sd)])) {
          rsd->static_ftable = PRK_STACK_TABLE(prk_parsed_facet_table_t,
                                                prk_parsed_raw_facet_t, count);
          rsd->static_ftable->count = count;
        }
```

```
              else
                 rsd->static_ftable = 0;
           }
           else {
              rsd->dynamic_ftable = 0;
              rsd->static_ftable = 0;
           } if (prk_fill_rsd_from_slot(rsd, sd, new_sd, sat, chunk,
                                      sub_chunk, instance_p, &must_create_p))
              new_slot_count++;
        }
      }
   }
   rsd_table->must_create_p = must_create_p;
   rsd_table->sd_count = new_slot_count + ((instance_p
                                            ? PRK_SAT_DEFAULT_END(sat)
                                            : PRK_SAT_SUBCLASS_END(sat)) >> 1);

/* remove links from old parents */ if (instance_p) {
      for (l = PRK_SAT_PARENTS(old_sat); !Null(l); l = PRK_REST(l)) {
         parent_sat = PRK_OBJECT_SAT((PrkObject)PRK_FIRST(l));
         prk_delete_element_ptr((PrkType)object, &PRK_SAT_INSTANCES(parent_sat,
                       PRK_SAT_HASH_TABLE_SIZE(parent_sat)));
      }
   }
   else {
      for (l = PRK_SAT_CLASS_PARENTS(old_sat, old_hts); !Null(l); l = PRK_REST(l)) {
         parent_sat = PRK_OBJECT_SAT((PrkObject)PRK_FIRST(l));
         prk_delete_element_ptr((PrkType)object,
                       &PRK_SAT_SUBCLASSES(parent_sat,
                           PRK_SAT_HASH_TABLE_SIZE(parent_sat)));
      }
   }

/* free value array */ prk_scrub_value_array(old_sat, PRK_OBJECT_VALUE_ARRAY(object));
   PRK_OBJECT_VALUE_ARRAY(object) = (PrkType **)0;

/* install new SAT */

PRK_OBJECT_SAT(object) = sat; /* raw sat */
   PRK_IS_OBJECT_SAME_KB_PARENTS_P(object) = same_module_parents_p;

/* load slots */ if (PRK_IS_INSTANCE(object)) {
      if (rsd_table->must_create_p) {
         /* *** This is an error */
         ASSERT_NEVER_REACHED(PrkSetObjectParents);
      }
   }
   else {
      sat = prk_make_csat(sat, rsd_table->sd_count, object);
      prk_merge_into_sat(sat, rsd_table, object);
   }

PRK_OBJECT_SAT(object) = sat;

prk_fill_slot_chunks(object, rsd_table, parent_table->count);
   prk_add_child_links(object, parent_table);

/* copy relevent stuff from old SAT */ if (!instance_p) {
      hts = PRK_SAT_HASH_TABLE_SIZE(sat);
      PRK_SAT_SUBCLASSES(sat, hts) = PRK_SAT_SUBCLASSES(old_sat, old_hts);
      PRK_SAT_INSTANCES(sat, hts) = PRK_SAT_INSTANCES(old_sat, old_hts);
   }
}
```

```c
/*
  file: n_parse.c
*/
static const char rcsid[] = "$Header: /tmp_mnt/net/op/prokee/src/generic/om/framema include <int_objm.ih>
/*
  three things we must handle:
     inheritance role--must be the same
     flags--must be the same *** this should be more restrictive
     static facets-- *** one must be a superset
*/ void prk_sd_collision(PrkSd *sd_ptr, PrkSd new_sd)
{
  PrkSd sd = *sd_ptr;

if (sd == new_sd)
    return;
  else {
    int i;
    static_facet_t *sf = PRK_SD_STATIC_FACETS(sd);
    static_facet_t *new_sf = PRK_SD_STATIC_FACETS(new_sd);

if (PRK_SD_ROLE_SPECIFIER(sd) != PRK_SD_ROLE_SPECIFIER(new_sd))
      PrkSignalExceptionLoop(PrkExcSlotInheritanceConflict,PRK_SD_OBJECT(new_sd),
                    PRK_SD_NAME(new_sd),PRK_SD_ROLE_SPECIFIER(sd),
                    PRK_SD_ROLE_SPECIFIER(new_sd));
    if (PRK_SD_FLAGS(sd) != PRK_SD_FLAGS(new_sd))
      PrkSignalExceptionLoop(PrkExcSlotTypeConflict,PRK_SD_OBJECT(new_sd),
                    PRK_SD_NAME(new_sd),PRK_SD_SLOT_TYPE(sd),
                    PRK_SD_SLOT_TYPE(new_sd));
    for (i = MIN(PRK_SD_STATIC_FACET_COUNT(sd),
                PRK_SD_STATIC_FACET_COUNT(new_sd));
         --i > 0;)
      if (sf[i].name != new_sf[i].name &&
          sf[i].role != new_sf[i].role)
        PrkSignalExceptionLoop(PrkExcStaticFacetConflict,sd, new_sd);
    if (PRK_SD_STATIC_FACET_COUNT(sd) < PRK_SD_STATIC_FACET_COUNT(new_sd)) {
      if (PRK_SD_OFFSET(sd) != PRK_SD_OFFSET(new_sd)) {
        new_sd = prk_copy_sd(new_sd);
        PRK_SD_OFFSET(new_sd) = PRK_SD_OFFSET(sd);
        PRK_SD_OBJECT(new_sd) = (PrkObject)PrkNull;
      }
      *sd_ptr = new_sd;
    }
  }
} define ALLOCATE_SAD_SPACE(temp, st_size, sat, sd_type_array, storage_class) \
  temp = st_size >> 1; \
  if (temp > sd_type_array[storage_class].size) \
    (sd_type_array[storage_class].size = temp), \
    (sd_type_array[storage_class].sd_array = \
      (PrkSd *)alloca(sizeof(PrkSd) * temp))

/* create base sat */
  /* for all other sats: */
  /*   build slot array table */
  /*   for each storage type: */
  /*     handle collisional sds--leaving spaces in linked list*/
  /*     handle non-collisional sds, moving as necessary */
  /*   update base sat attributes */
  /* install multi-sat */

PrkSat prk_create_new_multi_sat(prk_parent_table_t *parent_table)
{
  PrkSat sat, new_sat;
  unsigned new_hts, new_mask, locked_end, default_end;
  unsigned subclass_end;
```

```c
int i;
struct {
  PrkSd *sd_array;
  unsigned size;
} sd_type_array[3];              /* only handle locked, default, and sparse */

/* initialize sd_type_array */
sd_type_array[2].size = sd_type_array[1].size = sd_type_array[0].size = 0;

/* create base sat */
{
  /* take pessimistic view of sd combination */
  unsigned estimated_sd_count = 0;

for (i = parent_table->count; --i >= 0;)
    estimated_sd_count +=
      PRK_SAT_SUBCLASS_END(PRK_OBJECT_SAT(TABLE_ELT(parent_table, i))) >> 1;

new_hts = prk_hash_table_size(estimated_sd_count);
} new_sat = prk_allocate_sat(FALSE, new_hts);
new_hts = PRK_SAT_HASH_TABLE_SIZE(new_sat);
new_mask = new_hts - 1;
prk_copy_sat(sat = PRK_OBJECT_SAT(parent_table->start), new_sat, FALSE);
locked_end = PRK_SAT_LOCKED_END(sat);
default_end = PRK_SAT_DEFAULT_END(sat);
subclass_end = PRK_SAT_SUBCLASS_END(sat);

/* for all other sats: */
for (i = 1; i < parent_table->count; i++) {
  unsigned default_size = (default_end - locked_end) >> 1;
  unsigned subclass_size = (subclass_end - default_end) >> 1;
  unsigned hts;

sat = PRK_OBJECT_SAT(TABLE_ELT(parent_table, i));
  hts = PRK_SAT_HASH_TABLE_SIZE(sat);

/*   build slot array table */
  {
    unsigned temp;
    ALLOCATE_SAD_SPACE(temp, PRK_SAT_LOCKED_END(sat), sat, sd_type_array,
                      PrkLockedSlotType);
    ALLOCATE_SAD_SPACE(temp, PRK_SAT_DEFAULT_END(sat), sat, sd_type_array,
                      PrkDefaultSlotType);
    ALLOCATE_SAD_SPACE(temp, PRK_SAT_SUBCLASS_END(sat), sat, sd_type_array,
                      PrkSubclassSlotType);
  }

/*   for each storage type: */
  /*      handle collisional sds--leaving spaces in linked list*/
  {
    int j;
    PrkList l, l2;
    PrkSd sd, *old_sd;
    PrkSymbol name;
    PrkSlotType storage_class;
    for (j = hts - 1; j >= 0; j--)
      for (l = PRK_SAT_HASH_BUCKET(sat, j); !Null(l); l = PRK_REST(l))
        if ((storage_class = PRK_SD_SLOT_TYPE(sd = (PrkSd)PRK_FIRST(l)))
            != PrkOwnSlotType) {
          name = PRK_SD_NAME(sd);
          l2 = PRK_SAT_HASH_BUCKET(new_sat,
                                   PRK_SD_NAME_HASH_INDEX(name, new_mask));
      null_check:
          if (Null(l2)) {
            if (storage_class == PrkSparseSlotType) {
              /* *** */
            }
            else
```

```
            sd_type_array[storage_class].sd_array[PRK_SD_OFFSET(sd) >> 1]
                = sd;
            continue;
        }
        old_sd = (PrkSd *)&PRK_FIRST(12);
        if (PRK_SD_NAME(*old_sd) != name) {
            12 = PRK_REST(12);
            goto null_check;
        }
        prk_sd_collision(old_sd, sd);
        sd_type_array[storage_class].sd_array[PRK_SD_OFFSET(sd) >> 1]
            = (PrkSd)0;
        }
    } if (PRK_SAT_LOCKED_END(sat)) {
        int j, this_locked_end = PRK_SAT_LOCKED_END(sat);
        if (locked_end) {
            for (j = (MIN(locked_end, this_locked_end) >> 1) - 1;
                 j >= 0; j--)
                if (sd_type_array[PrkLockedSlotType].sd_array[j])
                    PrkSignalExceptionLoop(PrkExcMultiLockedParents,parent_table->start,
                                           TABLE_ELT(parent_table, i));
        }
        if (locked_end < this_locked_end) {
            /* inherit additional locked slots */
            unsigned index_end = this_locked_end >> 1;
            for (j = locked_end >> 1; j < index_end; j++) {
                PrkSd sd = sd_type_array[PrkLockedSlotType].sd_array[j];
                PrkAddListPtrElmt((PrkType)sd,
                        &PRK_SAT_HASH_BUCKET(new_sat, PRK_SD_NAME_HASH_INDEX(PRK_SD_NA
            } .
            locked_end = this_locked_end;
        }
    } default_size =
        prk_sort_sd_array(sd_type_array[PrkDefaultSlotType].sd_array, default_size,
                (PRK_SAT_DEFAULT_END(sat) - PRK_SAT_LOCKED_END(sat)) >> 1,
                new_sat, new_mask);
    subclass_size =
        prk_sort_sd_array(sd_type_array[PrkSubclassSlotType].sd_array, subclass_size,
                (PRK_SAT_SUBCLASS_END(sat) - PRK_SAT_DEFAULT_END(sat)) >> 1,
                new_sat, new_mask);

/* update base sat attributes */
    default_end = locked_end + (default_size << 1);
    subclass_end = default_end + (subclass_size << 1);
}

/* install multi-sat */
PRK_SAT_LOCKED_END(new_sat) = locked_end;
PRK_SAT_DEFAULT_END(new_sat) = default_end;
PRK_SAT_CHUNK_ARRAY_SIZE(new_sat) =
    (PRK_SAT_CHUNK_END(new_sat) - PRK_SAT_SUBCLASS_END(new_sat) - subclass_end)
    + PRK_DEFAULT_VA_FUDGE_FACTOR;

PRK_SAT_SUBCLASSES(new_sat, new_hts) =
    PRK_SAT_INSTANCES(new_sat, new_hts) =
        PRK_SAT_MULTI_SATS(new_sat, new_hts) =
            PRK_SAT_CLASS_PARENTS(new_sat, new_hts) = PrkNil;

PRK_SAT_INSTANCE_SAT(new_sat, new_hts) = NullSat;

{
    PrkList l;
    PRK_SAT_PARENTS(new_sat) = l = prk_ncons((PrkType)parent_table->start);

for (i = 1; i <= parent_table->count - 1; i++)
        l = PRK_REST(l) = prk_ncons((PrkType)TABLE_ELT(parent_table, i));
}
```

```c
    prk_install_multi_sat(new_sat, parent_table);

return new_sat;
} void prk_merge_static_facets(PrkSd sd, prk_parsed_facet_table_t *sfacet_table)
{
    unsigned
        i,
        new_count,
        old_size = PRK_SD_STATIC_FACET_SIZE(sd),
        count = sfacet_table->count;
    unsigned char
        sd_inherited_sfacet_count = PRK_SD_INHERITED_SFACET_COUNT(sd);
    static_facet_t
        *sf = PRK_SD_STATIC_FACETS(sd),
        *new_sf;
    prk_parsed_raw_facet_t *psf;

new_count = sfacet_table->combined_count;
    new_sf =
        (static_facet_t *)PRK_GC_MALLOC((size_t)(sizeof(static_facet_t) * new_count));
    memcpy(new_sf, sf, (size_t)(sizeof(static_facet_t) *
                                sd_inherited_sfacet_count));
    PRK_SD_STATIC_FACETS(sd) = new_sf;
    new_sf += sd_inherited_sfacet_count;
    psf = &TABLE_ELT(sfacet_table, 0);
    for (i = 0; i < count; i++, psf++)
        if (psf->sf_part.offset >= old_size)
            *new_sf++ = psf->sf_part;

PRK_SD_STATIC_FACET_COUNT(sd) = new_count;
    PRK_SD_STATIC_FACET_SIZE(sd) = sfacet_table->size;
}

PrkSat prk_slow_get_hashed_parent_sat(PrkList parents, char *fn)
{
    unsigned length = PrkListLength(parents);
    prk_parent_table_t *parent_table =
        PRK_STACK_TABLE(prk_parent_table_t, PrkType, length);

parent_table->count = length;
    prk_fill_parent_table(parent_table, (PrkCollection)parents,
                          (PrkModule) PrkNull, fn);
    return prk_get_hashed_parent_sat(parent_table);
}

/*
   file: objmain.c
*/
static const char rcsid[] = "$Header: /tmp_mnt/net/op/prokee/src/generic/om/framema define PrkSendMsg HidePrkSendMsg
include <prokee/int_objm.ih>
include <prokee/mergefct.ih>
undef PrkSendMsg USER_EXPORT PrkSd PrkFindSd(PrkObject object, PrkSymbol slot_name)
{
    PrkSd sd;
    PrkSat sat;
    USER_ASSERT_FULL_OBJECT(object, PrkFindSd);
    sat = PRK_OBJECT_SAT(object);
    ASSERT(PRK_IS_SAT(sat), PrkFindSad);
    PRK_FIND_SAD(sd, sat, slot_name, return (PrkSd)PrkNull);
    return sd;
}

USER_EXPORT PrkInheritance PrkSdInheritance(PrkSd sd)
{
```

```c
  USER_ASSERT_TYPE(sd, PrkSdTag, PrkSdInheritance);

return PRK_SD_ROLE_SPECIFIER(sd);
}

PrkBool prk_single_valued_role_p(PrkInheritance role)
{
  if (role < PRK_FROLE_COUNT)
    return PRK_IS_SV_INHERITANCE(role);
  else
    return TRUE;
}

USER_EXPORT PrkSlotType PrkSdSlotType(PrkSd sd)
{
  USER_ASSERT_TYPE(sd, PrkSdTag, PrkSdSlotType);
  return PRK_SD_SLOT_TYPE(sd);
}

USER_EXPORT PrkBool PrkIsMultiValueSd(PrkSd sd)
{
  PrkInheritance role_specifier;

USER_ASSERT_TYPE(sd, PrkSdTag, PrkIsMultiValueSd);
  role_specifier = PRK_SD_ROLE_SPECIFIER(sd);

return(role_specifier < PRK_FROLE_COUNT ?
         !PRK_IS_SV_INHERITANCE(role_specifier) : TRUE);
} unsigned prk_sd_get_flags(PrkSd sd)
{
  USER_ASSERT_TYPE(sd, PrkSdTag, prk_sd_get_flags);
  return PRK_SD_FLAGS(sd) & ~PRK_SD_SLOT_TYPE_MASK;
}

USER_EXPORT PrkBool PrkIsStaticFacetInSd(PrkSd sd, PrkSymbol facet_name)
{
  USER_ASSERT_TYPE(sd, PrkSdTag, PrkIsStaticFacetInSd);
  USER_ASSERT_TYPE(facet_name, PrkSymbolTag, PrkIsStaticFacetInSd);
  return(prk_sfacet_lookup(sd, facet_name) ? TRUE : FALSE);
}

USER_EXPORT PrkBool PrkIsSlot(PrkObject object, PrkSymbol slot_name)
{
  PrkSd sd;
  PrkSat sat;
  USER_ASSERT_FULL_OBJECT(object, PrkIsSlot);
  USER_ASSERT_TYPE(slot_name, PrkSymbolTag, PrkIsSlot);
  sat = PRK_OBJECT_SAT(object);
  ASSERT(PRK_IS_SAT(sat), PrkIsSlot);
  PRK_FIND_SAD(sd, sat, slot_name, return(FALSE));
  return(TRUE);
} define NO_SLOT_EXC(object, slot_name, fn) { \
    PrkSignalException(PrkExcNonExistentSlot, object, slot_name, #fn); \
    goto ReStart; }

/* defines sat, sd; assumes object, slot_name */ define GET_SAD(fn) \
    PrkSd sd; \
    PrkSat sat; \
  ReStart: \
    USER_ASSERT_FULL_OBJECT(object, fn); \
    USER_ASSERT_TYPE(slot_name, PrkSymbolTag, fn); \
    sat = PRK_OBJECT_SAT(object); \
    ASSERT(PRK_IS_SAT(sat), fn); \
    PRK_FIND_SAD_N(sd, sat, slot_name, NO_SLOT_EXC(object, slot_name, fn), xyz)
```

```c
PrkBool PrkIsSlotOrigin(PrkObject object, PrkSymbol slot_name)
{
  GET_SAD(PrkIsSlotOrigin);
  if (PRK_IS_INSTANCE(object))
    return(FALSE);
  else if (PRK_SD_ROLE_SPECIFIER(sd) == PrkOwnSlotType)
    return(TRUE);
  else {
    unsigned hts = PRK_SAT_HASH_TABLE_SIZE(sat);
    PrkList l = PRK_SAT_CLASS_PARENTS(sat, hts);
    PrkObject prnt;
    ASSERT_TYPE(l, PrkListTag, PrkIsSlotOrigin);
    for (; !Null(l); l = PRK_REST(l)) {
      prnt = (PrkObject)PRK_FIRST(l);
      ASSERT_FULL_OBJECT(prnt, PrkIsSlotOrigin);
      sat = PRK_OBJECT_SAT(prnt);
      ASSERT(PRK_IS_SAT(sat), PrkIsSlotOrigin);
      PRK_FIND_SAD(sd, sat, slot_name, continue);
      if (PRK_SD_ROLE_SPECIFIER(sd) == PrkOwnSlotType)
        continue;
      return(FALSE);
    }
    return(TRUE);
  }
}

PrkBool prk_any_marked_prnts(PrkObject object)
{
  PrkSat sat = PRK_OBJECT_SAT(object);
  unsigned hts = PRK_SAT_HASH_TABLE_SIZE(sat);
  PrkList prnts = PRK_OBJECT_PARENTS(object, sat, hts);
  while (!Null(prnts)) {
    if (PRK_IS_MARKED_OBJECT((PrkObject)PRK_FIRST(prnts)))
      return(TRUE);
    prnts = PRK_REST(prnts);
  }
  return(FALSE);
}
void prk_reconfig_slot_chldrn(PrkObject object, PrkSymbol slot_name,
                     PrkInheritance new_inheritance,
                     PrkSlotType new_slot_type,
                     PrkSlotFlags new_flags,
                     PrkType *sub_chunk,
                     PrkSat sat, PrkSd sd, PRK_SD_BODY old_sd_body)
{
  PrkObject c;
  PrkList msats,chldrn;
  unsigned hts;
  PrkSat msat;
  PrkSd msd;
  void prk_reconfig_slot_rec(PrkObject object, PrkSymbol slot_name,
                     PrkInheritance new_inheritance,
                     PrkSlotType new_slot_type,
                     PrkSlotFlags new_flags,
                     PrkType *prnt_sub_chunk,
                     PRK_SD_BODY old_prnt_sd_body);

if (!PRK_IS_INSTANCE(object) && (PRK_SD_SLOT_TYPE(sd) != PrkOwnSlotType)) {
    /* *** check for sparse */
    hts = PRK_SAT_HASH_TABLE_SIZE(sat);
    /* do multi-sats */
    msats = PRK_SAT_MULTI_SATS(sat, hts);
    ASSERT_TYPE(msats, PrkListTag, prk_reconfig_slot_chldren);
    if (!Null(msats)) {
      for (msats = PRK_REST(msats); !Null(msats); msats = PRK_REST(msats)) {
        ASSERT_TYPE(msats, PrkListTag, prk_reconfig_slot_chldren);
        msat = (PrkSat)PRK_FIRST(msats);
        ASSERT(PRK_IS_SAT(msat), prk_reconfig_slot_chldren);
        PRK_FIND_SAD(msd, msat, slot_name, continue);
        if (PRK_SD_SLOT_TYPE(msd) != PRK_SD_SLOT_TYPE(sd)) {
          PRK_EXC_MSG("Sorry, slot type change not implemented yet.",
                     prk_reconfig_slot_chldren);
```

```
      }
      PRK_SD_ROLE_SPECIFIER(msd) = PRK_SD_ROLE_SPECIFIER(sd);
      PRK_SD_FLAGS(msd) = PRK_SD_FLAGS(sd);
      PRK_SD_SIZE(msd) = PRK_SD_SIZE(sd);
      PRK_SD_STATIC_FACET_START(msd) = PRK_SD_STATIC_FACET_START(sd);
      PRK_SD_OFFSET(msd) = PRK_SD_OFFSET(sd);
    }
  }
  /* do instance sat */
  msat = PRK_SAT_INSTANCE_SAT(sat, hts);
  if (msat != NullSat) {
    ASSERT(PRK_IS_SAT(msat), prk_reconfig_slot_chldren);
    PRK_FIND_SAD2(msd, msat, slot_name, goto Skip);
    if (PRK_SD_SLOT_TYPE(msd) != PRK_SD_SLOT_TYPE(sd)) {
      PRK_EXC_MSG("Sorry, slot type change not implemented yet.",
                  prk_reconfig_slot_chldren);
    }
    PRK_SD_ROLE_SPECIFIER(msd) = PRK_SD_ROLE_SPECIFIER(sd);
    PRK_SD_FLAGS(msd) = PRK_SD_FLAGS(sd);
    PRK_SD_SIZE(msd) = PRK_SD_SIZE(sd);
    PRK_SD_STATIC_FACET_START(msd) = PRK_SD_STATIC_FACET_START(sd);
      PRK_SD_OFFSET(msd) = PRK_SD_OFFSET(sd);
    }
  Skip:
    chldrn = PRK_SAT_SUBCLASSES(sat, hts);
    for (; !Null(chldrn); chldrn = PRK_REST(chldrn)) {
      ASSERT_TYPE(chldrn, PrkListTag, prk_reconfig_slot_chldrn);
      c = (PrkObject)PRK_FIRST(chldrn);
      ASSERT_FULL_OBJECT(c, prk_reconfig_slot_chldrn);
      if (PRK_IS_MARKED_OBJECT(c) && !prk_any_marked_prnts(c))
        prk_reconfig_slot_rec(c, slot_name, new_inheritance,
                              new_slot_type, new_flags,
                              sub_chunk, old_sd_body);
    }
    if (PRK_SD_SLOT_TYPE(sd) != PrkSubclassSlotType) {
      chldrn = PRK_SAT_INSTANCES(sat,hts);
      for (; !Null(chldrn); chldrn = PRK_REST(chldrn)) {
        ASSERT_TYPE(chldrn,PrkListTag, prk_reconfig_slot_chldrn);
        c = (PrkObject)PRK_FIRST(chldrn);
        ASSERT_FULL_OBJECT(c, prk_reconfig_slot_chldrn);
        if (PRK_IS_MARKED_OBJECT(c) && !prk_any_marked_prnts(c))
          prk_reconfig_slot_rec(c, slot_name, new_inheritance,
                                new_slot_type, new_flags,
                                sub_chunk, old_sd_body);
      }
    }
  }
} void prk_reconfig_slot_rec(PrkObject object, PrkSymbol slot_name,
                           PrkInheritance new_inheritance,
                           PrkSlotType new_slot_type,
                           PrkSlotFlags new_flags,
                           PrkType *prnt_sub_chunk,
                           PRK_SD_BODY old_sd_body)
{
  PrkType **chunk, *old_sub_chunk, *sub_chunk, crnt_val, local_value;
  int sd_size;
  PrkBool new_p, instance_p;
  PrkInheritance old_inheritance;
  PrkList parents;
  GET_SAD(prk_reconfig_slot_rec);

prk_unmark_object(object);
  chunk = PRK_OBJECT_VALUE_ARRAY(object);
  CALCULATE_FULL_OFFSET(chunk, sat, PRK_SD_SLOT_TYPE(sd), sd,
                        prk_reconfig_slot_rec);

old_inheritance = old_sd_body.sd_role_specifier;
  crnt_val = *(PrkType *)chunk;
  parents = PRK_OBJECT_PARENTS(object, sat, PRK_SAT_HASH_TABLE_SIZE(sat));
  instance_p = PRK_IS_INSTANCE(object);
  old_sub_chunk = PRK_MASK_CHUNK(chunk[1]);
```

```
    switch (old_inheritance) {
      default:
        ASSERT_NEVER_REACHED(prk_reconfig_slot_rec);
        break;
      case PrkMVNoInheritance:
      case PrkSVNoInheritance:
        local_value = crnt_val;
        break;
      case PrkSVOverrideInheritance:
      case PrkSVInitialInheritance:
      case PrkMVOverrideInheritance:
      case PrkMVInitialInheritance:
        if (PRK_LOCAL_VALUE_P(chunk))
          local_value = crnt_val;
        else
          local_value = PrkNull;
        break;
      case PrkMethodInheritance:
      case PrkSelfLastUnionInheritance:
      case PrkSelfFirstUnionInheritance:
        if (PRK_LOCAL_CHUNK_P(chunk[1]))
          local_value = old_sub_chunk[old_sd_body.sd_static_facet_start - 1];
        else
          local_value = PrkNull;
        break;;
    } switch ((PrkFacetInheritance)new_inheritance) {
      default:
        ASSERT_NEVER_REACHED(prk_reconfig_slot_rec);
        break;
      case PrkMethodInheritance:
        new_flags |= PrkNoWhenChangedMonitorsFlag | PrkNoWhenNeededMonitorsFlag;
        sd_size = 1;
        goto common_layout;
      case PrkSVNoInheritance:
      case PrkSVInitialInheritance:
      case PrkSVOverrideInheritance:
      case PrkMVNoInheritance:
      case PrkMVInitialInheritance:
      case PrkMVOverrideInheritance:
        sd_size = !PRK_SD_DISALLOW_AVS_P(new_flags);
      common_layout:
        PRK_SD_ROLE_SPECIFIER(sd) = new_inheritance;
        PRK_SD_FLAGS(sd) = new_slot_type | new_flags;
        PRK_SD_STATIC_FACET_START(sd) = sd_size;
        if (PRK_SD_STATIC_FACET_SIZE(sd))
          sd_size++;
        if (!PRK_SD_DISALLOW_DFACETS_P(sd))
          sd_size++;
        PRK_SD_SIZE(sd) = sd_size;
        break;
      case PrkSelfLastUnionInheritance:
      case PrkSelfFirstUnionInheritance:
        sd_size = !PRK_SD_DISALLOW_AVS_P(new_flags) + 1;
        goto common_layout;
    }
    if (local_value != PrkNull) {
      if (PRK_IS_SV_INHERITANCE(new_inheritance) !=
          PRK_IS_SV_INHERITANCE(old_inheritance)) {
        if (PRK_IS_SV_INHERITANCE(new_inheritance)) {
          if (local_value == (PrkType)PrkNil)
            local_value = PrkNull;
          else if (!Null(PRK_REST((PrkList)local_value))) {
            PrkType tmp = PRK_FIRST((PrkList)local_value);
            PrkSignalException(PrkExcValueTruncation, object, slot_name,
                               local_value, &tmp, "PrkSetSlotInheritance");
            local_value = tmp;
          }
          else
            local_value = PRK_FIRST((PrkList)local_value);
        }
```

```
      else
        local_value = (PrkType)prk_ncons(local_value);
  }
}

ASSERT((sd_size >= 0) && (sd_size <= 4), prk_reconfig_slot_rec);
ASSERT(sd_size == PRK_SD_SIZE(sd), prk_reconfig_slot_rec);

if (PRK_SD_STATIC_FACET_SIZE(sd))
  ASSERT(PRK_SD_STATIC_FACET_START(sd) < sd_size, prk_reconfig_slot_rec);
else
  ASSERT(PRK_SD_STATIC_FACET_START(sd) <= sd_size, prk_reconfig_slot_rec);

if (PRK_LOCAL_CHUNK_P(chunk[1])) {
  if (PRK_SD_SIZE(sd) != old_sd_body.sd_size) {
    if (PRK_SD_SIZE(sd))
      sub_chunk = (PrkType *)PRK_SHORT_ALLOC(PRK_SD_SIZE(sd));
    else
      sub_chunk = 0;
    chunk[1] = (PrkType *)(((unsigned long) sub_chunk) |
                           ((unsigned long  chunk[1] & SVF_MASK));
    new_p = TRUE;
  }
  else {
    sub_chunk = old_sub_chunk;
    new_p = FALSE;
  } if (!PRK_SD_DISALLOW_AVS_P(new_flags)) {
    if (!PRK_SD_DISALLOW_AVS_P(old_sd_body.sd_flags)) {
      if (new_p)
        *sub_chunk = *old_sub_chunk;
    }
    else
      *(svf_t *)sub_chunk = default_svf;
  } if (PRK_SD_STATIC_FACET_COUNT(sd)) {
    if (old_sd_body.sd_static_facet_count) {
      if (new_p)
        sub_chunk[PRK_SD_STATIC_FACET_START(sd)] =
            old_sub_chunk[old_sd_body.sd_static_facet_start];
    }
    else
      sub_chunk[PRK_SD_STATIC_FACET_START(sd)] = 0;
  } if (!PRK_SD_DISALLOW_DFACETS_P(sd)) {
    if (!(old_sd_body.sd_flags & PrkNoDynamicFacetsFlag)) {
      if (new_p)
        sub_chunk[PRK_SD_SIZE(sd) - 1] =
          old_sub_chunk[old_sd_body.sd_size - 1];
    }
    else
      (PrkList)sub_chunk[PRK_SD_SIZE(sd) - 1] = PrkNil;
  }
}
else {
  chunk[1] = (PrkType *)((unsigned long)prnt_sub_chunk |
                         (unsigned long)chunk[1] & SVF_MASK);
  sub_chunk = prnt_sub_chunk;
} prk_fill_chunk(chunk, local_value, sd, parents, FALSE, instance_p);

sub_chunk = PRK_MASK_CHUNK(chunk[1]);

prk_reconfig_slot_chldrn(object, slot_name, new_inheritance,
                         new_slot_type, new_flags,
                         sub_chunk, sat, sd, old_sd_body);
}
```

```
void PrkReconfigureSlot(PrkObject object, PrkSymbol slot_name,
                        PrkInheritance new_inheritance,
                        PrkSlotType new_slot_type,
                        PrkSlotFlags new_flags)
{
  PrkType **chunk, *sub_chunk;
  unsigned sd_size;
  PrkBool new_p, local_value_p;
  PRK_SD_BODY old_sd_body;

GET_SAD(PrkReconfigureSlot);
  USER_ASSERT(PrkIsSlotOrigin(object, slot_name), PrkReconfigureSlot);

if (new_slot_type != PRK_SD_SLOT_TYPE(sd))
    PrkSetSlotType(object, slot_name, new_slot_type);

chunk = PRK_OBJECT_VALUE_ARRAY(object);
  CALCULATE_FULL_OFFSET(chunk, sat, PRK_SD_SLOT_TYPE(sd), sd,
                        PrkReconfigureSlot);
  ASSERT(PRK_LOCAL_CHUNK_P(chunk[1]), PrkReconfigureSlot);
  sub_chunk = PRK_MASK_CHUNK(chunk[1]);
  old_sd_body = ((PrkSd)PRK_OBJECT_BASE((sd), PrkNonImmediateTag,
                                        PrkSd))->sd_body;
  prk_mark_object_decnds(object);

prk_reconfig_slot_rec(object, slot_name, new_inheritance,
                        new_slot_type, new_flags,
                        sub_chunk, old_sd_body);
}

USER_EXPORT PrkInheritance PrkSlotInheritance(PrkObject object,
                                              PrkSymbol slot_name)
{
  GET_SAD(PrkSlotInheritance);
  return(PRK_SD_ROLE_SPECIFIER(sd));
}

USER_EXPORT void PrkSetSlotInheritance(PrkObject object, PrkSymbol slot_name,
                        PrkInheritance new_inheritance)
{
  GET_SAD(PrkSetSlotInheritance);
  USER_ASSERT(PrkIsSlotOrigin(object, slot_name), PrkSetSlotInheritance);
  PrkReconfigureSlot(object, slot_name, new_inheritance,
                     PRK_SD_SLOT_TYPE(sd), PRK_SD_FLAGS_ONLY(sd));
}

USER_EXPORT PrkBool PrkIsMultiValueSlotInheritance(PrkObject object, PrkSymbol slot
{
  PrkInheritance role;
  GET_SAD(PrkIsMultiValueSlotInheritance);
  role = PRK_SD_ROLE_SPECIFIER(sd);
  if (role < PRK_FROLE_COUNT)
    return !PRK_IS_SV_INHERITANCE(role);

return(TRUE);
}

USER_EXPORT PrkSlotType PrkGetSlotType(PrkObject object, PrkSymbol slot_name)
{
  GET_SAD(PrkGetSlotType);
  return(PRK_SD_SLOT_TYPE(sd));
} void prk_set_slot_type_chldrn1(PrkObject object, PrkSymbol slot_name,
                               PrkSlotType new_slot_type)
{
  PrkObject c;
  PrkList chldrn;
  PrkSat sat = PRK_OBJECT_SAT(object);
```

```
unsigned hts = PRK_SAT_HASH_TABLE_SIZE(sat);
void prk_set_slot_type_rec1(PrkObject object, PrkSymbol slot_name,
                            PrkSlotType new_slot_type);

if (!PRK_IS_INSTANCE(object) && (new_slot_type != PrkOwnSlotType)) {
    chldrn = PRK_SAT_SUBCLASSES(sat, hts);
    for (; !Null(chldrn); chldrn = PRK_REST(chldrn)) {
      ASSERT_TYPE(chldrn, PrkListTag, prk_reconfig_slot_chldrn);
      c = (PrkObject)PRK_FIRST(chldrn);
      ASSERT_FULL_OBJECT(c, prk_reconfig_slot_chldrn);
      if (PRK_IS_MARKED_OBJECT(c))
        prk_set_slot_type_rec1(c, slot_name, new_slot_type);
    }
    if (new_slot_type != PrkSubclassSlotType) {
      chldrn = PRK_SAT_INSTANCES(sat,hts);
      for (; !Null(chldrn); chldrn = PRK_REST(chldrn)) {
        ASSERT_TYPE(chldrn,PrkListTag, prk_reconfig_slot_chldrn);
        c = (PrkObject)PRK_FIRST(chldrn);
        ASSERT_FULL_OBJECT(c, prk_reconfig_slot_chldrn);
        if (PRK_IS_MARKED_OBJECT(c))
          prk_set_slot_type_rec1(c, slot_name, new_slot_type);
      }
    }
  }
} void prk_set_slot_type_rec1(PrkObject object, PrkSymbol slot_name,
                            PrkSlotType new_slot_type)
{
  PrkSat sat;
  PrkSd sd;
  PrkType *chunk = (PrkType *)PRK_OBJECT_VALUE_ARRAY(object);
  PrkType *new_end = chunk;
  PrkType cv, sb;
ReStart:
  prk_unmark_object(object);
  INIT_FULL_SAD_ACCESS(object, sd, sat, slot_name,
                       NO_SLOT_EXC(object, slot_name, prk_set_slot_type_rec1),
                       (PrkType **)chunk, -1);
  CALCULATE_END_OFFSET(new_end, sat, new_slot_type, prk_set_slot_type_rec1);
  if (chunk > new_end) {
    cv = chunk[0];
    sb = chunk[1];
    while (chunk > new_end) {
      chunk -= 2;
      chunk[2] = chunk[0];
      chunk[3] = chunk[1];
    }
    new_end[0] = cv;
    new_end[1] = sb;
  }
  else if (chunk < new_end) {
    new_end -= 2;
    cv = chunk[0];
    sb = chunk[1];
    while (chunk < new_end) {
      chunk[0] = chunk[2];
      chunk[1] = chunk[3];
      chunk += 2;
    }
    new_end[0] = cv;
    new_end[1] = sb;
  }
  prk_set_slot_type_chldrn1(object, slot_name, new_slot_type);
} void prk_set_slot_type_chldrn2(PrkObject object, PrkSymbol slot_name,
                               PrkSlotType new_slot_type)
{
  PrkObject c;
  PrkList chldrn;
```

```
  PrkSat sat = PRK_OBJECT_SAT(object);
  unsigned hts = PRK_SAT_HASH_TABLE_SIZE(sat);
  void prk_set_slot_type_rec2(PrkObject object, PrkSymbol slot_name,
                              PrkSlotType new_slot_type);

if (!PRK_IS_INSTANCE(object) && (new_slot_type != PrkOwnSlotType)) {
    chldrn = PRK_SAT_SUBCLASSES(sat, hts);
    for (; !Null(chldrn); chldrn = PRK_REST(chldrn)) {
      ASSERT_TYPE(chldrn, PrkListTag, prk_reconfig_slot_chldrn);
      c = (PrkObject)PRK_FIRST(chldrn);
      ASSERT_FULL_OBJECT(c, prk_reconfig_slot_chldrn);
      if (PRK_IS_MARKED_OBJECT(c))
        prk_set_slot_type_rec2(c, slot_name, new_slot_type);
    }
    if (new_slot_type != PrkSubclassSlotType) {
      chldrn = PRK_SAT_INSTANCES(sat,hts);
      for (; !Null(chldrn); chldrn = PRK_REST(chldrn)) {
        ASSERT_TYPE(chldrn,PrkListTag, prk_reconfig_slot_chldrn);
        c = (PrkObject)PRK_FIRST(chldrn);
        ASSERT_FULL_OBJECT(c, prk_reconfig_slot_chldrn);
        if (PRK_IS_MARKED_OBJECT(c))
          prk_set_slot_type_rec2(c, slot_name, new_slot_type);
      }
    }
  }
}

PrkBool prk_is_sd_origin(PrkObject object, PrkSd sd)
{
  return(TRUE);
} void prk_set_slot_type_rec2(PrkObject object, PrkSymbol slot_name,
                            PrkSlotType new_slot_type)
{
  PrkSlotType old_slot_type;
  unsigned old_len, old_ofs, new_ofs, hts;
  int index;
  PrkSd tsd;
  PrkList bucket;
  GET_SAD(prk_set_slot_type_rec2);
  if (prk_is_sd_origin(object, sd)) {
    old_slot_type = PRK_SD_SLOT_TYPE(sd);
    old_ofs = PRK_SD_OFFSET(sd);
    GET_SLOT_TYPE_LEN(sat, old_slot_type, old_len);

GET_SLOT_TYPE_LEN(sat, new_slot_type, new_ofs);
    OFFSET_SLOT_TYPE_END(sat, old_slot_type, -2);
    OFFSET_SLOT_TYPE_END(sat, new_slot_type, 2);
    PRK_SD_SET_SLOT_TYPE(sd, new_slot_type);
    PRK_SD_OFFSET(sd) = new_ofs;
  }
  if (old_ofs < old_len) {
    hts = PRK_SAT_HASH_TABLE_SIZE(sat);
    for (index = hts - 1; index >= 0; index--) {
      for (bucket = PRK_SAT_HASH_BUCKET(sat, index);
           !Null(bucket);
           bucket = PRK_REST(bucket)) {
        ASSERT_TYPE(bucket, PrkListTag, prk_set_slot_type_rec2);
        tsd = (PrkSd)PRK_FIRST(bucket);
        ASSERT_TYPE(tsd, PrkSdTag, prk_set_slot_type_rec2);
        if ((PRK_SD_SLOT_TYPE(tsd) == old_slot_type) &&
            (PRK_SD_OFFSET(tsd) > old_ofs) &&
            prk_is_sd_origin(object, sd))
          PRK_SD_OFFSET(tsd) -= 2;
      }
    }
  }
  prk_set_slot_type_chldrn2(object, slot_name, new_slot_type);
}
```

```
USER_EXPORT void PrkSetSlotType(PrkObject object, PrkSymbol slot_name,
                                PrkSlotType new_slot_type)
{
  GET_SAD(PrkSetSlotType);
  USER_ASSERT(new_slot_type <= PRK_SD_SLOT_TYPE_MASK, PrkSetSlotType);
  USER_ASSERT(PrkIsSlotOrigin(object, slot_name), PrkSetSlotType);
  if (new_slot_type != PRK_SD_SLOT_TYPE(sd)) {
/*
    PrkSignalExceptionLoop(PrkExcUnimplemented, PrkSetSlotTypeFnId);
*/
    if ((PrkObjectChildren(object, TRUE) != PrkNil) ||
        (PrkObjectChildren(object, FALSE) != PrkNil))
      PRK_EXC_MSG("Setting slot type of class with children not implemented",
                  PrkSetSlotType);
/*
    prk_mark_object_decnds(object);
*/
    prk_set_slot_type_rec1(object, slot_name, new_slot_type);
/*
    prk_mark_object_decnds(object);
*/
    prk_set_slot_type_rec2(object, slot_name, new_slot_type);
  }
}

USER_EXPORT PrkBool PrkTestSlotFlags(PrkObject object, PrkSymbol slot_name,
                                     PrkSlotFlags flags)
{
  GET_SAD(PrkGetSlotFlags);
  return (((PRK_SD_FLAGS(sd) & ~PRK_SD_SLOT_TYPE_MASK) & flags) ?
          TRUE : FALSE);
}

USER_EXPORT void PrkSetSlotFlags(PrkObject object, PrkSymbol slot_name,
                                 PrkSlotFlags flags)
{
  GET_SAD(PrkSetSlotFlags);
  USER_ASSERT(PrkIsSlotOrigin(object, slot_name), PrkSetSlotFlags);
  flags |= PRK_SD_FLAGS(sd);
  PrkReconfigureSlot(object, slot_name, PRK_SD_ROLE_SPECIFIER(sd),
                     PRK_SD_SLOT_TYPE(sd), flags);
}

USER_EXPORT void PrkClearSlotFlags(PrkObject object, PrkSymbol slot_name,
                                   PrkSlotFlags flags)
{
  GET_SAD(PrkClearSlotFlags);
  USER_ASSERT(PrkIsSlotOrigin(object, slot_name), PrkClearSlotFlags);
  flags = PRK_SD_FLAGS(sd) & ~flags;
  PrkReconfigureSlot(object, slot_name, PRK_SD_ROLE_SPECIFIER(sd),
                     PRK_SD_SLOT_TYPE(sd), flags);
}

USER_EXPORT PrkObject PrkSlotOrigin(PrkObject object, PrkSymbol slot_name)
{
  unsigned hts;
  PrkList prnts;
  PrkObject p;

GET_SAD(PrkSlotOrigin);

if (PRK_SD_SLOT_TYPE(sd) == PrkOwnSlotType)
    return(object);

cont2:
    hts = PRK_SAT_HASH_TABLE_SIZE(sat);
```

```c
  if (PRK_IS_INSTANCE(object))
    prnts = PRK_SAT_PARENTS(sat);
  else
    prnts = PRK_SAT_CLASS_PARENTS(sat,hts);

for (; !Null(prnts); prnts = PRK_REST(prnts)) {
    p = (PrkObject)PRK_FIRST(prnts);
    sat = PRK_OBJECT_SAT(p);
    ASSERT(PRK_IS_SAT(sat), PrkSlotOrigin);
    PRK_FIND_SAD(sd, sat, slot_name, goto cont1);
    if (!((PRK_SD_SLOT_TYPE(sd) == PrkOwnSlotType) ||
          (PRK_IS_INSTANCE(object) &&
           (PRK_SD_SLOT_TYPE(sd) == PrkSubclassSlotType))))
      continue;
    object = p;
      goto cont2;
    cont1:
      continue;
  } return(object);
}

USER_EXPORT PrkList PrkObjectParents(PrkObject object)
{
  PrkSat sat;
  USER_ASSERT_FULL_OBJECT(object, PrkObjectParents);
  sat = PRK_OBJECT_SAT(object);
  if (sat == NullSat)
    return PrkNil;
  ASSERT(PRK_IS_SAT(sat), PrkObjectParents);
  return PRK_OBJECT_PARENTS(object, sat, PRK_SAT_HASH_TABLE_SIZE(sat));
}

USER_EXPORT PrkList PrkObjectChildren(PrkObject object, PrkBool is_instance)
{
  USER_ASSERT_FULL_OBJECT(object, PrkObjectChildren);
  if (PRK_IS_INSTANCE(object))
    goto abort;
  else {
    PrkSat sat = PRK_OBJECT_SAT(object);
    sat_hash_index_t hash_table_size;
    if (sat == NullSat)
      goto abort;
    ASSERT(PRK_IS_SAT(sat), PrkObjectChildren);
    hash_table_size = PRK_SAT_HASH_TABLE_SIZE(sat);
    return is_instance ? PRK_SAT_INSTANCES(sat, hash_table_size)
                       : PRK_SAT_SUBCLASSES(sat, hash_table_size);
  }
 abort:
  return PrkNil;
}

USER_EXPORT PrkBool PrkIsAncestorObject(PrkObject parent, PrkObject child)
{
  PrkList parents;
  USER_ASSERT_FULL_OBJECT(parent, PrkIsAncestorObject);
  USER_ASSERT_FULL_OBJECT(child, PrkIsAncestorObject);
  parents = PrkObjectParents(child);
  if (!Null(prk_member_eq(parents, (PrkType)parent)))
    return TRUE;
  for (; !Null(parents); parents = PRK_REST(parents))
    if (PrkIsAncestorObject(parent, (PrkObject)PRK_FIRST(parents)))
      return TRUE;
  return FALSE;
}

USER_EXPORT void PrkRenameObject(PrkObject object, PrkSymbol new_name)
{
  PrkModule module;
```

```
USER_ASSERT_FULL_OBJECT(object, PrkRenameObject);
if (PRK_IS_SYSTEM_OBJECT(object)) {
  PrkSignalException(PrkExcSysObjOperationMsg, object, "rename");
  return;
}
module = PRK_OBJECT_MODULE(object);
module = (PrkModule)PRK_GET_APP(module);
if (PrkFindObject(new_name, (PrkApp) module) != PRK_FIND_OBJECT_NULL_RESULT){
   PrkSignalException(PrkExcObjectAlreadyExists, new_name,
                  PRK_OBJECT_MODULE(object));
   return;
}
else {
   PrkSymbol object_name = PRK_OBJECT_NAME(object);

if (PrkIsSymbol(object_name))        /* not anonymous object */
     prk_rem_assoc_prop((PrkList *)prk_get_addr_cons_prop(PRK_SYMBOL_ATTRIBUTES(PF
                                                         PRK_OBJECT_BACKPTR_PROP)
                 (PrkType) module);
   if (new_name == PrkAnonymousObjectName)
     new_name = PRK_MOD_ALLOC_ANON_OBJECT_NAME(PRK_OBJECT_MODULE(object));
   else
     prk_add_cons_prop(&PRK_SYMBOL_ATTRIBUTES(new_name),
                 PRK_OBJECT_BACKPTR_PROP,
                 (PrkType) PrkMakeCons((PrkType) module, (PrkType) object));
   PRK_OBJECT_NAME(object) = new_name;
#ifdef OBJ_EVENTS
   {
     PrkoRenameObjectEventStruct event_struct;
     event_struct.object = object;
     event_struct.old_object_name = object_name;
     PrkSignal(PrkoRenameObjectEventID, &event_struct);
   }
#endif                         /* OBJ_EVENTS */
  }
} ifdef OBJ_EVENTS

/* signal add or delete slot events */ void prko_signal_slot_mod(PrkObject object,PrkSymbol slot_name,int sc,
                  PrkEventId id)
{
  PrkoSlotModEventStruct ev;
  PrkSat sat;
  sat_hash_index_t hts;
  PrkList l;

prk_unmark_object(object);

if (PRK_IS_OBJECT_STRUCTURE_INTEREST(object)) {
    ev.object = object;
    ev.slot_name = slot_name;
    PrkSignal(id, &ev);
  }
  if (!PRK_IS_INSTANCE(object) &&
      ((sat = PRK_OBJECT_SAT(object)) != NullSat)) {
    ASSERT(PRK_IS_SAT(sat), prko_signal_slot_mod);
    hts = PRK_SAT_HASH_TABLE_SIZE(sat);
    switch (sc) {
    case PrkDefaultSlotType:
    case PrkLockedSlotType:
       for (l = PRK_SAT_SUBCLASSES(sat, hts); !Null(l); l = PRK_REST(l)) {
         object = (PrkObject)PRK_FIRST(l);
         ASSERT_FULL_OBJECT(object, prko_signal_slot_mod);
         if (PRK_IS_MARKED_OBJECT(object))
            prko_signal_slot_mod(object, slot_name, sc, id);
       }
```

```
      for (l = PRK_SAT_INSTANCES(sat, hts); !Null(l); l = PRK_REST(l)) {
        object = (PrkObject)PRK_FIRST(l);
        ASSERT_FULL_OBJECT(object, prko_signal_slot_mod);
        if (PRK_IS_MARKED_OBJECT(object))
          prko_signal_slot_mod(object, slot_name, sc, id);
      }
      break;
    case PrkSubclassSlotType:
      for (l = PRK_SAT_SUBCLASSES(sat, hts); !Null(l); l = PRK_REST(l)) {
        object = (PrkObject)PRK_FIRST(l);
        ASSERT_FULL_OBJECT(object, prko_signal_slot_mod);
        if (PRK_IS_MARKED_OBJECT(object))
          prko_signal_slot_mod(object, slot_name, sc, id);
      }
      break;
    case PrkOwnSlotType:
      break;
    case PrkSparseSlotType:
      /* *** sparse slots */
      break;
    default:
      ASSERT_NEVER_REACHED(prko_signal_slot_mod);
      break;
    }
  }
} endif

/*
  PrkRenameSlot

There are five main valid cases to account for:

1. The specified object defines the slot (founding object) and no decendents
  or other ancestors of the object's decendents contain a slot with the old
  or new name, even though in the latter case the slot may not visible to
  the descendents due to being overridden by the founding object, except
  where the storage class is such that the slot would not be visible to
  the descendents in any case (i.e. own or subclass storage class).
     This is the simplest case.  The high level alogorithm for this
case is:

a. For "this" class and each subclass, change the SAD symbol and
      rehash the SAD.  If any instance SATs exists, do the same for them.
      If any multi-SATs exist, do the same for them.  Local values and
      facets remain intact.

2. The specified object is not the founding object, and no decendents or
  ancestors of the object have a slot with the new name which is visible
  along the inheritance path.  The high level algorithm for this case is:

a. Create a slot with the new name.  The current local value of
      the old slot in the specified object is the local value of the new
      slot and propagates down to the new slots according to the
      slot's inheritance role.  Any local facets are also moved.

b. For each decendent whose old slot contained local values
      or local facets, the local values and facets are moved to the new
      slot and the combined value of the new slot is addjusted accordingly.
      The old slots reinherit from their parents if the inheritance role
      allows it, or are set to PrkNull.

3. A slot of the same old name exists in an ancestor of
  a descendent object.  Algorithm:

(This will be reconsidered when I get there.)

a. Save the local values and local facets of the slots with
      the old name which are in the inheritence path.

b. Delete the slot.  This includes recomputation of the
      inheritance path of the other slots with the old slot name.
``` c. Add the slot with the new name.

d. Restore local values and facets and regenerate combined values as required in those slots with the new name which are in the new inheritance path.

4. A slot of the same new name exists in an ancestor of a descendent object. Algorithm:

(Same as for 3 I think.)

5. This case is actually a sub-case which can occur in any of the previous cases, and is more of a condition to take into account when doing any of the operations. It concerns a object hierarchy such as:

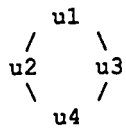

The idea is to make sure u4 is not operated on twice. Object marking can solve this problem.

There are additional cases which I consider error cases which should not be allowed:

6. The specified object is an instance.

7. The specified old slot does not exist in the specified object.

8. A slot with the specified new name already exists in the spedified object.

9. A decendent object has defined a slot with the new name.

*** for the short term (Beta release), I plan to only implement the simplest case (#1), which I believe is by far the most common case.

Low-level algorithm:

1. Check for simple user errors.

a. Invalid arguments.

b. Object is an instance object.

c. Slot with old_name doesn't exist in this object.

d. Slot with new name already exists in this object.

2. If own slot, change SAD symbol and rehash SAD.

3. Determine the case.

a. Mark this object.

b. Scan unmarked parents, marking them as you go. Keep a flags variable with a flag for each case.

c. Scan descendents and their unmarked parents. Use same flags variable. Count the decendents.

d. Unmark the objects.

4. If case 9, signal exception.

5. If case 3 or 4, (This will be reconsidered when I get there.)

a. Create temporary array, scan decendents which have the slot, and buffer local values and local facets in the temporary array.

b. Delete the slot using a subset of PrkDeleteSlot (i.e no need for argument checks or AV firing.

c. Add a slot with the new name and the local values and facets
    of the old slot using a subset of PrkMakeSlot (as for PrkDeleteSlot in c).

d. Scan slots in unmarked objects the inheritance path and restore local values and facets, if any. Mark processed objects.

e. Unmark objects.

f. Go to end.

6. If case 2, a. Add a slot with the new name and the local values and facets of the old slot. Use the PrkMakeSlot subset mentioned above.

b. Scan all unmarked decendents of the object in the inheritance path and move local values and local facets from the old slot to the new slot and regenerate the combined value. Cause reinheritance to occur for the old slot if allowed. Mark processed objects.

c. Unmark objects.

d. Go to end.

7. Do case 1.

a. Scan this object and all unmarked subclasses. Change name in SAD and rehash the SAD of the object SAT, instance SAT (if any), and the multi-SATs (if any). Mark processed objects.

b. Unmark objects.

8. End.
*/

```
/* mark a object, its parents, its decendents, and its
        decendents parents - also do type assertions here
        so we don't need to do them elsewhere */ void prk_mark_object_prnts_and_decnds(PrkObject object)
{
  PrkSat sat;
  PrkList prnts,chldrn;
  unsigned hts;
  PrkObject p,c;

ASSERT_FULL_OBJECT(object,prk_mark_object_prnts_and_decnds);
  prk_mark_object(object);
  sat = PRK_OBJECT_SAT(object);
  ASSERT(PRK_IS_SAT(sat), prk_mark_object_prnts_and_decnds);
  hts = PRK_SAT_HASH_TABLE_SIZE(sat);

if (PRK_IS_INSTANCE(object))
    prnts = PRK_SAT_PARENTS(sat);
  else
    prnts = PRK_SAT_CLASS_PARENTS(sat,hts);

for (; !Null(prnts); prnts = PRK_REST(prnts)) {
    ASSERT_TYPE(prnts,PrkListTag,prk_mark_object_prnts_and_decnds);
    p = (PrkObject)PRK_FIRST(prnts);
    ASSERT_FULL_OBJECT(p,prk_mark_object_prnts_and_decnds);
    prk_mark_object(p);
  }
```

```
  if (!PRK_IS_INSTANCE(object)) {
    chldrn = PRK_SAT_SUBCLASSES(sat,hts);

for (; !Null(chldrn); chldrn = PRK_REST(chldrn)) {
      ASSERT_TYPE(chldrn,PrkListTag,prk_mark_object_prnts_and_decnds);
      c = (PrkObject)PRK_FIRST(chldrn);
      prk_mark_object_prnts_and_decnds(c);
    } chldrn = PRK_SAT_INSTANCES(sat,hts);

for (; !Null(chldrn); chldrn = PRK_REST(chldrn)) {
      ASSERT_TYPE(chldrn,PrkListTag,prk_mark_object_prnts_and_decnds);
      c = (PrkObject)PRK_FIRST(chldrn);
      prk_mark_object_prnts_and_decnds(c);
    }
  }
}

/* check for the diamond hierarchy case - if any ancestors mark is
       cleared, return TRUE - recursive function */

PrkBool prk_diamond_check(PrkObject object)
{
  PrkSat sat;
  PrkList prnts;
  unsigned hts;
  PrkObject p;

sat = PRK_OBJECT_SAT(object);
  hts = PRK_SAT_HASH_TABLE_SIZE(sat);
  prnts = PRK_SAT_CLASS_PARENTS(sat,hts);

for (; !Null(prnts); prnts = PRK_REST(prnts)) {
    p = (PrkObject)PRK_FIRST(prnts);
    if (!PRK_IS_MARKED_OBJECT(p))
      return(TRUE);
    else if (prk_diamond_check(p))
      return(TRUE);
  } return(FALSE);
}
    /* get slot rename case flags for a child's parents and its
       decendent's parents */ int prk_get_prnts_and_decnds_case(PrkObject object, PrkSymbol old_name,
                                  PrkSymbol new_name)
{
  PrkSat sat,prnt_sat;
  PrkSd sd;
  PrkList prnts,chldrn;
  unsigned hts;
  PrkObject p,c;
  int case_flags = 0;

prk_unmark_object(object);
  sat = PRK_OBJECT_SAT(object);
  hts = PRK_SAT_HASH_TABLE_SIZE(sat);

/* check for case #9 */

PRK_FIND_SAD_N(sd, sat, new_name, goto chk_rest,lbl1);
  case_flags |= PRK_RENAME_CASE_9;
chk_rest:

if (PRK_IS_INSTANCE(object))
    prnts = PRK_SAT_PARENTS(sat);
  else
    prnts = PRK_SAT_CLASS_PARENTS(sat,hts);
```

```c
  for (; !Null(prnts); prnts = PRK_REST(prnts)) {
    p = (PrkObject)PRK_FIRST(prnts);
    if (PRK_IS_MARKED_OBJECT(p)) {
      prk_unmark_object(p);
      prnt_sat = PRK_OBJECT_SAT(p);
      ASSERT(PRK_IS_SAT(prnt_sat), prk_get_prnts_and_decnds_case);
      PRK_FIND_SAD_N(sd, prnt_sat, old_name, goto cont1, lbl2);
      if ((PRK_SD_SLOT_TYPE(sd) == PrkOwnSlotType) ||
          (PRK_IS_INSTANCE(object) &&
           (PRK_SD_SLOT_TYPE(sd) == PrkSubclassSlotType)))
        goto cont1;
      /* special case for diamond hierarchy - follow up hierarchy -
         if I reach an unmarked object - postpone case 3 decision */
      if (!prk_diamond_check(p))
        case_flags |= PRK_RENAME_CASE_3;
    cont1:
      PRK_FIND_SAD_N(sd, prnt_sat, new_name, goto cont2, lbl3);
      if ((PRK_SD_SLOT_TYPE(sd) == PrkOwnSlotType) ||
          (PRK_IS_INSTANCE(object) &&
           (PRK_SD_SLOT_TYPE(sd) == PrkSubclassSlotType))) {
      cont2:
        continue;
      }
      case_flags |= PRK_RENAME_CASE_4;
    }
  } if (!PRK_IS_INSTANCE(object)) {
     chldrn = PRK_SAT_SUBCLASSES(sat,hts);

for (; !Null(chldrn); chldrn = PRK_REST(chldrn)) {
       c = (PrkObject)PRK_FIRST(chldrn);
       case_flags |= prk_get_prnts_and_decnds_case(c, old_name, new_name);
     } chldrn = PRK_SAT_INSTANCES(sat,hts);

for (; !Null(chldrn); chldrn = PRK_REST(chldrn)) {
       c = (PrkObject)PRK_FIRST(chldrn);
       case_flags |= prk_get_prnts_and_decnds_case(c, old_name, new_name);
     }
  } return(case_flags);
}

/* determine rename case flags */ int prk_get_rename_slot_case_flags(PrkObject object, PrkSat sat, unsigned hts,
                                   PrkSymbol old_name, PrkSymbol new_name)
{
  int case_flags = 0;
  PrkList prnts = PRK_SAT_CLASS_PARENTS(sat,hts);
  PrkList chldrn;
  int prnt_old_slot_cnt = 0;
  PrkSat prnt_sat;
  PrkSd sd;
  PrkObject p,c;

/* mark this object, its parents, its decendents, and its
        decendents parents */ prk_mark_object_prnts_and_decnds(object);
  prk_unmark_object(object);

/* check parents for case #2 */ for (; !Null(prnts); prnts = PRK_REST(prnts)) {
    p = (PrkObject)PRK_FIRST(prnts);
    prk_unmark_object(p);
    prnt_sat = PRK_OBJECT_SAT(p);
    PRK_FIND_SAD(sd, prnt_sat, old_name, goto cont1);
    if (PRK_SD_SLOT_TYPE(sd) == PrkOwnSlotType) {
    cont1:
```

```
      continue;
    }
    case_flags |= PRK_RENAME_CASE_2;
  }

/* check descendents for cases #3, #4, and #9 */ chldrn = PRK_SAT_SUBCLASSES(sat,hts);
  for (; !Null(chldrn); chldrn = PRK_REST(chldrn)) {
    c = (PrkObject)PRK_FIRST(chldrn);
    case_flags |= prk_get_prnts_and_decnds_case(c, old_name, new_name);
  } chldrn = PRK_SAT_INSTANCES(sat,hts);

for (; !Null(chldrn); chldrn = PRK_REST(chldrn)) {
    c = (PrkObject)PRK_FIRST(chldrn);
    case_flags |= prk_get_prnts_and_decnds_case(c, old_name, new_name);
  } if (!case_flags)
    case_flags = PRK_RENAME_CASE_1;

return(case_flags);
}

/* rename SAD and rehash it *** could be macro */ void prk_rename_sat_sd(PrkObject object,PrkSat sat,PrkSymbol old_name,
                       PrkSymbol new_name)
{
  PrkSd sd;
      /* to monitoroid problem with processing a multi-sat twice, just
         return if slot is not found */
  PRK_FIND_SAD(sd, sat, old_name, return);
  PRK_SD_NAME(sd) = new_name;
  prk_delete_element_ptr((PrkType)sd, &PRK_FETCH_SAD_BUCKET(sat, old_name));
  PrkAddListPtrElmt((PrkType)sd, &PRK_FETCH_SAD_BUCKET(sat, new_name));
}

/* rename SAD and rehash it- already have sd *** could be macro */ void prk_rename_sd(PrkObject object,PrkSd sd,PrkSat sat,PrkSymbol old_name,
                   PrkSymbol new_name)
{
  PRK_SD_NAME(sd) = new_name;
  prk_delete_element_ptr((PrkType)sd, &PRK_FETCH_SAD_BUCKET(sat, old_name));
  PrkAddListPtrElmt((PrkType)sd, &PRK_FETCH_SAD_BUCKET(sat, new_name));
}

/* do rename slot case #1 */ void prk_rename_slot_case_1(PrkObject object, PrkSymbol old_name,
                            PrkSymbol new_name)
{
  PrkSd sd;
  PrkSat sat,inst_sat,multi_sat;
  prk_sdf_t storage_class;
  unsigned hts,cnt;
  PrkList multi_list,chldrn;
  PrkObject c;
  PrkBool been_done = FALSE;

if ((sat = PRK_OBJECT_SAT(object)) != NullSat) {
    ASSERT(PRK_IS_SAT(sat), prk_rename_slot_case_1);
    hts = PRK_SAT_HASH_TABLE_SIZE(sat);
    PRK_FIND_SAD(sd, sat, old_name, goto MaybeSadBeenDone);
    goto GotIt;
  MaybeSadBeenDone:
```

```
      been_done = TRUE;
      PRK_FIND_HSAD_N(sd, sat, old_name, new_name, goto DoMulti, lbl);
      been_done = FALSE;
    GotIt:
      storage_class = PRK_SD_SLOT_TYPE(sd);

/* process instance SAT if any */ if ((storage_class != PrkSubclassSlotType) &&
          ((inst_sat = PRK_SAT_INSTANCE_SAT(sat,hts)) != NullSat))
        prk_rename_sat_sd(object,inst_sat,old_name,new_name);

/* process multi sats if any */

DoMulti:
      if ((multi_list = PRK_SAT_MULTI_SATS(sat,hts)) != PrkNil) {
        ASSERT_TYPE(multi_list,PrkListTag,prk_rename_slot_case_1);
        ASSERT(PrkIsFixnum(PRK_FIRST(multi_list)),prk_rename_slot_case_1);
        cnt = PRK_UNBOX_FIXNUM((PrkFixnum)PRK_FIRST(multi_list));
        multi_list = PRK_REST(multi_list);
        for (; !Null(multi_list); multi_list = PRK_REST(multi_list)) {
          ASSERT_TYPE(multi_list,PrkListTag,prk_rename_slot_case_1);
          multi_sat = (PrkSat)PRK_FIRST(multi_list);
          ASSERT(PRK_IS_SAT(multi_sat), prk_rename_slot_case_1);
          prk_rename_sat_sd(object,multi_sat,old_name,new_name);
        }
      }

/* process descendents */ chldrn = PRK_SAT_SUBCLASSES(sat,hts);

for (; !Null(chldrn); chldrn = PRK_REST(chldrn)) {
        c = (PrkObject)PRK_FIRST(chldrn);
        if (!PRK_IS_INSTANCE(c))
          prk_rename_slot_case_1(c,old_name,new_name);
      }

/* process this object's main SAT */ if (!been_done)
        prk_rename_sd(object,sd,sat,old_name,new_name);
    }
} ifdef OBJ_EVENTS
    /* signal rename slot events */ void prko_signal_rename_slot(PrkObject object,PrkSymbol old_name,PrkSymbol new_name
                             int sc)
{
  PrkoRenameSlotEventStruct ev;
  PrkSat sat;
  sat_hash_index_t hts;
  PrkList l;
  ev.object = object;
  ev.old_name = old_name;
  ev.new_name = new_name;

prk_unmark_object(object);

if (PRK_IS_OBJECT_STRUCTURE_INTEREST(object))
    PrkSignal(PrkoRenameSlotEventID,&ev);

if (!PRK_IS_INSTANCE(object) &&
      ((sat = PRK_OBJECT_SAT(object)) != NullSat)) {
    ASSERT(PRK_IS_SAT(sat),prko_signal_rename_slot);
    hts = PRK_SAT_HASH_TABLE_SIZE(sat);
    switch (sc) {
    case PrkDefaultSlotType:
    case PrkLockedSlotType:
```

```c
      for (l = PRK_SAT_SUBCLASSES(sat,hts); !Null(l); l = PRK_REST(l)) {
        object = (PrkObject)PRK_FIRST(l);
        ASSERT_FULL_OBJECT(object,prko_signal_rename_slot);
        if (PRK_IS_MARKED_OBJECT(object))
           prko_signal_rename_slot(object,old_name,new_name,sc);
      }
      for (l = PRK_SAT_INSTANCES(sat,hts); !Null(l); l = PRK_REST(l)) {
        object = (PrkObject)PRK_FIRST(l);
        ASSERT_FULL_OBJECT(object,prko_signal_rename_slot);
        if (PRK_IS_MARKED_OBJECT(object))
           prko_signal_rename_slot(object,old_name,new_name,sc);
      }
      break;
    case PrkSubclassSlotType:
      for (l = PRK_SAT_SUBCLASSES(sat,hts); !Null(l); l = PRK_REST(l)) {
        object = (PrkObject)PRK_FIRST(l);
        ASSERT_FULL_OBJECT(object,prko_signal_rename_slot);
        if (PRK_IS_MARKED_OBJECT(object))
           prko_signal_rename_slot(object,old_name,new_name,sc);
      }
      break;
    case PrkOwnSlotType:
      break;
    case PrkSparseSlotType:
      /* *** sparse slots */
      break;
    default:
      ASSERT_NEVER_REACHED(prko_signal_rename_slot);
      break;
    }
  }
} endif

/* PrkRenameSlot main function */

USER_EXPORT void PrkRenameSlot(PrkObject object, PrkSymbol old_name, PrkSymbol new_
{
  PrkSat sat;
  PrkSd sd,new_sd;
  prk_sdf_t storage_class;
  int case_flags;
  unsigned hts;

/* check for errors */

USER_ASSERT_FULL_OBJECT(object, PrkRenameSlot);
  USER_ASSERT_TYPE(old_name, PrkSymbolTag, PrkRenameSlot);
  USER_ASSERT_TYPE(new_name, PrkSymbolTag, PrkRenameSlot);

if (PRK_IS_SYSTEM_OBJECT(object)) {
    PrkSignalException(PrkExcSysObjOperationMsg, object, "rename slot");
    return;
  } if (PRK_IS_INSTANCE(object))
     PrkSignalExceptionLoop(PrkExcIllegalInstSlotOp,PRK_OBJECT_NAME(object),old_name
                    "PrkRenameSlot");

sat = PRK_OBJECT_SAT(object);
  ASSERT(PRK_IS_SAT(sat), PrkRenameSlot);
  hts = PRK_SAT_HASH_TABLE_SIZE(sat);

PRK_FIND_SAD(sd, sat, old_name,
               PrkSignalExceptionLoop(PrkExcNonExistentSlot, object, old_name));

PRK_FIND_SAD2(new_sd, sat, new_name, goto SkipA);
     PrkSignalExceptionLoop(PrkExcSlotAlreadyExists, object, new_name);
  SkipA:
```

```
  /* do it */ storage_class = PRK_SD_SLOT_TYPE(sd);

case_flags = prk_get_rename_slot_case_flags(object,sat,hts,old_name,new_name);

if (case_flags & PRK_RENAME_CASE_9) {
    /* *** implement this case */
    goto Unimp;
  }
  else if (case_flags & PRK_RENAME_CASE_4) {
    /* *** implement this case */
    goto Unimp;
  }
  else if (case_flags & PRK_RENAME_CASE_3) {
      /* *** implement this case */
      goto Unimp;
    }
    else if (case_flags & PRK_RENAME_CASE_2) {
    /* *** implement this case */
  Unimp:
      PrkSignalExceptionLoop(PrkExcUnimplemented, PrkRenameSlotFnId, case_flags,
                      PRK_OBJECT_NAME(object), old_name, new_name);
    }
    else if (case_flags & PRK_RENAME_CASE_1) {
      if (storage_class == PrkOwnSlotType)
        prk_rename_sd(object,sd,sat,old_name,new_name);
      else
        prk_rename_slot_case_1(object,old_name,new_name);
    }
    else
      ASSERT_NEVER_REACHED(PrkRenameSlot);

#ifdef OBJ_EVENTS
    if (storage_class != PrkOwnSlotType)
      prk_mark_object_decnds(object);
    prko_signal_rename_slot(object, old_name, new_name, storage_class);
#endif
}

PrkSat prk_make_isat_oneshot(PrkSat sat, unsigned sd_count)
{
  PrkSat isat;
  ASSERT_TYPE(sat, PrkCSatTag, prk_make_isat_oneshot);
  isat = prk_allocate_sat(TRUE, prk_hash_table_size(PRK_SAT_DEFAULT_END(sat)));
  ASSERT_TYPE(isat, PrkISatTag, prk_make_isat_oneshot);
  prk_copy_into_isat(sat, isat);
  return isat;
}

PrkSat prk_make_csat(PrkSat sat, unsigned sd_count, PrkObject object)
{
  unsigned hash_size = prk_hash_table_size(sd_count);
  unsigned new_hash_table_size = (1 << hash_size);

PrkSat new_sat = prk_allocate_sat(FALSE, hash_size);

ASSERT(sat == empty_sat || PrkIsType(sat, PrkCSatTag), prk_make_csat);
  ASSERT_TYPE(new_sat, PrkCSatTag, prk_make_csat);
  PRK_SAT_PARENTS(new_sat) = prk_ncons((PrkType)object);
  PRK_SAT_CHUNK_ARRAY_SIZE(new_sat) =
    (PRK_SAT_CHUNK_END(new_sat) - PRK_SAT_CHUNK_END(sat)) +
     PRK_DEFAULT_VA_FUDGE_FACTOR;
  PRK_SAT_LOCKED_END(new_sat) = PRK_SAT_LOCKED_END(sat);
  PRK_SAT_DEFAULT_END(new_sat) = PRK_SAT_DEFAULT_END(sat);
  PRK_SAT_SUBCLASS_END(new_sat) = PRK_SAT_SUBCLASS_END(sat);

prk_copy_sat(sat, new_sat, FALSE);

PRK_SAT_CLASS_PARENTS(new_sat, new_hash_table_size) = PRK_SAT_PARENTS(sat);
```

```c
  PRK_SAT_INSTANCES(new_sat, new_hash_table_size) =
    PRK_SAT_SUBCLASSES(new_sat, new_hash_table_size) = PrkNil;
  PRK_SAT_INSTANCE_SAT(new_sat, new_hash_table_size) = NullSat;
  PRK_SAT_MULTI_SATS(new_sat, new_hash_table_size) = PrkNil;
  return new_sat;
}

PrkBool prk_role_conflict_p(PrkInheritance old_role, PrkInheritance new_role)
{
  if (new_role == PrkDefaultCreationInheritance)
    return FALSE;
  return new_role != old_role;
} void prk_create_static_facets(PrkSd sd, prk_parsed_facet_table_t *sfacets)
{
  unsigned count = PRK_SD_STATIC_FACET_COUNT(sd);
  static_facet_t *sf_ptr =
    (static_facet_t *)PRK_GC_MALLOC((size_t)(sizeof(static_facet_t) * count));
  prk_parsed_raw_facet_t *prf = &sfacets->start;
  PRK_SD_STATIC_FACETS(sd) = sf_ptr;
  for (; count--;)
    *sf_ptr++ = prf++->sf_part;
  PRK_SD_STATIC_FACET_SIZE(sd) = sfacets->size;
} void prk_merge_into_sat(PrkSat sat, prk_rsd_table_t *rsd_table, PrkObject object)
{
  unsigned rsd_count = rsd_table->count;
  prk_rsd_t *raw_sd = &rsd_table->rsd_start;
  unsigned locked_count = PRK_SAT_LOCKED_END(sat);
  unsigned default_count = PRK_SAT_DEFAULT_END(sat) - locked_count;
  unsigned subclass_count = PRK_SAT_SUBCLASS_END(sat) -
                            (default_count + locked_count);
  unsigned own_count = 0;
  unsigned sparse_count = 0;
  PrkSd *sd_ptr, sd;
  prk_sdf_t sd_flags;
  PrkInheritance role_specifier;

for (; rsd_count > 0; rsd_count--, raw_sd++)
    if (raw_sd->must_create_p) {
      sd_ptr = prk_get_sd_ptr(raw_sd->name, sat, object);
      sd = *sd_ptr;
      if (PRK_SD_OBJECT(sd) == object) { /* It must be a new slot descriptor */
        /* store slot method table */
        role_specifier = raw_sd->role;
        ASSERT(role_specifier != PrkDefaultCreationInheritance, prk_merge_into_sat)
        PRK_SD_ROLE_SPECIFIER(sd) = role_specifier;
        sd_flags = PRK_SD_FLAGS(sd) = raw_sd->flags;

NO_MERGE_STATIC_FACET_CODE(sd, raw_sd);
        switch (PRK_SD_SLOT_TYPE(sd)) {
        default:
          ASSERT_NEVER_REACHED(prk_merge_into_sat);
          break;
         case PrkDefaultSlotType:
           PRK_SD_OFFSET(sd) = default_count;
           default_count += 2;
           break;

case PrkLockedSlotType:
           PRK_SD_OFFSET(sd) = locked_count;
           locked_count += 2;
           break;

case PrkSubclassSlotType:
           PRK_SD_OFFSET(sd) = subclass_count;
           subclass_count += 2;
           break;

case PrkOwnSlotType:
```

```
            PRK_SD_OFFSET(sd) = own_count;
            own_count += 2;
            break;

case PrkSparseSlotType:
            PRK_SD_OFFSET(sd) = sparse_count;
            sparse_count += 2;
            break;
         }
      }
      else {
         /* merging slot descriptors *** */
         PrkSd new_sd;
         unsigned count;

PRK_MAKE_SAD(new_sd, object, raw_sd->name);

role_specifier = raw_sd->role;
         if (prk_role_conflict_p(PRK_SD_ROLE_SPECIFIER(sd), role_specifier))
            PrkSignalExceptionLoop(PrkExcSlotInheritanceConflict, PrkObjectName(objec
                        raw_sd->name, PRK_SD_ROLE_SPECIFIER(sd),
                        role_specifier);

PRK_SD_ROLE_SPECIFIER(new_sd) =
            role_specifier = PRK_SD_ROLE_SPECIFIER(sd);
         sd_flags = raw_sd->flags;
                           /* *** check flags conflict,
                              including storage class */
         PRK_SD_FLAGS(new_sd) = sd_flags;
         MERGE_STATIC_FACET_CODE(new_sd, sd, count, raw_sd);
         PRK_SD_OFFSET(new_sd) = PRK_SD_OFFSET(sd);

*sd_ptr = new_sd;
         sd = new_sd;
      }
      /* formerly: PRK_LAYOUT_CHUNK(role_specifier, sd, sd_flags); */
      /* see also n_addslt.c */
      if (!PRK_IS_USER_DEFINED_INHERITANCE(role_specifier))
         switch ((PrkFacetInheritance)role_specifier) {
            unsigned char _sd_size;
         default:
            ASSERT_NEVER_REACHED(PRK_LAYOUT_CHUNK_MACRO);
            break;
         case PrkMethodInheritance:
            sd_flags |= PrkNoWhenChangedMonitorsFlag | PrkNoWhenNeededMonitorsFlag;
            PRK_SD_FLAGS(sd) = sd_flags;
            _sd_size = 1;
            goto common_layout;
         case PrkSVOverrideInheritance:
         case PrkMVOverrideInheritance:
         case PrkMVNoInheritance:
         case PrkSVNoInheritance:
         case PrkMVInitialInheritance:
         case PrkSVInitialInheritance:
            _sd_size = !PRK_SD_DISALLOW_AVS_P(sd_flags);
         common_layout:
            PRK_SD_STATIC_FACET_START(sd) = _sd_size;
            if (PRK_SD_STATIC_FACET_SIZE(sd))
               _sd_size++;
            if (!PRK_SD_DISALLOW_DFACETS_P(sd))
               _sd_size++;
            PRK_SD_SIZE(sd) = _sd_size;
            break;
         case PrkSelfLastUnionInheritance:
         case PrkSelfFirstUnionInheritance:
            _sd_size = !PRK_SD_DISALLOW_AVS_P(sd_flags) + 1;
            goto common_layout;
         }
      else
         (PRK_SMT_METHOD(role_specifier, PRK_SMT_LAYOUT_CHUNK))(sd);
   }
   /* Store updated SAT size attributes */
```

```
  PRK_SAT_CHUNK_ARRAY_SIZE(sat) =
    (PRK_SAT_CHUNK_END(sat) =
      (PRK_SAT_SUBCLASS_END(sat) =
        (PRK_SAT_DEFAULT_END(sat) =
          (PRK_SAT_LOCKED_END(sat) = locked_count)
          + default_count)
        + subclass_count)
      + own_count)
    + PRK_DEFAULT_VA_FUDGE_FACTOR;

/* *** create sparse array */
}
void prk_fill_inhrtd_facet_values_1(PrkType *slot_chunk, PrkType *p_slot_chunk,
                                    unsigned filled_static_count, char *sfacet_vec,
                                    PrkSd sd, PrkSd parent_sd, PrkList dlist,
                                    PrkObject object)
{
  PrkList parent_dfacets, dfacet_cons, dlist2, dlist3;
  unsigned offset, p_offset;
  PrkDFacet df;
  if (filled_static_count &&
      (filled_static_count =
       PRK_SD_STATIC_FACET_COUNT(sd) - filled_static_count)) {
    PrkType *static_chunk =
      PRK_MASK_CHUNK(slot_chunk[offset = PRK_SD_STATIC_FACET_START(sd)]);
    PrkType *parent_chunk =
      PRK_MASK_CHUNK(p_slot_chunk[p_offset =
                                  PRK_SD_STATIC_FACET_START(parent_sd)]);
    static_facet_t *sf_ptr = PRK_SD_STATIC_FACETS(sd);
    for (; filled_static_count; sf_ptr++) {
      offset = sf_ptr->offset;
      if (!(long)sfacet_vec || !sfacet_vec[offset]) {
        switch (sf_ptr->role) {
        default:
          ASSERT_NEVER_REACHED(prk_fill_inhrtd_facet_values_1);
          break;

case PrkMonitorInheritance:
          PRK_INSTALL_AV(sf_ptr->name, sd, slot_chunk, offset, parent_chunk[offset])
          /* fall through */ case PrkSVOverrideInheritance:
        case PrkMVOverrideInheritance:
        case PrkSelfLastUnionInheritance:
        case PrkSelfFirstUnionInheritance:
        case PrkSVInitialInheritance:
        case PrkMVInitialInheritance:
          static_chunk[offset + 1] = PrkNull;
          static_chunk[offset] = parent_chunk[offset];
          break;

case PrkSVNoInheritance:
        case PrkMVNoInheritance:
          static_chunk[offset] = PrkNull;
          break;
        }
        filled_static_count--;
      }
    }
  }
  offset = PRK_SD_SIZE(sd) - 1;
  parent_dfacets = PRK_MASK_DFACET(p_slot_chunk[PRK_SD_SIZE(parent_sd) - 1]);
  ASSERT_TYPE(parent_dfacets, PrkListTag, prk_fill_inhrtd_facet_values_1);
  if (Null(dlist)) {
    slot_chunk[offset] = (PrkType)parent_dfacets;
  }
  else {
    dlist2 = dlist;
    for (; !Null(parent_dfacets); parent_dfacets = PRK_REST(parent_dfacets)) {
      dlist3 = dlist2;
      dfacet_cons = (PrkList)PRK_FIRST(parent_dfacets);
```

```
      df = PRK_DFCONS_DF(dfacet_cons);
enter_loop:
      if (Null(dlist3)) {
        switch (PRK_DFACET_ROLE(df)) {
        default:
          ASSERT_NEVER_REACHED(prk_fill_inhrtd_facet_values_1);
            break;

case PrkMonitorInheritance:
            PRK_INSTALL_AV(PRK_DFACET_NAME(df), sd, slot_chunk, PRK_DYNAMIC_AV,
                           PRK_DFCONS_VALUE(dfacet_cons), object);
            /* fall through */ case PrkSVOverrideInheritance:
          case PrkMVOverrideInheritance:
          case PrkSelfLastUnionInheritance:
          case PrkSelfFirstUnionInheritance:
          case PrkSVInitialInheritance:
          case PrkMVInitialInheritance:
            dlist = PrkMakeCons((PrkType)PRK_MAKE_DFCONS(df, PRK_DFCONS_VALUE(dfacet_
                                                     PrkNull),
                       (PrkType)dlist);
            break;

case PrkSVNoInheritance:
          case PrkMVNoInheritance:
            dlist = PrkMakeCons((PrkType)PRK_MAKE_SHORT_DFCONS(df, PrkNull),
                       (PrkType)dlist);
            break;
        }
      }
      else if (df != PRK_DFCONS_DF((PrkList)PRK_FIRST(dlist3))) {
        /* *** general case of matching names rather than DFacet structs */
        dlist3 = PRK_REST(dlist3);
        goto enter_loop;
      }
    }
    slot_chunk[offset] = (PrkType)((u_long)dlist | DFF_LOCAL_P);
  }
}

/* sfacet_vec is a vector of already filled in static facets */ void prk_fill_inhrtd_facet_values_n(PrkType *slot_chunk, prk_sd_table_t *sd_table,
                                    unsigned filled_static_count,
                                    char *sfacet_vec, PrkSd sd, PrkList dlist,
                                    PrkBool instance_p, PrkObject object)
{
  unsigned offset, parent_index;
  PrkSymbol slot_name = PRK_SD_NAME(sd);
  PrkBool dlist_changed_p;
  filled_static_count = PRK_SD_STATIC_FACET_COUNT(sd) - filled_static_count;
  if (filled_static_count) {
    PrkType *static_chunk =
      PRK_MASK_CHUNK(slot_chunk[offset = PRK_SD_STATIC_FACET_START(sd)]);
    static_facet_t *sf_ptr = PRK_SD_STATIC_FACETS(sd);
    for (; filled_static_count; sf_ptr++) {
      offset = sf_ptr->offset;
      if (!(long)sfacet_vec || !sfacet_vec[offset]) {
        switch (sf_ptr->role) {
        default:
          ASSERT_NEVER_REACHED(prk_fill_inhrtd_facet_values_n);

break;

case PrkMonitorInheritance:
          static_chunk[offset] =
            prk_fget_inhd_monitor_fvalues(slot_name, sf_ptr->name,
                                          PrkNull, sd_table, FALSE,
                                          instance_p);
          PRK_INSTALL_AV(sf_ptr->name, sd, slot_chunk, offset, static_chunk[offset]
          goto common_static_null_inherit;
```

```
      case PrkSVOverrideInheritance:
      case PrkMVOverrideInheritance:
      case PrkSVInitialInheritance:
      case PrkMVInitialInheritance:
        static_chunk[offset] =
          fget_inherited_override_fvalues(slot_name, sf_ptr->name,
                                          sd_table, FALSE, instance_p);
        goto common_static_null_inherit;

case PrkSelfLastUnionInheritance:
      case PrkSelfFirstUnionInheritance:
        static_chunk[offset] =
          prk_fget_inhd_union_fvalues(slot_name, sf_ptr->name,
                                      PrkNull, sd_table, FALSE,
                                      instance_p);
      common_static_null_inherit:
        static_chunk[offset+1] = PrkNull;
        break;

case PrkSVNoInheritance:
      case PrkMVNoInheritance:
        static_chunk[offset] = PrkNull;
        break;
      }
      filled_static_count--;
    }
  }
}
if (PRK_SD_DISALLOW_DFACETS_P(sd))
  return;

dlist_changed_p = !Null(dlist);
for (parent_index = 0; parent_index < sd_table->count; parent_index++) {
  PrkObject parent;
  PrkSat parent_sat;
  PrkSd parent_sd = TABLE_ELT(sd_table, parent_index).parent_sd;
  PrkList parent_dfacets, dfacet_cons, dlist2, dlist3;
  PrkType **p_value_array;
  PrkDFacet df;
  PrkSymbol facet_name;
  PrkType value;
  ASSERT_TYPE(sd, PrkSdTag, prk_fill_inhrtd_facet_values_n);
  if (PRK_SD_DISALLOW_DFACETS_P(parent_sd))
    goto next_parent;
  parent = TABLE_ELT(sd_table, parent_index).parent;
  ASSERT_FULL_OBJECT(parent, prk_fill_inhrtd_facet_values_n);
  parent_sat = PRK_OBJECT_SAT(parent);
  p_value_array = PRK_OBJECT_VALUE_ARRAY(parent);
  switch (PRK_SD_SLOT_TYPE(parent_sd)) {
  case PrkLockedSlotType:
    break;
  case PrkDefaultSlotType:
    p_value_array += PRK_SAT_LOCKED_END(parent_sat);
    break;
  case PrkSubclassSlotType:
    p_value_array += PRK_SAT_DEFAULT_END(parent_sat);
    break;
  case PrkSparseSlotType:
    break;                          /* *** */
  default:
    goto next_parent;
  }
  p_value_array += PRK_SD_OFFSET(parent_sd);
  parent_dfacets =
    PRK_MASK_DFACET(PRK_MASK_CHUNK(p_value_array[1])[PRK_SD_SIZE(parent_sd) - 1])
  dlist2 = dlist;

for (; !Null(parent_dfacets); parent_dfacets = PRK_REST(parent_dfacets)) {
    dlist3 = dlist2;
    dfacet_cons = (PrkList)PRK_FIRST(parent_dfacets);
    df = PRK_DFCONS_DF(dfacet_cons);
    facet_name = PRK_DFACET_NAME(df);
  enter_loop:
    if (Null(dlist3)) {
```

```
      dlist_changed_p = TRUE;
      switch (PRK_DFACET_ROLE(df)) {
      default:
        ASSERT_NEVER_REACHED(prk_fill_inhrtd_facet_values_n);
        break;

case PrkMonitorInheritance:
        dfacet_cons =
          PRK_MAKE_DFCONS(df,
                          prk_fget_inhd_monitor_fvalues(slot_name, facet_name,
                                                        PrkNull, sd_table,
                                                        TRUE, instance_p),
                          PrkNull);
        PRK_INSTALL_AV(PRK_DFACET_NAME(df), sd, slot_chunk, PRK_DYNAMIC_AV,
                       PRK_DFCONS_VALUE(dfacet_cons), object);
        break;

case PrkSVOverrideInheritance:
      case PrkMVOverrideInheritance:
      case PrkSVInitialInheritance:
      case PrkMVInitialInheritance:
        value = PRK_DFCONS_VALUE(dfacet_cons);
        dfacet_cons =
          PRK_MAKE_DFCONS(df,
                          value == PrkNull ?
                          fget_inherited_override_fvalues(slot_name, facet_name,
                                                          sd_table, TRUE,
                                                          instance_p) :
                          value,
                          PrkNull);
        break;

case PrkSelfLastUnionInheritance:
        dfacet_cons =
          PRK_MAKE_DFCONS(df,
                          prk_fget_inhd_union_fvalues(slot_name, facet_name,
                                                      PrkNull,
                                                      sd_table, TRUE,
                                                      instance_p),
                          PrkNull);
        break;

case PrkSelfFirstUnionInheritance:
        dfacet_cons =
          PRK_MAKE_DFCONS(df,
                          prk_fget_inherited_runion_fvls(slot_name, facet_name,
                                                         PrkNull,
                                                         sd_table, TRUE,
                                                         instance_p),
                          PrkNull);
        break;

case PrkSVNoInheritance:
      case PrkMVNoInheritance:
        dfacet_cons = PRK_MAKE_SHORT_DFCONS(df, PrkNull);
        break;
      }
      dlist = PrkMakeCons((PrkType)dfacet_cons, (PrkType)dlist);
    }
    else if (facet_name !=
             PRK_DFACET_NAME(PRK_DFCONS_DF((PrkList)PRK_FIRST(dlist3)))) {
      dlist3 = PRK_REST(dlist3);
      goto enter_loop;
    }
  }
 next_parent:
  continue;
  }
  slot_chunk[PRK_SD_SIZE(sd) - 1] =
    (PrkType)((u_long)dlist | (dlist_changed_p ? DFF_LOCAL_P : 0));
} void prk_add_child_links(PrkObject object, prk_parent_table_t *parent_table)
{
```

```
  int count = parent_table->count - 1;
  PrkBool instance_p = PRK_IS_INSTANCE(object);
  PrkSat sat;
  unsigned hash_table_size;
  for (; count >= 0; count--) {
    sat = PRK_OBJECT_SAT(TABLE_ELT(parent_table, count));
    hash_table_size = PRK_SAT_HASH_TABLE_SIZE(sat);
    PrkAddListPtrElmt((PrkType)object,
              (instance_p ?
                &PRK_SAT_INSTANCES(sat, hash_table_size) :
                &PRK_SAT_SUBCLASSES(sat, hash_table_size)));
  }
}

PrkList prk_reorder_class_list(PrkObject class, PrkList class_list)
{
  PrkList parents, local_parents, cons;
  PrkObject parent;
  PrkModule mod;
  PrkList remainder, *previous;
  PrkSat sat;
  unsigned hts;

ASSERT_FULL_OBJECT(class, prk_reorder_class_list);
  ASSERT_TYPE(class_list, PrkListTag, prk_reorder_class_list);
  previous = prk_addr_member_ptr_eq(&class_list, (PrkType)class);
  remainder = *previous;
  ASSERT(PRK_FIRST(remainder) == (PrkType) class, prk_reorder_class_list);
  remainder = PRK_REST(remainder);
  if (Null(remainder))
     return class_list;
  mod = PRK_OBJECT_MODULE(class);
  sat = PRK_OBJECT_SAT(class);
  ASSERT(PRK_IS_SAT(sat), prk_reorder_class_list);
  hts = PRK_SAT_HASH_TABLE_SIZE(sat);
  parents = PRK_SAT_CLASS_PARENTS(sat, hts);
  if (Null(parents))
     return class_list;
  local_parents = PrkNil;
  while (!Null(parents)) {
    parent = (PrkObject) PRK_FIRST(parents);
    ASSERT_FULL_OBJECT(parent, prk_reorder_class_list);
    if (mod == PRK_OBJECT_MODULE(parent)) {
      cons = PRK_MAKE_CONS();
      PRK_FIRST(cons) = (PrkType) parent;
      PRK_REST(cons) = local_parents;
      local_parents = cons;
    }
    parents = PRK_REST(parents);
    ASSERT_TYPE(parents, PrkListTag, prk_reorder_class_list);
  }
  if (Null(local_parents))
     return class_list;
  {
    PrkList moved_parents = PrkMakeCons((PrkType)PrkNil, (PrkType)PrkNil),
            unmoved_parents = PrkMakeCons((PrkType)PrkNil, (PrkType)PrkNil);
    PrkList *last_moved = &(PRK_REST(moved_parents)),
            *last_unmoved = &(PRK_REST(unmoved_parents));

while (!Null(remainder)) {
      parent = (PrkObject) PRK_FIRST(remainder);
        if (!Null(prk_member_ptr_eq(local_parents, (PrkType) parent))) {
          cons = PRK_MAKE_CONS();
          PRK_FIRST(cons) = (PrkType) parent;
          PRK_REST(cons) = PrkNil;
          *last_moved = cons;
          last_moved = &(PRK_REST(cons));
        }
        else {
          cons = PRK_MAKE_CONS();
```

```
      PRK_FIRST(cons) = (PrkType) parent;
      PRK_REST(cons) = PrkNil;
      *last_unmoved = cons;
      last_unmoved = &(PRK_REST(cons));
    }
    remainder = PRK_REST(remainder);
    ASSERT_TYPE(remainder, PrkListTag, prk_reorder_class_list);
  }
  moved_parents = PRK_REST(moved_parents);
  unmoved_parents = PRK_REST(unmoved_parents);
  if (Null(moved_parents))
    return class_list;
  *previous = moved_parents;
  *last_moved = PrkMakeCons((PrkType) class, (PrkType)unmoved_parents);
  /* now the class_list is OK, except that we have to call
     reorder_parents (recursively) for all moved parents      */
  /* need to copy moved_parents since prk_reorder_class_list may destructively
     modify class_list */
  moved_parents = PrkCopyList(moved_parents);
  while (!Null(moved_parents)) {
    class_list = prk_reorder_class_list((PrkObject) PRK_FIRST(moved_parents),
                                        class_list);
    moved_parents = PRK_REST(moved_parents);
    ASSERT_TYPE(moved_parents, PrkListTag, prk_reorder_class_list);
  }
  }
  return class_list;
}

/* resort module class list */ void prk_adjust_class_list(PrkObject object)
{
  PrkModule module = PRK_OBJECT_MODULE(object);
  PrkList l = PRK_MOD_CLASS_LIST(module);
  l = prk_reorder_class_list(object, l);
  PRK_MOD_CLASS_LIST(module) = l;
  PRK_MOD_CLASS_LIST_TAIL(module) = PrkListLastCons(l);
} void prk_install_object(PrkObject object, prk_parent_table_t *parent_table)
{
  PrkModule module = PRK_OBJECT_MODULE(object);
  PrkList l;

prk_add_child_links(object, parent_table);

if ((module != (PrkModule) PrkNull) && !PRK_MOD_P(object))
    if (PRK_IS_INSTANCE(object))

PrkAddListPtrElmt((PrkType)object, &PRK_MOD_INSTANCE_LIST(module));
    else if (Null(PRK_MOD_CLASS_LIST(module)))
      PRK_MOD_CLASS_LIST_TAIL(module) =
        PrkAddListPtrElmt((PrkType)object, &PRK_MOD_CLASS_LIST(module));
    else
      {
        l = PRK_MOD_CLASS_LIST_TAIL(module);
        PRK_MOD_CLASS_LIST_TAIL(module) = PrkAddListPtrElmt((PrkType)object,&PRK_RE
      }
  PRK_IS_LOADED_OBJECT(object) = TRUE;
}

/* mark an object's decendents */ void prk_mark_object_decnds(PrkObject object)
{
  PrkSat sat;
  PrkList chldrn;
  unsigned hts;
  PrkObject c;
```

```
  sat = PRK_OBJECT_SAT(object);
  ASSERT(PRK_IS_SAT(sat), prk_mark_object_decnds);
  hts = PRK_SAT_HASH_TABLE_SIZE(sat);

if (!PRK_IS_INSTANCE(object)) {
    chldrn = PRK_SAT_SUBCLASSES(sat,hts);

for (; !Null(chldrn); chldrn = PRK_REST(chldrn)) {
      ASSERT_TYPE(chldrn,PrkListTag,prk_mark_object_decnds);
      c = (PrkObject)PRK_FIRST(chldrn);
      ASSERT_FULL_OBJECT(c,prk_mark_object_decnds);
      prk_mark_object(c);
      prk_mark_object_decnds(c);
    } chldrn = PRK_SAT_INSTANCES(sat,hts);

for (; !Null(chldrn); chldrn = PRK_REST(chldrn)) {
      ASSERT_TYPE(chldrn,PrkListTag,prk_mark_object_decnds);
      c = (PrkObject)PRK_FIRST(chldrn);
      ASSERT_FULL_OBJECT(c,prk_mark_object_decnds);
      prk_mark_object(c);
      prk_mark_object_decnds(c);
    }
  }
}

/* mark an object's decendents */ void prk_unmark_object_decnds(PrkObject object)
{
  PrkSat sat;
  PrkList chldrn;
  unsigned hts;
  PrkObject c;

sat = PRK_OBJECT_SAT(object);
  ASSERT(PRK_IS_SAT(sat), prk_unmark_object_decnds);
  hts = PRK_SAT_HASH_TABLE_SIZE(sat);

if (!PRK_IS_INSTANCE(object)) {
    chldrn = PRK_SAT_SUBCLASSES(sat,hts);

for (; !Null(chldrn); chldrn = PRK_REST(chldrn)) {
      ASSERT_TYPE(chldrn,PrkListTag,prk_unmark_object_decnds);
      c = (PrkObject)PRK_FIRST(chldrn);
      ASSERT_FULL_OBJECT(c,prk_unmark_object_decnds);
      prk_unmark_object(c);
      prk_unmark_object_decnds(c);
    } chldrn = PRK_SAT_INSTANCES(sat,hts);

for (; !Null(chldrn); chldrn = PRK_REST(chldrn)) {
      ASSERT_TYPE(chldrn,PrkListTag,prk_unmark_object_decnds);
      c = (PrkObject)PRK_FIRST(chldrn);
      ASSERT_FULL_OBJECT(c,prk_unmark_object_decnds);
      prk_unmark_object(c);
      prk_unmark_object_decnds(c);
    }
  }
}

/* check to see if an existing slot should be used in a set parents
     situation */

PrkBool prk_include_slot_check(PrkObject object, PrkSd sd, PrkSat new_sat,
                               PrkType **chunk, PrkType **sub_chunk,
                               PrkBool instance_p, unsigned orphan_mode,
                               PrkSd *new_sdp)
{
```

```
PrkSd new_sd;
PrkBool orphaned = FALSE;
PrkSymbol slot_name = PRK_SD_NAME(sd);

PRK_FIND_SAD(new_sd, new_sat, slot_name, orphaned = TRUE);

if (orphaned /* or local class slot */) {
  *new_sdp = 0;
  if (instance_p)
    return(FALSE);
  else if ((PRK_SD_OBJECT(sd) == object) &&
           (PrkSlotOrigin(object, slot_name) == object))
    return(TRUE);
  switch(orphan_mode) {
    case PrkDeleteOrphans:
      return(FALSE);
    case PrkKeepOrphansWithLocalValues:
        switch (PRK_SD_ROLE_SPECIFIER(sd)) {
          case PrkSVNoInheritance:
          case PrkMVNoInheritance:
            return((PrkType)*chunk == PrkNull ? FALSE : TRUE);
          case PrkSVInitialInheritance:
          case PrkSVOverrideInheritance:
          case PrkMVInitialInheritance:
          case PrkMVOverrideInheritance:
            return(PRK_LOCAL_VALUE_P(chunk) ? TRUE : FALSE);
          case PrkSelfLastUnionInheritance:
          case PrkSelfFirstUnionInheritance:
          case PrkMethodInheritance:
            return(PRK_LOCAL_CHUNK_P(sub_chunk) ? TRUE : FALSE);
          default:
            ASSERT_NEVER_REACHED(prk_include_slot_check);
        }
        break;
      case PrkKeepAllOrphans:
        return(TRUE);
      default:
        PRK_EXC_MSG("Invalid orphan mode code", PrkSetObjectParents);
        break;
  }
}
else {
  *new_sdp = new_sd;
  return(TRUE);
} return(FALSE);
}

/* fill an rsd with data from an existing slot */

PrkBool prk_fill_rsd_from_slot(prk_rsd_t *rsd, PrkSd old_sd, PrkSd new_sd,
                               PrkSat sat, PrkType **chunk,
                               PrkType **sub_chunk, PrkBool instance_p,
                               PrkBool *must_create_p)
{
  prk_parsed_raw_facet_t *df, *sf, *f;
  PrkSymbol facet_name;
  PrkBool local_mcp = FALSE;
  unsigned sf_offset, sf_count;
  PrkFacetInheritance role;
  static_facet_t *sf_array = PRK_SD_STATIC_FACETS(old_sd);
  unsigned char count = PRK_SD_STATIC_FACET_COUNT(old_sd);
  PrkType **sf_value_array;
  PrkList dlist, new_dlist;

rsd->name = PRK_SD_NAME(old_sd);

switch (PRK_SD_ROLE_SPECIFIER(old_sd)) {
    case PrkSVNoInheritance:
    case PrkMVNoInheritance:
      rsd->value = (PrkType)*chunk;
```

```
      break;
    case PrkSVInitialInheritance:
    case PrkSVOverrideInheritance:
    case PrkMVInitialInheritance:
    case PrkMVOverrideInheritance:
      if (PRK_LOCAL_VALUE_P(chunk))
        rsd->value = (PrkType)*chunk;
      else
        rsd->value = PrkNull;
      break;
    case PrkMethodInheritance:
    case PrkSelfLastUnionInheritance:
    case PrkSelfFirstUnionInheritance:
      if (PRK_LOCAL_CHUNK_P(chunk[1]))
        rsd->value = (PrkType)PRK_LOCAL_VALUE(sub_chunk,old_sd);
      else
        rsd->value = PrkNull;
      break;
    default:
      ASSERT_NEVER_REACHED(prk_fill_rsd_from_slot);
    } if ((PrkBool)new_sd &&
        PRK_SD_SLOT_TYPE(new_sd) != PrkOwnSlotType) {
      rsd->flags = PRK_SD_FLAGS(new_sd);
      rsd->role = PRK_SD_ROLE_SPECIFIER(new_sd);
      if (rsd->static_ftable) {
        sf = &rsd->static_ftable->start;
        sf_value_array = (PrkType **)
          PRK_MASK_CHUNK((sub_chunk[PRK_SD_STATIC_FACET_START(old_sd)]));
        sf_offset = PRK_SD_STATIC_FACET_SIZE(new_sd);
        sf_count = PRK_SD_STATIC_FACET_COUNT(new_sd);
        for (; count; count--, sf_array++) {
          static_facet_t *new_sf;
          sf->sf_part.name = sf_array->name;
          if ((new_sf = prk_sfacet_lookup(new_sd, sf_array->name)) != 0) {
            sf->sf_part.role = new_sf->role;
            sf->sf_part.offset = new_sf->offset;
            goto Skip;
          }
          else if (!instance_p) {
            sf->sf_part.role = sf_array->role;
            sf->sf_part.offset = sf_offset;
            sf_offset += (sf_array->role > PRK_FACET_MAX_ONE_WORD_ROLE) ? 2 : 1;
            sf_count++;
          }
Skip:     if (sf_value_array)
            sf->value = (sf_array->role > PRK_FACET_MAX_ONE_WORD_ROLE) ?
              (PrkType)sf_value_array[sf_array->offset] :
              (PrkType)sf_value_array[sf_array->offset + 1];
          sf++;
        }
      }
      rsd->static_ftable->size = sf_offset;
      rsd->static_ftable->combined_count = sf_count;
    }
  }
    else {
      ASSERT(!instance_p, prk_fill_rsd_from_slot);
      rsd->flags = PRK_SD_FLAGS(old_sd);
      rsd->role = PRK_SD_ROLE_SPECIFIER(old_sd);
      local_mcp = TRUE;
      if (rsd->static_ftable) {
        sf = &rsd->static_ftable->start;
        sf_value_array = (PrkType **)
          PRK_MASK_CHUNK((sub_chunk[PRK_SD_STATIC_FACET_START(old_sd)]));
        sf_offset = 0;
        sf_count = 0;
        for (; count; count--, sf_array++) {
          static_facet_t *new_sf;
          sf->sf_part.name = sf_array->name;
          if (!instance_p) {
            sf->sf_part.role = sf_array->role;
```

```
            sf->sf_part.offset = sf_offset;
            sf_offset += (sf_array->role > PRK_FACET_MAX_ONE_WORD_ROLE) ?
              2 : 1;
            sf_count++;
            if (sf_value_array)
              sf->value = (sf_array->role > PRK_FACET_MAX_ONE_WORD_ROLE) ?
                (PrkType)sf_value_array[sf_array->offset] :
                  (PrkType)sf_value_array[sf_array->offset + 1];
            sf++;
          }
        }
        rsd->static_ftable->size = sf_offset;
        rsd->static_ftable->combined_count = sf_count;
      }
    } if (rsd->dynamic_ftable) {
      df = &rsd->dynamic_ftable->start;
      if (PRK_LOCAL_DLIST_P(sub_chunk[PRK_SD_SIZE(old_sd) - 1])) {
        dlist = PRK_MASK_DFACET(sub_chunk[PRK_SD_SIZE(old_sd) - 1]);
        for (; !Null(dlist); dlist = PRK_REST(dlist), df++) {
          PrkList f = (PrkList)PRK_FIRST(dlist);
          PrkDFacet old_df = PRK_DFCONS_DF(f);
          df->sf_part.name = PRK_DFACET_NAME(old_df);
          df->sf_part.role = PRK_DFACET_ROLE(old_df);
          df->value = (df->sf_part.role > PRK_FACET_MAX_ONE_WORD_ROLE) ?
            PRK_DFCONS_LVALUE(f) : PRK_DFCONS_VALUE(f);
        }
      }
    }

/* *** the following needs work */
    if (rsd->must_create_p = local_mcp)
      *must_create_p = TRUE;

return !(PrkBool)new_sd;
}
/*
  prk_stuff_object has got to run like a bat out of hell...
*/ void prk_stuff_object(PrkObject object, prk_parent_table_t *parent_table, prk_rsd_t
{
  PrkSat sat = PRK_OBJECT_SAT(object);

ASSERT(PRK_IS_SAT(sat), prk_stuff_object);

/* check to see if we need a local sat */
  if (PRK_IS_INSTANCE(object)) {
    if (rsd_table->must_create_p) {
      /* *** This is an error */
      ASSERT_NEVER_REACHED(prk_stuff_object);
    }
  }
  else {
    sat = prk_make_csat(sat, rsd_table->sd_count, object);
    prk_merge_into_sat(sat, rsd_table, object);
  }

PRK_OBJECT_SAT(object) = sat;

prk_fill_slot_chunks(object, rsd_table, parent_table->count);
  prk_install_object(object, parent_table);
}

/* recursive portion of PrkSetObjectParents */ void prk_set_object_parents(PrkObject object, PrkList parents,
                            unsigned orphan_mode)
{
```

```c
unsigned hts;
PrkSat sat, child_sat;
PrkList l;
PrkObject o;

prk_set_object_parents_stk(object, parents, orphan_mode);

sat = PRK_OBJECT_SAT(object);
hts = PRK_SAT_HASH_TABLE_SIZE(sat);

/* do children */ if (!PRK_IS_INSTANCE(object)) {
  for (l = PRK_SAT_SUBCLASSES(sat, hts); !Null(l); l = PRK_REST(l)) {
    o = (PrkObject)PRK_FIRST(l);
    if (PRK_IS_MARKED_OBJECT(o)) {
      child_sat = PRK_OBJECT_SAT(o);
      prk_unmark_object(o);
      prk_set_object_parents(o, PRK_SAT_CLASS_PARENTS(child_sat,
                 PRK_SAT_HASH_TABLE_SIZE(child_sat)), orphan_mode);
    }
   }
    for (l = PRK_SAT_INSTANCES(sat, hts); !Null(l); l = PRK_REST(l)) {
      o = (PrkObject)PRK_FIRST(l);
      if (PRK_IS_MARKED_OBJECT(o)) {
        child_sat = PRK_OBJECT_SAT(o);
        prk_unmark_object(o);
        prk_set_object_parents(o, PRK_SAT_PARENTS(child_sat), orphan_mode);
      }
    }
  }
} void prk_mark_object_list(PrkList l)
{
  PrkObject object;
  while (!Null(l)) {
    ASSERT_TYPE(l, PrkListTag, prk_mark_object_list);
    object = (PrkObject)PRK_FIRST(l);
    ASSERT_FULL_OBJECT(object, prk_mark_object_list);
    prk_mark_object(object);
    l = PRK_REST(l);
  }
}

/* top level set object parents function */

USER_EXPORT void PrkSetObjectParents(PrkObject object, PrkList new_prnts,
                          unsigned orphan_mode)
{
  PrkList l;
#ifdef OBJ_EVENTS
  PrkList old_prnts;
  PrkObject t;
  PrkoChangeObjectLinkEventStruct ev;
endif /* check for valid arguments */

USER_ASSERT_FULL_OBJECT(object, PrkSetObjectParents);
  USER_ASSERT_TYPE(new_prnts, PrkListTag, PrkSetObjectParents);
  prk_mark_object_list(new_prnts);
  for (l = new_prnts; !Null(l); l = PRK_REST(l)) {
    if (!PRK_IS_MARKED_OBJECT((PrkObject)PRK_FIRST(l)))
      PRK_EXC_MSG_WARNING(
          "Parents list given to PrkSetObjectParents has duplicate objects",
                     PrkSetObjectParents);
    else
      prk_unmark_object((PrkObject)PRK_FIRST(l));
  }
```

```
    /* check for nop */ if (!PrkIsListEqual(PrkObjectParents(object), new_prnts, TRUE)) {
ifdef OBJ_EVENTS old_prnts = PRK_OBJECT_PARENTS(object, PRK_OBJECT_SAT(object),
          PRK_SAT_HASH_TABLE_SIZE(PRK_OBJECT_SAT(object)));

if (old_prnts != PrkNil)
        old_prnts = PrkCopyList(old_prnts);
#endif

/* call WhenDetached monitor methods for the object and descnds */ prk_call_obj_fam_detaches(object);

/* mark object's descendents */ prk_mark_object_decnds(object);

/* do recursive portion */ prk_set_object_parents(object, new_prnts, orphan_mode);

/* resort module class list */ if (!PRK_IS_INSTANCE(object))
        prk_adjust_class_list(object);

prk_call_obj_fam_attaches(object,
           PrkMonitorFireOnCreateFlag | PrkMonitorFireOnAttachFlag);

#ifdef OBJ_EVENTS
     prk_mark_object_list(new_prnts);
     for (l = old_prnts; !Null(l); l = PRK_REST(l)) {
       t = (PrkObject)PRK_FIRST(l);
       ASSERT_FULL_OBJECT(t, PrkSetObjectParents);
       if (!PRK_IS_MARKED_OBJECT(t)) {
         ev.parent = t;
         ev.child = object;
         ev.created_p = FALSE;
         PrkSignal(PRK_IS_INSTANCE(object) ?
                  PrkoChangeObjectInstanceEventID :
                  PrkoChangeObjectSubclassEventID, &ev);
       }
       else
         prk_unmark_object(t);
     }
     for (l = new_prnts; !Null(l); l = PRK_REST(l)) {
       t = (PrkObject)PRK_FIRST(l);
       ASSERT_FULL_OBJECT(t, PrkSetObjectParents);
       if (PRK_IS_MARKED_OBJECT(t)) {
         ev.parent = t;
         ev.child = object;
         ev.created_p = TRUE;
         prk_unmark_object(t);
         PrkSignal(PRK_IS_INSTANCE(object) ?
                  PrkoChangeObjectInstanceEventID :
                  PrkoChangeObjectSubclassEventID, &ev);
       }
     }
endif
  }
} if !PRK_BIG_MACROS_OK
PrkBool prk_init_full_sad_access(PrkObject object, PrkSd *sdp, PrkSat *satp,
    PrkSymbol slot_name, PrkType ***value_arrayp, PrkSlotType storage_class)
{
```

```c
  *satp = PRK_OBJECT_SAT(object);
  ASSERT(PRK_IS_SAT(*satp), prk_init_full_sad_access);
  PRK_FIND_SAD(*sdp, *satp, slot_name, return(TRUE));
  *value_arrayp = PRK_OBJECT_VALUE_ARRAY(object);
  CALCULATE_FULL_OFFSET(*value_arrayp, *satp,
      (((int)storage_class == -1) ? PRK_SD_SLOT_TYPE(*sdp) : storage_class),
      *sdp, prk_init_full_sad_access);
  return(FALSE);
}

PrkBool prk_init_partial_sad_access(PrkObject object, PrkSd *sdp, PrkSat *satp,
    PrkSymbol slot_name, PrkType ***value_arrayp, PrkSlotType storage_class,
    PrkBool instance_p)
{
  *satp = PRK_OBJECT_SAT(object);
  ASSERT(PRK_IS_SAT(*satp), prk_init_partial_sad_access);
  PRK_FIND_SAD(*sdp, *satp, slot_name, return(TRUE));
  *value_arrayp = PRK_OBJECT_VALUE_ARRAY(object);
  CALCULATE_PARTIAL_OFFSET(*value_arrayp, *satp,
      (((int)storage_class == -1) ? PRK_SD_SLOT_TYPE(*sdp) : storage_class),
      *sdp, prk_init_partial_sad_access, return(TRUE), instance_p);
  return(FALSE);
}
endif USER_EXPORT void PrkMoveObject(PrkObject object, PrkModule dest_module, PrkBool tre
{
  PrkModule src_module;
  PrkApp src_app, dest_app;
  PrkBool instance_p, anonymous_p;
  PrkSymbol name;
  PrkList *prev;

USER_ASSERT_TYPE(object, PrkObjectTag, PrkMoveObject);
  USER_ASSERT(PRK_APP_OR_MOD_P(dest_module), PrkMoveObject);
  src_module = PRK_OBJECT_MODULE(object);
  src_app = PRK_GET_APP(src_module);
  dest_app = PRK_GET_APP(dest_module);
  instance_p = PRK_IS_INSTANCE(object);
  name = PRK_OBJECT_NAME(object);
  anonymous_p = PrkIsAnonymousObject(object);
  if (src_module == dest_module)
    return;
  {
    PrkObject obj = anonymous_p ? (PrkObject) PrkNull :
                                  PrkFindObject(name, dest_app);
    /* first check if already an object of that name exists */
    if ((obj != object) && (obj != (PrkObject) PrkNull)) {
      PrkSignalException(PrkExcMoveObjectAlreadyExists, object, dest_module);
      return;
    }
  }
  /* remove object from source module */
  prev = (instance_p ? &PRK_MOD_INSTANCE_LIST(src_module)
                     : &PRK_MOD_CLASS_LIST(src_module));
  while (!Null(*prev)) {
    ASSERT_TYPE(*prev, PrkListTag, PrkMoveObject);
    if (PRK_FIRST(*prev) == (PrkType) object) {
      *prev = PRK_REST(*prev);
      goto add_to_dest;
    }
    prev = &PRK_REST(*prev);
  }
  ASSERT_NEVER_REACHED(PrkMoveObject);

add_to_dest:
  if (anonymous_p)
    PRK_OBJECT_NAME(object) = PRK_MOD_ALLOC_ANON_OBJECT_NAME(dest_module);
  if (instance_p)
    PrkAddListPtrElmt((PrkType)object, &PRK_MOD_INSTANCE_LIST(dest_module));
  else
```

```
  if (Null(PRK_MOD_CLASS_LIST(dest_module)))
    PRK_MOD_CLASS_LIST_TAIL(dest_module) =
      PrkAddListPtrElmt((PrkType)object, &PRK_MOD_CLASS_LIST(dest_module));
  else {
    PrkList l = PRK_MOD_CLASS_LIST_TAIL(dest_module);
    PRK_MOD_CLASS_LIST_TAIL(dest_module) = PrkAddListPtrElmt((PrkType)object,
                                                        &PRK_REST(l));
  } if ((src_app != dest_app) && (!anonymous_p)) {
    PrkList al;
    /* update the property-list of the object-name */
    al = (PrkList) prk_get_whole_assoc_prop((PrkList) prk_get_cons_prop(PRK_SYMBOL_
                            (PrkType) src_app);
    ASSERT_TYPE(al, PrkListTag, PrkMoveObject);
    PRK_FIRST(al) = (PrkType) dest_app;
  }
  PRK_OBJECT_MODULE(object) = dest_module;
  if (tree_p) {
    /* loop thru all subclass and instances of the object to move them */
    PrkList children = PrkObjectChildren(object, TRUE);

/* loop thru instances */
    while (!Null(children)) {
      ASSERT_TYPE(children, PrkListTag, PrkMoveObject);
      ASSERT_TYPE(PRK_FIRST(children), PrkObjectTag, PrkMoveObject);
      PrkMoveObject((PrkObject)PRK_FIRST(children), dest_module, FALSE);
      children = PRK_REST(children);
    }
    children = PrkObjectChildren(object, FALSE);
    /* loop thru subclasses */ while (!Null(children)) {
      ASSERT_TYPE(children, PrkListTag, PrkMoveObject);
      ASSERT_TYPE(PRK_FIRST(children), PrkObjectTag, PrkMoveObject);
      PrkMoveObject((PrkObject)PRK_FIRST(children), dest_module, TRUE);
      children = PRK_REST(children);
    }
  }
}

/* #ifdef __sparc__ */

/* do not delete! */

PrkMethodFn PrkGetMsgFn(PrkObject object, PrkSymbol slot_name)
{
  PrkSd sd;
  PrkType **value_array;
  PrkSat sat;
  PrkInheritance role_specifier;
  PrkMethodFn fn;
  PrkBool bad_meth;

for (;;) {
    USER_ASSERT_FULL_OBJECT(object, PrkSendMsg);
    USER_ASSERT_TYPE(slot_name, PrkSymbolTag, PrkSendMsg);

INIT_FULL_SAD_ACCESS(object, sd, sat, slot_name,
                        goto no_slot,
                        value_array,
                        -1);
    bad_meth = FALSE;
    role_specifier = PRK_SD_ROLE_SPECIFIER(sd);
    if (role_specifier == PrkMethodInheritance) {
      PRK_EXTRACT_FROM_SABER_AT(fn, *value_array);
      if (fn) {
        ASSERT(prk_verify_pntr(fn), PrkSendMsg);
        return fn;
      }
      bad_meth = TRUE;
    }
```

```c
    PrkSignalException(PrkExcSendMsgError, object, slot_name, bad_meth);
    continue;

no_slot:
    PrkSignalException(PrkExcNonExistentSlot, object, slot_name);
  }
}

USER_EXPORT PrkType PrkSendMsg(PrkObject object, PrkSymbol slot,
                               PrkType a1, PrkType a2, PrkType a3,
                               PrkType a4, PrkType a5, PrkType a6,
                               PrkType a7, PrkType a8, PrkType a9,
                               PrkType a10, PrkType a11, PrkType a12,
                               PrkType a13, PrkType a14, PrkType a15, PrkType a16)
{
  return((*PrkGetMsgFn(object,slot))(object, slot, a1, a2, a3, a4, a5, a6,
                                a7, a8, a9, a10, a11, a12, a13, a14,
                                a15, a16));
}

/* #else void prk_full_object_check(PrkObject object)
{
   USER_ASSERT_FULL_OBJECT(object, PrkSendMsg);
} endif */  /* __sparc__ */ char prk_objman_initialized_p = FALSE;

USER_EXPORT void PrkInitObjectManager(int argc, char *argv[])
{
  if (!prk_objman_initialized_p) {
    if (argc)
      prk_image_file_name = argv[0];

PrkInitSubstrate(argc, argv);
#ifndef NDEBUG
#ifdef PRK_GC_LOADED
      {
        /* The following assertion ensures that
           gc bit in PrkObjects will remain in
           the 8th bit position */
        prk_object_flags_union_t x;
        x.of_l_ = 0;
        x.of_s_.gc_mark_p_ = TRUE;
        ASSERT((x.of_l_ == 0x01000000), PrkInitObjectManager);
      }
endif /* PRK_GC_LOADED */
#endif /* NDEBUG */
    prk_init_ob_excpt();
    prk_init_facets();

PrkDefaultOrphanMode = PrkDeleteOrphans;
#ifdef OBJ_EVENTS
    prk_obj_events_init();
#endif
    prk_init_app();
    prk_init_module();
    prk_init_monitors();
    prk_init_save_load_modules();
#ifdef PRK_GC_LOADED
    prk_gc_objmgr_data_start = (char *) &prk_gc_r_objmgr_data_start;
    prk_gc_objmgr_data_end = (char *) &prk_gc_r_objmgr_data_end;
    prk_init_gc_end();
    prk_gc_tool_init();
#endif
```

```
    prk_make_system_app((PrkApp) prk_objmgr_app_object);
    PrkBindException(PrkExcSubstrateExit, (PrkExcHandlerFn) prk_objman_exit_exc);
    prk_objman_initialized_p = TRUE;
  }
}

/*
  file: om_data.c
*/
static const char rcsid[] = "$Header: /tmp_mnt/net/op/prokee/src/generic/om/framema include <int_objm.ih>

/******************************************************************/
/*   All global variables which are potentially garbage-collectable
     should be defined below the definition of
     the GLOBAL VARIABLE:  prk_gc_r_objmgr_data_start
     and above the definition of
     the GLOBAL VARIABLE: prk_gc_r_objmgr_data_end

MAKE SURE THAT ALL THE GLOBALS ARE INITIALIZED. */ char *prk_gc_r_objmgr_data_start = NULL;

/* appmn.c */

PrkList prk_app_parent_classes = PrkNil;

/* modmain.c */

PrkList prk_module_parent_classes = PrkNil;

/* monitors.c */

PrkMethod PrkMonitorDefaultAttachMethod = NULL;
PrkMethod PrkMonitorDefaultDetachMethod = NULL;
PrkCollection PrkMonitorDefaultParents = (PrkCollection)PrkNil;
PrkCollection PrkMonitorDefaultSlotData = (PrkCollection)PrkNil;
PrkModule PrkMonitorDefaultModule = (PrkModule)PrkNull;

char *prk_gc_r_objmgr_data_end = NULL;

/******************************************************************/

/* appmn.c */

PrkApp PrkObjectDefaultApp = NULL;
int PrkLoadDefaultMonitorFlag = 0;
PrkBool PrkLoadDefaultQuietFlag = FALSE;

/* facets.c */
PrkSymbol PrkWhenNeededMonitorFacetName, PrkWhenChangedMonitorFacetName;

/* fdref.c */

PrkType *prk_fdref_ht;

/* inherit.c */ unsigned PrkWhenChangedDefaultFilter;
unsigned PrkWhenNeededDefaultFilter;
unsigned PrkUseAllMonitors;
unsigned PrkUseSystemMonitorsOnly;
unsigned PrkUseNoMonitors;
PrkBool PrkAddAfterP;
```

```c
    /* kbglobal.c */

/* an array that stores methods to save index table for
   a particular datatype */
PrkVoidFn prk_ismt[PRKS_SYSTEM_TAG_COUNT];

/* an array that stores methods to load an object on fault */
PrkType (*prk_ofm[PRKS_SYSTEM_TAG_COUNT])();

/* check CVALUE type ????? */
#define INITAIL_INDEX_TABLE_SIZES \
    {1024, 1024, 1024, 0, \
     0, 1024, 0, 0, \
     1024, 1024, 1024, 1024, \
     1024, 0, 0, 0, \
     0, 0, 0}

/* this could be made a global variable as this has default
   values for hash table sizes for various kinds of objects */
u_long prk_itsize[PRKS_SYSTEM_TAG_COUNT] = INITAIL_INDEX_TABLE_SIZES;

/* pointer to the image file name, this is used for
   getting the method function pointer from function name
   using nlist UNIX function */
char *prk_image_file_name = NULL;

PrkSymbol prk_random_load_data_symbol;
PrkSymbol prk_random_object_address_symbol;

/* App/Module loading and saving */ long PrkRanLOBuffSize;
long PrkSingleLOBuffSize;
long PrkRanSOBuffSize;
long PrkSeqLOBuffSize;
long PrkSeqSOBuffSize;
    /* kbmain.c */

PrkObject PrkKnowledgeBaseClass,
  PrkSystemKnowledgeBaseClass,
  PrkObjectManagerSystemKb;

PrkObject PrkKbDefaultParent;

/* modmain.c */

PrkSymbol prk_module_class_name;
PrkModule prk_module_class_object;

/* n_objmn.c */ unsigned PrkDefaultOrphanMode = PrkDeleteOrphans;

/* monitors.c */

PrkSymbol
  PrkMonitorMethodSlotName,
  PrkMonitorInfoSlotName,
  PrkMonitorAddMethodSlotName,
  PrkMonitorRemMethodSlotName,
  PrkSmallMonitorObjectName,
  PrkLargeMonitorObjectName;

PrkMonitor
  PrkSmallMonitorClass,
  PrkLargeMonitorClass;
```

```
PrkMonitorFlags PrkMonitorDefaultFlags;
char PrkMonitorDefaultPriority;
u_char PrkMonitorDefaultLevel;
PrkSymbol PrkMonitorDefaultName;
PrkBool PrkMonitorDefaultIsInstance;

/* objmain.c */ ifdef OBJ_EVENTS

PrkDataType

PrkoExceptionType,
  PrkoIntType,
  PrkoExceptionStructType,
  PrkoIntStructType,
  PrkoBreakLevelStructType,
  PrkoIntMajorLevelType,
  PrkoIntMinorLevelType ,
  PrkoModuleType,
  PrkoObjectType,
  PrkoModuleNameType,
  PrkoObjectNameType,
  PrkoSlotNameType,
  PrkoFacetNameType,
  PrkoValueType,
  PrkoBoolType,
  PrkoSlotValueModStructType,
  PrkoFacetValueModStructType,
  PrkoRenameModuleStructType,
  PrkoCreateModuleStructType,
  PrkoDeleteModuleStructType,
  PrkoRenameObjectStructType,
  PrkoCreateObjectStructType,
  PrkoDeleteObjectStructType,
  PrkoChangeObjectLinkStructType,
  PrkoSlotModStructType,
  PrkoRenameSlotStructType,
  PrkoFacetModStructType,
  PrkoRenameFacetStructType;

PrkEventId
  PrkoFileUnloadEventID,
  PrkoErrorEventID,
  PrkoBreakEventID,
  PrkoResetEventID,
  PrkoContinueEventID,
  PrkoExitEventID,
  PrkoConfirmExitEventID,
  PrkoSlotValueModEventID,
  PrkoFacetValueModEventID,
  PrkoRenameModuleEventID,
  PrkoCreateModuleEventID,
  PrkoPendingModuleDeletionEventID,
  PrkoModuleDeletedEventID,
  PrkoRenameObjectEventID,
  PrkoCreateObjectEventID,
  PrkoPendingObjectDeletionEventID,
  PrkoObjectDeletedEventID,
  PrkoChangeObjectSubclassEventID,
  PrkoChangeObjectInstanceEventID,
  PrkoAddSlotEventID,
  PrkoRenameSlotEventID,
  PrkoPendingDeleteSlotEventID,
  PrkoSlotDeletedEventID,
  PrkoAddFacetEventID,
  PrkoRenameFacetEventID,
  PrkoPendingDeleteFacetEventID,
  PrkoFacetDeletedEventID;
```

```
PrkInterestGroupId
  PrkFileUnloadInterestGroup = NULL,
  PrkResetInterestGroup = NULL,
  PrkBreakInterestGroup = NULL,
  PrkContinueInterestGroup = NULL,
  PrkErrorInterestGroup = NULL,
  PrkConfirmExitInterestGroup = NULL,
  PrkExitInterestGroup = NULL;

#endif /* OBJ_EVENTS */

/* object manager exceptions */

PrkException
  PrkExcObjManRoot,
  PrkExcValueOverflow,
  PrkExcFacetValueOverflow,
  PrkExcNullAsSlotValue,
  PrkExcNullAsFacetValue,
  PrkExcNonExistentSlot,
  PrkExcWarnNonExistentSlot,
  PrkExcNonExistentFacet,
  PrkExcNoDFacetViolation,
  PrkExcObjectAlreadyExists,
  PrkExcSlotAlreadyExists,
  PrkExcFacetAlreadyExists,
  PrkExcSlotTypeError,
  PrkExcGetValueMultiError,
  PrkExcGetFValueMultiError,
  PrkExcSendMsgError,
  PrkExcUnmarkError,
  PrkExcMarkSlotTypeConflict,
  PrkExcSlotInheritanceConflict,
  PrkExcFacetInheritanceConflict,
  PrkExcMultiLockedParents,
  PrkExcSlotTypeConflict,
  PrkExcStaticFacetConflict,
  PrkExcModuleAlreadyExists,
  PrkExcIllegalInstSlotOp,
  PrkExcNotClassError,
  PrkExcFileOpenError,
  PrkExcFileCloseError,
  PrkExcFileWriteError,
  PrkExcFileReadError,
  PrkExcFileEOFError,
  PrkExcFileFlushError,
  PrkExcStartSaveObjectsMsg,
  PrkExcEndSaveObjectsMsg,
  PrkExcStartLoadObjectsMsg,
  PrkExcEndLoadObjectsMsg,
  PrkExcLoadUndefinedParentError,
  PrkExcLoadNameSpaceClashError,
  PrkExcLoadModClashError,
  PrkExcInCorrectOBFormatError,
  PrkExcCurrputedOBFormatError,
  PrkExcSaveDeletedObjectMessage,
  PrkExcStartCompObjFileMsg,
  PrkExcEndCompObjFileMsg,
  PrkExcStartRSaveObjectsMsg,
  PrkExcEndRSaveObjectsMsg,
  PrkExcRLoadObjectLocnError,
  PrkExcRLoadOnNonRFileError,
  PrkExcRLoadObjectExistsMsg,
  PrkExcStartRLInstOfClassMsg,
  PrkExcEndRLInstOfClassMsg,
  PrkExcStartRLClassObjectsMsg,
  PrkExcEndRLClassObjectsMsg,
  PrkExcStartUnloadMsg,
  PrkExcEndUnloadMsg,
  PrkExcLoadObjectAlreadyExists,
  PrkExcCloseObjectFileMsg,
```

```
PrkExcMoveObjectAlreadyExists,
PrkExcNoMonitorClass,
PrkExcMonitorMismatch,
PrkExcBadMonitorReturn,
PrkExcDelObjWithChldrn,
PrkExcValueTruncation,
PrkExcSysObjOperationMsg,
PrkExcDelAppHasDeps,
PrkExcDelModHasDeps;

/*
  file: parse.c
*/
static const char rcsid[] = "$Header: /tmp_mnt/net/op/prokee/src/generic/om/framema include <int_objm.ih>

/* *** Things to do:
   1. PrkDefaultCreationInheritance should be out of all but the parsing code
   2. USER defined roles should not be dereferenced twice (once in parse and once
   in fill)
*/ void prk_fill_sd_table(PrkSymbol slot_name, prk_sd_table_t *sd_table, PrkList parer
                       PrkBool instance_p)
{
  int i = 0;
  prk_sd_object_t *sd_object = &sd_table->start;
  PrkSat sat;
  PrkSd sd;

for (; !Null(parents);) {
    sat = PRK_OBJECT_SAT((PrkType)PRK_FIRST(parents));
    PRK_FIND_SAD(sd, sat, slot_name, goto skip);
    switch (PRK_SD_SLOT_TYPE(sd)) {
    case PrkOwnSlotType:
      goto skip;
    case PrkSubclassSlotType:
      if (instance_p)
        goto skip;
    }
    sd_object->parent_sd = sd;

sd_object->parent = (PrkObject)PRK_FIRST(parents);
    sd_object++;
    i++;
  skip:
    parents = PRK_REST(parents);
  }
  sd_table->count = i;
} unsigned prk_sort_sd_array(PrkSd *sd_array, unsigned size, unsigned new_size,
                       PrkSat sat, unsigned new_mask)
{
  int i;
  PrkSd sd;

if (size >= new_size) {
    /* algorithm:
       go from 0 to new_size - 1, if slot found, shove after size
    */
    unsigned count = 0;
    for (i = 0; i < new_size; i++)
      if (sd_array[i]) {
        sd = prk_copy_sd(sd_array[i]);
        PRK_SD_OBJECT(sd) = (PrkObject)PrkNull;
        PRK_SD_OFFSET(sd) = (size + count) << 1;
        count++;
        PrkAddListPtrElmt((PrkType)sd,
                   &PRK_SAT_HASH_BUCKET(sat, PRK_SD_NAME_HASH_INDEX(PRK_SD_NAME(
      }
```

```
   return size + count;
 }
 else {                           /* size < new_size */
   /* algorithm:
      go from size to new_size, then wrap and go from 0 to tail.
      if empty space, then fill in with tail, reducing tail as you go.
    */
   int tail = size - 1;
   i = size;
   for (;;) {
     if (!(sd = sd_array[i])) {
       while (!(sd = sd_array[tail])) {
         if (tail == i)
           return new_size + tail;
         tail--;
         ASSERT(tail >= 0, prk_sort_sd_array);
       }
       tail--;
       goto copy;
     }
     if (i < size) {
     copy:
       sd = prk_copy_sd(sd);
       PRK_SD_OBJECT(sd) = (PrkObject)PrkNull;
       PRK_SD_OFFSET(sd) = (i >= size ? i : new_size + i) << 1;
     }
     PrkAddListPtrElmt((PrkType)sd,
                 &PRK_SAT_HASH_BUCKET(sat, PRK_SD_NAME_HASH_INDEX(PRK_SD_NAME(sc
     if (++i == new_size)
       i = 0;
     if (i > tail && i <= size)
       return new_size + tail + 1;
   }
 }
} void prk_install_multi_sat(PrkSat new_sat, prk_parent_table_t *parent_table)
{
  PrkSat sat;
  PrkList l;
  int i;
  unsigned hts;

for (i = parent_table->count; --i >= 0; ) {
    sat = PRK_OBJECT_SAT(TABLE_ELT(parent_table, i));
    hts = PRK_SAT_HASH_TABLE_SIZE(sat);
    l = PRK_SAT_MULTI_SATS(sat, hts);
    PRK_SAT_MULTI_SATS(sat, hts) =
      Null(l)
        ? PrkMakeList((PrkType)PRK_MAKE_FIXNUM(1), new_sat, PrkNull)
        : (l = PrkMakeCons((PrkType)((u_long)PRK_FIRST(l)+4), (PrkType)l),
           PRK_FIRST(PRK_REST(l)) = (PrkType)new_sat,
           l);
  }
}

/*
#define FACET_NAME_CHECK() \
  if (!PrkIsSymbol(facet_name)) \
    PrkSignalExceptionLoop(PrkExcUnexpectedUserType,PrkSymbolTag,facet_name, \
                       "prk_calc_facet_lengths");
*/ define FACET_NAME_CHECK() \
  if (!PrkIsSymbol((PrkType)facet_name)) { \
    if (PrkIsString((PrkType)facet_name)) \
      facet_name = (PrkType)PrkMakeSymbol(PRK_STRING_CSTRING((PrkString)facet_name)
    else \
      ASSERT_TYPE(facet_name, PrkSymbolTag, "FACET_NAME_CHECK"); \
  } define INC_FACET_COUNT(is_static) \
  ((is_static) ? sf_count++ : df_count++)
```

```c
/*
  returns number of dynamic and static facet definitions in raw_slot_data
  for stack allocation of internal rsd structs.
*/ void prk_calc_facet_lengths(PrkRawSlotData raw_slot_data, prk_rsd_t *rsd)
{
  unsigned sf_count = 0, df_count = 0;
  PrkCollection c = PRK_RAW_SLOT_FACET_DATA(raw_slot_data);
  PrkType facet_name, maybe_rfd;
  if (PrkIsList((PrkType)c))
    while (!Null((PrkList)c)) {
      facet_name = PRK_FIRST((PrkList)c);
      FACET_NAME_CHECK();
      c = (PrkCollection)PRK_REST((PrkList)c);
      if (Null((PrkList)c) ||
          PrkIsSymbol(PRK_FIRST((PrkList)c)) ||
          PrkIsString(PRK_FIRST((PrkList)c)))
        INC_FACET_COUNT(PRK_RAW_FACET_DATA_STATIC_P(PrkDefaultRawFacetData));
      else {
        maybe_rfd = PRK_FIRST((PrkList)c);
        c = (PrkCollection)PRK_REST((PrkList)c);
        USER_ASSERT_TYPE(maybe_rfd, PrkRawFacetDataTag,(slot or object creation));
/*      if (!PrkIsRawFacetData(maybe_rfd))
          PrkSignalExceptionLoop(PrkExcUnexpectedUserType,PrkRawFacetDataTag,
                        maybe_rfd,"prk_calc_facet_lengths");
*/
        INC_FACET_COUNT(PRK_RAW_FACET_DATA_STATIC_P((PrkRawFacetData)maybe_rfd));
      }
    }
  else {                          /* array case */
    int index = 0;
    int used = PRK_ARRAY_FILL_COUNT((PrkArray)c);
    while (index != used) {
      facet_name = PRK_ELT((PrkArray)c, index);
      FACET_NAME_CHECK();
      index++;
      if (index == used ||
          PrkIsSymbol(PRK_ELT((PrkArray)c, index)) ||
          PrkIsString(PRK_ELT((PrkArray)c, index)))
        INC_FACET_COUNT(PRK_RAW_FACET_DATA_STATIC_P(PrkDefaultRawFacetData));
      else {
        maybe_rfd = PRK_ELT((PrkArray)c, index);
        index++;
        if (!PrkIsRawFacetData(maybe_rfd))
          PrkSignalExceptionLoop(PrkExcUnexpectedUserType,PrkRawFacetDataTag,
                        maybe_rfd,"prk_calc_facet_lengths");
        INC_FACET_COUNT(PRK_RAW_FACET_DATA_STATIC_P((PrkRawFacetData)maybe_rfd));
      }
    }
  }
  rsd->static_ftable = (prk_parsed_facet_table_t *)(u_long)sf_count;
  rsd->dynamic_ftable = (prk_parsed_facet_table_t *)(u_long)df_count;
  return;
} define STATIC_FACET_NOT_FOUND ((unsigned char)-1)

unsigned char prk_get_old_sf_offset(PrkSymbol object_name, PrkSd sd, PrkSymbol fnam
                                    PrkFacetInheritance role, prk_parsed_raw_facet_t *s
{
  static_facet_t *sf_array = PRK_SD_STATIC_FACETS(sd);
  unsigned char count = PRK_SD_STATIC_FACET_COUNT(sd);
  sf->sf_part.name = fname;
  for (; count; count--, sf_array++)
    if (sf_array->name == fname) {
      if (prk_role_conflict_p(sf_array->role, role))
        PrkSignalExceptionLoop(PrkExcFacetInheritanceConflict,
                      object_name, PRK_SD_NAME(sd), fname,
                      sf_array->role, role);
      sf->sf_part.role = sf_array->role;
      return sf->sf_part.offset = sf_array->offset;
    }
```

```c
      sf->sf_part.role =
        role == PrkDefaultCreationInheritance ? PrkDefaultFacetInheritance : role;
      return STATIC_FACET_NOT_FOUND;
} define SF_PLAIN(sf, sf_offset, sf_count, role) \
    (sf->sf_part.offset = sf_offset, sf_offset += 1 + (role > PRK_FACET_MAX_ONE_WORD define SF_CHECK(uname, sd, sf, fname, sf_offset, sf_count, role, f) \
    (f = (prk_get_old_sf_offset(uname, sd, fname, role, sf) == STATIC_FACET_NOT_FOUNI
        ? (local_mcp = TRUE, SF_PLAIN(sf, sf_offset, sf_count, role)) : sf++)

/* returns TRUE if new slot name */
PrkBool prk_parse_raw_slot_datum(PrkSymbol object_name, PrkSat sat, prk_rsd_t *rsd,
                                 PrkSymbol name, PrkRawSlotData raw_data,
                                 PrkBool *must_create_p)
{
    prk_parsed_raw_facet_t *df, *sf, *f;
    PrkCollection c = PRK_RAW_SLOT_FACET_DATA(raw_data);
    PrkSymbol facet_name;
    PrkRawFacetData rfd;
    PrkSd old_sd;
    PrkBool local_mcp = FALSE;
    unsigned sf_offset, sf_count;
    PrkFacetInheritance role;

PRK_FIND_SAD(old_sd, sat, name, (old_sd = (PrkSd)NULL));

rsd->name = name;
    rsd->value = PRK_RAW_SLOT_DATA_VALUE(raw_data);
    rsd->flags = PRK_RAW_SLOT_DATA_FLAGS(raw_data);
    rsd->role = PRK_RAW_SLOT_DATA_ROLE(raw_data);

if (rsd->dynamic_ftable)
        df = &rsd->dynamic_ftable->start;
    if (rsd->static_ftable)
        sf = &rsd->static_ftable->start;

if ((PrkBool)old_sd &&
        PRK_SD_SLOT_TYPE(old_sd) != PrkOwnSlotType) {
        if (rsd->role == PrkDefaultCreationInheritance)
            rsd->role = PRK_SD_ROLE_SPECIFIER(old_sd);
        else {
            if (PRK_IS_USER_DEFINED_INHERITANCE(rsd->role))
                rsd->role =
                    (PrkInheritance)&smt_array[rsd->role - PRK_ROLE_COUNT];
            if (prk_role_conflict_p(PRK_SD_ROLE_SPECIFIER(old_sd), rsd->role))
                                    /* error if slotrole conflict */
                PrkSignalExceptionLoop(PrkExcSlotInheritanceConflict, object_name, name,
                          PRK_SD_ROLE_SPECIFIER(old_sd), rsd->role);
        }
    } sf_offset = PRK_SD_STATIC_FACET_SIZE(old_sd);
    sf_count = PRK_SD_STATIC_FACET_COUNT(old_sd);
    if (PrkIsList((PrkType)c))
        while (!Null((PrkList)c)) {
            facet_name = (PrkSymbol)PRK_FIRST((PrkList)c);
            c = (PrkCollection)PRK_REST((PrkList)c);
            if (Null((PrkList)c) || PrkIsSymbol(PRK_FIRST((PrkList)c))) {
                role = PRK_IS_MONITOR_FACET_NAME(facet_name) ? PrkMonitorInheritance : Pr
                if (PRK_RAW_FACET_DATA_STATIC_P(PrkDefaultRawFacetData))
                    SF_CHECK(object_name, old_sd, sf, facet_name, sf_offset, sf_count,
                             role, f);
                else {
                    f = df++;
                    f->sf_part.name = facet_name;
                    f->sf_part.role = role;
                }
                f->value = PRK_RAW_FACET_DATA_VALUE(PrkDefaultRawFacetData);
            }
            else {
```

```c
          rfd = (PrkRawFacetData)PRK_FIRST((PrkList)c);
          USER_ASSERT_TYPE(rfd, PrkRawFacetDataTag, prk_parse_raw_slot_datum);
          c = (PrkCollection)PRK_REST((PrkList)c);
          role = PRK_RAW_FACET_DATA_ROLE(rfd);
          USER_ASSERT(PRK_FACET_ROLE_P(role), prk_parse_raw_slot_datum);
          if (PRK_RAW_FACET_DATA_STATIC_P(rfd))
              SF_CHECK(object_name, old_sd, sf, facet_name, sf_offset, sf_count,
                       role, f);
          else {
            f = df++;
            f->sf_part.name = facet_name;
            f->sf_part.role = role;
          }
          f->value = PRK_RAW_FACET_DATA_VALUE(rfd);
        }
      }
      else {                          /* array case */
        int index = 0;
        int used = PRK_ARRAY_FILL_COUNT((PrkArray)c);
        while (index != used) {
          facet_name = (PrkSymbol)PRK_ELT((PrkArray)c, index);
          index++;
          if (index == used || PrkIsSymbol(PRK_ELT((PrkArray)c, index))) {
            role = PRK_IS_MONITOR_FACET_NAME(facet_name) ? PrkMonitorInheritance : Pr
            if (PRK_RAW_FACET_DATA_STATIC_P(PrkDefaultRawFacetData))
                SF_CHECK(object_name, old_sd, sf, facet_name, sf_offset, sf_count,
                         role, f);
            else {
              f = df++;
              f->sf_part.name = facet_name;
              f->sf_part.role = role;
            }
            f->value = PRK_RAW_FACET_DATA_VALUE(PrkDefaultRawFacetData);
          }
          else {
            rfd = (PrkRawFacetData)PRK_ELT((PrkArray)c, index);
            USER_ASSERT_TYPE(rfd, PrkRawFacetDataTag, prk_parse_raw_slot_datum);
            index++;
            role = PRK_RAW_FACET_DATA_ROLE(rfd);
            USER_ASSERT(PRK_FACET_ROLE_P(role), prk_parse_raw_slot_datum);
            if (PRK_RAW_FACET_DATA_STATIC_P(rfd))
                SF_CHECK(object_name, old_sd, sf, facet_name, sf_offset, sf_count,
                         role, f);
            else {
              f = df++;
              f->sf_part.name = facet_name;
              f->sf_part.role = role;
            }
            f->value = PRK_RAW_FACET_DATA_VALUE(rfd);
          }
        }
      }
    }
    else {                            /* new SAD */
      local_mcp = TRUE;
      sf_offset = 0;
      sf_count = 0;
      if (rsd->role == PrkDefaultCreationInheritance)
        rsd->role = PrkDefaultInheritance;
      if (PrkIsList((PrkType)c))
        while (!Null((PrkList)c)) {
          facet_name = (PrkSymbol)PRK_FIRST((PrkList)c);
          c = (PrkCollection)PRK_REST((PrkList)c);
          if (Null((PrkList)c) || PrkIsSymbol(PRK_FIRST((PrkList)c))) {
            role = PRK_IS_MONITOR_FACET_NAME(facet_name) ?
              PrkMonitorInheritance : PrkDefaultInheritance;
            f = PRK_RAW_FACET_DATA_STATIC_P(PrkDefaultRawFacetData) ?
              SF_PLAIN(sf, sf_offset, sf_count, role) : df++;
            f->sf_part.name = facet_name;
            f->sf_part.role = role;
            f->value = PRK_RAW_FACET_DATA_VALUE(PrkDefaultRawFacetData);
          }
```

```
    else {
      rfd = (PrkRawFacetData)PRK_FIRST((PrkList)c);
      USER_ASSERT_TYPE(rfd, PrkRawFacetDataTag, prk_parse_raw_slot_datum);
      c = (PrkCollection)PRK_REST((PrkList)c);
      role = PRK_RAW_FACET_DATA_ROLE(rfd);
      if (role == PrkDefaultCreationInheritance)
        role = PrkDefaultInheritance;
      USER_ASSERT(PRK_FACET_ROLE_P(role), prk_parse_raw_slot_datum);
      f = PRK_RAW_FACET_DATA_STATIC_P(rfd) ?
        SF_PLAIN(sf, sf_offset, sf_count, role) : df++;
      f->sf_part.name = facet_name;
      f->sf_part.role = role;
      f->value = PRK_RAW_FACET_DATA_VALUE(rfd);
    }
  }
  else {                          /* array case */
      int index = 0;
      int used = PRK_ARRAY_FILL_COUNT((PrkArray)c);
      while (index != used) {
        facet_name = (PrkSymbol)PRK_ELT((PrkArray)c, index);
        index++;
        if (index == used || PrkIsSymbol(PRK_ELT((PrkArray)c, index))) {
          role = PRK_IS_MONITOR_FACET_NAME(facet_name) ?
            PrkMonitorInheritance : PrkDefaultInheritance;
          f = PRK_RAW_FACET_DATA_STATIC_P(PrkDefaultRawFacetData) ?
            SF_PLAIN(sf, sf_offset, sf_count, role) : df++;
          f->sf_part.name = facet_name;
          f->sf_part.role = role;
          f->value = PRK_RAW_FACET_DATA_VALUE(PrkDefaultRawFacetData);
        }
        else {
          rfd = (PrkRawFacetData)PRK_ELT((PrkArray)c, index);
          USER_ASSERT_TYPE(rfd, PrkRawFacetDataTag, prk_parse_raw_slot_datum);
          index++;
          role = PRK_RAW_FACET_DATA_ROLE(rfd);
          if (role == PrkDefaultCreationInheritance)
            role = PrkDefaultInheritance;
          USER_ASSERT(PRK_FACET_ROLE_P(role), prk_parse_raw_slot_datum);
          f = PRK_RAW_FACET_DATA_STATIC_P(rfd) ?
            SF_PLAIN(sf, sf_offset, sf_count, role) : df++;
          f->sf_part.name = facet_name;
          f->sf_part.role = role;
          f->value = PRK_RAW_FACET_DATA_VALUE(rfd);
        }
      }
    }
  }
  if (rsd->static_ftable) {
    rsd->static_ftable->size = sf_offset;
    rsd->static_ftable->combined_count = sf_count;
  }
  /* *** the following needs work */
  if (rsd->must_create_p = local_mcp)
    *must_create_p = TRUE;
  return !(PrkBool)old_sd;
}

PrkObject prk_force_to_class(PrkType o, PrkApp app, char *fn)
{
  PrkObject object;
  PrkSymbol s;

switch (PrkGetType(o)) { case PrkSymbolTag:
    {
Sym:  object = PrkFindObject((PrkSymbol)o, app);
      if (object == PRK_FIND_OBJECT_NULL_RESULT)
        goto NotClass;
      if (PRK_IS_INSTANCE(object))
        goto NotClass;
    }
```

```
      return object;

case PrkObjectTag:
    if (PRK_IS_INSTANCE((PrkObject)o))
       goto NotClass;
    return (PrkObject)o;
  case PrkStringTag:
    if ((s = PrkFindSymbol(PRK_STRING_CSTRING((PrkString)o))) !=
        (PrkSymbol)PrkNull) {
      o = (PrkType)s;
      goto Sym;
    }
    goto NotClass;
  default:
    {
    NotClass:
      PrkSignalExceptionLoop(PrkExcNotClassError, &o, fn);
    }
  }
  return (PrkObject)o;
}

/* returns T if all parents have same module as module */
PrkBool prk_fill_parent_table(prk_parent_table_t *parent_table, PrkCollection paren
                         PrkModule module, char *fn)
{
  int i;
  PrkBool same_module_p = TRUE;
  PrkObject object;
  if (PrkIsList(parents))
     for (i = 0; !Null((PrkList)parents);
          parents = (PrkCollection)PRK_REST((PrkList)parents)) {
       object = (PrkObject)PRK_FIRST(parents);
       if (PRK_OBJECT_MODULE(TABLE_ELT(parent_table, i++) = object =
             prk_force_to_class((PrkType)object, (PrkApp)module, fn)) != module)
         same_module_p = FALSE;
     }
  else
     for (i = PRK_ARRAY_FILL_COUNT((PrkArray)parents) - 1; i >= 0; i--) {
       object = (PrkObject)PRK_ELT((PrkArray)parents, i);
       if (PRK_OBJECT_MODULE(TABLE_ELT(parent_table, i) = object =
             prk_force_to_class((PrkType)object, (PrkApp)module, fn)) != module)
         same_module_p = FALSE;
     }
  return same_module_p;
}

PrkSd prk_copy_sd(PrkSd old_sd)
{
  PrkSd new_sd =
     (PrkSd)prk_make_tagged_object((size_t)sizeof(struct PRK_SD_STRUCT),
                                   PrkSdTag);
  *(PRK_SD_BODY *)&PRK_SD_NAME(new_sd) =
     *(PRK_SD_BODY *)&PRK_SD_NAME(old_sd);
  PRK_SD_INHERITED_SFACET_COUNT(new_sd) =
     PRK_SD_STATIC_FACET_COUNT(old_sd);
  return new_sd;
}

PrkSat prk_get_hashed_parent_sat(prk_parent_table_t *parent_table)
{
  int index = parent_table->count - 1;
  int total = index;
  PrkSat sat = PRK_OBJECT_SAT(TABLE_ELT(parent_table, index));
  PrkList l, min_multi_sat_list =
             PRK_SAT_MULTI_SATS(sat, PRK_SAT_HASH_TABLE_SIZE(sat));
  PrkFixnum min_multi_sat_count;

if (Null(min_multi_sat_list))
     goto create_new;

new_min_loop:
    min_multi_sat_count = (PrkFixnum)PRK_FIRST(min_multi_sat_list);
```

```
repeat:
  if (!index)
    goto check;

sat = PRK_OBJECT_SAT(TABLE_ELT(parent_table, --index));
  l = PRK_SAT_MULTI_SATS(sat, PRK_SAT_HASH_TABLE_SIZE(sat));

if (Null(l))
    goto create_new;

if ((u_long)PRK_FIRST(l) >= (u_long)min_multi_sat_count)
    goto repeat;

min_multi_sat_list = l;
  goto new_min_loop;

check:
  for (min_multi_sat_list = PRK_REST(min_multi_sat_list);
       !Null(min_multi_sat_list);
       min_multi_sat_list = PRK_REST(min_multi_sat_list)) {
    index = 0;
    sat = (PrkSat)PRK_FIRST(min_multi_sat_list);
    l = PRK_SAT_PARENTS(sat);
    for (; !Null(l); l = PRK_REST(l)) {
      if ((PrkObject)PRK_FIRST(l) != TABLE_ELT(parent_table, index))
        break;
      if (index++ == total)
        if (Null(PRK_REST(l)))
          return (PrkSat)PRK_FIRST(min_multi_sat_list);
        else
          break;
    }
  } create_new:
  return prk_create_new_multi_sat(parent_table);
}
```

What is claimed is:

1. In an object-oriented software system on a computer having a central processing unit and a memory means, said object-oriented system having data structures comprising objects, said objects representing real-world entities, said objects being an aggregation of attributes, wherein form of aggregation of said attributes is specified by attribute declarations, a method for generating a data representation of said objects so that source code is independent of value access and for accessing said data representation for use in implementing said objects of the software system, said method comprising the steps of:

using said central processing unit to create an attribute value array for each one of said objects for storing in said memory means specific values of said attributes;

using said central processing unit to store in said memory means said attribute declarations in an attribute access descriptor data structure having an attribute selector and an attribute offset, said attribute selector being the name of said attribute, said attribute offset being an index into said attribute value array;

using said central processing unit to create an attribute access table for each said object and to store all attribute access tables in said memory means; thereafter using said central processing unit to place in said attribute access tables pointers to said attribute access descriptor data structures for each one of said objects, thereby to provide the data representation of said objects; and thereafter using said central processing unit to access said specific values of attributes in said attribute value array by specifying said attribute selector, using said pointers to find the attribute access descriptor data structure having said attribute selector, and applying said attribute offset as an index into said attribute value array, thereby to access the data representation of said objects.

2. The method of claim 1, wherein said attribute declarations include an element specifying access type, and wherein said access type element has the value "dynamic access" so as to permit generic access to said attribute values, further comprising the step of;

thereafter using the central processing unit to replace said "dynamic access" value of said access type element of said attribute declarations in said attribute access descriptor data structure with a value "static access" in order to permit direct reference to said specific values in said attribute value array, said attribute declarations specifying layout of internal data structure.

* * * * *